(12) United States Patent
Brannon et al.

(10) Patent No.: US 11,354,435 B2
(45) Date of Patent: *Jun. 7, 2022

(54) DATA PROCESSING SYSTEMS FOR DATA TESTING TO CONFIRM DATA DELETION AND RELATED METHODS

(71) Applicant: OneTrust, LLC, Atlanta, GA (US)

(72) Inventors: Jonathan Blake Brannon, Smyrna, GA (US); Kevin Jones, Atlanta, GA (US); Dylan D. Patton-Kuhl, Atlanta, GA (US); Bryan Patrick Kveen, Atlanta, GA (US); Nicholas Ian Pavlichek, Atlanta, GA (US); Eliza Rose Crawford, Chamblee, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/472,948

(22) Filed: Sep. 13, 2021

(65) Prior Publication Data

US 2021/0406398 A1 Dec. 30, 2021

Related U.S. Application Data

(63) Continuation-in-part of application No. 17/181,828, filed on Feb. 22, 2021, now Pat. No. 11,120,162,
(Continued)

(51) Int. Cl.
*G06F 9/44* (2018.01)
*G06F 21/62* (2013.01)
(Continued)

(52) U.S. Cl.
CPC ............ *G06F 21/6245* (2013.01); *G06F 9/44* (2013.01); *G06F 15/76* (2013.01);
(Continued)

(58) Field of Classification Search
CPC ...... G06F 15/76; G06F 16/9038; G06F 21/31; G06F 21/552; G06F 21/62;
(Continued)

(56) References Cited

U.S. PATENT DOCUMENTS 4,536,866 A 8/1985 Jerome et al.
5,193,162 A 3/1993 Bordsen et al.
(Continued)

FOREIGN PATENT DOCUMENTS

CN 111496802 8/2020
CN 112115859 12/2020
(Continued)

OTHER PUBLICATIONS

Subhadeep Sarkar et al., Towards Enforcement of the EU GDPR: Enabling Data Erasure, IEEE, 2018, retrieved online on Jan. 21, 2022, pp. 1-8. Retrieved from the Internet: <URL: https://ieeexplore.ieee.org/stamp/stamp.jsp?tp=&arnumber=8726847>. (Year: 2018).*
(Continued)

*Primary Examiner* — Hanh Thi-Minh Bui
(74) *Attorney, Agent, or Firm* — Brient IP Law, LLC

(57) ABSTRACT

In particular embodiments, a Personal Data Deletion System is configured to: (1) at least partially automatically identify and delete personal data that an entity is required to erase under one or more of the conditions discussed above; and (2) perform one or more data tests after the deletion to confirm that the system has, in fact, deleted any personal data associated with the data subject. The system may, for example, be configured to test to ensure the data has been deleted by: (1) submitting a unique token of data through a form to a system; (2) in response to passage of an expected data retention time, test the system by calling into the system after the passage of the data retention time to search for the unique token.

14 Claims, 67 Drawing Sheets

Related U.S. Application Data which is a continuation of application No. 16/834,812, filed on Mar. 30, 2020, now Pat. No. 10,929,559, which is a continuation of application No. 16/563,741, filed on Sep. 6, 2019, now Pat. No. 10,607,028, which is a continuation-in-part of application No. 16/410,566, filed on May 13, 2019, now Pat. No. 10,452,866, which is a continuation-in-part of application No. 16/055,083, filed on Aug. 4, 2018, now Pat. No. 10,289,870, which is a continuation-in-part of application No. 15/996,208, filed on Jun. 1, 2018, now Pat. No. 10,181,051, which is a continuation-in-part of application No. 15/853,674, filed on Dec. 22, 2017, now Pat. No. 10,019,597, which is a continuation-in-part of application No. 15/619,455, filed on Jun. 10, 2017, now Pat. No. 9,851,966, which is a continuation-in-part of application No. 15/254,901, filed on Sep. 1, 2016, now Pat. No. 9,729,583.

(60) Provisional application No. 62/728,435, filed on Sep. 7, 2018, provisional application No. 62/360,123, filed on Jul. 8, 2016, provisional application No. 62/353,802, filed on Jun. 23, 2016, provisional application No. 62/348,695, filed on Jun. 10, 2016, provisional application No. 62/541,613, filed on Aug. 4, 2017, provisional application No. 62/537,839, filed on Jul. 27, 2017, provisional application No. 62/547,530, filed on Aug. 18, 2017.

(51) Int. Cl.
| | | |
|---|---|---|
| *G06F 21/31* | (2013.01) | |
| *G06F 21/55* | (2013.01) | |
| *H04L 9/40* | (2022.01) | |
| *G06F 16/9038* | (2019.01) | |
| *G06F 15/76* | (2006.01) | |

(52) U.S. Cl.
CPC ......... *G06F 16/9038* (2019.01); *G06F 21/31* (2013.01); *G06F 21/552* (2013.01); *G06F 21/62* (2013.01); *G06F 21/6227* (2013.01); *H04L 29/06* (2013.01); *H04L 63/20* (2013.01); *H04L 63/205* (2013.01)

(58) Field of Classification Search
CPC .... G06F 21/6227; G06F 21/6245; G06F 9/44; H04L 29/06; H04L 63/20; H04L 63/205
See application file for complete search history.

(56) References Cited

U.S. PATENT DOCUMENTS

| | | |
|---|---|---|
| 5,276,735 A | 1/1994 | Boebert et al. |
| 5,329,447 A | 7/1994 | Leedom, Jr. |
| 5,404,299 A | 4/1995 | Tsurubayashi et al. |
| 5,535,393 A | 7/1996 | Reeve et al. |
| 5,560,005 A | 9/1996 | Hoover et al. |
| 5,668,986 A | 9/1997 | Nilsen et al. |
| 5,710,917 A | 1/1998 | Musa et al. |
| 5,761,529 A | 6/1998 | Raji |
| 5,764,906 A | 6/1998 | Edelstein et al. |
| 5,872,973 A | 2/1999 | Mitchell et al. |
| 5,913,041 A | 6/1999 | Ramanathan et al. |
| 5,913,214 A | 6/1999 | Madnick et al. |
| 6,016,394 A | 1/2000 | Walker |
| 6,122,627 A | 9/2000 | Carey et al. |
| 6,148,297 A | 11/2000 | Swor et al. |
| 6,148,342 A | 11/2000 | Ho |
| 6,240,416 B1 | 5/2001 | Immon et al. |
| 6,243,816 B1 | 6/2001 | Fang |
| 6,253,203 B1 | 6/2001 | Oflaherty et al. |
| 6,263,335 B1 | 7/2001 | Paik et al. |
| 6,272,631 B1 | 8/2001 | Thomlinson et al. |
| 6,275,824 B1 | 8/2001 | Oflaherty et al. |
| 6,282,548 B1 | 8/2001 | Burner et al. |
| 6,330,562 B1 | 12/2001 | Boden et al. |
| 6,363,488 B1 | 3/2002 | Ginter et al. |
| 6,374,237 B1 | 4/2002 | Reese |
| 6,374,252 B1 | 4/2002 | Althoff et al. |
| 6,408,336 B1 | 6/2002 | Schneider et al. |
| 6,427,230 B1 | 7/2002 | Goiffon et al. |
| 6,442,688 B1 | 8/2002 | Moses et al. |
| 6,446,120 B1 | 9/2002 | Dantressangle |
| 6,463,488 B1 | 10/2002 | San Juan |
| 6,484,149 B1 | 11/2002 | Jammes et al. |
| 6,484,180 B1 | 11/2002 | Lyons et al. |
| 6,516,314 B1 | 2/2003 | Birkler et al. |
| 6,516,337 B1 | 2/2003 | Tripp et al. |
| 6,519,571 B1 | 2/2003 | Guheen et al. |
| 6,591,272 B1 | 7/2003 | Williams |
| 6,601,233 B1 | 7/2003 | Underwood |
| 6,606,744 B1 | 8/2003 | Mikurak |
| 6,611,812 B2 | 8/2003 | Hurtado et al. |
| 6,625,602 B1 | 9/2003 | Meredith et al. |
| 6,629,081 B1 | 9/2003 | Cornelius et al. |
| 6,633,878 B1 | 10/2003 | Underwood |
| 6,662,192 B1 | 12/2003 | Rebane |
| 6,662,357 B1 | 12/2003 | Bowman-Amuah |
| 6,697,824 B1 | 2/2004 | Bowman-Amuah |
| 6,699,042 B2 | 3/2004 | Smith et al. |
| 6,701,314 B1 | 3/2004 | Conover et al. |
| 6,721,713 B1 | 4/2004 | Guheen et al. |
| 6,725,200 B1 | 4/2004 | Rost |
| 6,732,109 B2 | 5/2004 | Lindberg et al. |
| 6,754,665 B1 | 6/2004 | Futagami et al. |
| 6,755,344 B1 | 6/2004 | Mollett et al. |
| 6,757,685 B2 | 6/2004 | Raffaele et al. |
| 6,757,888 B1 | 6/2004 | Knutson et al. |
| 6,816,944 B2 | 11/2004 | Peng |
| 6,826,693 B1 | 11/2004 | Yoshida et al. |
| 6,850,252 B1 | 2/2005 | Hoffberg |
| 6,886,101 B2 | 4/2005 | Glazer et al. |
| 6,901,346 B2 | 5/2005 | Tracy et al. |
| 6,904,417 B2 | 6/2005 | Clayton et al. |
| 6,909,897 B2 | 6/2005 | Kikuchi |
| 6,925,443 B1 | 8/2005 | Baggett, Jr. et al. |
| 6,938,041 B1 | 8/2005 | Brandow et al. |
| 6,956,845 B2 | 10/2005 | Baker et al. |
| 6,978,270 B1 | 12/2005 | Carty et al. |
| 6,980,927 B2 | 12/2005 | Tracy et al. |
| 6,980,987 B2 | 12/2005 | Kaminer |
| 6,983,221 B2 | 1/2006 | Tracy et al. |
| 6,985,887 B1 | 1/2006 | Sunstein et al. |
| 6,990,454 B2 | 1/2006 | McIntosh |
| 6,993,448 B2 | 1/2006 | Tracy et al. |
| 6,993,495 B2 | 1/2006 | Smith, Jr. et al. |
| 6,996,807 B1 | 2/2006 | Vardi et al. |
| 7,003,560 B1 | 2/2006 | Mullen et al. |
| 7,003,662 B2 | 2/2006 | Genty et al. |
| 7,013,290 B2 | 3/2006 | Ananian |
| 7,017,105 B2 | 3/2006 | Flanagin et al. |
| 7,023,979 B1 | 4/2006 | Wu et al. |
| 7,039,594 B1 | 5/2006 | Gersting |
| 7,039,654 B1 | 5/2006 | Eder |
| 7,047,517 B1 | 5/2006 | Brown et al. |
| 7,051,036 B2 | 5/2006 | Rosnow et al. |
| 7,051,038 B1 | 5/2006 | Yeh et al. |
| 7,058,970 B2 | 6/2006 | Shaw |
| 7,069,427 B2 | 6/2006 | Adler et al. |
| 7,076,558 B1 | 7/2006 | Dunn |
| 7,095,854 B1 | 8/2006 | Ginter et al. |
| 7,100,195 B1 | 8/2006 | Underwood |
| 7,120,800 B2 | 10/2006 | Ginter et al. |
| 7,124,101 B1 | 10/2006 | Mikurak |
| 7,124,107 B1 | 10/2006 | Pishevar et al. |
| 7,127,705 B2 | 10/2006 | Christfort et al. |
| 7,127,741 B2 | 10/2006 | Bandini et al. |
| 7,133,845 B1 | 11/2006 | Ginter et al. |
| 7,139,999 B2 | 11/2006 | Bowman-Amuah |
| 7,143,091 B2 | 11/2006 | Charnock et al. |

(56) References Cited

U.S. PATENT DOCUMENTS

| | | |
|---|---|---|
| 7,149,698 B2 | 12/2006 | Guheen et al. |
| 7,165,041 B1 | 1/2007 | Guheen et al. |
| 7,167,842 B1 | 1/2007 | Josephson, II et al. |
| 7,167,844 B1 | 1/2007 | Leong et al. |
| 7,171,379 B2 | 1/2007 | Menninger et al. |
| 7,181,438 B1 | 2/2007 | Szabo |
| 7,203,929 B1 | 4/2007 | Vinodkrishnan et al. |
| 7,213,233 B1 | 5/2007 | Vinodkrishnan et al. |
| 7,216,340 B1 | 5/2007 | Vinodkrishnan et al. |
| 7,219,066 B2 | 5/2007 | Parks et al. |
| 7,223,234 B2 | 5/2007 | Stupp et al. |
| 7,225,460 B2 | 5/2007 | Barzilai et al. |
| 7,234,065 B2 | 6/2007 | Breslin et al. |
| 7,247,625 B2 | 7/2007 | Zhang et al. |
| 7,251,624 B1 | 7/2007 | Lee et al. |
| 7,260,830 B2 | 8/2007 | Sugimoto |
| 7,266,566 B1 | 9/2007 | Kennaley et al. |
| 7,272,818 B2 | 9/2007 | Ishimitsu et al. |
| 7,275,063 B2 | 9/2007 | Horn |
| 7,281,020 B2 | 10/2007 | Fine |
| 7,284,232 B1 | 10/2007 | Bates et al. |
| 7,284,271 B2 | 10/2007 | Lucovsky et al. |
| 7,287,280 B2 | 10/2007 | Young |
| 7,290,275 B2 | 10/2007 | Baudoin et al. |
| 7,293,119 B2 | 11/2007 | Beale |
| 7,299,299 B2 | 11/2007 | Hollenbeck et al. |
| 7,302,569 B2 | 11/2007 | Betz et al. |
| 7,313,575 B2 | 12/2007 | Carr et al. |
| 7,313,699 B2 | 12/2007 | Koga |
| 7,313,825 B2 | 12/2007 | Redlich et al. |
| 7,315,826 B1 | 1/2008 | Guheen et al. |
| 7,315,849 B2 | 1/2008 | Bakalash et al. |
| 7,322,047 B2 | 1/2008 | Redlich et al. |
| 7,330,850 B1 | 2/2008 | Seibel et al. |
| 7,340,447 B2 | 3/2008 | Ghatare |
| 7,340,776 B2 | 3/2008 | Zobel et al. |
| 7,343,434 B2 | 3/2008 | Kapoor et al. |
| 7,346,518 B1 | 3/2008 | Frank et al. |
| 7,353,204 B2 | 4/2008 | Liu |
| 7,356,559 B1 | 4/2008 | Jacobs et al. |
| 7,367,014 B2 | 4/2008 | Griffin |
| 7,370,025 B1 | 5/2008 | Pandit |
| 7,376,835 B2 | 5/2008 | Olkin et al. |
| 7,380,120 B1 | 5/2008 | Garcia |
| 7,382,903 B2 | 6/2008 | Ray |
| 7,383,570 B2 | 6/2008 | Pinkas et al. |
| 7,391,854 B2 | 6/2008 | Salonen et al. |
| 7,398,393 B2 | 7/2008 | Mont et al. |
| 7,401,235 B2 | 7/2008 | Mowers et al. |
| 7,403,942 B1 | 7/2008 | Bayliss |
| 7,409,354 B2 | 8/2008 | Putnam et al. |
| 7,412,402 B2 | 8/2008 | Cooper |
| 7,424,680 B2 | 9/2008 | Carpenter |
| 7,428,546 B2 | 9/2008 | Nori et al. |
| 7,430,585 B2 | 9/2008 | Sibert |
| 7,454,457 B1 | 11/2008 | Lowery et al. |
| 7,454,508 B2 | 11/2008 | Mathew et al. |
| 7,478,157 B2 | 1/2009 | Bohrer et al. |
| 7,480,755 B2 | 1/2009 | Herrell et al. |
| 7,487,170 B2 | 2/2009 | Stevens |
| 7,493,282 B2 | 2/2009 | Manly et al. |
| 7,512,987 B2 | 3/2009 | Williams |
| 7,516,882 B2 | 4/2009 | Cucinotta |
| 7,523,053 B2 | 4/2009 | Pudhukottai et al. |
| 7,529,836 B1 | 5/2009 | Bolen |
| 7,548,968 B1 | 6/2009 | Bura et al. |
| 7,552,480 B1 | 6/2009 | Voss |
| 7,562,339 B2 | 7/2009 | Racca et al. |
| 7,565,685 B2 | 7/2009 | Ross et al. |
| 7,567,541 B2 | 7/2009 | Karimi et al. |
| 7,584,505 B2 | 9/2009 | Mondri et al. |
| 7,584,508 B1 | 9/2009 | Kashchenko et al. |
| 7,587,749 B2 | 9/2009 | Leser et al. |
| 7,590,705 B2 | 9/2009 | Mathew et al. |
| 7,590,972 B2 | 9/2009 | Axelrod et al. |
| 7,603,356 B2 | 10/2009 | Schran et al. |
| 7,606,783 B1 | 10/2009 | Carter |
| 7,606,790 B2 | 10/2009 | Levy |
| 7,607,120 B2 | 10/2009 | Sanyal et al. |
| 7,613,700 B1 | 11/2009 | Lobo et al. |
| 7,617,136 B1 | 11/2009 | Lessing et al. |
| 7,617,167 B2 | 11/2009 | Griffis et al. |
| 7,620,644 B2 | 11/2009 | Cote et al. |
| 7,627,666 B1 | 12/2009 | Degiulio et al. |
| 7,630,874 B2 | 12/2009 | Fables et al. |
| 7,630,998 B2 | 12/2009 | Zhou et al. |
| 7,636,742 B1 | 12/2009 | Olavarrieta et al. |
| 7,640,322 B2 | 12/2009 | Wendkos et al. |
| 7,650,497 B2 | 1/2010 | Thornton et al. |
| 7,653,592 B1 | 1/2010 | Flaxman et al. |
| 7,657,476 B2 | 2/2010 | Barney |
| 7,657,694 B2 | 2/2010 | Mansell et al. |
| 7,665,073 B2 | 2/2010 | Meijer et al. |
| 7,665,125 B2 | 2/2010 | Heard et al. |
| 7,668,947 B2 | 2/2010 | Hutchinson et al. |
| 7,673,282 B2 | 3/2010 | Amaru et al. |
| 7,676,034 B1 | 3/2010 | Wu et al. |
| 7,681,034 B1 | 3/2010 | Lee et al. |
| 7,681,140 B2 | 3/2010 | Ebert |
| 7,685,561 B2 | 3/2010 | Deem et al. |
| 7,685,577 B2 | 3/2010 | Pace et al. |
| 7,693,593 B2 | 4/2010 | Ishibashi et al. |
| 7,698,398 B1 | 4/2010 | Lai |
| 7,702,639 B2 | 4/2010 | Stanley et al. |
| 7,707,224 B2 | 4/2010 | Chastagnol et al. |
| 7,712,029 B2 | 5/2010 | Ferreira et al. |
| 7,716,242 B2 | 5/2010 | Pae et al. |
| 7,725,474 B2 | 5/2010 | Tamai et al. |
| 7,725,875 B2 | 5/2010 | Waldrep |
| 7,729,940 B2 | 6/2010 | Harvey et al. |
| 7,730,142 B2 | 6/2010 | Levasseur et al. |
| 7,752,124 B2 | 7/2010 | Green et al. |
| 7,756,826 B2 | 7/2010 | Bots et al. |
| 7,756,987 B2 | 7/2010 | Wang et al. |
| 7,761,586 B2 | 7/2010 | Olenick et al. |
| 7,774,745 B2 | 8/2010 | Fildebrandt et al. |
| 7,788,212 B2 | 8/2010 | Beckmann et al. |
| 7,788,222 B2 | 8/2010 | Shah et al. |
| 7,788,632 B2 | 8/2010 | Kuester et al. |
| 7,788,726 B2 | 8/2010 | Teixeira |
| 7,801,758 B2 | 9/2010 | Gracie et al. |
| 7,801,826 B2 | 9/2010 | Labrou et al. |
| 7,801,912 B2 | 9/2010 | Ransil et al. |
| 7,802,305 B1 | 9/2010 | Leeds |
| 7,805,349 B2 | 9/2010 | Yu et al. |
| 7,813,947 B2 | 10/2010 | Deangelis et al. |
| 7,822,620 B2 | 10/2010 | Dixon et al. |
| 7,827,523 B2 | 11/2010 | Ahmed et al. |
| 7,844,640 B2 | 11/2010 | Bender et al. |
| 7,849,143 B2 | 12/2010 | Vuong |
| 7,853,468 B2 | 12/2010 | Callahan et al. |
| 7,853,470 B2 | 12/2010 | Sonnleithner et al. |
| 7,853,925 B2 | 12/2010 | Kemmler |
| 7,870,540 B2 | 1/2011 | Zare et al. |
| 7,870,608 B2 | 1/2011 | Shraim et al. |
| 7,873,541 B1 | 1/2011 | Klar et al. |
| 7,877,327 B2 | 1/2011 | Gwiazda et al. |
| 7,877,812 B2 | 1/2011 | Koved et al. |
| 7,885,841 B2 | 2/2011 | King |
| 7,890,461 B2 | 2/2011 | Oeda et al. |
| 7,895,260 B2 | 2/2011 | Archer et al. |
| 7,904,478 B2 | 3/2011 | Yu et al. |
| 7,904,487 B2 | 3/2011 | Ghatare |
| 7,917,888 B2 | 3/2011 | Chong et al. |
| 7,917,963 B2 | 3/2011 | Goyal et al. |
| 7,921,152 B2 | 4/2011 | Ashley et al. |
| 7,930,197 B2 | 4/2011 | Ozzie et al. |
| 7,930,753 B2 | 4/2011 | Mellinger et al. |
| 7,953,725 B2 | 5/2011 | Burris et al. |
| 7,954,150 B2 | 5/2011 | Croft et al. |
| 7,958,087 B2 | 6/2011 | Blumenau |
| 7,958,494 B2 | 6/2011 | Chaar et al. |
| 7,962,900 B2 | 6/2011 | Barraclough et al. |
| 7,966,310 B2 | 6/2011 | Sullivan et al. |

(56) References Cited

U.S. PATENT DOCUMENTS

| | | |
|---|---|---|
| 7,966,599 B1 | 6/2011 | Malasky et al. |
| 7,966,663 B2 | 6/2011 | Strickland et al. |
| 7,974,992 B2 | 7/2011 | Fastabend et al. |
| 7,975,000 B2 | 7/2011 | Dixon et al. |
| 7,991,559 B2 | 8/2011 | Dzekunov et al. |
| 7,991,747 B1 | 8/2011 | Upadhyay et al. |
| 7,996,372 B2 | 8/2011 | Rubel, Jr. |
| 8,005,891 B2 | 8/2011 | Knowles et al. |
| 8,010,612 B2 | 8/2011 | Costea et al. |
| 8,010,720 B2 | 8/2011 | Iwaoka et al. |
| 8,019,881 B2 | 9/2011 | Sandhu et al. |
| 8,020,206 B2 | 9/2011 | Hubbard et al. |
| 8,024,384 B2 | 9/2011 | Prabhakar et al. |
| 8,032,721 B2 | 10/2011 | Murai |
| 8,036,374 B2 | 10/2011 | Noble, Jr. |
| 8,037,409 B2 | 10/2011 | Jacob et al. |
| 8,041,749 B2 | 10/2011 | Beck |
| 8,041,913 B2 | 10/2011 | Wang |
| 8,069,161 B2 | 11/2011 | Bugir et al. |
| 8,069,471 B2 | 11/2011 | Boren |
| 8,082,539 B1 | 12/2011 | Schelkogonov |
| 8,090,754 B2 | 1/2012 | Schmidt et al. |
| 8,095,923 B2 | 1/2012 | Harvey et al. |
| 8,099,709 B2 | 1/2012 | Baikov et al. |
| 8,103,962 B2 | 1/2012 | Embley et al. |
| 8,117,441 B2 | 2/2012 | Kurien et al. |
| 8,135,815 B2 | 3/2012 | Mayer |
| 8,146,054 B2 | 3/2012 | Baker et al. |
| 8,146,074 B2 | 3/2012 | Ito et al. |
| 8,150,717 B2 | 4/2012 | Whitmore |
| 8,156,105 B2 | 4/2012 | Altounian et al. |
| 8,156,158 B2 | 4/2012 | Rolls et al. |
| 8,166,406 B1 | 4/2012 | Goldfeder et al. |
| 8,176,061 B2 | 5/2012 | Swanbeck et al. |
| 8,176,177 B2 | 5/2012 | Sussman et al. |
| 8,176,334 B2 | 5/2012 | Vainstein |
| 8,176,470 B2 | 5/2012 | Klumpp et al. |
| 8,180,759 B2 | 5/2012 | Hamzy |
| 8,181,151 B2 | 5/2012 | Sedukhin et al. |
| 8,185,409 B2 | 5/2012 | Putnam et al. |
| 8,196,176 B2 | 6/2012 | Berteau et al. |
| 8,205,093 B2 | 6/2012 | Argott |
| 8,205,140 B2 | 6/2012 | Hafeez et al. |
| 8,214,362 B1 | 7/2012 | Djabarov |
| 8,214,803 B2 | 7/2012 | Horii et al. |
| 8,234,377 B2 | 7/2012 | Cohn |
| 8,239,244 B2 | 8/2012 | Ginsberg et al. |
| 8,250,051 B2 | 8/2012 | Bugir et al. |
| 8,255,468 B2 | 8/2012 | Vitaldevara et al. |
| 8,260,262 B2 | 9/2012 | Ben Ayed |
| 8,261,362 B2 | 9/2012 | Goodwin et al. |
| 8,266,231 B1 | 9/2012 | Golovin et al. |
| 8,275,632 B2 | 9/2012 | Awaraji et al. |
| 8,275,793 B2 | 9/2012 | Ahmad et al. |
| 8,286,239 B1 | 10/2012 | Sutton |
| 8,312,549 B2 | 11/2012 | Goldberg et al. |
| 8,316,237 B1 | 11/2012 | Felsher et al. |
| 8,332,908 B2 | 12/2012 | Hatakeyama et al. |
| 8,340,999 B2 | 12/2012 | Kumaran et al. |
| 8,341,405 B2 | 12/2012 | Meijer et al. |
| 8,346,929 B1 | 1/2013 | Lai |
| 8,364,713 B2 | 1/2013 | Pollard |
| 8,370,224 B2 | 2/2013 | Grewal |
| 8,370,794 B2 | 2/2013 | Moosmann et al. |
| 8,380,630 B2 | 2/2013 | Felsher |
| 8,380,743 B2 | 2/2013 | Convertino et al. |
| 8,381,180 B2 | 2/2013 | Rostoker |
| 8,381,297 B2 | 2/2013 | Touboul |
| 8,386,314 B2 | 2/2013 | Kirkby et al. |
| 8,392,982 B2 | 3/2013 | Harris et al. |
| 8,418,226 B2 | 4/2013 | Gardner |
| 8,423,954 B2 | 4/2013 | Ronen et al. |
| 8,429,179 B1 | 4/2013 | Mirhaji |
| 8,429,597 B2 | 4/2013 | Prigge |
| 8,429,630 B2 | 4/2013 | Nickolov et al. |
| 8,429,758 B2 | 4/2013 | Chen et al. |
| 8,438,644 B2 | 5/2013 | Watters et al. |
| 8,463,247 B2 | 6/2013 | Misiag |
| 8,464,311 B2 | 6/2013 | Ashley et al. |
| 8,468,244 B2 | 6/2013 | Redlich et al. |
| 8,473,324 B2 | 6/2013 | Alvarez et al. |
| 8,474,012 B2 | 6/2013 | Ahmed et al. |
| 8,494,894 B2 | 7/2013 | Jaster et al. |
| 8,504,481 B2 | 8/2013 | Motahari et al. |
| 8,510,199 B1 | 8/2013 | Erlanger |
| 8,515,988 B2 | 8/2013 | Jones et al. |
| 8,516,076 B2 | 8/2013 | Thomas |
| 8,527,337 B1 | 9/2013 | Lim et al. |
| 8,533,746 B2 | 9/2013 | Nolan et al. |
| 8,533,844 B2 | 9/2013 | Mahaffey et al. |
| 8,538,817 B2 | 9/2013 | Wilson |
| 8,539,359 B2 | 9/2013 | Rapaport et al. |
| 8,539,437 B2 | 9/2013 | Finlayson et al. |
| 8,560,645 B2 | 10/2013 | Linden et al. |
| 8,560,841 B2 | 10/2013 | Chin et al. |
| 8,560,956 B2 | 10/2013 | Curtis et al. |
| 8,561,153 B2 | 10/2013 | Grason et al. |
| 8,565,729 B2 | 10/2013 | Moseler et al. |
| 8,566,726 B2 | 10/2013 | Dixon et al. |
| 8,566,938 B1 | 10/2013 | Prakash et al. |
| 8,571,909 B2 | 10/2013 | Miller et al. |
| 8,572,717 B2 | 10/2013 | Narayanaswamy |
| 8,578,036 B1 | 11/2013 | Holfelder et al. |
| 8,578,166 B2 | 11/2013 | De Monseignat et al. |
| 8,578,481 B2 | 11/2013 | Rowley |
| 8,578,501 B1 | 11/2013 | Ogilvie |
| 8,583,694 B2 | 11/2013 | Siegel et al. |
| 8,583,766 B2 | 11/2013 | Dixon et al. |
| 8,589,183 B2 | 11/2013 | Awaraji et al. |
| 8,601,467 B2 | 12/2013 | Hofhansl et al. |
| 8,601,591 B2 | 12/2013 | Krishnamurthy et al. |
| 8,606,746 B2 | 12/2013 | Yeap et al. |
| 8,612,420 B2 | 12/2013 | Sun et al. |
| 8,612,993 B2 | 12/2013 | Grant et al. |
| 8,615,549 B2 | 12/2013 | Knowles et al. |
| 8,615,731 B2 | 12/2013 | Doshi |
| 8,620,952 B2 | 12/2013 | Bennett et al. |
| 8,621,637 B2 | 12/2013 | Al-Harbi et al. |
| 8,626,671 B2 | 1/2014 | Federgreen |
| 8,627,114 B2 | 1/2014 | Resch et al. |
| 8,630,961 B2 | 1/2014 | Beilby et al. |
| 8,631,048 B1 | 1/2014 | Davis et al. |
| 8,640,110 B2 | 1/2014 | Kopp et al. |
| 8,646,072 B1 | 2/2014 | Savant |
| 8,650,399 B2 | 2/2014 | Le Bihan et al. |
| 8,655,939 B2 | 2/2014 | Redlich et al. |
| 8,656,265 B1 | 2/2014 | Paulin et al. |
| 8,656,456 B2 | 2/2014 | Maxson et al. |
| 8,661,036 B2 | 2/2014 | Turski et al. |
| 8,667,074 B1 | 3/2014 | Farkas |
| 8,667,487 B1 | 3/2014 | Boodman et al. |
| 8,677,472 B1 | 3/2014 | Dotan et al. |
| 8,681,984 B2 | 3/2014 | Lee et al. |
| 8,682,698 B2 | 3/2014 | Cashman et al. |
| 8,683,502 B2 | 3/2014 | Shkedi et al. |
| 8,688,601 B2 | 4/2014 | Jaiswal |
| 8,689,292 B2 | 4/2014 | Williams et al. |
| 8,693,689 B2 | 4/2014 | Belenkiy et al. |
| 8,700,524 B2 | 4/2014 | Williams et al. |
| 8,700,699 B2 | 4/2014 | Shen et al. |
| 8,706,742 B1 | 4/2014 | Ravid et al. |
| 8,707,451 B2 | 4/2014 | Ture et al. |
| 8,712,813 B2 | 4/2014 | King |
| 8,713,098 B1 | 4/2014 | Adya et al. |
| 8,713,638 B2 | 4/2014 | Hu et al. |
| 8,719,366 B2 | 5/2014 | Mathew et al. |
| 8,732,839 B2 | 5/2014 | Hohl |
| 8,744,894 B2 | 6/2014 | Christiansen et al. |
| 8,751,285 B2 | 6/2014 | Deb et al. |
| 8,762,406 B2 | 6/2014 | Ho et al. |
| 8,763,071 B2 | 6/2014 | Sinha et al. |
| 8,763,082 B2 | 6/2014 | Huber et al. |
| 8,763,131 B2 | 6/2014 | Archer et al. |
| 8,767,947 B1 | 7/2014 | Ristock et al. |

(56) References Cited

U.S. PATENT DOCUMENTS

| | | |
|---|---|---|
| 8,769,242 B2 | 7/2014 | Tkac et al. |
| 8,769,412 B2 | 7/2014 | Gill et al. |
| 8,769,671 B2 | 7/2014 | Shraim et al. |
| 8,776,241 B2 | 7/2014 | Zaitsev |
| 8,788,935 B1 | 7/2014 | Hirsch et al. |
| 8,793,614 B2 | 7/2014 | Wilson et al. |
| 8,793,650 B2 | 7/2014 | Hilerio et al. |
| 8,793,781 B2 | 7/2014 | Grossi et al. |
| 8,793,809 B2 | 7/2014 | Falkenburg et al. |
| 8,799,984 B2 | 8/2014 | Ahn |
| 8,805,707 B2 | 8/2014 | Schumann, Jr. et al. |
| 8,805,806 B2 | 8/2014 | Amarendran et al. |
| 8,805,925 B2 | 8/2014 | Price et al. |
| 8,812,342 B2 | 8/2014 | Barcelo et al. |
| 8,812,752 B1 | 8/2014 | Shih et al. |
| 8,812,766 B2 | 8/2014 | Kranendonk et al. |
| 8,813,028 B2 | 8/2014 | Farooqi |
| 8,819,253 B2 | 8/2014 | Simeloff et al. |
| 8,819,617 B1 | 8/2014 | Koenig et al. |
| 8,826,446 B1 | 9/2014 | Liu et al. |
| 8,832,649 B2 | 9/2014 | Bishop et al. |
| 8,832,854 B1 | 9/2014 | Staddon et al. |
| 8,839,232 B2 | 9/2014 | Taylor et al. |
| 8,843,487 B2 | 9/2014 | McGraw et al. |
| 8,843,745 B2 | 9/2014 | Roberts, Jr. |
| 8,849,757 B2 | 9/2014 | Kruglick |
| 8,856,534 B2 | 10/2014 | Khosravi et al. |
| 8,862,507 B2 | 10/2014 | Sandhu et al. |
| 8,875,232 B2 | 10/2014 | Blom et al. |
| 8,893,078 B2 | 11/2014 | Schaude et al. |
| 8,893,286 B1 | 11/2014 | Oliver |
| 8,893,297 B2 | 11/2014 | Eversoll et al. |
| 8,904,494 B2 | 12/2014 | Kindler et al. |
| 8,914,263 B2 | 12/2014 | Shimada et al. |
| 8,914,299 B2 | 12/2014 | Pesci-Anderson et al. |
| 8,914,342 B2 | 12/2014 | Kalaboukis et al. |
| 8,914,902 B2 | 12/2014 | Moritz et al. |
| 8,918,306 B2 | 12/2014 | Cashman et al. |
| 8,918,392 B1 | 12/2014 | Brooker et al. |
| 8,918,632 B1 | 12/2014 | Sartor |
| 8,930,896 B1 | 1/2015 | Wiggins |
| 8,930,897 B2 | 1/2015 | Nassar |
| 8,935,198 B1 | 1/2015 | Phillips et al. |
| 8,935,266 B2 | 1/2015 | Wu |
| 8,935,342 B2 | 1/2015 | Patel |
| 8,935,804 B1 | 1/2015 | Clark et al. |
| 8,938,221 B2 | 1/2015 | Brazier et al. |
| 8,943,076 B2 | 1/2015 | Stewart et al. |
| 8,943,548 B2 | 1/2015 | Drokov et al. |
| 8,949,137 B2 | 2/2015 | Crapo et al. |
| 8,955,038 B2 | 2/2015 | Nicodemus et al. |
| 8,959,568 B2 | 2/2015 | Hudis et al. |
| 8,959,584 B2 | 2/2015 | Piliouras |
| 8,966,575 B2 | 2/2015 | McQuay et al. |
| 8,966,597 B1 | 2/2015 | Saylor et al. |
| 8,973,108 B1 | 3/2015 | Roth et al. |
| 8,977,234 B2 | 3/2015 | Chava |
| 8,977,643 B2 | 3/2015 | Schindlauer et al. |
| 8,978,158 B2 | 3/2015 | Rajkumar et al. |
| 8,983,972 B2 | 3/2015 | Kriebel et al. |
| 8,984,031 B1 | 3/2015 | Todd |
| 8,990,933 B1 | 3/2015 | Magdalin |
| 8,996,417 B1 | 3/2015 | Channakeshava |
| 8,996,480 B2 | 3/2015 | Agarwala et al. |
| 8,997,213 B2 | 3/2015 | Papakipos et al. |
| 9,003,295 B2 | 4/2015 | Baschy |
| 9,003,552 B2 | 4/2015 | Goodwin et al. |
| 9,009,851 B2 | 4/2015 | Droste et al. |
| 9,014,661 B2 | 4/2015 | Decharms |
| 9,015,796 B1 | 4/2015 | Fujioka |
| 9,021,469 B2 | 4/2015 | Hilerio et al. |
| 9,026,526 B1 | 5/2015 | Bau et al. |
| 9,030,987 B2 | 5/2015 | Bianchetti et al. |
| 9,032,067 B2 | 5/2015 | Prasad et al. |
| 9,043,217 B2 | 5/2015 | Cashman et al. |
| 9,043,480 B2 | 5/2015 | Barton et al. |
| 9,047,463 B2 | 6/2015 | Porras |
| 9,047,582 B2 | 6/2015 | Hutchinson et al. |
| 9,047,639 B1 | 6/2015 | Quintiliani et al. |
| 9,049,244 B2 | 6/2015 | Prince et al. |
| 9,049,314 B2 | 6/2015 | Pugh et al. |
| 9,055,071 B1 | 6/2015 | Gates et al. |
| 9,058,590 B2 | 6/2015 | Criddle et al. |
| 9,064,033 B2 | 6/2015 | Jin et al. |
| 9,069,940 B2 | 6/2015 | Hars |
| 9,076,231 B1 | 7/2015 | Hill et al. |
| 9,077,736 B2 | 7/2015 | Werth et al. |
| 9,081,952 B2 | 7/2015 | Sagi et al. |
| 9,087,090 B1 | 7/2015 | Cormier et al. |
| 9,092,796 B2 | 7/2015 | Eversoll et al. |
| 9,094,434 B2 | 7/2015 | Williams et al. |
| 9,098,515 B2 | 8/2015 | Richter et al. |
| 9,100,778 B2 | 8/2015 | Stogaitis et al. |
| 9,106,691 B1 | 8/2015 | Burger et al. |
| 9,106,710 B1 | 8/2015 | Feimster |
| 9,111,105 B2 | 8/2015 | Barton et al. |
| 9,111,295 B2 | 8/2015 | Tietzen et al. |
| 9,123,339 B1 | 9/2015 | Shaw et al. |
| 9,129,311 B2 | 9/2015 | Schoen et al. |
| 9,135,261 B2 | 9/2015 | Maunder et al. |
| 9,135,444 B2 | 9/2015 | Carter et al. |
| 9,141,823 B2 | 9/2015 | Dawson |
| 9,152,818 B1 | 10/2015 | Hathaway et al. |
| 9,152,820 B1 | 10/2015 | Pauley, Jr. et al. |
| 9,154,514 B1 | 10/2015 | Prakash |
| 9,154,556 B1 | 10/2015 | Dotan et al. |
| 9,158,655 B2 | 10/2015 | Wadhwani et al. |
| 9,165,036 B2 | 10/2015 | Mehra |
| 9,170,996 B2 | 10/2015 | Lovric et al. |
| 9,172,706 B2 | 10/2015 | Krishnamurthy et al. |
| 9,177,293 B1 | 11/2015 | Gagnon et al. |
| 9,178,901 B2 | 11/2015 | Xue et al. |
| 9,183,100 B2 | 11/2015 | Gventer et al. |
| 9,189,642 B2 | 11/2015 | Perlman |
| 9,201,572 B2 | 12/2015 | Lyon et al. |
| 9,201,770 B1 | 12/2015 | Duerk |
| 9,202,026 B1 | 12/2015 | Reeves |
| 9,202,085 B2 | 12/2015 | Mawdsley et al. |
| 9,215,076 B1 | 12/2015 | Roth et al. |
| 9,215,252 B2 | 12/2015 | Smith et al. |
| 9,218,596 B2 | 12/2015 | Ronca et al. |
| 9,224,009 B1 | 12/2015 | Liu et al. |
| 9,230,036 B2 | 1/2016 | Davis |
| 9,231,935 B1 | 1/2016 | Bridge et al. |
| 9,232,040 B2 | 1/2016 | Barash et al. |
| 9,235,476 B2 | 1/2016 | McHugh et al. |
| 9,240,987 B2 | 1/2016 | Barrett-Bowen et al. |
| 9,241,259 B2 | 1/2016 | Daniela et al. |
| 9,245,126 B2 | 1/2016 | Christodorescu et al. |
| 9,245,266 B2 | 1/2016 | Hardt |
| 9,253,609 B2 | 2/2016 | Hosier, Jr. |
| 9,264,443 B2 | 2/2016 | Weisman |
| 9,274,858 B2 | 3/2016 | Milliron et al. |
| 9,280,581 B1 | 3/2016 | Grimes et al. |
| 9,286,149 B2 | 3/2016 | Sampson et al. |
| 9,286,282 B2 | 3/2016 | Ling, III et al. |
| 9,288,118 B1 | 3/2016 | Pattan |
| 9,288,556 B2 | 3/2016 | Kim et al. |
| 9,294,498 B1 | 3/2016 | Yampolskiy et al. |
| 9,299,050 B2 | 3/2016 | Stiffler et al. |
| 9,306,939 B2 | 4/2016 | Chan et al. |
| 9,317,697 B2 | 4/2016 | Maier et al. |
| 9,317,715 B2 | 4/2016 | Schuette et al. |
| 9,325,731 B2 | 4/2016 | McGeehan |
| 9,336,184 B2 | 5/2016 | Mital et al. |
| 9,336,324 B2 | 5/2016 | Lomme et al. |
| 9,336,332 B2 | 5/2016 | Davis et al. |
| 9,336,400 B2 | 5/2016 | Milman et al. |
| 9,338,188 B1 | 5/2016 | Ahn |
| 9,342,706 B2 | 5/2016 | Chawla et al. |
| 9,344,297 B2 | 5/2016 | Shah et al. |
| 9,344,424 B2 | 5/2016 | Tenenboym et al. |
| 9,344,484 B2 | 5/2016 | Ferris |
| 9,348,802 B2 | 5/2016 | Massand |

(56) References Cited

U.S. PATENT DOCUMENTS

| | | |
|---|---|---|
| 9,348,862 B2 | 5/2016 | Kawecki, III |
| 9,348,929 B2 | 5/2016 | Eberlein |
| 9,349,016 B1 | 5/2016 | Brisebois et al. |
| 9,350,718 B2 | 5/2016 | Sondhi et al. |
| 9,355,157 B2 | 5/2016 | Mohammed et al. |
| 9,356,961 B1 | 5/2016 | Todd et al. |
| 9,361,446 B1 | 6/2016 | Demirjian et al. |
| 9,369,488 B2 | 6/2016 | Woods et al. |
| 9,374,693 B1 | 6/2016 | Olincy et al. |
| 9,384,199 B2 | 7/2016 | Thereska et al. |
| 9,384,357 B2 | 7/2016 | Patil et al. |
| 9,386,104 B2 | 7/2016 | Adams et al. |
| 9,396,332 B2 | 7/2016 | Abrams et al. |
| 9,401,900 B2 | 7/2016 | Levasseur et al. |
| 9,411,967 B2 | 8/2016 | Parecki et al. |
| 9,411,982 B1 | 8/2016 | Dippenaar et al. |
| 9,417,859 B2 | 8/2016 | Gounares et al. |
| 9,424,021 B2 | 8/2016 | Zamir |
| 9,424,414 B1 | 8/2016 | Demirjian et al. |
| 9,426,177 B2 | 8/2016 | Wang et al. |
| 9,450,940 B2 | 9/2016 | Belov et al. |
| 9,460,136 B1 | 10/2016 | Todd et al. |
| 9,460,171 B2 | 10/2016 | Marrelli et al. |
| 9,460,307 B2 | 10/2016 | Breslau et al. |
| 9,461,876 B2 | 10/2016 | Van Dusen et al. |
| 9,462,009 B1 | 10/2016 | Kolman et al. |
| 9,465,702 B2 | 10/2016 | Gventer et al. |
| 9,465,800 B2 | 10/2016 | Lacey |
| 9,473,446 B2 | 10/2016 | Vijay et al. |
| 9,473,535 B2 | 10/2016 | Sartor |
| 9,477,523 B1 | 10/2016 | Warman et al. |
| 9,477,660 B2 | 10/2016 | Scott et al. |
| 9,477,685 B1 | 10/2016 | Leung et al. |
| 9,477,942 B2 | 10/2016 | Adachi et al. |
| 9,483,659 B2 | 11/2016 | Bao et al. |
| 9,489,366 B2 | 11/2016 | Scott et al. |
| 9,495,547 B1 | 11/2016 | Schepis et al. |
| 9,501,523 B2 | 11/2016 | Hyatt et al. |
| 9,507,960 B2 | 11/2016 | Bell et al. |
| 9,509,674 B1 | 11/2016 | Nasserbakht et al. |
| 9,509,702 B2 | 11/2016 | Grigg et al. |
| 9,514,231 B2 | 12/2016 | Eden |
| 9,516,012 B2 | 12/2016 | Chochois et al. |
| 9,521,166 B2 | 12/2016 | Wilson |
| 9,524,500 B2 | 12/2016 | Dave et al. |
| 9,529,989 B2 | 12/2016 | Kling et al. |
| 9,536,108 B2 | 1/2017 | Powell et al. |
| 9,537,546 B2 | 1/2017 | Cordeiro et al. |
| 9,542,568 B2 | 1/2017 | Francis et al. |
| 9,549,047 B1 | 1/2017 | Fredinburg et al. |
| 9,552,395 B2 | 1/2017 | Bayer et al. |
| 9,552,470 B2 | 1/2017 | Turgeman et al. |
| 9,553,918 B1 | 1/2017 | Manion et al. |
| 9,558,497 B2 | 1/2017 | Carvalho |
| 9,569,752 B2 | 2/2017 | Deering et al. |
| 9,571,509 B1 | 2/2017 | Satish et al. |
| 9,571,526 B2 | 2/2017 | Sartor |
| 9,571,559 B2 | 2/2017 | Raleigh et al. |
| 9,571,991 B1 | 2/2017 | Brizendine et al. |
| 9,576,289 B2 | 2/2017 | Henderson et al. |
| 9,578,060 B1 | 2/2017 | Brisebois et al. |
| 9,578,173 B2 | 2/2017 | Sanghavi et al. |
| 9,582,681 B2 | 2/2017 | Mishra |
| 9,584,964 B2 | 2/2017 | Pelkey |
| 9,589,110 B2 | 3/2017 | Carey et al. |
| 9,600,181 B2 | 3/2017 | Patel et al. |
| 9,602,529 B2 | 3/2017 | Jones et al. |
| 9,606,971 B2 | 3/2017 | Seolas et al. |
| 9,607,041 B2 | 3/2017 | Himmelstein |
| 9,619,652 B2 | 4/2017 | Slater |
| 9,619,661 B1 | 4/2017 | Finkelstein |
| 9,621,357 B2 | 4/2017 | Williams et al. |
| 9,621,566 B2 | 4/2017 | Gupta et al. |
| 9,626,124 B2 | 4/2017 | Lipinski et al. |
| 9,626,680 B1 | 4/2017 | Ryan et al. |
| 9,629,064 B2 | 4/2017 | Graves et al. |
| 9,642,008 B2 | 5/2017 | Wyatt et al. |
| 9,646,095 B1 | 5/2017 | Gottlieb et al. |
| 9,647,949 B2 | 5/2017 | Varki et al. |
| 9,648,036 B2 | 5/2017 | Seiver et al. |
| 9,652,314 B2 | 5/2017 | Mahiddini |
| 9,654,506 B2 | 5/2017 | Barrett |
| 9,654,541 B1 | 5/2017 | Kapczynski et al. |
| 9,665,722 B2 | 5/2017 | Nagasundaram et al. |
| 9,665,733 B1 | 5/2017 | Sills et al. |
| 9,665,883 B2 | 5/2017 | Roullier et al. |
| 9,672,053 B2 | 6/2017 | Tang et al. |
| 9,672,355 B2 | 6/2017 | Titonis et al. |
| 9,678,794 B1 | 6/2017 | Barrett et al. |
| 9,691,090 B1 | 6/2017 | Barday |
| 9,699,209 B2 | 7/2017 | Ng et al. |
| 9,704,103 B2 | 7/2017 | Suskind et al. |
| 9,705,840 B2 | 7/2017 | Pujare et al. |
| 9,705,880 B2 | 7/2017 | Siris |
| 9,721,078 B2 | 8/2017 | Cornick et al. |
| 9,721,108 B2 | 8/2017 | Krishnamurthy et al. |
| 9,727,751 B2 | 8/2017 | Oliver et al. |
| 9,729,583 B1 | 8/2017 | Barday |
| 9,734,148 B2 | 8/2017 | Bendersky et al. |
| 9,734,255 B2 | 8/2017 | Jiang |
| 9,740,985 B2 | 8/2017 | Byron et al. |
| 9,740,987 B2 | 8/2017 | Dolan |
| 9,749,408 B2 | 8/2017 | Subramani et al. |
| 9,754,091 B2 | 9/2017 | Kode et al. |
| 9,756,059 B2 | 9/2017 | Demirjian et al. |
| 9,760,620 B2 | 9/2017 | Nachnani et al. |
| 9,760,635 B2 | 9/2017 | Bliss et al. |
| 9,760,697 B1 | 9/2017 | Walker |
| 9,760,849 B2 | 9/2017 | Vinnakota et al. |
| 9,762,553 B2 | 9/2017 | Ford et al. |
| 9,767,202 B2 | 9/2017 | Darby et al. |
| 9,767,309 B1 | 9/2017 | Patel et al. |
| 9,769,124 B2 | 9/2017 | Yan |
| 9,773,269 B1 | 9/2017 | Lazarus |
| 9,785,795 B2 | 10/2017 | Grondin et al. |
| 9,787,671 B1 | 10/2017 | Bogrett |
| 9,798,749 B2 | 10/2017 | Saner |
| 9,798,826 B2 | 10/2017 | Wilson et al. |
| 9,798,896 B2 | 10/2017 | Jakobsson |
| 9,800,605 B2 | 10/2017 | Baikalov et al. |
| 9,800,606 B1 | 10/2017 | Yumer |
| 9,804,649 B2 | 10/2017 | Cohen et al. |
| 9,804,928 B2 | 10/2017 | Davis et al. |
| 9,805,381 B2 | 10/2017 | Frank et al. |
| 9,811,532 B2 | 11/2017 | Parkison et al. |
| 9,817,850 B2 | 11/2017 | Dubbels et al. |
| 9,817,978 B2 | 11/2017 | Marsh et al. |
| 9,819,684 B2 | 11/2017 | Cernoch et al. |
| 9,825,928 B2 | 11/2017 | Lelcuk et al. |
| 9,830,563 B2 | 11/2017 | Paknad |
| 9,832,633 B2 | 11/2017 | Gerber, Jr. et al. |
| 9,836,598 B2 | 12/2017 | Iyer et al. |
| 9,838,407 B1 | 12/2017 | Oprea et al. |
| 9,838,839 B2 | 12/2017 | Vudali et al. |
| 9,841,969 B2 | 12/2017 | Seibert, Jr. et al. |
| 9,842,042 B2 | 12/2017 | Chhatwal et al. |
| 9,842,349 B2 | 12/2017 | Sawczuk et al. |
| 9,848,005 B2 | 12/2017 | Ardeli et al. |
| 9,848,061 B1 | 12/2017 | Jain et al. |
| 9,852,150 B2 | 12/2017 | Sharpe et al. |
| 9,853,959 B1 | 12/2017 | Kapczynski et al. |
| 9,860,226 B2 | 1/2018 | Thormaehlen |
| 9,864,735 B1 | 1/2018 | Lamprecht |
| 9,877,138 B1 | 1/2018 | Franklin |
| 9,880,157 B2 | 1/2018 | Levak et al. |
| 9,882,935 B2 | 1/2018 | Barday |
| 9,887,965 B2 | 2/2018 | Kay et al. |
| 9,888,377 B1 | 2/2018 | Mccorkendale et al. |
| 9,892,441 B2 | 2/2018 | Barday |
| 9,892,442 B2 | 2/2018 | Barday |
| 9,892,443 B2 | 2/2018 | Barday |
| 9,892,444 B2 | 2/2018 | Barday |
| 9,894,076 B2 | 2/2018 | Li et al. |
| 9,898,613 B1 | 2/2018 | Swerdlow et al. |

(56) References Cited

U.S. PATENT DOCUMENTS

| | | |
|---|---|---|
| 9,898,769 B2 | 2/2018 | Barday |
| 9,912,625 B2 | 3/2018 | Mutha et al. |
| 9,912,677 B2 | 3/2018 | Chien |
| 9,912,810 B2 | 3/2018 | Segre et al. |
| 9,916,703 B2 | 3/2018 | Levinson et al. |
| 9,922,124 B2 | 3/2018 | Rathod |
| 9,923,927 B1 | 3/2018 | McClintock et al. |
| 9,928,379 B1 | 3/2018 | Hoffer |
| 9,934,493 B2 | 4/2018 | Castinado et al. |
| 9,934,544 B1 | 4/2018 | Whitfield et al. |
| 9,936,127 B2 | 4/2018 | Todasco |
| 9,942,214 B1 | 4/2018 | Burciu et al. |
| 9,942,244 B2 | 4/2018 | Lahoz et al. |
| 9,942,276 B2 | 4/2018 | Sartor |
| 9,946,897 B2 | 4/2018 | Lovin |
| 9,948,652 B2 | 4/2018 | Yu et al. |
| 9,948,663 B1 | 4/2018 | Wang et al. |
| 9,953,189 B2 | 4/2018 | Cook et al. |
| 9,954,883 B2 | 4/2018 | Ahuja et al. |
| 9,959,551 B1 | 5/2018 | Schermerhorn et al. |
| 9,959,582 B2 | 5/2018 | Sukman et al. |
| 9,961,070 B2 | 5/2018 | Tang |
| 9,973,518 B2 | 5/2018 | Lee et al. |
| 9,973,585 B2 | 5/2018 | Ruback et al. |
| 9,977,904 B2 | 5/2018 | Khan et al. |
| 9,977,920 B2 | 5/2018 | Danielson et al. |
| 9,983,936 B2 | 5/2018 | Dornemann et al. |
| 9,984,252 B2 | 5/2018 | Pollard |
| 9,990,499 B2 | 6/2018 | Chan et al. |
| 9,992,213 B2 | 6/2018 | Sinnema |
| 10,001,975 B2 | 6/2018 | Bharthulwar |
| 10,002,064 B2 | 6/2018 | Muske |
| 10,007,895 B2 | 6/2018 | Vanasco |
| 10,013,577 B1 | 7/2018 | Beaumont et al. |
| 10,015,164 B2 | 7/2018 | Hamburg et al. |
| 10,019,339 B2 | 7/2018 | Von Hanxleden et al. |
| 10,019,588 B2 | 7/2018 | Garcia et al. |
| 10,019,591 B1 | 7/2018 | Beguin |
| 10,019,741 B2 | 7/2018 | Hesselink |
| 10,021,143 B2 | 7/2018 | Cabrera et al. |
| 10,025,804 B2 | 7/2018 | Vranyes et al. |
| 10,028,226 B2 | 7/2018 | Ayyagari et al. |
| 10,032,172 B2 | 7/2018 | Barday |
| 10,044,761 B2 | 8/2018 | Ducatel et al. |
| 10,055,426 B2 | 8/2018 | Arasan et al. |
| 10,055,869 B2 | 8/2018 | Borrelli et al. |
| 10,061,847 B2 | 8/2018 | Mohammed et al. |
| 10,069,858 B2 | 9/2018 | Robinson et al. |
| 10,069,914 B1 | 9/2018 | Smith |
| 10,073,924 B2 | 9/2018 | Karp et al. |
| 10,075,451 B1 | 9/2018 | Hall et al. |
| 10,084,817 B2 | 9/2018 | Saher et al. |
| 10,091,214 B2 | 10/2018 | Godlewski et al. |
| 10,091,312 B1 | 10/2018 | Khanwalkar et al. |
| 10,102,533 B2 | 10/2018 | Barday |
| 10,108,409 B2 | 10/2018 | Pirzadeh et al. |
| 10,122,663 B2 | 11/2018 | Hu et al. |
| 10,122,760 B2 | 11/2018 | Terrill et al. |
| 10,127,403 B2 | 11/2018 | Kong et al. |
| 10,129,211 B2 | 11/2018 | Heath |
| 10,140,666 B1 | 11/2018 | Wang et al. |
| 10,142,113 B2 | 11/2018 | Zaidi et al. |
| 10,152,560 B2 | 12/2018 | Potiagalov et al. |
| 10,158,676 B2 | 12/2018 | Barday |
| 10,165,011 B2 | 12/2018 | Barday |
| 10,169,762 B2 | 1/2019 | Ogawa |
| 10,176,503 B2 | 1/2019 | Barday et al. |
| 10,181,043 B1 | 1/2019 | Pauley, Jr. et al. |
| 10,181,051 B2 | 1/2019 | Barday et al. |
| 10,187,363 B2 | 1/2019 | Smirnoff et al. |
| 10,187,394 B2 | 1/2019 | Bar et al. |
| 10,204,154 B2 | 2/2019 | Barday et al. |
| 10,205,994 B2 | 2/2019 | Splaine et al. |
| 10,212,134 B2 | 2/2019 | Rai |
| 10,212,175 B2 | 2/2019 | Seul et al. |
| 10,223,533 B2 | 3/2019 | Dawson |
| 10,230,571 B2 | 3/2019 | Rangasamy et al. |
| 10,250,594 B2 | 4/2019 | Chathoth et al. |
| 10,255,602 B2 | 4/2019 | Wang |
| 10,257,127 B2 | 4/2019 | Dotan-Cohen et al. |
| 10,257,181 B1 | 4/2019 | Sherif et al. |
| 10,268,838 B2 | 4/2019 | Yadgiri et al. |
| 10,275,221 B2 | 4/2019 | Thattai et al. |
| 10,275,614 B2 | 4/2019 | Barday et al. |
| 10,282,370 B1 | 5/2019 | Barday et al. |
| 10,282,559 B2 | 5/2019 | Barday et al. |
| 10,284,604 B2 | 5/2019 | Barday et al. |
| 10,289,584 B2 | 5/2019 | Chiba |
| 10,289,857 B1 | 5/2019 | Brinskelle |
| 10,289,866 B2 | 5/2019 | Barday et al. |
| 10,289,867 B2 | 5/2019 | Barday et al. |
| 10,289,870 B2 | 5/2019 | Barday et al. |
| 10,296,504 B2 | 5/2019 | Hock et al. |
| 10,304,442 B1 | 5/2019 | Rudden et al. |
| 10,310,723 B2 | 6/2019 | Rathod |
| 10,311,042 B1 | 6/2019 | Kumar |
| 10,311,475 B2 | 6/2019 | Yuasa |
| 10,311,492 B2 | 6/2019 | Gelfenbeyn et al. |
| 10,318,761 B2 | 6/2019 | Barday et al. |
| 10,320,940 B1 | 6/2019 | Brennan et al. |
| 10,324,960 B1 | 6/2019 | Skvortsov et al. |
| 10,326,768 B2 | 6/2019 | Verweyst et al. |
| 10,326,841 B2 | 6/2019 | Bradley et al. |
| 10,331,689 B2 | 6/2019 | Sorrentino et al. |
| 10,331,904 B2 | 6/2019 | Sher-Jan et al. |
| 10,333,975 B2 | 6/2019 | Soman et al. |
| 10,346,186 B2 | 7/2019 | Kalyanpur |
| 10,346,635 B2 | 7/2019 | Kumar et al. |
| 10,346,637 B2 | 7/2019 | Barday et al. |
| 10,346,638 B2 | 7/2019 | Barday et al. |
| 10,346,849 B2 | 7/2019 | Ionescu et al. |
| 10,348,726 B2 | 7/2019 | Caluwaert |
| 10,348,775 B2 | 7/2019 | Barday |
| 10,353,673 B2 | 7/2019 | Barday et al. |
| 10,361,857 B2 | 7/2019 | Woo |
| 10,373,119 B2 | 8/2019 | Driscoll et al. |
| 10,373,409 B2 | 8/2019 | White et al. |
| 10,375,115 B2 | 8/2019 | Mallya |
| 10,387,559 B1 | 8/2019 | Wendt et al. |
| 10,387,657 B2 | 8/2019 | Belfiore, Jr. et al. |
| 10,387,952 B1 | 8/2019 | Sandhu et al. |
| 10,395,201 B2 | 8/2019 | Vescio |
| 10,402,545 B2 | 9/2019 | Gorfein et al. |
| 10,404,729 B2 | 9/2019 | Turgeman |
| 10,417,401 B2 | 9/2019 | Votaw et al. |
| 10,417,621 B2 | 9/2019 | Cassel et al. |
| 10,419,476 B2 | 9/2019 | Parekh |
| 10,423,985 B1 | 9/2019 | Dutta et al. |
| 10,425,492 B2 | 9/2019 | Comstock et al. |
| 10,430,608 B2 | 10/2019 | Peri et al. |
| 10,435,350 B2 | 10/2019 | Ito et al. |
| 10,437,412 B2 | 10/2019 | Barday et al. |
| 10,437,860 B2 | 10/2019 | Barday et al. |
| 10,438,016 B2 | 10/2019 | Barday et al. |
| 10,438,273 B2 | 10/2019 | Burns et al. |
| 10,440,062 B2 | 10/2019 | Barday et al. |
| 10,445,508 B2 | 10/2019 | Sher-Jan et al. |
| 10,445,526 B2 | 10/2019 | Barday et al. |
| 10,452,864 B2 | 10/2019 | Barday et al. |
| 10,452,866 B2 | 10/2019 | Barday et al. |
| 10,453,076 B2 | 10/2019 | Parekh et al. |
| 10,453,092 B1 | 10/2019 | Wang et al. |
| 10,454,934 B2 | 10/2019 | Parimi et al. |
| 10,481,763 B2 | 11/2019 | Bartkiewicz et al. |
| 10,489,454 B1 | 11/2019 | Chen |
| 10,503,926 B2 | 12/2019 | Barday et al. |
| 10,510,031 B2 | 12/2019 | Barday et al. |
| 10,521,623 B2 | 12/2019 | Rodriguez et al. |
| 10,534,851 B1 | 1/2020 | Chan et al. |
| 10,535,081 B2 | 1/2020 | Ferreira et al. |
| 10,536,475 B1 | 1/2020 | McCorkle, Jr. et al. |
| 10,541,938 B1 | 1/2020 | Timmerman et al. |
| 10,546,135 B1 | 1/2020 | Kassoumeh et al. |
| 10,552,462 B1 | 2/2020 | Hart |

(56) References Cited

U.S. PATENT DOCUMENTS

| | | |
|---|---|---|
| 10,558,821 B2 | 2/2020 | Barday et al. |
| 10,564,815 B2 | 2/2020 | Soon-Shiong |
| 10,564,935 B2 | 2/2020 | Barday et al. |
| 10,564,936 B2 | 2/2020 | Barday et al. |
| 10,565,161 B2 | 2/2020 | Barday et al. |
| 10,565,236 B1 | 2/2020 | Barday et al. |
| 10,567,439 B2 | 2/2020 | Barday |
| 10,567,517 B2 | 2/2020 | Weinig et al. |
| 10,572,684 B2 | 2/2020 | Lafever et al. |
| 10,572,686 B2 | 2/2020 | Barday et al. |
| 10,574,705 B2 | 2/2020 | Barday et al. |
| 10,592,648 B2 | 3/2020 | Barday et al. |
| 10,592,692 B2 | 3/2020 | Brannon |
| 10,606,916 B2 | 3/2020 | Brannon et al. |
| 10,613,971 B1 | 4/2020 | Vasikarla |
| 10,628,553 B1 | 4/2020 | Murrish et al. |
| 10,645,102 B2 | 5/2020 | Hamdi |
| 10,645,548 B2 | 5/2020 | Reynolds et al. |
| 10,649,630 B1 | 5/2020 | Vora et al. |
| 10,650,408 B1 | 5/2020 | Andersen et al. |
| 10,657,469 B2 | 5/2020 | Bade et al. |
| 10,659,566 B1 | 5/2020 | Luah et al. |
| 10,671,749 B2 | 6/2020 | Felice-Steele et al. |
| 10,671,760 B2 | 6/2020 | Esmailzadeh et al. |
| 10,678,945 B2 | 6/2020 | Barday et al. |
| 10,685,140 B2 | 6/2020 | Barday et al. |
| 10,706,176 B2 | 7/2020 | Brannon et al. |
| 10,706,226 B2 | 7/2020 | Byun et al. |
| 10,708,305 B2 | 7/2020 | Barday et al. |
| 10,713,387 B2 | 7/2020 | Brannon et al. |
| 10,726,153 B2 | 7/2020 | Nerurkar et al. |
| 10,726,158 B2 | 7/2020 | Brannon et al. |
| 10,732,865 B2 | 8/2020 | Jain et al. |
| 10,735,388 B2 | 8/2020 | Rose et al. |
| 10,740,487 B2 | 8/2020 | Barday et al. |
| 10,747,893 B2 | 8/2020 | Kiriyama et al. |
| 10,747,897 B2 | 8/2020 | Cook |
| 10,749,870 B2 | 8/2020 | Brouillette et al. |
| 10,762,213 B2 | 9/2020 | Rudek et al. |
| 10,762,236 B2 | 9/2020 | Brannon et al. |
| 10,769,302 B2 | 9/2020 | Barday et al. |
| 10,769,303 B2 | 9/2020 | Brannon |
| 10,776,510 B2 | 9/2020 | Antonelli et al. |
| 10,776,518 B2 | 9/2020 | Barday et al. |
| 10,778,792 B1 | 9/2020 | Handy Bosma et al. |
| 10,783,256 B2 | 9/2020 | Brannon |
| 10,785,173 B2 | 9/2020 | Willett et al. |
| 10,785,299 B2 | 9/2020 | Gupta et al. |
| 10,791,150 B2 | 9/2020 | Barday et al. |
| 10,795,527 B1 | 10/2020 | Legge et al. |
| 10,796,020 B2 | 10/2020 | Barday et al. |
| 10,796,260 B2 | 10/2020 | Brannon et al. |
| 10,798,133 B2 | 10/2020 | Barday et al. |
| 10,831,831 B2 | 11/2020 | Greene |
| 10,834,590 B2 | 11/2020 | Turgeman et al. |
| 10,846,433 B2 | 11/2020 | Brannon et al. |
| 10,853,501 B2 | 12/2020 | Brannon |
| 10,860,721 B1 | 12/2020 | Gentile |
| 10,860,742 B2 | 12/2020 | Joseph et al. |
| 10,860,979 B2 | 12/2020 | Geffen et al. |
| 10,878,127 B2 | 12/2020 | Brannon et al. |
| 10,885,485 B2 | 1/2021 | Brannon et al. |
| 10,891,393 B2 | 1/2021 | Currier et al. |
| 10,893,074 B2 | 1/2021 | Sartor |
| 10,896,394 B2 | 1/2021 | Brannon et al. |
| 10,902,490 B2 | 1/2021 | He et al. |
| 10,909,488 B2 | 2/2021 | Hecht et al. |
| 10,949,555 B2 | 3/2021 | Rattan et al. |
| 10,949,565 B2 | 3/2021 | Barday et al. |
| 10,957,326 B2 | 3/2021 | Bhaya et al. |
| 10,963,571 B2 | 3/2021 | Bar Joseph et al. |
| 10,963,572 B2 | 3/2021 | Belfiore, Jr. et al. |
| 10,965,547 B1 | 3/2021 | Esposito et al. |
| 10,972,509 B2 | 4/2021 | Barday et al. |
| 10,976,950 B1 | 4/2021 | Trezzo et al. |
| 10,983,963 B1 | 4/2021 | Venkatasubramanian et al. |
| 10,984,458 B1 | 4/2021 | Gutierrez |
| 10,997,318 B2 | 5/2021 | Barday et al. |
| 11,003,748 B2 | 5/2021 | Oliker et al. |
| 11,012,475 B2 | 5/2021 | Patnala et al. |
| 11,057,356 B2 | 7/2021 | Malhotra et al. |
| 11,057,427 B2 | 7/2021 | Wright et al. |
| 11,062,051 B2 | 7/2021 | Barday et al. |
| 11,068,318 B2 | 7/2021 | Kuesel et al. |
| 11,068,584 B2 | 7/2021 | Burriesci et al. |
| 11,068,618 B2 | 7/2021 | Brannon |
| 11,068,797 B2 | 7/2021 | Bhide et al. |
| 11,093,950 B2 | 8/2021 | Hersh et al. |
| 11,138,299 B2 | 10/2021 | Brannon et al. |
| 11,144,622 B2 | 10/2021 | Brannon |
| 11,144,862 B1 | 10/2021 | Jackson et al. |
| 11,195,134 B2 | 12/2021 | Brannon |
| 11,201,929 B2 | 12/2021 | Dudmesh et al. |
| 11,210,420 B2 | 12/2021 | Brannon |
| 11,238,390 B2 | 2/2022 | Brannon |
| 11,240,273 B2 | 2/2022 | Barday et al. |
| 11,256,777 B2 | 2/2022 | Brannon |
| 2002/0004736 A1 | 1/2002 | Roundtree et al. |
| 2002/0049907 A1 | 4/2002 | Woods et al. |
| 2002/0055932 A1 | 5/2002 | Wheeler et al. |
| 2002/0077941 A1 | 6/2002 | Halligan et al. |
| 2002/0103854 A1 | 8/2002 | Okita |
| 2002/0129216 A1 | 9/2002 | Collins |
| 2002/0161594 A1 | 10/2002 | Bryan et al. |
| 2002/0161733 A1 | 10/2002 | Grainger |
| 2003/0041250 A1 | 2/2003 | Proudler |
| 2003/0065641 A1 | 4/2003 | Chaloux |
| 2003/0093680 A1 | 5/2003 | Astley et al. |
| 2003/0097451 A1 | 5/2003 | Bjorksten et al. |
| 2003/0097661 A1 | 5/2003 | Li et al. |
| 2003/0115142 A1 | 6/2003 | Brickell et al. |
| 2003/0130893 A1 | 7/2003 | Farmer |
| 2003/0131001 A1 | 7/2003 | Matsuo |
| 2003/0131093 A1 | 7/2003 | Aschen et al. |
| 2003/0140150 A1 | 7/2003 | Kemp et al. |
| 2003/0167216 A1 | 9/2003 | Brown et al. |
| 2003/0212604 A1 | 11/2003 | Cullen |
| 2004/0002818 A1 | 1/2004 | Kulp et al. |
| 2004/0025053 A1 | 2/2004 | Hayward |
| 2004/0088235 A1 | 5/2004 | Ziekle et al. |
| 2004/0098366 A1 | 5/2004 | Sinclair et al. |
| 2004/0098493 A1 | 5/2004 | Rees |
| 2004/0111359 A1 | 6/2004 | Hudock |
| 2004/0186912 A1 | 9/2004 | Harlow et al. |
| 2004/0193907 A1 | 9/2004 | Patanella |
| 2005/0022198 A1 | 1/2005 | Olapurath et al. |
| 2005/0033616 A1 | 2/2005 | Vavul et al. |
| 2005/0076294 A1 | 4/2005 | Dehamer et al. |
| 2005/0114343 A1 | 5/2005 | Wesinger et al. |
| 2005/0144066 A1 | 6/2005 | Cope et al. |
| 2005/0197884 A1 | 9/2005 | Mullen, Jr. |
| 2005/0198177 A1 | 9/2005 | Black |
| 2005/0198646 A1 | 9/2005 | Kortela |
| 2005/0246292 A1 | 11/2005 | Sarcanin |
| 2005/0278538 A1 | 12/2005 | Fowler |
| 2006/0031078 A1 | 2/2006 | Pizzinger et al. |
| 2006/0035204 A1 | 2/2006 | Lamarche et al. |
| 2006/0075122 A1 | 4/2006 | Lindskog et al. |
| 2006/0149730 A1 | 7/2006 | Curtis |
| 2006/0156052 A1 | 7/2006 | Bodnar et al. |
| 2006/0190280 A1 | 8/2006 | Hoebel et al. |
| 2006/0206375 A1 | 9/2006 | Scott et al. |
| 2006/0224422 A1 | 10/2006 | Cohen |
| 2006/0253597 A1 | 11/2006 | Mujica |
| 2006/0259416 A1 | 11/2006 | Johnson |
| 2007/0011058 A1 | 1/2007 | Dev |
| 2007/0027715 A1 | 2/2007 | Gropper et al. |
| 2007/0061393 A1 | 3/2007 | Moore |
| 2007/0130101 A1 | 6/2007 | Anderson et al. |
| 2007/0130323 A1 | 6/2007 | Landsman et al. |
| 2007/0157311 A1 | 7/2007 | Meier et al. |
| 2007/0173355 A1 | 7/2007 | Klein |
| 2007/0179793 A1 | 8/2007 | Bagchi et al. |
| 2007/0180490 A1 | 8/2007 | Renzi et al. |

(56) References Cited

U.S. PATENT DOCUMENTS

| | | |
|---|---|---|
| 2007/0192438 A1 | 8/2007 | Goei |
| 2007/0266420 A1 | 11/2007 | Hawkins et al. |
| 2007/0283171 A1 | 12/2007 | Breslin et al. |
| 2008/0015927 A1 | 1/2008 | Ramirez |
| 2008/0028065 A1 | 1/2008 | Caso et al. |
| 2008/0028435 A1 | 1/2008 | Strickland et al. |
| 2008/0047016 A1 | 2/2008 | Spoonamore |
| 2008/0120699 A1 | 5/2008 | Spear |
| 2008/0140696 A1 | 6/2008 | Mathuria |
| 2008/0189306 A1 | 8/2008 | Hewei, I et al. |
| 2008/0195436 A1 | 8/2008 | Whyte |
| 2008/0222271 A1 | 9/2008 | Spires |
| 2008/0235177 A1 | 9/2008 | Kim et al. |
| 2008/0270203 A1 | 10/2008 | Holmes et al. |
| 2008/0270351 A1 | 10/2008 | Thomsen |
| 2008/0270381 A1 | 10/2008 | Thomsen |
| 2008/0270382 A1 | 10/2008 | Thomsen et al. |
| 2008/0270451 A1 | 10/2008 | Thomsen et al. |
| 2008/0270462 A1 | 10/2008 | Thomsen |
| 2008/0281649 A1 | 11/2008 | Morris |
| 2008/0282320 A1 | 11/2008 | Denovo et al. |
| 2008/0288271 A1 | 11/2008 | Faust |
| 2008/0288299 A1 | 11/2008 | Schultz |
| 2009/0012896 A1 | 1/2009 | Arnold |
| 2009/0022301 A1 | 1/2009 | Mudaliar |
| 2009/0037975 A1 | 2/2009 | Ishikawa et al. |
| 2009/0119500 A1 | 5/2009 | Roth et al. |
| 2009/0138276 A1 | 5/2009 | Hayashida et al. |
| 2009/0140035 A1 | 6/2009 | Miller |
| 2009/0144702 A1 | 6/2009 | Atkin et al. |
| 2009/0158249 A1 | 6/2009 | Tomkins et al. |
| 2009/0172705 A1 | 7/2009 | Cheong |
| 2009/0182818 A1 | 7/2009 | Krywaniuk |
| 2009/0187764 A1 | 7/2009 | Astakhov et al. |
| 2009/0204452 A1 | 8/2009 | Iskandar et al. |
| 2009/0204820 A1 | 8/2009 | Brandenburg et al. |
| 2009/0210347 A1 | 8/2009 | Sarcanin |
| 2009/0216610 A1 | 8/2009 | Chorny |
| 2009/0249076 A1 | 10/2009 | Reed et al. |
| 2009/0303237 A1 | 12/2009 | Liu et al. |
| 2010/0010912 A1 | 1/2010 | Jones et al. |
| 2010/0010968 A1 | 1/2010 | Redlich et al. |
| 2010/0077484 A1 | 3/2010 | Paretti et al. |
| 2010/0082533 A1 | 4/2010 | Nakamura et al. |
| 2010/0094650 A1 | 4/2010 | Tran et al. |
| 2010/0100398 A1 | 4/2010 | Auker et al. |
| 2010/0121773 A1 | 5/2010 | Currier et al. |
| 2010/0192201 A1 | 7/2010 | Shimoni et al. |
| 2010/0205057 A1 | 8/2010 | Hook et al. |
| 2010/0223349 A1 | 9/2010 | Thorson |
| 2010/0228786 A1 | 9/2010 | Török |
| 2010/0234987 A1 | 9/2010 | Benschop et al. |
| 2010/0235297 A1 | 9/2010 | Mamorsky |
| 2010/0235915 A1 | 9/2010 | Memon et al. |
| 2010/0262624 A1 | 10/2010 | Pullikottil |
| 2010/0268628 A1 | 10/2010 | Pitkow et al. |
| 2010/0268932 A1 | 10/2010 | Bhattacharjee |
| 2010/0281313 A1 | 11/2010 | White et al. |
| 2010/0287114 A1 | 11/2010 | Bartko et al. |
| 2010/0333012 A1 | 12/2010 | Adachi et al. |
| 2011/0006996 A1 | 1/2011 | Smith et al. |
| 2011/0010202 A1 | 1/2011 | Neale |
| 2011/0082794 A1 | 4/2011 | Blechman |
| 2011/0137696 A1 | 6/2011 | Meyer et al. |
| 2011/0145154 A1 | 6/2011 | Rivers et al. |
| 2011/0153396 A1 | 6/2011 | Marcuvitz et al. |
| 2011/0191664 A1 | 8/2011 | Sheleheda et al. |
| 2011/0208850 A1 | 8/2011 | Sheleheda et al. |
| 2011/0209067 A1 | 8/2011 | Bogess et al. |
| 2011/0231896 A1 | 9/2011 | Tovar |
| 2011/0238573 A1 | 9/2011 | Varadarajan |
| 2011/0252456 A1 | 10/2011 | Hatakeyama |
| 2011/0302643 A1 | 12/2011 | Pichna et al. |
| 2012/0041939 A1 | 2/2012 | Amsterdamski |
| 2012/0084151 A1 | 4/2012 | Kozak et al. |
| 2012/0084349 A1 | 4/2012 | Lee et al. |
| 2012/0102411 A1 | 4/2012 | Sathish |
| 2012/0102543 A1 | 4/2012 | Kohli et al. |
| 2012/0110674 A1 | 5/2012 | Belani et al. |
| 2012/0116923 A1 | 5/2012 | Irving et al. |
| 2012/0131438 A1 | 5/2012 | Li et al. |
| 2012/0143650 A1 | 6/2012 | Crowley et al. |
| 2012/0144499 A1 | 6/2012 | Tan et al. |
| 2012/0226621 A1 | 9/2012 | Petran et al. |
| 2012/0239557 A1 | 9/2012 | Weinflash et al. |
| 2012/0254320 A1 | 10/2012 | Dove et al. |
| 2012/0259752 A1 | 10/2012 | Agee |
| 2012/0323700 A1 | 12/2012 | Aleksandrovich et al. |
| 2012/0330769 A1 | 12/2012 | Arceo |
| 2012/0330869 A1 | 12/2012 | Durham |
| 2013/0004933 A1 | 1/2013 | Bhaskaran |
| 2013/0018954 A1 | 1/2013 | Cheng |
| 2013/0085801 A1 | 4/2013 | Sharpe et al. |
| 2013/0091156 A1 | 4/2013 | Raiche et al. |
| 2013/0103485 A1 | 4/2013 | Postrel |
| 2013/0111323 A1 | 5/2013 | Taghaddos et al. |
| 2013/0124257 A1 | 5/2013 | Schubert |
| 2013/0159351 A1 | 6/2013 | Hamann et al. |
| 2013/0171968 A1 | 7/2013 | Wang |
| 2013/0179982 A1 | 7/2013 | Bridges et al. |
| 2013/0179988 A1 | 7/2013 | Bekker et al. |
| 2013/0185806 A1 | 7/2013 | Hatakeyama |
| 2013/0218829 A1 | 8/2013 | Martinez |
| 2013/0219459 A1 | 8/2013 | Bradley |
| 2013/0254649 A1 | 9/2013 | Oneill |
| 2013/0254699 A1 | 9/2013 | Bashir et al. |
| 2013/0262328 A1 | 10/2013 | Federgreen |
| 2013/0282466 A1 | 10/2013 | Hampton |
| 2013/0290169 A1 | 10/2013 | Bathula et al. |
| 2013/0298071 A1 | 11/2013 | Wine |
| 2013/0311224 A1 | 11/2013 | Heroux et al. |
| 2013/0318207 A1 | 11/2013 | Dotter |
| 2013/0326112 A1 | 12/2013 | Park et al. |
| 2013/0332362 A1 | 12/2013 | Ciurea |
| 2013/0340086 A1 | 12/2013 | Blom |
| 2014/0006355 A1 | 1/2014 | Kirihata |
| 2014/0006616 A1 | 1/2014 | Aad et al. |
| 2014/0012833 A1 | 1/2014 | Humprecht |
| 2014/0019561 A1 | 1/2014 | Belity et al. |
| 2014/0032259 A1 | 1/2014 | Lafever et al. |
| 2014/0032265 A1 | 1/2014 | Paprocki |
| 2014/0040134 A1 | 2/2014 | Peter |
| 2014/0040161 A1 | 2/2014 | Jason |
| 2014/0040979 A1 | 2/2014 | Barton et al. |
| 2014/0041048 A1 | 2/2014 | Goodwin et al. |
| 2014/0047551 A1 | 2/2014 | Nagasundaram et al. |
| 2014/0052463 A1 | 2/2014 | Cashman et al. |
| 2014/0067973 A1 | 3/2014 | Eden |
| 2014/0074645 A1 | 3/2014 | Ingram |
| 2014/0089027 A1 | 3/2014 | Brown |
| 2014/0089039 A1 | 3/2014 | McClellan |
| 2014/0108173 A1 | 4/2014 | Cooper et al. |
| 2014/0108968 A1 | 4/2014 | Vishria |
| 2014/0142988 A1 | 5/2014 | Grosso et al. |
| 2014/0143011 A1 | 5/2014 | Mudugu et al. |
| 2014/0164476 A1 | 6/2014 | Thomson |
| 2014/0188956 A1 | 7/2014 | Subba et al. |
| 2014/0196143 A1 | 7/2014 | Fliderman et al. |
| 2014/0208418 A1 | 7/2014 | Libin |
| 2014/0222468 A1 | 8/2014 | Araya et al. |
| 2014/0244309 A1 | 8/2014 | Francois |
| 2014/0244325 A1 | 8/2014 | Cartwright |
| 2014/0244375 A1 | 8/2014 | Kim |
| 2014/0244399 A1 | 8/2014 | Orduna et al. |
| 2014/0257917 A1 | 9/2014 | Spencer et al. |
| 2014/0258093 A1 | 9/2014 | Gardiner et al. |
| 2014/0278539 A1 | 9/2014 | Edwards |
| 2014/0278663 A1 | 9/2014 | Samuel et al. |
| 2014/0278730 A1 | 9/2014 | Muhart et al. |
| 2014/0283027 A1 | 9/2014 | Orona et al. |
| 2014/0283106 A1 | 9/2014 | Stahura et al. |
| 2014/0288971 A1 | 9/2014 | Whibbs, III |
| 2014/0289681 A1 | 9/2014 | Wielgosz |
| 2014/0289862 A1 | 9/2014 | Gorfein et al. |

(56) References Cited

U.S. PATENT DOCUMENTS

| | | |
|---|---|---|
| 2014/0317171 A1 | 10/2014 | Fox et al. |
| 2014/0324480 A1 | 10/2014 | Dufel et al. |
| 2014/0337041 A1 | 11/2014 | Madden et al. |
| 2014/0337466 A1 | 11/2014 | Li et al. |
| 2014/0344015 A1 | 11/2014 | Puértolas-Montañés et al. |
| 2015/0012363 A1 | 1/2015 | Grant et al. |
| 2015/0019530 A1 | 1/2015 | Felch |
| 2015/0026056 A1 | 1/2015 | Calman et al. |
| 2015/0026260 A1 | 1/2015 | Worthley |
| 2015/0033112 A1 | 1/2015 | Norwood et al. |
| 2015/0066577 A1 | 3/2015 | Christiansen et al. |
| 2015/0066865 A1 | 3/2015 | Yara et al. |
| 2015/0088598 A1 | 3/2015 | Acharyya et al. |
| 2015/0106264 A1 | 4/2015 | Johnson |
| 2015/0106867 A1 | 4/2015 | Liang |
| 2015/0106948 A1 | 4/2015 | Holman et al. |
| 2015/0106949 A1 | 4/2015 | Holman et al. |
| 2015/0121462 A1 | 4/2015 | Courage et al. |
| 2015/0143258 A1 | 5/2015 | Carolan et al. |
| 2015/0149362 A1 | 5/2015 | Baum et al. |
| 2015/0154520 A1 | 6/2015 | Federgreen et al. |
| 2015/0169318 A1 | 6/2015 | Nash |
| 2015/0172296 A1 | 6/2015 | Fujioka |
| 2015/0178740 A1 | 6/2015 | Borawski et al. |
| 2015/0199534 A1 | 7/2015 | Francis et al. |
| 2015/0199541 A1 | 7/2015 | Koch et al. |
| 2015/0199702 A1 | 7/2015 | Singh |
| 2015/0229664 A1 | 8/2015 | Hawthorn et al. |
| 2015/0235049 A1 | 8/2015 | Cohen et al. |
| 2015/0235050 A1 | 8/2015 | Wouhaybi et al. |
| 2015/0235283 A1 | 8/2015 | Nishikawa |
| 2015/0242778 A1 | 8/2015 | Wilcox et al. |
| 2015/0242858 A1 | 8/2015 | Smith et al. |
| 2015/0248391 A1 | 9/2015 | Watanabe |
| 2015/0254597 A1 | 9/2015 | Jahagirdar |
| 2015/0261887 A1 | 9/2015 | Joukov |
| 2015/0262189 A1 | 9/2015 | Vergeer |
| 2015/0264417 A1 | 9/2015 | Spitz et al. |
| 2015/0269384 A1 | 9/2015 | Holman et al. |
| 2015/0271167 A1 | 9/2015 | Kalai |
| 2015/0309813 A1 | 10/2015 | Patel |
| 2015/0310227 A1 | 10/2015 | Ishida et al. |
| 2015/0310575 A1 | 10/2015 | Shelton |
| 2015/0348200 A1 | 12/2015 | Fair et al. |
| 2015/0356362 A1 | 12/2015 | Demos |
| 2015/0379430 A1 | 12/2015 | Dirac et al. |
| 2016/0006760 A1 | 1/2016 | Lala et al. |
| 2016/0012465 A1 | 1/2016 | Sharp |
| 2016/0026394 A1 | 1/2016 | Goto |
| 2016/0034918 A1 | 2/2016 | Bjelajac et al. |
| 2016/0048700 A1 | 2/2016 | Stransky-Heilkron |
| 2016/0050213 A1 | 2/2016 | Storr |
| 2016/0063523 A1 | 3/2016 | Nistor et al. |
| 2016/0063567 A1 | 3/2016 | Srivastava |
| 2016/0071112 A1 | 3/2016 | Unser |
| 2016/0080405 A1 | 3/2016 | Schler et al. |
| 2016/0099963 A1 | 4/2016 | Mahaffey et al. |
| 2016/0103963 A1 | 4/2016 | Mishra |
| 2016/0125550 A1 | 5/2016 | Joao et al. |
| 2016/0125749 A1 | 5/2016 | Delacroix et al. |
| 2016/0125751 A1 | 5/2016 | Barker et al. |
| 2016/0140466 A1 | 5/2016 | Sidebottom et al. |
| 2016/0143570 A1 | 5/2016 | Valacich et al. |
| 2016/0148143 A1 | 5/2016 | Anderson et al. |
| 2016/0162269 A1 | 6/2016 | Pogorelik et al. |
| 2016/0164915 A1 | 6/2016 | Cook |
| 2016/0180386 A1 | 6/2016 | Konig |
| 2016/0188450 A1 | 6/2016 | Appusamy et al. |
| 2016/0189156 A1 | 6/2016 | Kim et al. |
| 2016/0196189 A1 | 7/2016 | Miyagi et al. |
| 2016/0225000 A1 | 8/2016 | Glasgow |
| 2016/0232465 A1 | 8/2016 | Kurtz et al. |
| 2016/0232534 A1 | 8/2016 | Lacey et al. |
| 2016/0234319 A1 | 8/2016 | Griffin |
| 2016/0253497 A1 | 9/2016 | Christodorescu et al. |
| 2016/0255139 A1 | 9/2016 | Rathod |
| 2016/0261631 A1 | 9/2016 | Vissamsetty et al. |
| 2016/0262163 A1 | 9/2016 | Gonzalez Garrido et al. |
| 2016/0292621 A1 | 10/2016 | Ciccone et al. |
| 2016/0321582 A1 | 11/2016 | Broudou et al. |
| 2016/0321748 A1 | 11/2016 | Mahatma et al. |
| 2016/0330237 A1 | 11/2016 | Edlabadkar |
| 2016/0342811 A1 | 11/2016 | Whitcomb et al. |
| 2016/0364736 A1 | 12/2016 | Maugans, III |
| 2016/0370954 A1 | 12/2016 | Burningham et al. |
| 2016/0378762 A1 | 12/2016 | Rohter |
| 2016/0381064 A1 | 12/2016 | Chan et al. |
| 2016/0381560 A1 | 12/2016 | Margaliot |
| 2017/0004055 A1 | 1/2017 | Horan et al. |
| 2017/0032395 A1 | 2/2017 | Kaufman et al. |
| 2017/0032408 A1 | 2/2017 | Kumar et al. |
| 2017/0034101 A1 | 2/2017 | Kumar et al. |
| 2017/0041324 A1 | 2/2017 | Ionutescu et al. |
| 2017/0046399 A1 | 2/2017 | Sankaranarasimhan et al. |
| 2017/0046753 A1 | 2/2017 | Deupree, IV |
| 2017/0061501 A1 | 3/2017 | Horwich |
| 2017/0068785 A1 | 3/2017 | Experton et al. |
| 2017/0070495 A1 | 3/2017 | Cherry et al. |
| 2017/0093917 A1 | 3/2017 | Chandra et al. |
| 2017/0115864 A1 | 4/2017 | Thomas et al. |
| 2017/0124570 A1 | 5/2017 | Nidamanuri et al. |
| 2017/0140174 A1 | 5/2017 | Lacey et al. |
| 2017/0140467 A1 | 5/2017 | Neag et al. |
| 2017/0142158 A1 | 5/2017 | Laoutaris et al. |
| 2017/0142177 A1 | 5/2017 | Hu |
| 2017/0154188 A1 | 6/2017 | Meier et al. |
| 2017/0161520 A1 | 6/2017 | Lockhart, III et al. |
| 2017/0171235 A1 | 6/2017 | Mulchandani et al. |
| 2017/0171325 A1 | 6/2017 | Perez |
| 2017/0177324 A1 | 6/2017 | Frank et al. |
| 2017/0180378 A1 | 6/2017 | Tyler et al. |
| 2017/0180505 A1 | 6/2017 | Shaw et al. |
| 2017/0193017 A1 | 7/2017 | Migliori |
| 2017/0193624 A1 | 7/2017 | Tsai |
| 2017/0201518 A1 | 7/2017 | Holmqvist et al. |
| 2017/0206707 A1 | 7/2017 | Guay et al. |
| 2017/0208084 A1 | 7/2017 | Steelman et al. |
| 2017/0220685 A1 | 8/2017 | Yan et al. |
| 2017/0220964 A1 | 8/2017 | Datta Ray |
| 2017/0249710 A1 | 8/2017 | Guillama et al. |
| 2017/0269791 A1 | 9/2017 | Meyerzon et al. |
| 2017/0270318 A1 | 9/2017 | Ritchie |
| 2017/0278004 A1 | 9/2017 | McElhinney et al. |
| 2017/0278117 A1 | 9/2017 | Wallace et al. |
| 2017/0286719 A1 | 10/2017 | Krishnamurthy et al. |
| 2017/0287031 A1 | 10/2017 | Barday |
| 2017/0289199 A1 | 10/2017 | Barday |
| 2017/0308875 A1 | 10/2017 | O'Regan et al. |
| 2017/0316400 A1 | 11/2017 | Venkatakrishnan et al. |
| 2017/0330197 A1 | 11/2017 | DiMaggio et al. |
| 2017/0353404 A1 | 12/2017 | Hodge |
| 2018/0032757 A1 | 2/2018 | Michael |
| 2018/0039975 A1 | 2/2018 | Hefetz |
| 2018/0041498 A1 | 2/2018 | Kikuchi |
| 2018/0046753 A1 | 2/2018 | Shelton |
| 2018/0046939 A1 | 2/2018 | Meron et al. |
| 2018/0063174 A1 | 3/2018 | Grill et al. |
| 2018/0063190 A1 | 3/2018 | Wright et al. |
| 2018/0082368 A1 | 3/2018 | Weinflash et al. |
| 2018/0083843 A1 | 3/2018 | Sambandam |
| 2018/0091476 A1 | 3/2018 | Jakobsson et al. |
| 2018/0131574 A1 | 5/2018 | Jacobs et al. |
| 2018/0131658 A1 | 5/2018 | Bhagwan et al. |
| 2018/0165637 A1 | 6/2018 | Romero et al. |
| 2018/0198614 A1 | 7/2018 | Neumann |
| 2018/0219917 A1 | 8/2018 | Chiang |
| 2018/0239500 A1 | 8/2018 | Allen et al. |
| 2018/0248914 A1 | 8/2018 | Sartor |
| 2018/0285887 A1 | 10/2018 | Maung |
| 2018/0301222 A1 | 10/2018 | Dew, Sr. et al. |
| 2018/0307859 A1 | 10/2018 | Lafever et al. |
| 2018/0349583 A1 | 12/2018 | Turgeman et al. |
| 2018/0351888 A1 | 12/2018 | Howard |
| 2018/0352003 A1 | 12/2018 | Winn et al. |

(56) References Cited

U.S. PATENT DOCUMENTS

| | | |
|---|---|---|
| 2018/0357243 A1 | 12/2018 | Yoon |
| 2018/0365720 A1 | 12/2018 | Goldman et al. |
| 2018/0374030 A1 | 12/2018 | Barday et al. |
| 2018/0375814 A1 | 12/2018 | Hart |
| 2019/0005210 A1 | 1/2019 | Wiederspohn et al. |
| 2019/0012672 A1 | 1/2019 | Francesco |
| 2019/0019184 A1 | 1/2019 | Lacey et al. |
| 2019/0050547 A1 | 2/2019 | Welsh et al. |
| 2019/0087570 A1 | 3/2019 | Sloane |
| 2019/0096020 A1 | 3/2019 | Barday et al. |
| 2019/0108353 A1 | 4/2019 | Sadeh et al. |
| 2019/0130132 A1 | 5/2019 | Barbas et al. |
| 2019/0138496 A1 | 5/2019 | Yamaguchi |
| 2019/0148003 A1 | 5/2019 | Van Hoe |
| 2019/0156053 A1 | 5/2019 | Vogel et al. |
| 2019/0156058 A1 | 5/2019 | Van Dyne et al. |
| 2019/0171801 A1 | 6/2019 | Barday et al. |
| 2019/0179652 A1 | 6/2019 | Hesener et al. |
| 2019/0180051 A1 | 6/2019 | Barday et al. |
| 2019/0182294 A1 | 6/2019 | Rieke et al. |
| 2019/0188402 A1 | 6/2019 | Wang et al. |
| 2019/0266200 A1 | 8/2019 | Francolla |
| 2019/0266201 A1 | 8/2019 | Barday et al. |
| 2019/0266350 A1 | 8/2019 | Barday et al. |
| 2019/0268343 A1 | 8/2019 | Barday et al. |
| 2019/0268344 A1 | 8/2019 | Barday et al. |
| 2019/0272492 A1 | 9/2019 | Elledge et al. |
| 2019/0294818 A1 | 9/2019 | Barday et al. |
| 2019/0303610 A1* | 10/2019 | Bodegas Martinez ............... G06F 21/6245 |
| 2019/0332802 A1 | 10/2019 | Barday et al. |
| 2019/0332807 A1 | 10/2019 | Lafever et al. |
| 2019/0333118 A1 | 10/2019 | Crimmins et al. |
| 2019/0354709 A1 | 11/2019 | Brinskelle |
| 2019/0356684 A1 | 11/2019 | Sinha et al. |
| 2019/0362169 A1 | 11/2019 | Lin et al. |
| 2019/0362268 A1 | 11/2019 | Fogarty et al. |
| 2019/0378073 A1 | 12/2019 | Lopez et al. |
| 2019/0384934 A1 | 12/2019 | Kim |
| 2019/0392170 A1 | 12/2019 | Barday et al. |
| 2019/0392171 A1 | 12/2019 | Barday et al. |
| 2020/0020454 A1 | 1/2020 | McGarvey et al. |
| 2020/0050966 A1 | 2/2020 | Enuka et al. |
| 2020/0051117 A1 | 2/2020 | Mitchell |
| 2020/0057781 A1 | 2/2020 | McCormick |
| 2020/0074471 A1 | 3/2020 | Adjaoute |
| 2020/0081865 A1 | 3/2020 | Farrar et al. |
| 2020/0082270 A1 | 3/2020 | Gu et al. |
| 2020/0090197 A1 | 3/2020 | Rodriguez et al. |
| 2020/0092179 A1 | 3/2020 | Chieu et al. |
| 2020/0110589 A1 | 4/2020 | Bequet et al. |
| 2020/0110904 A1 | 4/2020 | Shinde et al. |
| 2020/0117737 A1 | 4/2020 | Gopalakrishnan et al. |
| 2020/0137097 A1 | 4/2020 | Zimmermann et al. |
| 2020/0143301 A1 | 5/2020 | Bowers |
| 2020/0143797 A1 | 5/2020 | Manoharan et al. |
| 2020/0159952 A1 | 5/2020 | Dain et al. |
| 2020/0159955 A1 | 5/2020 | Barlik et al. |
| 2020/0167653 A1 | 5/2020 | Manjunath et al. |
| 2020/0175424 A1 | 6/2020 | Kursun |
| 2020/0183655 A1 | 6/2020 | Barday et al. |
| 2020/0186355 A1 | 6/2020 | Davies |
| 2020/0193018 A1 | 6/2020 | Van Dyke |
| 2020/0193022 A1 | 6/2020 | Lunsford et al. |
| 2020/0210558 A1 | 7/2020 | Barday et al. |
| 2020/0210620 A1 | 7/2020 | Haletky |
| 2020/0220901 A1 | 7/2020 | Barday et al. |
| 2020/0226156 A1 | 7/2020 | Borra et al. |
| 2020/0226196 A1 | 7/2020 | Brannon et al. |
| 2020/0242259 A1 | 7/2020 | Chirravuri et al. |
| 2020/0242719 A1 | 7/2020 | Lee |
| 2020/0250342 A1 | 8/2020 | Miller et al. |
| 2020/0252413 A1 | 8/2020 | Buzbee et al. |
| 2020/0252817 A1 | 8/2020 | Brouillette et al. |
| 2020/0272764 A1 | 8/2020 | Brannon et al. |
| 2020/0293679 A1 | 9/2020 | Handy Bosma et al. |
| 2020/0296171 A1 | 9/2020 | Mocanu et al. |
| 2020/0302089 A1 | 9/2020 | Barday et al. |
| 2020/0310917 A1 | 10/2020 | Tkachev et al. |
| 2020/0311310 A1 | 10/2020 | Barday et al. |
| 2020/0344243 A1 | 10/2020 | Brannon et al. |
| 2020/0356695 A1 | 11/2020 | Brannon et al. |
| 2020/0364369 A1 | 11/2020 | Brannon et al. |
| 2020/0372178 A1 | 11/2020 | Barday et al. |
| 2020/0394327 A1 | 12/2020 | Childress et al. |
| 2020/0401380 A1 | 12/2020 | Jacobs et al. |
| 2020/0401962 A1 | 12/2020 | Gottemukkala et al. |
| 2020/0410117 A1 | 12/2020 | Barday et al. |
| 2020/0410131 A1 | 12/2020 | Barday et al. |
| 2020/0410132 A1 | 12/2020 | Brannon et al. |
| 2021/0012341 A1 | 1/2021 | Garg et al. |
| 2021/0056569 A1 | 2/2021 | Silberman et al. |
| 2021/0081567 A1 | 3/2021 | Park et al. |
| 2021/0125089 A1 | 4/2021 | Nickl et al. |
| 2021/0152496 A1 | 5/2021 | Kim et al. |
| 2021/0233157 A1 | 7/2021 | Crutchfield, Jr. |
| 2021/0243595 A1 | 8/2021 | Buck et al. |
| 2021/0248247 A1 | 8/2021 | Poothokaran et al. |
| 2021/0256163 A1 | 8/2021 | Fleming et al. |
| 2021/0279360 A1 | 9/2021 | Gimenez Palop et al. |
| 2021/0297441 A1 | 9/2021 | Olalere |
| 2021/0303828 A1 | 9/2021 | Lafreniere et al. |
| 2021/0312061 A1 | 10/2021 | Schroeder |
| 2021/0326786 A1 | 10/2021 | Sun et al. |
| 2021/0382949 A1 | 12/2021 | Yastrebenetsky et al. |
| 2021/0397735 A1 | 12/2021 | Samatov et al. |
| 2021/0400018 A1 | 12/2021 | Vettaikaran et al. |
| 2021/0406712 A1 | 12/2021 | Bhide et al. |

FOREIGN PATENT DOCUMENTS

| | | |
|---|---|---|
| EP | 1394698 | 3/2004 |
| EP | 2031540 | 3/2009 |
| KR | 20130062500 | 6/2013 |
| WO | 2001033430 | 5/2001 |
| WO | 20020067158 | 8/2002 |
| WO | 20030050773 | 6/2003 |
| WO | 2005008411 | 1/2005 |
| WO | 2007002412 | 1/2007 |
| WO | 2008/134203 | 11/2008 |
| WO | 2012174659 | 12/2012 |
| WO | 2015116905 | 8/2015 |
| WO | 2020/146028 | 7/2020 |

OTHER PUBLICATIONS

International Search Report, dated Aug. 8, 2017, from corresponding International Application No. PCT/US2017/036889.
International Search Report, dated Aug. 8, 2017, from corresponding International Application No. PCT/US2017/036890.
International Search Report, dated Aug. 8, 2017, from corresponding International Application No. PCT/US2017/036893.
International Search Report, dated Aug. 8, 2017, from corresponding International Application No. PCT/US2017/036901.
International Search Report, dated Aug. 8, 2017, from corresponding International Application No. PCT/US2017/036913.
International Search Report, dated Aug. 8, 2017, from corresponding International Application No. PCT/US2017/036920.
International Search Report, dated Dec. 14, 2018, from corresponding International Application No. PCT/US2018/045296.
International Search Report, dated Jan. 14, 2019, from corresponding International Application No. PCT/US2018/046949.
International Search Report, dated Jan. 7, 2019, from corresponding International Application No. PCT/US2018/055772.
International Search Report, dated Jun. 21, 2017, from corresponding International Application No. PCT/US2017/025600.
International Search Report, dated Jun. 6, 2017, from corresponding International Application No. PCT/US2017/025605.
International Search Report, dated Jun. 6, 2017, from corresponding International Application No. PCT/US2017/025611.

(56) References Cited

OTHER PUBLICATIONS

International Search Report, dated Mar. 14, 2019, from corresponding International Application No. PCT/US2018/055736.
International Search Report, dated Mar. 4, 2019, from corresponding International Application No. PCT/US2018/055773.
International Search Report, dated Mar. 4, 2019, from corresponding International Application No. PCT/US2018/055774.
International Search Report, dated Nov. 19, 2018, from corresponding International Application No. PCT/US2018/046939.
International Search Report, dated Oct. 11, 2018, from corresponding International Application No. PCT/US2018/043975.
International Search Report, dated Oct. 11, 2018, from corresponding International Application No. PCT/US2018/043976.
International Search Report, dated Oct. 11, 2018, from corresponding International Application No. PCT/US2018/043977.
International Search Report, dated Oct. 11, 2018, from corresponding International Application No. PCT/US2018/044026.
International Search Report, dated Oct. 11, 2018, from corresponding International Application No. PCT/US2018/045240.
International Search Report, dated Oct. 12, 2017, from corresponding International Application No. PCT/US2017/036888.
International Search Report, dated Oct. 12, 2018, from corresponding International Application No. PCT/US2018/044046.
International Search Report, dated Oct. 16, 2018, from corresponding International Application No. PCT/US2018/045243.
International Search Report, dated Oct. 18, 2018, from corresponding International Application No. PCT/US2018/045249.
International Search Report, dated Oct. 20, 2017, from corresponding International Application No. PCT/US2017/036917.
International Search Report, dated Oct. 3, 2017, from corresponding International Application No. PCT/US2017/036912.
International Search Report, dated Sep. 1, 2017, from corresponding International Application No. PCT/US2017/036896.
International Search Report, dated Sep. 12, 2018, from corresponding International Application No. PCT/US2018/037504.
International Search Report, dated Sep. 15, 2021, from corresponding International Application No. PCT/US2021/033631.
Invitation to Pay Additional Search Fees, dated Aug. 10, 2017, from corresponding International Application No. PCT/US2017/036912.
Invitation to Pay Additional Search Fees, dated Aug. 10, 2017, from corresponding International Application No. PCT/US2017/036917.
Invitation to Pay Additional Search Fees, dated Aug. 24, 2017, from corresponding International Application No. PCT/US2017/036888.
Invitation to Pay Additional Search Fees, dated Jan. 18, 2019, from corresponding International Application No. PCT/US2018/055736.
Invitation to Pay Additional Search Fees, dated Jan. 7, 2019, from corresponding International Application No. PCT/US2018/055773.
Invitation to Pay Additional Search Fees, dated Jan. 8, 2019, from corresponding International Application No. PCT/US2018/055774.
Invitation to Pay Additional Search Fees, dated Oct. 23, 2018, from corresponding International Application No. PCT/US2018/045296.
Islam, et al, "Mixture Model Based Label Association Techniques for Web Accessibility," ACM, pp. 67-76 (Year: 2010).
Jensen, et al, "Temporal Data Management," IEEE Transactions on Knowledge and Data Engineering, vol. 11, No. 1, Jan./Feb. 1999, pp. 36-44 (Year: 1999).
Joel Reardon et al., Secure Data Deletion from Persistent Media, ACM, Nov. 4, 2013, retrieved online on Jun. 13, 2019, pp. 271-283. Retrieved from the Internet: URL: http://delivery.acm.org/10.1145/2520000/2516699/p271-reardon.pdf? (Year: 2013).
Joonbakhsh et al, "Mining and Extraction of Personal Software Process measures through IDE Interaction logs," ACM/IEEE, 2018, retrieved online on Dec. 2, 2019, pp. 78-81. Retrieved from the Internet: URL: http://delivery.acm.org/10.1145/3200000/3196462/p78-joonbakhsh.pdf? (Year: 2018).
Jun et al, "Scalable Multi-Access Flash Store for Big Data Analytics," ACM, pp. 55-64 (Year: 2014).
Kirkham, et al, "A Personal Data Store for an Internet of Subjects," IEEE, pp. 92-97 (Year: 2011).

Korba, Larry et al.; "Private Data Discovery for Privacy Compliance in Collaborative Environments"; Cooperative Design, Visualization, and Engineering; Springer Berlin Heidelberg; Sep. 21, 2008; pp. 142-150.
Krol, Kat, et al, Control versus Effort in Privacy Warnings for Webforms, ACM, Oct. 24, 2016, pp. 13-23.
Lamb et al, "Role-Based Access Control for Data Service Integration", ACM, pp. 3-11 (Year: 2006).
Leadbetter, et al, "Where Big Data Meets Linked Data: Applying Standard Data Models to Environmental Data Streams," IEEE, pp. 2929-2937 (Year: 2016).
Lebeau, Franck, et al, "Model-Based Vulnerability Testing for Web Applications," 2013 IEEE Sixth International Conference on Software Testing, Verification and Validation Workshops, pp. 445-452, IEEE, 2013 (Year: 2013).
Li, Ninghui, et al, t-Closeness: Privacy Beyond k-Anonymity and l-Diversity, IEEE, 2014, p. 106-115.
Liu et al, "Cross-Geography Scientific Data Transferring Trends and Behavior," ACM, pp. 267-278 (Year: 2018).
Office Action, dated Nov. 15, 2018, from corresponding U.S. Appl. No. 16/059,911.
Office Action, dated Nov. 15, 2019, from corresponding U.S. Appl. No. 16/552,758.
Office Action, dated Nov. 18, 2019, from corresponding U.S. Appl. No. 16/560,885.
Office Action, dated Nov. 18, 2019, from corresponding U.S. Appl. No. 16/560,889.
Office Action, dated Nov. 18, 2019, from corresponding U.S. Appl. No. 16/572,347.
Office Action, dated Nov. 19, 2019, from corresponding U.S. Appl. No. 16/595,342.
Office Action, dated Nov. 20, 2019, from corresponding U.S. Appl. No. 16/595,327.
Office Action, dated Nov. 23, 2018, from corresponding U.S. Appl. No. 16/042,673.
Office Action, dated Nov. 24, 2020, from corresponding U.S. Appl. No. 16/925,628.
Office Action, dated Oct. 10, 2018, from corresponding U.S. Appl. No. 16/041,563.
Office Action, dated Oct. 10, 2018, from corresponding U.S. Appl. No. 16/055,083.
Office Action, dated Oct. 10, 2018, from corresponding U.S. Appl. No. 16/055,944.
Office Action, dated Oct. 14, 2020, from corresponding U.S. Appl. No. 16/927,658.
Office Action, dated Oct. 15, 2018, from corresponding U.S. Appl. No. 16/054,780.
Office Action, dated Oct. 16, 2019, from corresponding U.S. Appl. No. 16/557,392.
Office Action, dated Oct. 16, 2020, from corresponding U.S. Appl. No. 16/808,489.
Office Action, dated Oct. 23, 2018, from corresponding U.S. Appl. No. 16/055,961.
Office Action, dated Oct. 26, 2018, from corresponding U.S. Appl. No. 16/041,468.
Office Action, dated Oct. 8, 2019, from corresponding U.S. Appl. No. 16/552,765.
Office Action, dated Sep. 1, 2017, from corresponding U.S. Appl. No. 15/619,459.
Office Action, dated Sep. 11, 2017, from corresponding U.S. Appl. No. 15/619,375.
Office Action, dated Sep. 11, 2017, from corresponding U.S. Appl. No. 15/619,478.
Office Action, dated Sep. 15, 2021, from corresponding U.S. Appl. No. 16/623,157.
Office Action, dated Sep. 16, 2019, from corresponding U.S. Appl. No. 16/277,715.
Office Action, dated Sep. 19, 2017, from corresponding U.S. Appl. No. 15/671,073.
Office Action, dated Sep. 22, 2017, from corresponding U.S. Appl. No. 15/619,278.
Office Action, dated Sep. 24, 2021, from corresponding U.S. Appl. No. 17/342,153.

(56) References Cited

OTHER PUBLICATIONS

Office Action, dated Sep. 4, 2020, from corresponding U.S. Appl. No. 16/989,086.
Office Action, dated Sep. 5, 2017, from corresponding U.S. Appl. No. 15/619,469.
Office Action, dated Sep. 6, 2017, from corresponding U.S. Appl. No. 15/619,479.
Office Action, dated Sep. 7, 2017, from corresponding U.S. Appl. No. 15/633,703.
Office Action, dated Sep. 8, 2017, from corresponding U.S. Appl. No. 15/619,251.
Notice of Allowance, dated Apr. 12, 2017, from corresponding U.S. Appl. No. 15/256,419.
Notice of Allowance, dated Apr. 17, 2020, from corresponding U.S. Appl. No. 16/593,639.
Notice of Allowance, dated Apr. 19, 2021, from corresponding U.S. Appl. No. 17/164,029.
Notice of Allowance, dated Apr. 2, 2019, from corresponding U.S. Appl. No. 16/160,577.
Notice of Allowance, dated Apr. 2, 2021, from corresponding U.S. Appl. No. 17/162,006.
Notice of Allowance, dated Apr. 22, 2021, from corresponding U.S. Appl. No. 17/163,701.
Notice of Allowance, dated Apr. 25, 2018, from corresponding U.S. Appl. No. 15/883,041.
Notice of Allowance, dated Apr. 28, 2021, from corresponding U.S. Appl. No. 17/135,445.
Notice of Allowance, dated Apr. 28, 2021, from corresponding U.S. Appl. No. 17/181,828.
Notice of Allowance, dated Apr. 29, 2020, from corresponding U.S. Appl. No. 16/700,049.
Notice of Allowance, dated Apr. 30, 2020, from corresponding U.S. Appl. No. 16/565,265.
Notice of Allowance, dated Apr. 30, 2020, from corresponding U.S. Appl. No. 16/820,346.
Notice of Allowance, dated Apr. 30, 2021, from corresponding U.S. Appl. No. 16/410,762.
Notice of Allowance, dated Apr. 8, 2019, from corresponding U.S. Appl. No. 16/228,250.
Notice of Allowance, dated Apr. 8, 2020, from corresponding U.S. Appl. No. 16/791,348.
Notice of Allowance, dated Apr. 9, 2020, from corresponding U.S. Appl. No. 16/791,075.
Notice of Allowance, dated Aug. 10, 2020, from corresponding U.S. Appl. No. 16/671,444.
Notice of Allowance, dated Aug. 10, 2020, from corresponding U.S. Appl. No. 16/788,633.
Notice of Allowance, dated Jun. 4, 2019, from corresponding U.S. Appl. No. 16/159,566.
Notice of Allowance, dated Jun. 5, 2019, from corresponding U.S. Appl. No. 16/220,899.
Notice of Allowance, dated Jun. 5, 2019, from corresponding U.S. Appl. No. 16/357,260.
Notice of Allowance, dated Jun. 6, 2018, from corresponding U.S. Appl. No. 15/875,570.
Notice of Allowance, dated Jun. 6, 2019, from corresponding U.S. Appl. No. 16/159,628.
Notice of Allowance, dated Jun. 7, 2021, from corresponding U.S. Appl. No. 17/099,270.
Notice of Allowance, dated Jun. 8, 2020, from corresponding U.S. Appl. No. 16/712,104.
Notice of Allowance, dated Mar. 1, 2018, from corresponding U.S. Appl. No. 15/853,674.
Notice of Allowance, dated Mar. 1, 2019, from corresponding U.S. Appl. No. 16/059,911.
Notice of Allowance, dated Mar. 10, 2021, from corresponding U.S. Appl. No. 16/925,628.
Notice of Allowance, dated Mar. 10, 2021, from corresponding U.S. Appl. No. 17/128,666.
Notice of Allowance, dated Mar. 13, 2019, from corresponding U.S. Appl. No. 16/055,083.
Notice of Allowance, dated Mar. 14, 2019, from corresponding U.S. Appl. No. 16/055,944.
Notice of Allowance, dated Mar. 16, 2020, from corresponding U.S. Appl. No. 16/778,704.
Notice of Allowance, dated Mar. 16, 2021, from corresponding U.S. Appl. No. 17/149,380.
Notice of Allowance, dated Mar. 17, 2020, from corresponding U.S. Appl. No. 16/560,885.
Notice of Allowance, dated Mar. 18, 2020, from corresponding U.S. Appl. No. 16/560,963.
Notice of Allowance, dated Mar. 19, 2021, from corresponding U.S. Appl. No. 17/013,757.
Notice of Allowance, dated Mar. 2, 2018, from corresponding U.S. Appl. No. 15/858,802.
Notice of Allowance, dated Mar. 24, 2020, from corresponding U.S. Appl. No. 16/552,758.
Notice of Allowance, dated Mar. 25, 2019, from corresponding U.S. Appl. No. 16/054,780.
Notice of Allowance, dated Mar. 26, 2020, from corresponding U.S. Appl. No. 16/560,889.
Notice of Allowance, dated Mar. 26, 2020, from corresponding U.S. Appl. No. 16/578,712.
Notice of Allowance, dated Mar. 27, 2019, from corresponding U.S. Appl. No. 16/226,280.
Notice of Allowance, dated Mar. 29, 2019, from corresponding U.S. Appl. No. 16/055,998.
Notice of Allowance, dated Mar. 31, 2020, from corresponding U.S. Appl. No. 16/563,744.
Notice of Allowance, dated Mar. 31, 2021, from corresponding U.S. Appl. No. 17/013,758.
Notice of Allowance, dated Mar. 31, 2021, from corresponding U.S. Appl. No. 17/162,205.
Notice of Allowance, dated May 1, 2020, from corresponding U.S. Appl. No. 16/586,202.
Notice of Allowance, dated May 11, 2020, from corresponding U.S. Appl. No. 16/786,196.
Notice of Allowance, dated May 13, 2021, from corresponding U.S. Appl. No. 17/101,915.
Notice of Allowance, dated May 19, 2020, from corresponding U.S. Appl. No. 16/505,430.
Notice of Allowance, dated May 19, 2020, from corresponding U.S. Appl. No. 16/808,496.
Notice of Allowance, dated May 20, 2020, from corresponding U.S. Appl. No. 16/707,762.
Notice of Allowance, dated May 21, 2018, from corresponding U.S. Appl. No. 15/896,790.
Notice of Allowance, dated May 26, 2021, from corresponding U.S. Appl. No. 16/808,493.
Notice of Allowance, dated May 26, 2021, from corresponding U.S. Appl. No. 16/865,874.
Notice of Allowance, dated May 26, 2021, from corresponding U.S. Appl. No. 17/199,514.
Notice of Allowance, dated May 27, 2020, from corresponding U.S. Appl. No. 16/820,208.
Notice of Allowance, dated May 27, 2021, from corresponding U.S. Appl. No. 16/927,658.
Notice of Allowance, dated May 27, 2021, from corresponding U.S. Appl. No. 17/198,757.
Notice of Allowance, dated May 28, 2019, from corresponding U.S. Appl. No. 16/277,568.
Notice of Allowance, dated May 28, 2020, from corresponding U.S. Appl. No. 16/799,279.
Notice of Allowance, dated May 28, 2021, from corresponding U.S. Appl. No. 16/862,944.
Notice of Allowance, dated May 5, 2017, from corresponding U.S. Appl. No. 15/254,901.
Notice of Allowance, dated May 5, 2020, from corresponding U.S. Appl. No. 16/563,754.
Notice of Allowance, dated May 7, 2020, from corresponding U.S. Appl. No. 16/505,426.

(56) References Cited

OTHER PUBLICATIONS

Notice of Allowance, dated May 7, 2021, from corresponding U.S. Appl. No. 17/194,662.
Notice of Allowance, dated Nov. 14, 2019, from corresponding U.S. Appl. No. 16/436,616.
Notice of Allowance, dated Nov. 2, 2018, from corresponding U.S. Appl. No. 16/054,762.
Notice of Allowance, dated Feb. 25, 2021, from corresponding U.S. Appl. No. 17/106,469.
Notice of Allowance, dated Feb. 26, 2021, from corresponding U.S. Appl. No. 17/139,650.
Notice of Allowance, dated Feb. 27, 2019, from corresponding U.S. Appl. No. 16/041,468.
Notice of Allowance, dated Feb. 27, 2019, from corresponding U.S. Appl. No. 16/226,290.
Notice of Allowance, dated Feb. 3, 2021, from corresponding U.S. Appl. No. 16/827,039.
Notice of Allowance, dated Feb. 3, 2021, from corresponding U.S. Appl. No. 17/068,558.
Notice of Allowance, dated Jan. 1, 2021, from corresponding U.S. Appl. No. 17/026,727.
Notice of Allowance, dated Jan. 14, 2020, from corresponding U.S. Appl. No. 16/277,715.
Notice of Allowance, dated Jan. 15, 2021, from corresponding U.S. Appl. No. 17/030,714.
Notice of Allowance, dated Jan. 18, 2018, from corresponding U.S. Appl. No. 15/619,478.
Notice of Allowance, dated Jan. 18, 2019 from corresponding U.S. Appl. No. 16/159,635.
Notice of Allowance, dated Jan. 2, 2020, from corresponding U.S. Appl. No. 16/410,296.
Notice of Allowance, dated Jan. 23, 2018, from corresponding U.S. Appl. No. 15/619,251.
Notice of Allowance, dated Jan. 25, 2021, from corresponding U.S. Appl. No. 16/410,336.
Notice of Allowance, dated Jan. 26, 2018, from corresponding U.S. Appl. No. 15/619,469.
Notice of Allowance, dated Jan. 29, 2020, from corresponding U.S. Appl. No. 16/278,119.
Notice of Allowance, dated Jan. 6, 2021, from corresponding U.S. Appl. No. 16/595,327.
Notice of Allowance, dated Jan. 8, 2020, from corresponding U.S. Appl. No. 16/600,879.
Notice of Allowance, dated Jul. 10, 2019, from corresponding U.S. Appl. No. 16/237,083.
Notice of Allowance, dated Jul. 10, 2019, from corresponding U.S. Appl. No. 16/403,358.
Notice of Allowance, dated Jul. 12, 2019, from corresponding U.S. Appl. No. 16/278,121.
Notice of Allowance, dated Jul. 14, 2020, from corresponding U.S. Appl. No. 16/701,043.
Notice of Allowance, dated Jul. 15, 2020, from corresponding U.S. Appl. No. 16/791,006.
Notice of Allowance, dated Jul. 16, 2020, from corresponding U.S. Appl. No. 16/901,979.
Notice of Allowance, dated Jul. 17, 2019, from corresponding U.S. Appl. No. 16/055,961.
Notice of Allowance, dated Jul. 17, 2020, from corresponding U.S. Appl. No. 16/778,709.
Notice of Allowance, dated Jul. 19, 2021, from corresponding U.S. Appl. No. 17/306,252.
Notice of Allowance, dated Jul. 21, 2020, from corresponding U.S. Appl. No. 16/557,392.
Notice of Allowance, dated Jul. 23, 2019, from corresponding U.S. Appl. No. 16/220,978.
Notice of Allowance, dated Jul. 26, 2019, from corresponding U.S. Appl. No. 16/409,673.
Notice of Allowance, dated Jul. 26, 2021, from corresponding U.S. Appl. No. 17/151,399.
Notice of Allowance, dated Jul. 26, 2021, from corresponding U.S. Appl. No. 17/207,316.
Notice of Allowance, dated Jul. 31, 2019, from corresponding U.S. Appl. No. 16/221,153.
Notice of Allowance, dated Jul. 8, 2021, from corresponding U.S. Appl. No. 17/201,040.
Notice of Allowance, dated Jun. 1, 2020, from corresponding U.S. Appl. No. 16/813,321.
Notice of Allowance, dated Jun. 11, 2021, from corresponding U.S. Appl. No. 16/862,948.
Notice of Allowance, dated Jun. 11, 2021, from corresponding U.S. Appl. No. 16/862,952.
Notice of Allowance, dated Jun. 11, 2021, from corresponding U.S. Appl. No. 17/216,436.
Notice of Allowance, dated Jun. 12, 2019, from corresponding U.S. Appl. No. 16/278,123.
Notice of Allowance, dated Jun. 12, 2019, from corresponding U.S. Appl. No. 16/363,454.
Notice of Allowance, dated Jun. 16, 2020, from corresponding U.S. Appl. No. 16/798,818.
Notice of Allowance, dated Jun. 17, 2020, from corresponding U.S. Appl. No. 16/656,895.
Notice of Allowance, dated Jun. 18, 2019, from corresponding U.S. Appl. No. 16/410,566.
Notice of Allowance, dated Jun. 19, 2018, from corresponding U.S. Appl. No. 15/894,890.
Notice of Allowance, dated Jun. 19, 2019, from corresponding U.S. Appl. No. 16/042,673.
Notice of Allowance, dated Jun. 19, 2019, from corresponding U.S. Appl. No. 16/055,984.
Notice of Allowance, dated Jun. 2, 2021, from corresponding U.S. Appl. No. 17/198,581.
Notice of Allowance, dated Jun. 21, 2019, from corresponding U.S. Appl. No. 16/404,439.
Notice of Allowance, dated Jun. 22, 2020, from corresponding U.S. Appl. No. 16/791,337.
Notice of Allowance, dated Jun. 27, 2018, from corresponding U.S. Appl. No. 15/882,989.
Final Office Action, dated Apr. 23, 2020, from corresponding U.S. Appl. No. 16/572,347.
Final Office Action, dated Apr. 27, 2021, from corresponding U.S. Appl. No. 17/068,454.
Final Office Action, dated Apr. 7, 2020, from corresponding U.S. Appl. No. 16/595,327.
Final Office Action, dated Aug. 10, 2020, from corresponding U.S. Appl. No. 16/791,589.
Final Office Action, dated Aug. 27, 2021, from corresponding U.S. Appl. No. 17/161,159.
Final Office Action, dated Aug. 28, 2020, from corresponding U.S. Appl. No. 16/410,336.
Final Office Action, dated Aug. 5, 2020, from corresponding U.S. Appl. No. 16/719,071.
Final Office Action, dated Aug. 9, 2021, from corresponding U.S. Appl. No. 17/119,080.
Final Office Action, dated Dec. 7, 2020, from corresponding U.S. Appl. No. 16/862,956.
Final Office Action, dated Dec. 9, 2019, from corresponding U.S. Appl. No. 16/410,336.
Final Office Action, dated Feb. 19, 2020, from corresponding U.S. Appl. No. 16/404,491.
Final Office Action, dated Feb. 3, 2020, from corresponding U.S. Appl. No. 16/557,392.
Final Office Action, dated Feb. 8, 2021, from corresponding U.S. Appl. No. 16/927,658.
Final Office Action, dated Jan. 17, 2018, from corresponding U.S. Appl. No. 15/619,278.
Final Office Action, dated Jan. 21, 2020, from corresponding U.S. Appl. No. 16/410,762.
Final Office Action, dated Jan. 23, 2018, from corresponding U.S. Appl. No. 15/619,479.
Final Office Action, dated Jan. 23, 2020, from corresponding U.S. Appl. No. 16/505,430.

(56) References Cited

OTHER PUBLICATIONS

Final Office Action, dated Jul. 21, 2021, from corresponding U.S. Appl. No. 17/151,334.
Final Office Action, dated Jul. 7, 2021, from corresponding U.S. Appl. No. 17/149,421.
Final Office Action, dated Mar. 26, 2021, from corresponding U.S. Appl. No. 17/020,275.
Final Office Action, dated Mar. 5, 2019, from corresponding U.S. Appl. No. 16/055,961.
Final Office Action, dated Mar. 6, 2020, from corresponding U.S. Appl. No. 16/595,342.
Final Office Action, dated May 14, 2021, from corresponding U.S. Appl. No. 17/013,756.
Final Office Action, dated Nov. 29, 2017, from corresponding U.S. Appl. No. 15/619,237.
Final Office Action, dated Sep. 17, 2021, from corresponding U.S. Appl. No. 17/200,698.
Final Office Action, dated Sep. 21, 2020, from corresponding U.S. Appl. No. 16/808,493.
Final Office Action, dated Sep. 21, 2020, from corresponding U.S. Appl. No. 16/862,944.
Final Office Action, dated Sep. 22, 2020, from corresponding U.S. Appl. No. 16/808,497.
Final Office Action, dated Sep. 23, 2020, from corresponding U.S. Appl. No. 16/862,948.
Final Office Action, dated Sep. 24, 2020, from corresponding U.S. Appl. No. 16/862,952.
Final Office Action, dated Sep. 25, 2019, from corresponding U.S. Appl. No. 16/278,119.
Final Office Action, dated Sep. 28, 2020, from corresponding U.S. Appl. No. 16/565,395.
Final Office Action, dated Sep. 8, 2020, from corresponding U.S. Appl. No. 16/410,866.
Office Action, dated Apr. 1, 2021, from corresponding U.S. Appl. No. 17/119,080.
Office Action, dated Apr. 15, 2021, from corresponding U.S. Appl. No. 17/161,159.
Office Action, dated Apr. 18, 2018, from corresponding U.S. Appl. No. 15/894,819.
Office Action, dated Apr. 2, 2021, from corresponding U.S. Appl. No. 17/151,334.
Office Action, dated Apr. 20, 2020, from corresponding U.S. Appl. No. 16/812,795.
Office Action, dated Apr. 22, 2019, from corresponding U.S. Appl. No. 16/241,710.
Office Action, dated Apr. 22, 2020, from corresponding U.S. Appl. No. 16/811,793.
Office Action, dated Apr. 28, 2020, from corresponding U.S. Appl. No. 16/798,818.
Office Action, dated Apr. 28, 2020, from corresponding U.S. Appl. No. 16/808,500.
Office Action, dated Apr. 28, 2021, from corresponding U.S. Appl. No. 16/808,497.
Office Action, dated Apr. 29, 2020, from corresponding U.S. Appl. No. 16/791,337.
Office Action, dated Apr. 5, 2019, from corresponding U.S. Appl. No. 16/278,119.
Office Action, dated Apr. 7, 2020, from corresponding U.S. Appl. No. 16/788,633.
Office Action, dated Apr. 7, 2020, from corresponding U.S. Appl. No. 16/791,589.
Office Action, dated Aug. 13, 2019, from corresponding U.S. Appl. No. 16/505,430.
Office Action, dated Aug. 13, 2019, from corresponding U.S. Appl. No. 16/512,033.
Office Action, dated Aug. 15, 2019, from corresponding U.S. Appl. No. 16/505,461.
Aman et al, "Detecting Data Tampering Attacks in Synchrophasor Networks using Time Hopping," IEEE, pp. 1-6 (Year: 2016).
Bertino et al, "Towards Mechanisms for Detection and Prevention of Data Exfiltration by Insiders," Mar. 22, 2011, ACM, pp. 10-19 (Year: 2011).
Bujlow et al, "Web Tracking: Mechanisms, Implications, and Defenses," Proceedings of the IEEE, Aug. 1, 2017, vol. 5, No. 8, pp. 1476-1510 (Year: 2017).
Fan et al, "Intrusion Investigations with Data-hiding for Computer Log-file Forensics," IEEE, pp. 1-6 (Year: 2010).
Final Office Action, dated Oct. 26, 2021, from corresponding U.S. Appl. No. 17/306,496.
Final Office Action, dated Oct. 28, 2021, from corresponding U.S. Appl. No. 17/234,205.
Final Office Action, dated Oct. 29, 2021, from corresponding U.S. Appl. No. 17/020,275.
Gonçalves et al, "The XML Log Standard for Digital Libraries: Analysis, Evolution, and Deployment," IEEE, pp. 312-314 (Year: 2003).
International Search Report, dated Nov. 12, 2021, from corresponding International Application No. PCT/US2021/043481.
International Search Report, dated Nov. 3, 2021, from corresponding International Application No. PCT/US2021/040893.
International Search Report, dated Nov. 3, 2021, from corresponding International Application No. PCT/US2021/044910.
Iordanou et al, "Tracing Cross Border Web Tracking," Oct. 31, 2018, pp. 329-342, ACM (Year: 2018).
Notice of Allowance, dated Nov. 16, 2021, from corresponding U.S. Appl. No. 17/491,871.
Notice of Allowance, dated Nov. 22, 2021, from corresponding U.S. Appl. No. 17/383,889.
Notice of Allowance, dated Oct. 22, 2021, from corresponding U.S. Appl. No. 17/346,847.
Office Action, dated Nov. 10, 2021, from corresponding U.S. Appl. No. 17/380,485.
Office Action, dated Nov. 10, 2021, from corresponding U.S. Appl. No. 17/409,999.
Office Action, dated Nov. 12, 2021, from corresponding U.S. Appl. No. 17/346,586.
Office Action, dated Nov. 12, 2021, from corresponding U.S. Appl. No. 17/373,444.
Office Action, dated Nov. 16, 2021, from corresponding U.S. Appl. No. 17/370,650.
Office Action, dated Nov. 16, 2021, from corresponding U.S. Appl. No. 17/486,350.
Office Action, dated Nov. 23, 2021, from corresponding U.S. Appl. No. 17/013,756.
Office Action, dated Nov. 26, 2021, from corresponding U.S. Appl. No. 16/925,550.
Office Action, dated Nov. 4, 2021, from corresponding U.S. Appl. No. 17/491,906.
Office Action, dated Nov. 8, 2021, from corresponding U.S. Appl. No. 16/872,130.
Office Action, dated Oct. 15, 2021, from corresponding U.S. Appl. No. 16/908,081.
Restriction Requirement, dated Nov. 10, 2021, from corresponding U.S. Appl. No. 17/366,754.
Roesner et al, "Detecting and Defending Against Third-Party Tracking on the Web," 9th USENIX Symposium on Networked Systems Design and Implementation, Apr. 11, 2013, pp. 1-14, ACM (Year: 2013).
Van Eijk et al, "The Impact of User Location on Cookie Notices (Inside and Outside of the European Union)," IEEE Security & Privacy Workshop on Technology and Consumer Protection (CONPRO '19), Jan. 1, 2019 (Year: 2019).
Written Opinion of the International Searching Authority, dated Nov. 12, 2021, from corresponding International Application No. PCT/US2021/043481.
Written Opinion of the International Searching Authority, dated Nov. 3, 2021, from corresponding International Application No. PCT/US2021/040893.
Written Opinion of the International Searching Authority, dated Nov. 3, 2021, from corresponding International Application No. PCT/US2021/044910.

(56) References Cited

OTHER PUBLICATIONS

Symantec, Symantex Data Loss Prevention—Discover, monitor, and protect confidential data; 2008; Symantec Corporation; http://www.mssuk.com/images/Symantec%2014552315_IRC_BR_DLP_03.09_sngl.pdf.
Tanasa et al, "Advanced Data Preprocessing for Intersites Web Usage Mining," IEEE, Mar. 2004, pp. 59-65 (Year: 2004).
Tanwar, et al, "Live Forensics Analysis: Violations of Business Security Policy," 2014 International Conference on Contemporary Computing and Informatics (IC31), 2014, pp. 971-976 (Year: 2014).
The Cookie Collective, Optanon Cookie Policy Generator, The Cookie Collective, Year 2016, http://web.archive.org/web/20160324062743/https:/optanon.com/.
Thuraisingham, "Security Issues for the Semantic Web," Proceedings 27th Annual International Computer Software and Applications Conference, COMPSAC 2003, Dallas, TX, USA, 2003, pp. 633-638 (Year: 2003).
TRUSTe Announces General Availability of Assessment Manager for Enterprises to Streamline Data Privacy Management with Automation, PRNewswire, Mar. 4, 2015.
Tsai et al, "Determinants of Intangible Assets Value: The Data Mining Approach," Knowledge Based System, pp. 67-77 http://www.elsevier.com/locate/knosys (Year: 2012).
Tuomas Aura et al., Scanning Electronic Documents for Personally Identifiable Information, ACM, Oct. 30, 2006, retrieved online on Jun. 13, 2019, pp. 41-49. Retrieved from the Internet: URL: http://delivery.acm.org/10.1145/1180000/1179608/p41-aura.pdf? (Year: 2006).
Wang et al, "Revealing Key Non-Financial Factors for Online Credit-Scoring in E-Financing," 2013, IEEE, pp. 1-6 (Year: 2013).
Wang et al, "Secure and Efficient Access to Outsourced Data," ACM, pp. 55-65 (Year: 2009).
Weaver et al, "Understanding Information Preview in Mobile Email Processing", ACM, pp. 303-312, 2011 (Year: 2011).
Written Opinion of the International Searching Authority, dated Jun. 6, 2017, from corresponding International Application No. PCT/US2017/025611.
Written Opinion of the International Searching Authority, dated Aug. 15, 2017, from corresponding International Application No. PCT/US2017/036919.
Written Opinion of the International Searching Authority, dated Aug. 21, 2017, from corresponding International Application No. PCT/US2017/036914.
Written Opinion of the International Searching Authority, dated Aug. 29, 2017, from corresponding International Application No. PCT/US2017/036898.
Written Opinion of the International Searching Authority, dated Aug. 8, 2017, from corresponding International Application No. PCT/US2017/036889.
Written Opinion of the International Searching Authority, dated Aug. 8, 2017, from corresponding International Application No. PCT/US2017/036890.
Written Opinion of the International Searching Authority, dated Aug. 8, 2017, from corresponding International Application No. PCT/US2017/036893.
Written Opinion of the International Searching Authority, dated Aug. 8, 2017, from corresponding International Application No. PCT/US2017/036901.
Written Opinion of the International Searching Authority, dated Aug. 8, 2017, from corresponding International Application No. PCT/US2017/036913.
Written Opinion of the International Searching Authority, dated Aug. 8, 2017, from corresponding International Application No. PCT/US2017/036920.
Written Opinion of the International Searching Authority, dated Dec. 14, 2018, from corresponding International Application No. PCT/US2018/045296.
Written Opinion of the International Searching Authority, dated Jan. 14, 2019, from corresponding International Application No. PCT/US2018/046949.
Written Opinion of the International Searching Authority, dated Jan. 7, 2019, from corresponding International Application No. PCT/US2018/055772.
Written Opinion of the International Searching Authority, dated Jun. 21, 2017, from corresponding International Application No. PCT/US2017/025600.
Written Opinion of the International Searching Authority, dated Jun. 6, 2017, from corresponding International Application No. PCT/US2017/025605.
Written Opinion of the International Searching Authority, dated Mar. 14, 2019, from corresponding International Application No. PCT/US2018/055736.
Written Opinion of the International Searching Authority, dated Mar. 4, 2019, from corresponding International Application No. PCT/US2018/055773.
Written Opinion of the International Searching Authority, dated Mar. 4, 2019, from corresponding International Application No. PCT/US2018/055774.
Written Opinion of the International Searching Authority, dated Nov. 19, 2018, from corresponding International Application No. PCT/US2018/046939.
Written Opinion of the International Searching Authority, dated Oct. 11, 2018, from corresponding International Application No. PCT/US2018/043975.
Written Opinion of the International Searching Authority, dated Oct. 11, 2018, from corresponding International Application No. PCT/US2018/043976.
Written Opinion of the International Searching Authority, dated Oct. 11, 2018, from corresponding International Application No. PCT/US2018/043977.
Written Opinion of the International Searching Authority, dated Oct. 11, 2018, from corresponding International Application No. PCT/US2018/044026.
Written Opinion of the International Searching Authority, dated Oct. 11, 2018, from corresponding International Application No. PCT/US2018/045240.
Written Opinion of the International Searching Authority, dated Oct. 12, 2017, from corresponding International Application No. PCT/US2017/036888.
Written Opinion of the International Searching Authority, dated Oct. 12, 2018, from corresponding International Application No. PCT/US2018/044046.
Written Opinion of the International Searching Authority, dated Oct. 16, 2018, from corresponding International Application No. PCT/US2018/045243.
Written Opinion of the International Searching Authority, dated Oct. 18, 2018, from corresponding International Application No. PCT/US2018/045249.
Written Opinion of the International Searching Authority, dated Oct. 20, 2017, from corresponding International Application No. PCT/US2017/036917.
Written Opinion of the International Searching Authority, dated Oct. 3, 2017, from corresponding International Application No. PCT/US2017/036912.
Written Opinion of the International Searching Authority, dated Sep. 1, 2017, from corresponding International Application No. PCT/US2017/036896.
Written Opinion of the International Searching Authority, dated Sep. 12, 2018, from corresponding International Application No. PCT/US2018/037504.
Written Opinion of the International Searching Authority, dated Sep. 15, 2021, from corresponding International Application No. PCT/US2021/033631.
Wu et al, "Data Mining with Big Data," IEEE, Jan. 2014, pp. 97-107, vol. 26, No. 1, (Year: 2014).
www.truste.com (1), 200150207, Internet Archive Wayback Machine, www.archive.org,2_7_2015.
Xu, et al, "GatorShare: A File System Framework for High-Throughput Data Management," ACM, pp. 776-786 (Year: 2010).
Yang et al, "DAC-MACS: Effective Data Access Control for Multiauthority Cloud Storage Systems," IEEE, pp. 1790-1801 (Year: 2013).

(56) References Cited

OTHER PUBLICATIONS

Yang et al, "Mining Web Access Sequence with Improved Apriori Algorithm," IEEE, 2017, pp. 780-784 (Year: 2017).
Ye et al, "An Evolution-Based Cache Scheme for Scalable Mobile Data Access," ACM, pp. 1-7 (Year: 2007).
Restriction Requirement, dated Jun. 15, 2021, from corresponding U.S. Appl. No. 17/187,329.
Restriction Requirement, dated Jun. 15, 2021, from corresponding U.S. Appl. No. 17/222,556.
Restriction Requirement, dated Jun. 9, 2021, from corresponding U.S. Appl. No. 17/222,725.
Restriction Requirement, dated May 5, 2020, from corresponding U.S. Appl. No. 16/808,489.
Restriction Requirement, dated Nov. 15, 2019, from corresponding U.S. Appl. No. 16/586,202.
Restriction Requirement, dated Nov. 21, 2016, from corresponding U.S. Appl. No. 15/254,901.
Restriction Requirement, dated Nov. 5, 2019, from corresponding U.S. Appl. No. 16/563,744.
Restriction Requirement, dated Oct. 17, 2018, from corresponding U.S. Appl. No. 16/055,984.
Restriction Requirement, dated Sep. 15, 2020, from corresponding U.S. Appl. No. 16/925,628.
Restriction Requirement, dated Sep. 9, 2019, from corresponding U.S. Appl. No. 16/505,426.
Abdullah et al, "The Mapping Process of Unstructured Data to the Structured Data", ACM, pp. 151-155 (Year: 2013).
Acar, Gunes, et al, The Web Never Forgets, Computer and Communications Security, ACM, Nov. 3, 2014, pp. 674-689.
Advisory Action, dated Jan. 13, 2021, from corresponding U.S. Appl. No. 16/808,493.
Advisory Action, dated Jan. 13, 2021, from corresponding U.S. Appl. No. 16/862,944.
Advisory Action, dated Jan. 13, 2021, from corresponding U.S. Appl. No. 16/862,948.
Advisory Action, dated Jan. 13, 2021, from corresponding U.S. Appl. No. 16/862,952.
Advisory Action, dated Jan. 6, 2021, from corresponding U.S. Appl. No. 16/808,497.
Advisory Action, dated Jun. 19, 2020, from corresponding U.S. Appl. No. 16/595,342.
Advisory Action, dated Jun. 2, 2020, from corresponding U.S. Appl. No. 16/404,491.
Advisory Action, dated May 21, 2020, from corresponding U.S. Appl. No. 16/557,392.
Aghasian, Erfan, et al, Scoring Users' Privacy Disclosure Across Multiple Online Social Networks,IEEE Access, Multidisciplinary Rapid Review Open Access Journal, Jul. 31, 2017, vol. 5, 2017.
Agosti et al, "Access and Exchange of Hierarchically Structured Resources on the Web with the NESTOR Framework", IEEE, pp. 659-662 (Year: 2009).
Agrawal et al, "Securing Electronic Health Records Without Impeding the Flow of Information," International Journal of Medical Informatics 76, 2007, pp. 471-479 (Year: 2007).
Ahmad et al, "Task-Oriented Access Model for Secure Data Sharing Over Cloud," ACM, pp. 1-7 (Year: 2015).
Ahmad, et al, "Performance of Resource Management Algorithms for Processable Bulk Data Transfer Tasks in Grid Environments," ACM, pp. 177-188 (Year: 2008).
Alaa et al, "Personalized Risk Scoring for Critical Care Prognosis Using Mixtures of Gaussian Processes," Apr. 27, 2017, IEEE, vol. 65, issue 1, pp. 207-217 (Year: 2017).
Antunes et al, "Preserving Digital Data in Heterogeneous Environments", ACM, pp. 345-348, 2009 (Year: 2009).
Ardagna, et al, "A Privacy-Aware Access Control System," Journal of Computer Security, 16:4, pp. 369-397 (Year: 2008).
AvePoint, Automating Privacy Impact Assessments, AvePoint, Inc.
AvePoint, AvePoint Privacy Impact Assessment 1: User Guide, Cumulative Update 2, Revision E, Feb. 2015, AvePoint, Inc.
AvePoint, Installing and Configuring the APIA System, International Association of Privacy Professionals, AvePoint, Inc.
Ball, et al, "Aspects of the Computer-Based Patient Record," Computers in Healthcare, Springer-Verlag New York Inc., pp. 1-23 (Year: 1992).
Bang et al, "Building an Effective and Efficient Continuous Web Application Security Program," 2016 International Conference on Cyber Security Situational Awareness, Data Analytics and Assessment (CyberSA), London, 2016, pp. 1-4 (Year: 2016).
Barker, "Personalizing Access Control by Generalizing Access Control," ACM, pp. 149-158 (Year: 2010).
Barr, "Amazon Rekognition Update—Estimated Age Range for Faces," AWS News Blog, Feb. 10, 2017, pp. 1-5 (Year: 2017).
Bayardo et al, "Technological Solutions for Protecting Privacy," Computer 36.9 (2003), pp. 115-118, (Year: 2003).
Berezovskiy et al, "A framework for dynamic data source identification and orchestration on the Web", ACM, pp. 1-8 (Year: 2010).
Bertino et al, "On Specifying Security Policies for Web Documents with an XML-based Language," ACM, pp. 57-65 (Year: 2001).
Bhargav-Spantzel et al., Receipt Management—Transaction History based Trust Establishment, 2007, ACM, p. 82-91.
Bhuvaneswaran et al, "Redundant Parallel Data Transfer Schemes for the Grid Environment", ACM, pp. 18 (Year: 2006).
Bieker, et al, "Privacy-Preserving Authentication Solutions—Best Practices for Implementation and EU Regulatory Perspectives," Oct. 29, 2014, IEEE, pp. 1-10 (Year: 2014).
Bin, et al, "Research on Data Mining Models for the Internet of Things," IEEE, pp. 1-6 (Year: 2010).
Binns, et al, "Data Havens, or Privacy Sans Frontières? A Study of International Personal Data Transfers," ACM, pp. 273-274 (Year: 2002).
Borgida, "Description Logics in Data Management," IEEE Transactions on Knowledge and Data Engineering, vol. 7, No. 5, Oct. 1995, pp. 671-682 (Year: 1995).
Brandt et al, "Efficient Metadata Management in Large Distributed Storage Systems," IEEE, pp. 1-9 (Year: 2003).
Byun, Ji-Won, Elisa Bertino, and Ninghui Li. "Purpose based access control of complex data for privacy protection." Proceedings of the tenth ACM symposium on Access control models and technologies. ACM, 2005. (Year: 2005).
Carminati et al, "Enforcing Access Control Over Data Streams," ACM, pp. 21-30 (Year: 2007).
Carpineto et al, "Automatic Assessment of Website Compliance to the European Cookie Law with CooLCheck," Proceedings of the 2016 ACM on Workshop on Privacy in the Electronic Society, 2016, pp. 135-138 (Year: 2016).
Cerpzone, "How to Access Data on Data Archival Storage and Recovery System", https://www.saj.usace.army.mil/Portals/44/docs/Environmental/Lake%20O%20Watershed/15February2017/How%20To%20Access%20Model%20Data%20on%20DASR.pdf?ver=2017-02-16-095535-633, Feb. 16, 2017.
Cha et al, "A Data-Driven Security Risk Assessment Scheme for Personal Data Protection," IEEE, pp. 50510-50517 (Year: 2018).
Notice of Allowance, dated Nov. 23, 2020, from corresponding U.S. Appl. No. 16/791,589.
Notice of Allowance, dated Nov. 24, 2020, from corresponding U.S. Appl. No. 17/027,019.
Notice of Allowance, dated Nov. 25, 2020, from corresponding U.S. Appl. No. 17/019,771.
Notice of Allowance, dated Nov. 26, 2019, from corresponding U.S. Appl. No. 16/563,735.
Notice of Allowance, dated Nov. 27, 2019, from corresponding U.S. Appl. No. 16/570,712.
Notice of Allowance, dated Nov. 27, 2019, from corresponding U.S. Appl. No. 16/577,634.
Notice of Allowance, dated Nov. 3, 2020, from corresponding U.S. Appl. No. 16/719,071.
Notice of Allowance, dated Nov. 5, 2019, from corresponding U.S. Appl. No. 16/560,965.
Notice of Allowance, dated Nov. 7, 2017, from corresponding U.S. Appl. No. 15/671,073.
Notice of Allowance, dated Nov. 8, 2018, from corresponding U.S. Appl. No. 16/042,642.

(56) References Cited

OTHER PUBLICATIONS

Notice of Allowance, dated Nov. 9, 2020, from corresponding U.S. Appl. No. 16/595,342.
Notice of Allowance, dated Oct. 10, 2019, from corresponding U.S. Appl. No. 16/277,539.
Notice of Allowance, dated Oct. 17, 2018, from corresponding U.S. Appl. No. 15/896,790.
Notice of Allowance, dated Oct. 17, 2018, from corresponding U.S. Appl. No. 16/054,672.
Notice of Allowance, dated Oct. 17, 2019, from corresponding U.S. Appl. No. 16/563,741.
Notice of Allowance, dated Oct. 21, 2019, from corresponding U.S. Appl. No. 16/404,405.
Notice of Allowance, dated Oct. 21, 2020, from corresponding U.S. Appl. No. 16/834,812.
Notice of Allowance, dated Oct. 3, 2019, from corresponding U.S. Appl. No. 16/511,700.
Notice of Allowance, dated Sep. 1, 2021, from corresponding U.S. Appl. No. 17/196,570.
Notice of Allowance, dated Sep. 1, 2021, from corresponding U.S. Appl. No. 17/222,556.
Notice of Allowance, dated Sep. 12, 2019, from corresponding U.S. Appl. No. 16/512,011.
Notice of Allowance, dated Sep. 13, 2018, from corresponding U.S. Appl. No. 15/894,809.
Notice of Allowance, dated Sep. 13, 2018, from corresponding U.S. Appl. No. 15/894,890.
Notice of Allowance, dated Sep. 14, 2021, from corresponding U.S. Appl. No. 16/808,497.
Notice of Allowance, dated Sep. 16, 2020, from corresponding U.S. Appl. No. 16/915,097.
Notice of Allowance, dated Sep. 17, 2020, from corresponding U.S. Appl. No. 16/863,226.
Notice of Allowance, dated Sep. 18, 2018, from corresponding U.S. Appl. No. 15/894,819.
Notice of Allowance, dated Sep. 18, 2018, from corresponding U.S. Appl. No. 16/041,545.
Notice of Allowance, dated Sep. 18, 2020, from corresponding U.S. Appl. No. 16/812,795.
Notice of Allowance, dated Sep. 23, 2020, from corresponding U.S. Appl. No. 16/811,793.
Notice of Allowance, dated Sep. 23, 2021, from corresponding U.S. Appl. No. 17/068,454.
Notice of Allowance, dated Sep. 24, 2021, from corresponding U.S. Appl. No. 17/334,939.
Notice of Allowance, dated Sep. 25, 2020, from corresponding U.S. Appl. No. 16/983,536.
Notice of Allowance, dated Sep. 27, 2017, from corresponding U.S. Appl. No. 15/626,052.
Notice of Allowance, dated Sep. 27, 2021, from corresponding U.S. Appl. No. 17/222,523.
Notice of Allowance, dated Sep. 28, 2018, from corresponding U.S. Appl. No. 16/041,520.
Notice of Allowance, dated Sep. 29, 2021, from corresponding U.S. Appl. No. 17/316,179.
Notice of Allowance, dated Sep. 4, 2018, from corresponding U.S. Appl. No. 15/883,041.
Notice of Allowance, dated Sep. 4, 2020, from corresponding U.S. Appl. No. 16/808,500.
Notice of Allowance, dated Sep. 4, 2020, from corresponding U.S. Appl. No. 16/901,662.
Notice of Allowance, dated Sep. 9, 2021, from corresponding U.S. Appl. No. 17/334,909.
Restriction Requirement, dated Apr. 10, 2019, from corresponding U.S. Appl. No. 16/277,715.
Restriction Requirement, dated Apr. 13, 2020, from corresponding U.S. Appl. No. 16/817,136.
Restriction Requirement, dated Apr. 24, 2019, from corresponding U.S. Appl. No. 16/278,122.
Restriction Requirement, dated Aug. 7, 2019, from corresponding U.S. Appl. No. 16/410,866.
Restriction Requirement, dated Aug. 9, 2019, from corresponding U.S. Appl. No. 16/404,399.
Restriction Requirement, dated Dec. 31, 2018, from corresponding U.S. Appl. No. 15/169,668.
Restriction Requirement, dated Dec. 9, 2019, from corresponding U.S. Appl. No. 16/565,395.
Restriction Requirement, dated Jan. 18, 2017, from corresponding U.S. Appl. No. 15/256,430.
Restriction Requirement, dated Jul. 28, 2017, from corresponding U.S. Appl. No. 15/169,658.
Notice of Allowance, dated Aug. 12, 2020, from corresponding U.S. Appl. No. 16/719,488.
Notice of Allowance, dated Aug. 12, 2021, from corresponding U.S. Appl. No. 16/881,832.
Notice of Allowance, dated Aug. 14, 2018, from corresponding U.S. Appl. No. 15/989,416.
Notice of Allowance, dated Aug. 18, 2017, from corresponding U.S. Appl. No. 15/619,455.
Notice of Allowance, dated Aug. 20, 2019, from corresponding U.S. Appl. No. 16/241,710.
Notice of Allowance, dated Aug. 24, 2018, from corresponding U.S. Appl. No. 15/619,479.
Notice of Allowance, dated Aug. 26, 2019, from corresponding U.S. Appl. No. 16/443,374.
Notice of Allowance, dated Aug. 26, 2020, from corresponding U.S. Appl. No. 16/808,503.
Notice of Allowance, dated Aug. 28, 2019, from corresponding U.S. Appl. No. 16/278,120.
Notice of Allowance, dated Aug. 30, 2018, from corresponding U.S. Appl. No. 15/996,208.
Notice of Allowance, dated Aug. 31, 2021, from corresponding U.S. Appl. No. 17/326,901.
Notice of Allowance, dated Aug. 4, 2021, from corresponding U.S. Appl. No. 16/895,278.
Notice of Allowance, dated Aug. 7, 2020, from corresponding U.S. Appl. No. 16/901,973.
Notice of Allowance, dated Aug. 9, 2018, from corresponding U.S. Appl. No. 15/882,989.
Notice of Allowance, dated Aug. 9, 2021, from corresponding U.S. Appl. No. 16/881,699.
Notice of Allowance, dated Dec. 10, 2018, from corresponding U.S. Appl. No. 16/105,602.
Notice of Allowance, dated Dec. 11, 2019, from corresponding U.S. Appl. No. 16/278,122.
Notice of Allowance, dated Dec. 11, 2019, from corresponding U.S. Appl. No. 16/593,634.
Notice of Allowance, dated Dec. 12, 2017, from corresponding U.S. Appl. No. 15/169,643.
Notice of Allowance, dated Dec. 12, 2017, from corresponding U.S. Appl. No. 15/619,212.
Notice of Allowance, dated Dec. 12, 2017, from corresponding U.S. Appl. No. 15/619,382.
Notice of Allowance, dated Dec. 13, 2019, from corresponding U.S. Appl. No. 16/512,033.
Notice of Allowance, dated Dec. 15, 2020, from corresponding U.S. Appl. No. 16/989,086.
Notice of Allowance, dated Dec. 16, 2019, from corresponding U.S. Appl. No. 16/505,461.
Notice of Allowance, dated Dec. 17, 2020, from corresponding U.S. Appl. No. 17/034,772.
Notice of Allowance, dated Dec. 18, 2019, from corresponding U.S. Appl. No. 16/659,437.
Notice of Allowance, dated Dec. 23, 2019, from corresponding U.S. Appl. No. 16/656,835.
Notice of Allowance, dated Dec. 23, 2020, from corresponding U.S. Appl. No. 17/068,557.
Notice of Allowance, dated Dec. 3, 2019, from corresponding U.S. Appl. No. 16/563,749.
Notice of Allowance, dated Dec. 31, 2018, from corresponding U.S. Appl. No. 16/159,634.

(56) References Cited

OTHER PUBLICATIONS

Notice of Allowance, dated Dec. 31, 2019, from corresponding U.S. Appl. No. 16/404,399.
Notice of Allowance, dated Dec. 4, 2019, from corresponding U.S. Appl. No. 16/594,670.
Notice of Allowance, dated Dec. 5, 2017, from corresponding U.S. Appl. No. 15/633,703.
Notice of Allowance, dated Dec. 6, 2017, from corresponding U.S. Appl. No. 15/619,451.
Notice of Allowance, dated Dec. 6, 2017, from corresponding U.S. Appl. No. 15/619,459.
Notice of Allowance, dated Dec. 7, 2020, from corresponding U.S. Appl. No. 16/817,136.
Notice of Allowance, dated Dec. 9, 2019, from corresponding U.S. Appl. No. 16/565,261.
Notice of Allowance, dated Dec. 9, 2020, from corresponding U.S. Appl. No. 16/404,491.
Notice of Allowance, dated Feb. 10, 2020, from corresponding U.S. Appl. No. 16/552,765.
Notice of Allowance, dated Feb. 11, 2021, from corresponding U.S. Appl. No. 17/086,732.
Notice of Allowance, dated Feb. 12, 2020, from corresponding U.S. Appl. No. 16/572,182.
Notice of Allowance, dated Feb. 13, 2019, from corresponding U.S. Appl. No. 16/041,563.
Notice of Allowance, dated Feb. 14, 2019, from corresponding U.S. Appl. No. 16/226,272.
Notice of Allowance, dated Feb. 19, 2019, from corresponding U.S. Appl. No. 16/159,632.
Notice of Allowance, dated Feb. 19, 2021, from corresponding U.S. Appl. No. 16/832,451.
Notice of Allowance, dated Feb. 24, 2021, from corresponding U.S. Appl. No. 17/034,355.
Notice of Allowance, dated Feb. 24, 2021, from corresponding U.S. Appl. No. 17/068,198.
Notice of Allowance, dated Feb. 24, 2021, from corresponding U.S. Appl. No. 17/101,106.
Notice of Allowance, dated Feb. 24, 2021, from corresponding U.S. Appl. No. 17/101,253.
Notice of Allowance, dated Feb. 25, 2020, from corresponding U.S. Appl. No. 16/714,355.
Office Action, dated Jan. 4, 2019, from corresponding U.S. Appl. No. 16/159,566.
Office Action, dated Jan. 4, 2019, from corresponding U.S. Appl. No. 16/159,628.
Office Action, dated Jan. 4, 2021, from corresponding U.S. Appl. No. 17/013,756.
Office Action, dated Jan. 7, 2020, from corresponding U.S. Appl. No. 16/572,182.
Office Action, dated Jul. 13, 2021, from corresponding U.S. Appl. No. 17/306,496.
Office Action, dated Jul. 15, 2021, from corresponding U.S. Appl. No. 17/020,275.
Office Action, dated Jul. 18, 2019, from corresponding U.S. Appl. No. 16/410,762.
Office Action, dated Jul. 19, 2021, from corresponding U.S. Appl. No. 17/316,179.
Office Action, dated Jul. 21, 2017, from corresponding U.S. Appl. No. 15/256,430.
Office Action, dated Jul. 21, 2021, from corresponding U.S. Appl. No. 16/901,654.
Office Action, dated Jul. 23, 2019, from corresponding U.S. Appl. No. 16/436,616.
Office Action, dated Jul. 24, 2020, from corresponding U.S. Appl. No. 16/404,491.
Office Action, dated Jul. 27, 2020, from corresponding U.S. Appl. No. 16/595,342.
Office Action, dated Jun. 1, 2020, from corresponding U.S. Appl. No. 16/862,952.
Office Action, dated Jun. 24, 2019, from corresponding U.S. Appl. No. 16/410,336.
Office Action, dated Jun. 24, 2021, from corresponding U.S. Appl. No. 17/234,205.
Office Action, dated Jun. 27, 2019, from corresponding U.S. Appl. No. 16/404,405.
Office Action, dated Jun. 7, 2021, from corresponding U.S. Appl. No. 17/200,698.
Office Action, dated Jun. 9, 2021, from corresponding U.S. Appl. No. 17/222,523.
Office Action, dated Mar. 11, 2019, from corresponding U.S. Appl. No. 16/220,978.
Office Action, dated Mar. 12, 2019, from corresponding U.S. Appl. No. 16/221,153.
Office Action, dated Mar. 15, 2021, from corresponding U.S. Appl. No. 17/149,421.
Office Action, dated Mar. 16, 2020, from corresponding U.S. Appl. No. 16/719,488.
Office Action, dated Mar. 17, 2020, from corresponding U.S. Appl. No. 16/565,395.
Office Action, dated Mar. 17, 2020, from corresponding U.S. Appl. No. 16/719,071.
Office Action, dated Mar. 20, 2020, from corresponding U.S. Appl. No. 16/778,709.
Office Action, dated Mar. 23, 2020, from corresponding U.S. Appl. No. 16/671,444.
Office Action, dated Mar. 25, 2019, from corresponding U.S. Appl. No. 16/278,121.
Office Action, dated Mar. 25, 2020, from corresponding U.S. Appl. No. 16/701,043.
Office Action, dated Mar. 25, 2020, from corresponding U.S. Appl. No. 16/791,006.
Office Action, dated Mar. 27, 2019, from corresponding U.S. Appl. No. 16/278,120.
Office Action, dated Mar. 30, 2018, from corresponding U.S. Appl. No. 15/894,890.
Office Action, dated Mar. 30, 2018, from corresponding U.S. Appl. No. 15/896,790.
Office Action, dated Mar. 30, 2021, from corresponding U.S. Appl. No. 17/151,399.
Office Action, dated Mar. 4, 2019, from corresponding U.S. Appl. No. 16/237,083.
Office Action, dated May 14, 2020, from corresponding U.S. Appl. No. 16/808,497.
Office Action, dated May 14, 2020, from corresponding U.S. Appl. No. 16/808,503.
Office Action, dated May 15, 2020, from corresponding U.S. Appl. No. 16/808,493.
Office Action, dated May 16, 2018, from corresponding U.S. Appl. No. 15/882,989.
Office Action, dated May 17, 2019, from corresponding U.S. Appl. No. 16/277,539.
Office Action, dated May 18, 2021, from corresponding U.S. Appl. No. 17/196,570.
Office Action, dated May 2, 2018, from corresponding U.S. Appl. No. 15/894,809.
Office Action, dated May 2, 2019, from corresponding U.S. Appl. No. 16/104,628.
Office Action, dated May 29, 2020, from corresponding U.S. Appl. No. 16/862,944.
Office Action, dated May 29, 2020, from corresponding U.S. Appl. No. 16/862,948.
Office Action, dated May 29, 2020, from corresponding U.S. Appl. No. 16/863,226.
Office Action, dated May 5, 2020, from corresponding U.S. Appl. No. 16/410,336.
Office Action, dated Nov. 1, 2017, from corresponding U.S. Appl. No. 15/169,658.
Office Action, dated Nov. 12, 2020, from corresponding U.S. Appl. No. 17/034,355.
Office Action, dated Nov. 12, 2020, from corresponding U.S. Appl. No. 17/034,772.

(56) References Cited

OTHER PUBLICATIONS

Liu, Kun, et al, A Framework for Computing the Privacy Scores of Users in Online Social Networks, ACM Transactions on Knowledge Discovery from Data, vol. 5, No. 1, Article 6, Dec. 2010, 30 pages.
Liu, Yandong, et al, "Finding the Right Consumer: Optimizing for Conversion in Display Advertising Campaigns," Proceedings of the Fifth ACM International Conference on Web Search and Data Mining, Feb. 2, 2012, pp. 473-428 (Year: 2012).
Lizar et al, "Usable Consents: Tracking and Managing Use of Personal Data with a Consent Transaction Receipt," Proceedings of the 2014 ACM International Joint Conference on Pervasive and Ubiquitous Computing: Adjunct Publication, 2014, pp. 647-652 (Year: 2014).
Luu, et al, "Combined Local and Holistic Facial Features for Age-Determination," 2010 11th Int. Conf. Control, Automation, Robotics and Vision, Singapore, Dec. 7, 2010, IEEE, pp. 900-904 (Year: 2010).
Ma Ziang, et al, "LibRadar: Fast and Accurate Detection of Third-Party Libraries in Android Apps," 2016 IEEE/ACM 38th IEEE International Conference on Software Engineering Companion (ICSE-C), ACM, May 14, 2016, pp. 653-656, DOI: http://dx.doi.org/10.1145/2889160.2889178, p. 653, r.col, par. 1-3; figure 3 (Year: 2016).
Mandal, et al, "Automated Age Prediction Using Wrinkles Features of Facial Images and Neural Network," International Journal of Emerging Engineering Research and Technology, vol. 5, Issue 2, Feb. 2017, pp. 12-20 (Year: 2017).
Maret et al, "Multimedia Information Interchange: Web Forms Meet Data Servers", IEEE, pp. 499-505 (Year: 1999).
Martin, et al, "Hidden Surveillance by Web Sites: Web Bugs in Contemporary Use," Communications of the ACM, vol. 46, No. 12, Dec. 2003, pp. 258-264. Internet source https://doi.org/10.1145/953460.953509. (Year: 2003).
McGarth et al, "Digital Library Technology for Locating and Accessing Scientific Data", ACM, pp. 188-194 (Year: 1999).
Mesbah et al, "Crawling Ajax-Based Web Applications Through Dynamic Analysis of User Interface State Changes," ACM Transactions on the Web (TWEB) vol. 6, No. 1, Article 3, Mar. 2012, pp. 1-30 (Year: 2012).
Moiso et al, "Towards a User-Centric Personal Data Ecosystem The Role of the Bank of Individual's Data," 2012 16th International Conference on Intelligence in Next Generation Networks, Berlin, 2012, pp. 202-209 (Year: 2012).
Moscoso-Zea et al, "Datawarehouse Design for Educational Data Mining," IEEE, pp. 1-6 (Year: 2016).
Mudepalli et al, "An efficient data retrieval approach using blowfish encryption on cloud CipherText Retrieval in Cloud Computing" IEEE, pp. 267-271 (Year: 2017).
Mundada et al, "Half-Baked Cookies: Hardening Cookie-Based Authentication for the Modern Web," Proceedings of the 11th ACM on Asia Conference on Computer and Communications Security, 2016, pp. 675-685 (Year: 2016).
Newman et al, "High Speed Scientific Data Transfers using Software Defined Networking," ACM, pp. 1-9 (Year: 2015).
Newman, "Email Archive Overviews using Subject Indexes", ACM, pp. 652-653, 2002 (Year: 2002).
Nishikawa, Taiji, English Translation of JP 2019154505, Aug. 27, 2019 (Year: 2019).
Notice of Filing Date for Petition for Post-Grant Review of related U.S. Pat. No. 9,691,090 dated Apr. 12, 2018.
O'Keefe et al, "Privacy-Preserving Data Linkage Protocols," Proceedings of the 2004 ACM Workshop on Privacy in the Electronic Society, 2004, pp. 94-102 (Year: 2004).
Olenski, Steve, For Consumers, Data Is a Matter of Trust, CMO Network, Apr. 18, 2016, https://www.forbes.com/sites/steveolenski/2016/04/18/for-consumers-data-is-a-matter-of-trust/#2e48496278b3.
Pearson, et al, "A Model-Based Privacy Compliance Checker," IJEBR, vol. 5, No. 2, pp. 63-83, 2009, Nov. 21, 2008. [Online]. Available: http://dx.doi.org/10.4018/jebr.2009040104 (Year: 2008).
Pechenizkiy et al, "Process Mining Online Assessment Data," Educational Data Mining, pp. 279-288 (Year: 2009).
Petition for Post-Grant Review of related U.S. Pat. No. 9,691,090 dated Mar. 27, 2018.
Petrie et al, "The Relationship between Accessibility and Usability of Websites", ACM, pp. 397-406 (Year: 2007).
Pfeifle, Sam, The Privacy Advisor, IAPP and AvePoint Launch New Free PIA Tool, International Association of Privacy Professionals, Mar. 5, 2014.
Pfeifle, Sam, The Privacy Advisor, IAPP Heads to Singapore with APIA Template in Tow, International Association of Privacy Professionals, https://iapp.org/news/a/iapp-heads-to-singapore-with-apia-template_in_tow/, Mar. 28, 2014, p. 1-3.
Ping et al, "Wide Area Placement of Data Replicas for Fast and Highly Available Data Access," ACM, pp. 1-8 (Year: 2011).
Popescu-Zeletin, "The Data Access and Transfer Support in a Local Heterogeneous Network (HMINET)", IEEE, pp. 147-152 (Year: 1979).
Porter, "De-Identified Data and Third Party Data Mining: The Risk of Re-Identification of Personal Information," Shidler JL Com. & Tech. 5, 2008, pp. 1-9 (Year: 2008).
Pretorius, et al, "Attributing Users Based on Web Browser History," 2017 IEEE Conference on Application, Information and Network Security (AINS), 2017, pp. 69-74 (Year: 2017).
Qing-Jiang et al, "The (P, a, K) Anonymity Model for Privacy Protection of Personal Information in the Social Networks," 2011 6th IEEE Joint International Information Technology and Artificial Intelligence Conference, vol. 2 IEEE, 2011, pp. 420-423 (Year: 2011).
Qiu, et al, "Design and Application of Data Integration Platform Based on Web Services and XML," IEEE, pp. 253-256 (Year: 2016).
Radu, et al, "Analyzing Risk Evaluation Frameworks and Risk Assessment Methods," IEEE, Dec. 12, 2020, pp. 1-6 (Year: 2020).
Reardon et al., User-Level Secure Deletion on Log-Structured File Systems, ACM, 2012, retrieved online on Apr. 22, 2021, pp. 1-11. Retrieved from the Internet: URL: http://citeseerx.ist.psu.edu/viewdoc/download; isessionid=450713515DC7F19F8ED09AE961D4B60E. (Year: 2012).
Regulation (EU) 2016/679, "On the protection of natural persons with regard to the processing of personal data and on the free movement of such data, and repealing Directive 95/46/EC (General Data Protection Regulation)," Official Journal of the European Union, May 4, 2016, pp. L 119/1-L 119/88 (Year: 2016).
Rozepz, "What is Google Privacy Checkup? Everything You Need to Know," Tom's Guide web post, Apr. 26, 2018, pp. 1-11 (Year: 2018).
Salim et al, "Data Retrieval and Security using Lightweight Directory Access Protocol", IEEE, pp. 685-688 (Year: 2009).
Santhisree, et al, "Web Usage Data Clustering Using Dbscan Algorithm and Set Similarities," IEEE, pp. 220-224 (Year: 2010).
Sanzo et al, "Analytical Modeling of Lock-Based Concurrency Control with Arbitrary Transaction Data Access Patterns," ACM, pp. 69-78 (Year: 2010).
Schwartz, Edward J., et al, 2010 IEEE Symposium on Security and Privacy: All You Ever Wanted to Know About Dynamic Analysis and forward Symbolic Execution (but might have been afraid to ask), Carnegie Mellon University, IEEE Computer Society, 2010, p. 317-331.
Sedinic et al, "Security Risk Management in Complex Organization," May 29, 2015, IEEE, pp. 1331-1337 (Year: 2015).
Singh, et al, "A Metadata Catalog Service for Data Intensive Applications," ACM, pp. 1-17 (Year: 2003).
Slezak, et al, "Brighthouse: An Analytic Data Warehouse for Ad-hoc Queries," ACM, pp. 1337-1345 (Year: 2008).
Soceanu, et al, "Managing the Privacy and Security of eHealth Data," May 29, 2015, IEEE, pp. 1-8 (Year: 2015).
Srinivasan et al, "Descriptive Data Analysis of File Transfer Data," ACM, pp. 1-8 (Year: 2014).
Srivastava, Agrima, et al, Measuring Privacy Leaks in Online Social Networks, International Conference on Advances in Computing, Communications and Informatics (ICACCI), 2013.

(56) References Cited

OTHER PUBLICATIONS

Stack Overflow, "Is there a way to force a user to scroll to the bottom of a div?," Stack Overflow, pp. 1-11, Nov. 2013. [Online]. Available: https://stackoverflow.com/questions/2745935/is-there-a-way-to-force-a-user-to-scroll-to-the-bottom-of-a-div (Year: 2013).
Stern, Joanna, "iPhone Privacy Is Broken . . . and Apps Are to Blame", The Wall Street Journal, wsj.com, May 31, 2019.
Strodl, et al, "Personal & SOHO Archiving," Vienna University of Technology, Vienna, Austria, JCDL '08, Jun. 16-20, 2008, Pittsburgh, Pennsylvania, USA, pp. 115-123 (Year: 2008).
Sukumar et al, "Review on Modern Data Preprocessing Techniques in Web Usage Mining (WUM)," IEEE, 2016, pp. 64-69 (Year: 2016).
Bjorn Greif, "Cookie Pop-up Blocker: Cliqz Automatically Denies Consent Requests," Cliqz.com, pp. 1-9, Aug. 11, 2019 (Year: 2019).
Final Office Action, dated Dec. 10, 2021, from corresponding U.S. Appl. No. 17/187,329.
He et al, "A Crowdsourcing Framework for Detecting of Cross-Browser Issues in Web Application," ACM, pp. 1-4, Nov. 6, 2015 (Year: 2015).
International Search Report, dated Dec. 22, 2021, from corresponding International Application No. PCT/US2021/051217.
Jones et al, "AI and the Ethics of Automating Consent," IEEE, pp. 64-72, May 2018 (Year: 2018).
Liu et al, "A Novel Approach for Detecting Browser-based Silent Miner," IEEE, pp. 490-497 (Year: 2018).
Lu et al, "An HTTP Flooding Detection Method Based on Browser Behavior," IEEE, pp. 1151-1154 (Year: 2006).
Notice of Allowance, dated Dec. 13, 2021, from corresponding U.S. Appl. No. 16/908,081.
Notice of Allowance, dated Dec. 13, 2021, from corresponding U.S. Appl. No. 17/347,853.
Notice of Allowance, dated Dec. 2, 2021, from corresponding U.S. Appl. No. 16/901,654.
Notice of Allowance, dated Dec. 8, 2021, from corresponding U.S. Appl. No. 17/397,472.
Nouwens et al, "Dark Patterns after the GDPR: Scraping Consent Pop-ups and Demonstrating their Influence," ACM, pp. 1-13, Apr. 25, 2020 (Year: 2020).
Office Action, dated Dec. 13, 2021, from corresponding U.S. Appl. No. 17/476,209.
Office Action, dated Dec. 17, 2021, from corresponding U.S. Appl. No. 17/395,759.
Office Action, dated Dec. 17, 2021, from corresponding U.S. Appl. No. 17/499,582.
Office Action, dated Dec. 2, 2021, from corresponding U.S. Appl. No. 17/504,102.
Office Action, dated Dec. 27, 2021, from corresponding U.S. Appl. No. 17/493,332.
Office Action, dated Dec. 29, 2021, from corresponding U.S. Appl. No. 17/479,807.
Office Action, dated Dec. 7, 2021, from corresponding U.S. Appl. No. 17/499,609.
Paes, "Student Research Abstract: Automatic Detection of Cross-Browser Incompatibilities using Machine Learning and Screenshot Similarity," ACM, pp. 697-698, Apr. 3, 2017 (Year: 2017).
Restriction Requirement, dated Dec. 17, 2021, from corresponding U.S. Appl. No. 17/475,244.
Shahriar et al, "A Model-Based Detection of Vulnerable and Malicious Browser Extensions," IEEE, pp. 198-207 (Year: 2013).
Sjosten et al, "Discovering Browser Extensions via Web Accessible Resources," ACM, pp. 329-336, Mar. 22, 2017 (Year: 2017).
Written Opinion of the International Searching Authority, dated Dec. 22, 2021, from corresponding International Application No. PCT/US2021/051217.
Office Action, dated Aug. 18, 2021, from corresponding U.S. Appl. No. 17/222,725.
Office Action, dated Aug. 19, 2019, from corresponding U.S. Appl. No. 16/278,122.
Office Action, dated Aug. 20, 2020, from corresponding U.S. Appl. No. 16/817,136.
Office Action, dated Aug. 23, 2017, from corresponding U.S. Appl. No. 15/626,052.
Office Action, dated Aug. 24, 2017, from corresponding U.S. Appl. No. 15/169,643.
Office Action, dated Aug. 24, 2017, from corresponding U.S. Appl. No. 15/619,451.
Office Action, dated Aug. 24, 2020, from corresponding U.S. Appl. No. 16/595,327.
Office Action, dated Aug. 27, 2019, from corresponding U.S. Appl. No. 16/410,296.
Office Action, dated Aug. 27, 2021, from corresponding U.S. Appl. No. 17/187,329.
Office Action, dated Aug. 27, 2021, from corresponding U.S. Appl. No. 17/334,948.
Office Action, dated Aug. 29, 2017, from corresponding U.S. Appl. No. 15/619,237.
Office Action, dated Aug. 30, 2017, from corresponding U.S. Appl. No. 15/619,212.
Office Action, dated Aug. 30, 2017, from corresponding U.S. Appl. No. 15/619,382.
Office Action, dated Aug. 30, 2021, from corresponding U.S. Appl. No. 16/938,520.
Office Action, dated Aug. 6, 2019, from corresponding U.S. Appl. No. 16/404,491.
Office Action, dated Aug. 6, 2020, from corresponding U.S. Appl. No. 16/862,956.
Office Action, dated Dec. 11, 2019, from corresponding U.S. Appl. No. 16/578,712.
Office Action, dated Dec. 14, 2018, from corresponding U.S. Appl. No. 16/104,393.
Office Action, dated Dec. 15, 2016, from corresponding U.S. Appl. No. 15/256,419.
Office Action, dated Dec. 16, 2019, from corresponding U.S. Appl. No. 16/563,754.
Office Action, dated Dec. 16, 2019, from corresponding U.S. Appl. No. 16/565,265.
Office Action, dated Dec. 16, 2020, from corresponding U.S. Appl. No. 17/020,275.
Office Action, dated Dec. 18, 2020, from corresponding U.S. Appl. No. 17/030,714.
Office Action, dated Dec. 19, 2019, from corresponding U.S. Appl. No. 16/410,866.
Office Action, dated Dec. 2, 2019, from corresponding U.S. Appl. No. 16/560,963.
Office Action, dated Dec. 23, 2019, from corresponding U.S. Appl. No. 16/593,639.
Office Action, dated Dec. 24, 2020, from corresponding U.S. Appl. No. 17/068,454.
Office Action, dated Dec. 3, 2018, from corresponding U.S. Appl. No. 16/055,998.
Office Action, dated Dec. 31, 2018, from corresponding U.S. Appl. No. 16/160,577.
Office Action, dated Dec. 8, 2020, from corresponding U.S. Appl. No. 17/013,758.
Office Action, dated Dec. 8, 2020, from corresponding U.S. Appl. No. 17/068,198.
Office Action, dated Feb. 10, 2021, from corresponding U.S. Appl. No. 16/862,944.
Office Action, dated Feb. 10, 2021, from corresponding U.S. Appl. No. 17/106,469.
Office Action, dated Feb. 15, 2019, from corresponding U.S. Appl. No. 16/220,899.
Office Action, dated Feb. 17, 2021, from corresponding U.S. Appl. No. 16/862,948.
Office Action, dated Feb. 18, 2021, from corresponding U.S. Appl. No. 16/862,952.
Office Action, dated Feb. 2, 2021, from corresponding U.S. Appl. No. 17/101,915.
Office Action, dated Feb. 26, 2019, from corresponding U.S. Appl. No. 16/228,250.

(56) References Cited

OTHER PUBLICATIONS

Office Action, dated Feb. 3, 2021, from corresponding U.S. Appl. No. 17/013,757.
Office Action, dated Feb. 5, 2020, from corresponding U.S. Appl. No. 16/586,202.
Office Action, dated Feb. 6, 2020, from corresponding U.S. Appl. No. 16/707,762.
Office Action, dated Feb. 8, 2021, from corresponding U.S. Appl. No. 17/139,650.
Office Action, dated Feb. 9, 2021, from corresponding U.S. Appl. No. 16/808,493.
Office Action, dated Jan. 18, 2019, from corresponding U.S. Appl. No. 16/055,984.
Office Action, dated Jan. 22, 2021, from corresponding U.S. Appl. No. 17/099,270.
Office Action, dated Jan. 24, 2020, from corresponding U.S. Appl. No. 16/505,426.
Office Action, dated Jan. 24, 2020, from corresponding U.S. Appl. No. 16/700,049.
Office Action, dated Jan. 27, 2020, from corresponding U.S. Appl. No. 16/656,895.
Office Action, dated Jan. 28, 2020, from corresponding U.S. Appl. No. 16/712,104.
Office Action, dated Jan. 29, 2021, from corresponding U.S. Appl. No. 17/101,106.
Cha, et al, "Process-Oriented Approach for Validating Asset Value for Evaluating Information Security Risk," IEEE, Aug. 31, 2009, pp. 379-385 (Year: 2009).
Chapados et al, "Scoring Models for Insurance Risk Sharing Pool Optimization," 2008, IEEE, pp. 97-105 (Year: 2008).
Cheng, Raymond, et al, "Radiatus: A Shared-Nothing Server-Side Web Architecture," Proceedings of the Seventh ACM Symposium on Cloud Computing, Oct. 5, 2016, pp. 237-250 (Year: 2016).
Choi et al, "Retrieval Effectiveness of Table of Contents and Subject Headings," ACM, pp. 103-104 (Year: 2007).
Chowdhury et al, "A System Architecture for Subject-Centric Data Sharing", ACM, pp. 1-10 (Year: 2018).
Chowdhury et al, "Managing Data Transfers in Computer Clusters with Orchestra," ACM, pp. 98-109 (Year: 2011).
Decision Regarding Institution of Post-Grant Review in Case PGR2018-00056 for U.S. Pat. No. 9,691,090 B1, Oct. 11, 2018.
Dimou et al, "Machine-Interpretable Dataset and Service Descriptions for Heterogeneous Data Access and Retrieval", ACM, pp. 145-152 (Year: 2015).
Dokholyan et al, "Regulatory and Ethical Considerations for Linking Clinical and Administrative Databases," American Heart Journal 157.6 (2009), pp. 971-982 (Year: 2009).
Dunkel et al, "Data Organization and Access for Efficient Data Mining", IEEE, pp. 522-529 (Year: 1999).
Dwork, Cynthia, Differential Privacy, Microsoft Research, p. 1-12.
Emerson, et al, "A Data Mining Driven Risk Profiling Method for Road Asset Management," ACM, pp. 1267-1275 (Year: 2013).
Enck, William, et al, TaintDroid: An Information-Flow Tracking System for Realtime Privacy Monitoring on Smartphones, ACM Transactions on Computer Systems, vol. 32, No. 2, Article 5, Jun. 2014, p. 5:1-5:29.
Everypixel Team, "A New Age Recognition API Detects the Age of People on Photos," May 20, 2019, pp. 1-5 (Year: 2019).
Falahrastegar, Marjan, et al, Tracking Personal Identifiers Across the Web, Medical Image Computing and Computer-Assisted Intervention—Miccai 2015, 18th International Conference, Oct. 5, 2015, Munich, Germany.
Final Written Decision Regarding Post-Grant Review in Case PGR2018-00056 for U.S. Pat. No. 9,691,090 B1, Oct. 10, 2019.
Francis, Andre, Business Mathematics and Statistics, South-Western Cengage Learning, 2008, Sixth Edition.
Friedman et al, "Data Mining with Differential Privacy," ACM, Jul. 2010, pp. 493-502 (Year: 2010).
Friedman et al, "Informed Consent in the Mozilla Browser: Implementing Value-Sensitive Design," Proceedings of the 35th Annual Hawaii International Conference on System Sciences, 2002, IEEE, pp. 1-10 (Year: 2002).
Frikken, Keith B., et al, Yet Another Privacy Metric for Publishing Micro-data, Miami University, Oct. 27, 2008, p. 117-121.
Fung et al, "Discover Information and Knowledge from Websites using an Integrated Summarization and Visualization Framework", IEEE, pp. 232-235 (Year: 2010).
Gajare et al, "Improved Automatic Feature Selection Approach for Health Risk Prediction," Feb. 16, 2018, IEEE, pp. 816-819 (Year: 2018).
Ghiglieri, Marco et al.; Personal DLP for Facebook, 2014 IEEE International Conference on Pervasive Computing and Communication Workshops (Percom Workshops); IEEE; Mar. 24, 2014; pp. 629-634.
Gilda, et al, "Blockchain for Student Data Privacy and Consent," 2018 International Conference on Computer Communication and Informatics, Jan. 4-6, 2018, IEEE, pp. 1-5 (Year: 2018).
Golab, et al, "Issues in Data Stream Management," ACM, SIGMOD Record, vol. 32, No. 2, Jun. 2003, pp. 5-14 (Year: 2003).
Golfarelli et al, "Beyond Data Warehousing: What's Next in Business Intelligence?," ACM, pp. 1-6 (Year: 2004).
Goni, Kyriaki, "Deletion Process_Only you can see my history: Investigating Digital Privacy, Digital Oblivion, and Control on Personal Data Through an Interactive Art Installation," ACM, 2016, retrieved online on Oct. 3, 2019, pp. 324-333. Retrieved from the Internet URL: http://delivery.acm.org/10.1145/2920000/291.
Gowadia et al, "RDF Metadata for XML Access Control," ACM, pp. 31-48 (Year: 2003).
Grolinger, et al, "Data Management in Cloud Environments: NoSQL and NewSQL Data Stores," Journal of Cloud Computing: Advances, Systems and Applications, pp. 1-24 (Year: 2013).
Guo, et al, "OPAL: A Passe-partout for Web Forms," ACM, pp. 353-356 (Year: 2012).
Gustarini, et al, "Evaluation of Challenges in Human Subject Studies 'In-the-Wild' Using Subjects' Personal Smartphones," ACM, pp. 1447-1456 (Year: 2013).
Hacigümüs, Hakan, et al, Executing SQL over Encrypted Data in the Database-Service-Provider Model, ACM, Jun. 4, 2002, pp. 216-227.
Halevy, et al, "Schema Mediation in Peer Data Management Systems," IEEE, Proceedings of the 19th International Conference on Data Engineering, 2003, pp. 505-516 (Year: 2003).
Hauch, et al, "Information Intelligence: Metadata for Information Discovery, Access, and Integration," ACM, pp. 793-798 (Year: 2005).
Hernandez, et al, "Data Exchange with Data-Metadata Translations," ACM, pp. 260-273 (Year: 2008).
Hinde, "A Model to Assess Organisational Information Privacy Maturity Against the Protection of Personal Information Act Dissertation University of Cape Town" 2014, pp. 1-121 (Year: 2014).
Hodge, et al, "Managing Virtual Data Marts with Metapointer Tables," pp. 1-7 (Year: 2002).
Horrall et al, "Evaluating Risk: IBM's Country Financial Risk and Treasury Risk Scorecards," Jul. 21, 2014, IBM, vol. 58, issue 4, pp. 2:1-2:9 (Year: 2014).
Hu, et al, "Attribute Considerations for Access Control Systems," NIST Special Publication 800-205, Jun. 2019, pp. 1-42 (Year: 2019).
Hu, et al, "Guide to Attribute Based Access Control (ABAC) Definition and Considerations (Draft)," NIST Special Publication 800-162, pp. 1-54 (Year: 2013).
Huang, et al, "A Study on Information Security Management with Personal Data Protection," IEEE, Dec. 9, 2011, pp. 624-630 (Year: 2011).
Huner et al, "Towards a Maturity Model for Corporate Data Quality Management", ACM, pp. 231-238, 2009 (Year: 2009).
Hunton & Williams LLP, The Role of Risk Management in Data Protection, Privacy Risk Framework and the Risk-based Approach to Privacy, Centre for Information Policy Leadership, Workshop II, Nov. 23, 2014.

(56) References Cited

OTHER PUBLICATIONS

Huo et al, "A Cloud Storage Architecture Model for Data-lntensive Applications," IEEE, pp. 1-4 (Year: 2011).
IAPP, Daily Dashboard, PIA Tool Stocked With New Templates for DPI, Infosec, International Association of Privacy Professionals, Apr. 22, 2014.
IAPP, ISO/IEC 27001 Information Security Management Template, Resource Center, International Association of Privacy Professionals.
Imran et al, "Searching in Cloud Object Storage by Using a Metadata Model", IEEE, 2014, retrieved online on Apr. 1, 2020, pp. 121-128. Retrieved from the Internet: URL: https://ieeeexplore.ieee.org/stamp/stamp.jsp? (Year: 2014).
International Search Report, dated Aug. 15, 2017, from corresponding International Application No. PCT/US2017/036919.
International Search Report, dated Aug. 21, 2017, from corresponding International Application No. PCT/US2017/036914.
International Search Report, dated Aug. 29, 2017, from corresponding International Application No. PCT/US2017/036898.
Yin et al, "Multibank Memory Optimization for Parallel Data Access in Multiple Data Arrays", ACM, pp. 1-8 (Year: 2016).
Yiu et al, "Outsourced Similarity Search on Metric Data Assets", IEEE, pp. 338-352 (Year: 2012).
Yu, "Using Data from Social Media Websites to Inspire the Design of Assistive Technology", ACM, pp. 1-2 (Year: 2016).
Yu, et al, "Performance and Fairness Issues in Big Data Transfers," ACM, pp. 9-11 (Year: 2014).
Zannone, et al, "Maintaining Privacy on Derived Objects," ACM, pp. 10-19 (Year: 2005).
Zeldovich, Nickolai, et al, Making Information Flow Explicit in HiStar, OSDI '06: 7th USENIX Symposium on Operating Systems Design and Implementation, USENIX Association, p. 263-278.
Zhang et al, "Data Transfer Performance Issues for a Web Services Interface to Synchrotron Experiments", ACM, pp. 59-65 (Year: 2007).
Zhang et al, "Dynamic Topic Modeling for Monitoring Market Competition from Online Text and Image Data", ACM, pp. 1425-1434 (Year: 2015).
Zheng, et al, "Methodologies for Cross-Domain Data Fusion: An Overview," IEEE, pp. 16-34 (Year: 2015).
Zheng, et al, "Toward Assured Data Deletion in Cloud Storage," IEEE, vol. 34, No. 3, pp. 101-107 May/Jun. 2020 (Year: 2020).
Zhu, et al, "Dynamic Data Integration Using Web Services," IEEE, pp. 1-8 (Year: 2004).
Notice of Allowance, dated Oct. 1, 2021, from corresponding U.S. Appl. No. 17/340,395.
Office Action, dated Oct. 12, 2021, from corresponding U.S. Appl. No. 17/346,509.
Restriction Requirement, dated Oct. 6, 2021, from corresponding U.S. Appl. No. 17/340,699.
International Search Report, dated Feb. 11, 2022, from corresponding International Application No. PCT/US2021/053518.
Jiahao Chen et al. "Fairness Under Unawareness: Assessing Disparity when Protected Class is Unobserved," arxiv.org, Cornell University Library, 201 Olin Library Cornell University, Ithaca, NY 14853, Nov. 27, 2018 (Nov. 27, 2018), Section 2, Figure 2. (Year 2018).
Notice of Allowance, dated Feb. 1, 2022, from corresponding U.S. Appl. No. 17/346,509.
Notice of Allowance, dated Feb. 14, 2022, from corresponding U.S. Appl. No. 16/623,157.
Notice of Allowance, dated Feb. 22, 2022, from corresponding U.S. Appl. No. 17/535,065.
Notice of Allowance, dated Feb. 4, 2022, from corresponding U.S. Appl. No. 17/520,272.
Notice of Allowance, dated Feb. 8, 2022, from corresponding U.S. Appl. No. 17/342,153.
Office Action, dated Feb. 16, 2022, from corresponding U.S. Appl. No. 16/872,031.
Office Action, dated Feb. 9, 2022, from corresponding U.S. Appl. No. 17/543,546.
Office Action, dated Jan. 31, 2022, from corresponding U.S. Appl. No. 17/493,290.
Written Opinion of the International Searching Authority, dated Feb. 11, 2022, from corresponding International Application No. PCT/US2021/053518.
Czeskis et al., "Lightweight Server Support for Browser-based CSRF Protection," Proceedings of the 22nd International Conference on World Wide Web, 2013, pp. 273-284 (Year: 2013).
Final Office Action, dated Feb. 25, 2022, from corresponding U.S. Appl. No. 17/346,586.
Final Office Action, dated Mar. 21, 2022, from corresponding U.S. Appl. No. 17/373,444.
Final Office Action, dated Mar. 22, 2022, from corresponding U.S. Appl. No. 17/380,485.
Matte et al., "Do Cookie Banners Respect my Choice?: Measuring Legal Compliance of Banners from IAB Europe's Transparency and Consent Framework," 2020 IEEE Symposium on Security and Privacy (SP), 2020, pp. 791-809 (Year: 2020).
Notice of Allowance, dated Feb. 24, 2022, from corresponding U.S. Appl. No. 17/234,205.
Notice of Allowance, dated Feb. 24, 2022, from corresponding U.S. Appl. No. 17/549,170.
Notice of Allowance, dated Mar. 16, 2022, from corresponding U.S. Appl. No. 17/486,350.
Notice of Allowance, dated Mar. 2, 2022, from corresponding U.S. Appl. No. 16/872,130.
Notice of Allowance, dated Mar. 2, 2022, from corresponding U.S. Appl. No. 17/535,098.
Notice of Allowance, dated Mar. 21, 2022, from corresponding U.S. Appl. No. 17/366,754.
Notice of Allowance, dated Mar. 22, 2022, from corresponding U.S. Appl. No. 17/475,244.
Notice of Allowance, dated Mar. 22, 2022, from corresponding U.S. Appl. No. 17/504,102.
Notice of Allowance, dated Mar. 28, 2022, from corresponding U.S. Appl. No. 17/499,609.
Notice of Allowance, dated Mar. 4, 2022, from corresponding U.S. Appl. No. 17/409,999.
Office Action, dated Mar. 1, 2022, from corresponding U.S. Appl. No. 17/119,080.
Office Action, dated Mar. 2, 2022, from corresponding U.S. Appl. No. 17/020,275.
Office Action, dated Mar. 2, 2022, from corresponding U.S. Appl. No. 17/161,159.
Office Action, dated Mar. 2, 2022, from corresponding U.S. Appl. No. 17/200,698.
Office Action, dated Mar. 21, 2022, from corresponding U.S. Appl. No. 17/571,871.
Office Action, dated Mar. 22, 2022, from corresponding U.S. Appl. No. 17/187,329.
Sanchez-Rola et al., "Can I Opt Out Yet?: GDPR and the Global Illusion of Cookie Control," Proceedings of the 2019 ACM Asia Conference on Computer and Communications Security, 2019, pp. 340-351 (Year: 2019).
Ali et al., "Age Estimation from Facial Images Using Biometric Ratios and Wrinkle Analysis," IEEE, 2015, pp. 1-5 (Year: 2015).
Chang et al., "A Ranking Approach for Human Age Estimation Based on Face Images," IEEE, 2010, pp. 3396-3399 (Year: 2010).
Edinger et al., "Age and Gender Estimation of Unfiltered Faces," IEEE, 2014, pp. 2170-2179 (Year: 2014).
Final Office Action, dated Apr. 1, 2022, from corresponding U.S. Appl. No. 17/370,650.
Final Office Action, dated Apr. 25, 2022, from corresponding U.S. Appl. No. 17/149,421.
Final Office Action, dated Apr. 5, 2022, from corresponding U.S. Appl. No. 17/013,756.
Han et al., "Demographic Estimation from Face Images: Human vs. Machine Performance," IEEE, 2015, pp. 1148-1161 (Year: 2015).
Huettner, "Digital Risk Management: Protecting Your Privacy, Improving Security, and Preparing for Emergencies," EEE, pp. 136-138 (Year: 2006).

(56) References Cited

OTHER PUBLICATIONS

International Search Report, dated Apr. 12, 2022, from corresponding International Application No. PCT/US2022/016735.
International Search Report, dated Feb. 14, 2022, from corresponding International Application No. PCT/US2021/058274.
International Search Report, dated Mar. 18, 2022, from corresponding International Application No. PCT/US2022/013733.
Jayasinghe et al., "Matching Facial Images Using Age Related Morphing Changes," ISSRI, 2009, pp. 2901-2907 (Year: 2009).
Khan et al., "Wrinkles Energy Based Age Estimation Using Discrete Cosine Transform," IEEE, 2015, pp. 1-4 (Year 2015).
Kristian et al., "Human Facial Age Classification Using Active Shape Module, Geometrical Feature, and Support Vendor Machine on Early Growth Stage," ISICO, 2015, pp. 1-8 (Year: 2015).
Lewis, James et al., "Microservices," Mar. 25, 2014 (Mar. 25, 2014),XP055907494, Retrieved from the Internet: https://martinfowler.com/articles/microsen/ices.html [retrieved on Mar. 31, 2014].
Liu et al., "Overview on Ontology Mapping and Approach," IEEE, pp. 592-595 (Year: 2011).
Milic et al., "Comparative Analysis of Metadata Models on e-Government Open Data Platforms," IEEE, pp. 119-130 (Year: 2021).
Notice of Allowance, dated Apr. 12, 2022, from corresponding U.S. Appl. No. 17/479,807.
Notice of Allowance, dated Apr. 14, 2022, from corresponding U.S. Appl. No. 17/572,276.
Notice of Allowance, dated Apr. 20, 2022, from corresponding U.S. Appl. No. 17/573,808.
Notice of Allowance, dated Apr. 27, 2022, from corresponding U.S. Appl. No. 17/573,999.
Notice of Allowance, dated Apr. 28, 2022, from corresponding U.S. Appl. No. 17/670,352.
Notice of Allowance, dated Apr. 4, 2022, from corresponding U.S. Appl. No. 17/493,332.
Notice of Allowance, dated Apr. 4, 2022, from corresponding U.S. Appl. No. 17/572,298.
Notice of Allowance, dated Mar. 31, 2022, from corresponding U.S. Appl. No. 17/476,209.
Office Action, dated Apr. 12, 2022, from corresponding U.S. Appl. No. 17/670,341.
Office Action, dated Apr. 18, 2022, from corresponding U.S. Appl. No. 17/670,349.
Office Action, dated Apr. 25, 2022, from corresponding U.S. Appl. No. 17/588,645.
Office Action, dated Apr. 26, 2022, from corresponding U.S. Appl. No. 17/151,334.
Office Action, dated Apr. 8, 2022, from corresponding U.S. Appl. No. 16/938,509.
Qu et al., "Metadata Type System: Integrate Presentation, Data Models and Extraction to Enable Exploratory Browsing Interfaces," ACM, pp. 107-116 (Year: 2014).
Restriction Requirement, dated Apr. 12, 2022, from corresponding U.S. Appl. No. 17/584,187.
Shulz et al., "Generative Data Models for Validation and Evaluation of Visualization Techniques," ACM, pp. 1-13 (Year: 2016).
Written Opinion of the International Searching Authority, dated Apr. 12, 2022, from corresponding International Application No. PCT/US2022/016735.
Written Opinion of the International Searching Authority, dated Feb. 14, 2022, from corresponding International Application No. PCT/US2021/058274.
Written Opinion of the International Searching Authority, dated Mar. 18, 2022, from corresponding International Application No. PCT/US2022/013733.
Final Office Action, dated Apr. 28, 2022, from corresponding U.S. Appl. No. 16/925,550.
Notice of Allowance, dated Apr. 28, 2022, from corresponding U.S. Appl. No. 17/592,922.
Notice of Allowance, dated Apr. 29, 2022, from corresponding U.S. Appl. No. 17/387,421.
Amar et al., "Privacy-Aware Infrastructure for Managing Personal Data," ACM, pp. 571-572, Aug. 22-26, 2016 (Year: 2016).
Banerjee et al., "Link Before You Share: Managing Privacy Policies through Blockchain," IEEE, pp. 4438-4447 (Year: 2017).
Civili et al., "Mastro Studio: Managing Ontology-Based Data Access Applications," ACM, pp. 1314-1317, Aug. 26-30, 2013 (Year: 2013).
Degeling et al., "We Value Your Privacy . . . Now Take Some Cookies: Measuring the GDPRs Impact on Web Privacy," arxiv.org, Cornell University Library, 201 Olin Library Cornell University, Ithaca, NY 14853, Aug. 15, 2018, pp. 1-15 (Year: 2019).
Geko et al., "An Ontology Capturing the Interdependence of the General Data Protection Regulation (GDPR) and Information Security," ACM, pp. 1-6, Nov. 15-16, 2018 (Year: 2018).
International Search Report, dated Jan. 5, 2022, from corresponding International Application No. PCT/US2021/050497.
Lu, "How Machine Learning Mitigates Racial Bias in the US Housing Market," Available as SSRN 3489519, pp. 1-73, Nov. 2019 (Year: 2019).
Notice of Allowance, dated Dec. 30, 2021, from corresponding U.S. Appl. No. 16/938,520.
Notice of Allowance, dated Jan. 11, 2022, from corresponding U.S. Appl. No. 17/371,350.
Notice of Allowance, dated Jan. 12, 2022, from corresponding U.S. Appl. No. 17/334,948.
Notice of Allowance, dated Jan. 12, 2022, from corresponding U.S. Appl. No. 17/463,775.
Notice of Allowance, dated Jan. 24, 2022, from corresponding U.S. Appl. No. 17/340,699.
Notice of Allowance, dated Jan. 26, 2022, from corresponding U.S. Appl. No. 17/491,906.
Notice of Allowance, dated Jan. 5, 2022, from corresponding U.S. Appl. No. 17/475,241.
Notice of Allowance, dated Jan. 6, 2022, from corresponding U.S. Appl. No. 17/407,765.
Notice of Allowance, dated Jan. 7, 2022, from corresponding U.S. Appl. No. 17/222,725.
Office Action, dated Dec. 30, 2021, from corresponding U.S. Appl. No. 17/149,421.
Office Action, dated Jan. 14, 2022, from corresponding U.S. Appl. No. 17/499,595.
Office Action, dated Jan. 21, 2022, from corresponding U.S. Appl. No. 17/499,624.
Office Action, dated Jan. 25, 2022, from corresponding U.S. Appl. No. 17/494,220.
Office Action, dated Jan. 4, 2022, from corresponding U.S. Appl. No. 17/480,377.
Office Action, dated Jan. 7, 2022, from corresponding U.S. Appl. No. 17/387,421.
Rakers, "Managing Professional and Personal Sensitive Information," ACM, pp. 9-13, Oct. 24-27, 2010 (Year 2010).
Sachinopoulou et al., "Ontology-Based Approach for Managing Personal Health and Wellness Information," IEEE, pp. 1802-1805 (Year: 2007).
Shankar et al., "Doppleganger: Better Browser Privacy Without the Bother," Proceedings of the 13th ACM Conference on Computer and Communications Security; [ACM Conference on Computer and Communications Security], New York, NY: ACM, US, Oct. 30, 2006, pp. 154-167 (Year: 2006).
Written Opinion of the International Searching Authority, dated Jan. 5, 2022, from corresponding International Application No. PCT/US2021/050497.
Yue et al., "An Automatic HTTP Cookie Management System," Computer Networks, Elsevier, Amsterdam, NL, vol. 54, No. 13, Sep. 15, 2010, pp. 2182-2198 (Year: 2010).

\* cited by examiner

ACME CORPORATION

I am a(n): *Select One*
[ Customer ] [ Employee ] [ Other ]

My request involves: *Select One*
[ Requesting Info ] [ Deleting Data ] [ Filing a Complaint ]
[ Opting Out ] [ Updating Data ] [ Other ]

First Name*:
Joe

Last Name*:
Lopez

Email Address*:
Jlopez123456789@gmail.com

Telephone:
1234567890

Addr Line 1:
123 Main St.

Addr Line 2:
Box 502

City:
Madrid

Country of Residence:
Spain

Details of my request:
Send me my Data

[ Submit ]

ACME Privacy
123 Main St.
Capital City, ST, USA 20219

+1 800-123-4578
emailaboutprivacy@ACME.com
Link to Privacy Policy

FIG. 9

ACME CORPORATION

I am a(n): *Select One*

[ Customer ]  [ Employee ]  [ Other ]

---

Thank you! A confirmation of your submission has been sent to the following email: Jlopez123456789@gmail.com

Your Request ID is: 5

OK

---

First Name*:
| Joe |

Last Name*:
| Lopez |

Email Address*:
| Jlopez123456789@gmail.com |

Telephone:
| 1234567890 |

Addr Line 1:
| 123 Main St. |

Addr Line 2:
| Box 502 |

City
| Madrid |

Country of Residence*:
| Spain |

Details of my request:
| Send me my Data |

ACME Privacy
123 Main St.
Capital City, ST, USA 20219

+1 800-123-4578
emailaboutprivacy@ACME.com
Link to Privacy Policy

FIG. 10

From: OneTrust Privacy Officer
Sent: Sunday, February 19, 2017 9:27 PM EST
To: Joe Lopez <jlopez123456789@gmail.com>
BCc: Amelia Davis <adavis09876@ACME.com>
Subject: *Your ACME Privacy Request is being processed*

Data Request

Thank you for your submission! Here are the details of your request:

Request ID: 5
Date Submitted: 2/21/2017 10:35AM EST
I am a(n): Customer
My request involves: Opting Out
**First Name*:** Joe
**Last Name*:** Lopez
**Email Address*:** Jlopez123456789@gmail.com
Telephone: XXXXXX986
Addr Line 1: XXXXXXXXXX
Addr Line 2: XXXXXXXXXX
City: XXXXXXXXXX
**Count of Residence*:** XXXXXXXXXX
Details of my request:
Send me my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 11

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Donald Blair | New | Retrieve | 30 | NO | 11/02/17 | Employee | Rena Doyle | ∧ |
| ☐ | 012 | Donald Blair | New | Retrieve | 30 | NO | 11/02/17 | Employee | Rena Doyle | ∧ |
| ☐ | 012 | Allison Smith | New | Retrieve | 30 | NO | 11/02/17 | Employee | Rena Doyle | ∧ |
| ☐ | 012 | Donald Blair | Complete | Retrieve | 30 | NO | 11/02/17 | Employee | Rena Doyle | ∧ |

FIG. 12

Data Subject Request Queue

| ID ▽ | Name | Status ▽ | Purpose | Days Left to Respond | Extension | Date | ndent |
|---|---|---|---|---|---|---|---|
| ☐ 012 | Donald Blair | New | Retrieve | 30 | NO | | a Doyle ∧ |
| ☑ 012 | Donald Blair | New | Retrieve | 30 | NO | | a Doyle ∧ |
| ☐ 012 | Allison Smith | New | Retrieve | 30 | NO | 11/02/17 | Employee  Rena Doyle ∧ |
| ☐ 012 | Donald Blair | Complete | Retrieve | 30 | NO | 11/02/17 | Employee  Rena Doyle ∧ |

Verify Request
Assign
Request Extension
Reject
Suspend

New Request  Edit  Filter

Data Subject Request Queue

| ID | Name | Status | Purpose | Days Left to Respond | Extension | Date Created | DSR Type | Respondent |
|---|---|---|---|---|---|---|---|---|
| 012 | Donald Blair | New | Retrieve | 30 | NO | 11/02/17 | Employee | Rena Doyle |
| 012 | Donald Blair | | | | | | Employee | Rena Doyle |
| 012 | Allison Smith | | | | | | Employee | Rena Doyle |
| 012 | Donald Blair | | | | | | Employee | Rena Doyle |

Authentication

Are you sure you want to Authenticate?

Donald Blair

Duis mollis, est non commodo luctus, niosi eratnportfitor ligula,eget lacinia odio sem nec elit. Aenean lacinia bibendum nulla sed consectetur. Lorem ipsum dolor sit amet, consectetur adipiscing elit.

datasubject_doc.pdf ×

Upload Attachment

Cancel    Submit

FIG. 15

Data Subject Request Queue

Enter Name 🔍     New Request    Edit    Filter

| | ID ▾ | Name | Status ▾ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ˄ |
| ☐ | 012 | Donald Blair | In progress | Retrieve | 30 | NO | 11/02/17 | Employee | Rena Doyle | ˄ |
| ☐ | 012 | Allison Smith | New | Retrieve | 30 | NO | 11/02/17 | Employee | Rena Doyle | ˄ |
| ☐ | 012 | Franklin Howard | Complete | Retrieve | 30 | NO | 11/02/17 | Employee | Rena Doyle | ˄ |

FIG. 16

Data Subject Request Queue

*Enter Name* 🔍            New Request    Edit ∨    Filter

| ☐ | ID ▽ | Name | Status ▽ | Purpose | Days Left to Respond | Extension | Date | ndent |
|---|---|---|---|---|---|---|---|---|
| ☐ | 012 | Tim LePenne | (New) | Retrieve | 30 | NO | 1 | |
| ☑ | 012 | Donald Blair | (In progress) | Retrieve | 30 | NO | 1 | Doyle ∨ |
| ☐ | 012 | Allison Smith | (In progress) | Retrieve | 30 | NO | 11/02/17 | Employee — Rena Doyle ∨ |
| ☐ | 012 | Franklin Howard | (Complete) | Retrieve | 30 | NO | 11/02/17 | Employee — Rena Doyle ∨ |

Popup menu:
- Verify Request
- Assign
- Request Extension
- Reject
- Suspend

Data Subject Request Queue

| | ID ▾ | Name | Status ▾ | Purpose | Days Left to Respond | Extension | Date | ndent |
|---|---|---|---|---|---|---|---|---|
| ☐ | 012 | Tim LePenne | New | Retrieve | 30 | NO | | Doyle |
| ☑ | 012 | Donald Blair | In progress | Retrieve | 30 | NO | 1 | Doyle |
| ☐ | 012 | Allison Smith | In progress | Retrieve | 30 | NO | 11/02/17 | Employee — Rena Doyle |
| ☐ | 012 | Franklin Howard | Complete | Retrieve | 30 | NO | 11/02/17 | Employee — Rena Doyle |

Verify Request
Assign
Request Extension
Reject
Suspend

New Request · Edit · Filter

Data Subject Request Queue

| | ID | Name | Status | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | > |
| ☑ | 012 | Donald Blair | In progress | Retrieve | 30 | NO | 11/02/17 | Employee | Rena Doyle | > |
| ☐ | 012 | Allison Smith | In progress | Retrieve | 30 | NO | 11/02/17 | Employee | Rena Doyle | > |
| ☐ | 012 | Franklin Howard | | | | | | Employee | Rena Doyle | > |

Reject Request ✕

The request submitted cannot be collected as no data regarding the Data Subject is maintained by mycompany any longer Cancel   Submit

FIG. 22

Data Subject Request Queue

| | ID ▼ | Name | Status ▼ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | ^ |
| ☑ | 012 | Donald Blair | Rejected | Retrieve | 30 | NO | 11/02/17 | Employee | Rena Doyle | ^ |
| ☐ | 012 | Allison Smith | In progress | Retrieve | 30 | NO | 11/02/17 | Employee | Rena Doyle | ^ |
| ☐ | 012 | Franklin Howard | Complete | Retrieve | 30 | NO | 11/02/17 | Employee | Rena Doyle | ^ |

New Request   Edit   Filter

FIG. 23

From: OneTrust Privacy Officer
Sent: Sunday, February 19, 2017 9:27 PM EST
To: Allison Smith <asmith123456789@gmail.com>
Bcc: Amelia Davis <adavis09876@ACME.com>
Subject: *Your ACME Privacy Request is being Completed*

Data Response

Dear Allison,

The request submitted cannot be collected as no data regarding the Data Subject is maintained by *mycompany* any longer Here are the details of your request:

Request ID: 5
Date Submitted: 2/21/2017 10:35AM EST
I am a(n): Employee
My request involves: Restrict
First Name*: Allison
Last Name*: Smith
Email Address*: asmith123456789@gmail.com
Telephone: XXXXXXXXX
Addr Line 1: XXXXXXXXXX
Addr Line 2: XXXXXXXXXX
City: XXXXXXXXXX
Count of Residence*: XXXXXXXXXX
Details of my request:
Restrict my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 24

Data Subject Request Queue

| | ID ▽ | Name | Status ▽ | Purpose | Days Left to Respond | Extension | Date | ndent | |
|---|---|---|---|---|---|---|---|---|---|
| ☐ | 012 | Tim LePenne | New | Retrieve | 30 | NO | | Doyle | > |
| ☑ | 012 | Donald Blair | In progress | Retrieve | 2 | NO | | Doyle | > |
| ☐ | 012 | Allison Smith | In progress | Retrieve | 30 | NO | 11/02/17 | Rena Doyle Employee | > |
| ☐ | 012 | Franklin Howard | Complete | Retrieve | 30 | NO | 11/02/17 | Rena Doyle Employee | > |

Popup menu:
- Verify Request
- Assign
- Request Extension
- Reject
- Suspend

Buttons: New Request, Edit, Filter

FIG. 25

Data Subject Request Queue

Enter Name | New Request | Edit | Filter

| | ID ▽ | Name | Status ▽ | Purpose | Days Left to Respond | Extension | Date Created | DSR Type | Respondent |
|---|---|---|---|---|---|---|---|---|---|
| ☐ | 012 | Donald Blair | New | Retrieve | 30 | NO | 11/02/17 | Employee | Rena Doyle ⌄ |
| ☑ | 012 | Donald Blair | In progress | Retrieve | 2 | NO | 11/02/17 | Employee | Rena Doyle ⌄ |
| ☐ | 012 | Allison Smith | In progress | Retrieve | 30 | NO | 11/02/17 | Employee | Rena Doyle ⌄ |
| ☐ | 012 | Franklin Howard | | | | | | Employee | Rena Doyle ⌄ |

Reject Request

How many days do you want to Extend?

[ 90 ] Days

Due to the complexity of this request, the response has been delayed

Cancel    Submit

FIG. 26

Data Subject Request Queue

| | ID ▽ | Name | Status ▽ | Purpose | Days Left to Respond | Extension | Date Created | DSR Type | Respondent | |
|---|---|---|---|---|---|---|---|---|---|---|
| ☐ | 012 | Tim LePenne | (New) | Retrieve | 30 | NO | 11/02/17 | Employee | Rena Doyle | ∧ |
| ☐ | 012 | Donald Blair | (New) | Retrieve | 92 | YES | 11/02/17 | Employee | Rena Doyle | ∧ |
| ☐ | 012 | Allison Smith | (In progress) | Retrieve | 30 | NO | 11/02/17 | Employee | Rena Doyle | ∧ |
| ☐ | 012 | Franklin Howard | (Complete) | Retrieve | 30 | NO | 11/02/17 | Employee | Rena Doyle | ∧ |

FIG. 27

Data Subject Request Queue

| | ID ▼ | Name | Status ▼ | Purpose | Days Left to Respond | Extension | Date Created | DSR Type | Respondent | |
|---|---|---|---|---|---|---|---|---|---|---|
| ☐ | 012 | Tim LePenne | New | Retrieve | 30 | NO | 11/02/17 | Employee | Rena Doyle | > |
| ☐ | 012 | Donald Blair | In progress | Retrieve | 30 | NO | 11/02/17 | Employee | Rena Doyle | > |
| ☐ | 012 | Allison Smith | Rejected | Retrieve | 30 | NO | 11/02/17 | Employee | Rena Doyle | > |
| ☐ | 012 | Franklin Howard | Complete | Retrieve | 30 | NO | 11/02/17 | Employee | Rena Doyle | > |

Data Subject Request Details

Request Queue > Response-05

Assignee: Jason Sabourin

Date Opened: 11/02/17

Extended: No

Deadline: 3/25

Request Type: Data Retrieval

Request Count: 1

Tags: + Add New

Donald Blair

Request ID: 05
e-mail address: dblair@gmail.com
Address: 123 Main St
Apt 18
Atlanta, Ga 30320

Country: USA
Phone number: 323-420-4039
Subject Type: Customer

Inbox | Comments | Attachments

Unverified Request

In order to respond to this request it must be verified

[ Verify Now ]

[ Edit ]

< Back to Queue

FIG. 31

Data Subject Request Details *In progress*

Request Queue > Response-05

Assignee: Jason Sabourin

Date Opened: 11/02/17

Extended: No

Deadline: 3/25

Request Type: Data Retrieval

Request Count: 1

Tags: + Add New

Donald Blair

| | | | |
|---|---|---|---|
| Request ID: | 05 | Country: | USA |
| e-mail address: | dblair@gmail.com | Phone number: | 323-420-4039 |
| Address: | 123 Main St Apt 18 Atlanta, Ga 30320 | Subject Type: | Customer |

Inbox | Comments | Attachments

Today
- From: Donald Blair
  03/09/17 09:33 AM EST
  Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Monday
- From: OneTrust
  03/09/17 09:33 AM EST
  CC: Jason Sabourin, Brett Curtis

- From: OneTrust
  03/09/17 09:33 AM EST
  CC: Jason Sabourin, Brett Curtis

Edit

Reply
- Reply as Rejected
- Reply as Pending
- Reply as Extended
- Reply as Completed
- Reply as Comp w/ Securlink < Back to Queue

FIG. 32

Data Subject Request Details (In progress)

Request Queue > Response-05

Assignee:
Jason Sabourin

Date Opened:
11/02/17

Extended:
No

Deadline:
3/25

Request Type:
Data Retrieval

Request Count:
1

Tags:
+ Add New

Donald Blair

Request ID: 05
e-mail address: dblair@gmail.com
Address: 123 Main St
Apt 18
Atlanta, Ga 30320

Country: USA
Phone number: 323-420-4039
Subject Type: Customer

Inbox     Comments     Attachments

Today

From: Donald Blair
03/09/17 09:33 AM EST

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Draft to Donald Blair
CC: *Enter CC Here*

Cras mattis consectetur purus sit amet fermentum. Cras justo odio, dapibus ac facilisis in, egestas eget quam. Nullam quis risus eget urna mollis ornare vel eu leo. Maecenas faucibus mollis interdum. Curabitur blandit tempus porttitor.

Save     Send as Complete

From: OneTrust
03/09/17 09:33 AM EST
CC:Jason Sabourin, Brett Curtis

< Back to Queue     Edit

< Back to Queue

Data Subject Request Details
Request Queue > Response-05

Edit

Assignee:
Jason Sabourin

Date Opened:
11/02/17

Extended:
No

Deadline:
3/25

Request Type:
Data Retrieval

Request Count:
1

Tags:
+ Add New

Donald Blair   (Complete)

Request ID: 05
e-mail address: dblair@gmail.com
Address: 123 Main St
Apt 18
Atlanta, Ga 30320

Country: USA
Phone number: 323-420-4039
Subject Type: Customer

Inbox | Comments | Attachments

Today

✉ From: OneTrust
03/09/17  09:33 AM EST    (Replied as Complete)
CC: Jason Sabourin, Brett Curtis ✉ From: Donald Blair
03/09/17  09:33 AM EST
CC: Jason Sabourin, Brett Curtis Monday ✉ From: OneTrust
03/09/17  09:33 AM EST
CC: Jason Sabourin, Brett Curtis

From: OneTrust Privacy Officer
Sent: Sunday, February 19, 2017 9:27 PM EST
To: Joe Lopez <jlopez123456789@gmail.com>
Bcc: Amelia Davis <adavis09876@ACME.com>
Subject: *Your ACME Privacy Request is Completed*

Data Response

Dear Joe,

Your privacy-related request has been completed. In order to access the data you requested, please click the secure link below.

http://www.securelink.onetrust.com/1124ahawlu091284

If you have any questions regarding your submission, please contact *Amelia Davis* via email or phone:
adavis09876@ACME.com
+00 123 123 9980

---

Here are the details of your request:

Request ID: 5
Date Submitted: 2/21/2017 10:35AM EST
I am a(n): Customer
My request involves: Opting Out
**First Name*:** Joe
**Last Name*:** Lopez
**Email Address*:** Jlopez123456789@gmail.com
Telephone: XXXXXXXXX
Addr Line 1: XXXXXXXXXX
Addr Line 2: XXXXXXXXXX
City: XXXXXXXXX
**Count of Residence*:** XXXXXXXXXX
Details of my request:
Send me my Data If you have any questions regarding your submission, please contact *Amelia Davis* via email or phone:
adavis09876@ACME.com
+00 123 123 9980

ACME Privacy
123 Main St.
Capital City, ST, USA 20219

+1 800-123-4578
emailaboutprivacy@ACME.com
Link to Privacy Policy

FIG. 35

OneTrust
Privacy Management Software

Request ID

☐ I'm not a robot

Welcome to OneTrust

Features:
- Unlimited usage and respondents
- Centralized record keeping and reporting
- Readiness & PIA Templates
- Data Mapping Automation
- Website Scanning & Cookie Compliance
- Ability to tailor questionnaire templates for use cases including: GDPR, DPIA, Privacy Threshold assessment (PTA), Vendor Risk Assessments, Information Security Assessments, and more Questions? Contact Us support@onetrust.com

FIG. 36

OneTrust
Privacy Management Software

Request ID

5

Email Token

ABSHI&&@12131JEJE

Log In

Welcome to OneTrust

Features:
- Unlimited usage and respondents
- Centralized record keeping and reporting
- Readiness & PIA Templates
- Data Mapping Automation
- Website Scanning & Cookie Compliance
- Ability to tailor questionnaire templates for use cases including: GDPR, DPIA, Privacy Threshold assessment (PTA), Vendor Risk Assessments, Information Security Assessments, and more Questions? Contact Us support@onetrust.com

FIG. 38

From: Generitech Privacy officer
Sent: Monday, February 20,2017 9:27 PM EST
To: Alison Smith <asmith 123456789@gmail.com>
Bcc: Amelia Davis <adavis09876@generitech.com>
Subject: Your Generitech Privacy Request is completed

OneTrust
Privacy Management Software

Data Subject Request Assignment

Dear Joe,

The following data subject request has been filed, and you have been identified as someone who knows how to fulfill the request. Please click the link below, in order to fulfill the request Click here to access the request ( Access Request )

If you have questions regarding your submission, please contact Amelia Davis via email or phone:

adavis09876@ACME.com
+00 123 123 9980

Generitech Privacy
123 Main St.
Capital City, ST, USA 20219

+1 800-123-4578
emailaboutprivacy@generitech.com
Link to Privacy Policy

Verify Your Identity

Name: Joe Lopez

To verify your identity, please answer the following questions.
- Which of the following STREETS have you NEVER lived or used as your address?
  ○
  ○
  ○
  ○
  ○ ALL OF THE ABOVE
- With which of the following PEOPLE are you most closely associated?
  ○
  ○
  ○
  ○
  ○ NONE OF THE ABOVE
- Which of the following CITIES have you PREVIOUSLY OR CURRENTLY used as your address?
  ○
  ○
  ○
  ○
  ○ NONE OF THE ABOVE

| Section A: Employee Information | | | |
|---|---|---|---|
| Last name DOE | First name JOHN | M.I. | Social Security no.² (required) 123456789 |

| Home address-Street and PO Box if applicable |
|---|
| 123 MAIN STREET |

| City ATLANTA | County FULTON | State GA | ZIP code 30309 |
|---|---|---|---|

| Marital Status ☒ Single ☐ Married ☐ Domestic Partner | Primary phone no. 5555555555 | Secondary phone no. |
|---|---|---|

| Employee email address JDOE@ACME.COM | | |
|---|---|---|

| Employer name ACME CORP | | Group no. (if known) |
|---|---|---|

| Employer street address |
|---|
| 123 EAST PARKWAY |

| City ATLANTA | Country FULTON | State GA | ZIP code 30309 |
|---|---|---|---|

| Employment status: ☒ Full time ☐ Part time | Date of full-time employment (MM/DD/YYYY) | Date waiting period begins (MM/DD/YYYY) | Income reported by: ☒ W-2 ☐ 1099 ☐ Other: | No. of hours worked per week |
|---|---|---|---|---|

| Date of hire (MM/DD/YYYY) | ☐ Disabled ☐ Retired |
|---|---|
| ☐ Rehire - Rehire date: | |

Section B: Applicable Type

Select one

☐ New enrollment
☐ open enrollment
  (not applicable for
  Life and Disability)
☐ Rehire - Rehire date:

☐ COBRA -
Select qualifying event
☐ Left employment
☐ Loss of dependent child status
☐ Medicare ☐ Reduction in hours
☐ Divorce or legal separation
☐ Covered employee's Medicare entitlement ☐ Death Qualifying event date 1 A small group must have at least one eligible employee, in addition to the bussiness owner. A spouse cannot be the only eligible employee.
2 Blue Cross and Blue Shield of Georgia ist required by the Internal Revenue Service to collect this information.

Scenario #1: User Uplods PDF
- The system maps values to the now defined structure.

| Value | Object |
|---|---|
| John | First Name |
| Doe | Last Name |
| 123456789 | Social Security No. |
| 123 Main Street | Address |
| Atlanta | City |
| Fulton | County |
| GA | State |
| 30309 | Zip Code |
| Single | Marital Status |
| 5555555555 | Primary Phone Number |
| Jdoe@acme.com | Employee Email Address |
| Acme Corp | Employer Name |
| 123 East Parkway | Employer Street Address |
| Atlanta | City |
| Fulton | County |
| GA | State |
| 30309 | Zip Code |
| Full Time | Employment Status |
| W-2 | Employment Reported by |

FIG. 61

- The system created groupings are added

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employer Email Address | Employee Information |
| Acme Corp | Employer Name | Employer |
| 123 East Parkway | Employee Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

FIG. 61 CONT.

- Additional potential mappings are also included

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123456789 | Tax Identification Number | Employee Information |
| 123456789 | Account Number | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employee Email Address | Employee Information |
| Acme Corp | Employer Name | Employer |
| 123 East Parkway | Employer Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

FIG. 61 CONT.

| Value | Object | Context |
|---|---|---|
| Employee Information | Context | |
| John | First Name | Employee Information |
| Doe | Last Name | Employee Information |
| John Doe | Full Name | Employee Information |
| 123456789 | Social Security No | Employee Information |
| 123456789 | Tax Identification Number | Employee Information |
| 123456789 | Account Number | Employee Information |
| 123 Main Street | Address | Employee Information |
| Atlanta | City | Employee Information |
| Fulton | County | Employee Information |
| GA | State | Employee Information |
| 30309 | Zip Code | Employee Information |
| Single | Marital Status | Employee Information |
| 5555555555 | Primary Phone Number | Employee Information |
| Jdoe@acme.com | Employee Email Address | Employee Information |
| Acme Corp | Employer Name | Employer |
| 123 East Parkway | Employer Street Address | Employer |
| Atlanta | City | Employer |
| Fulton | County | Employer |
| GA | State | Employer |
| 30309 | Zip Code | Employer |
| Full Time | Employment Status | Employment |
| W-2 | Employment Reported by | Employment |

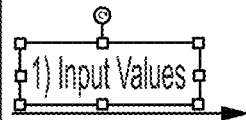

FIG. 62

| Data Element | Data Category | Classification |
|---|---|---|
| Contact details | Contact Information | PII |
| Home Address | Contact Information | PII |
| Phone Numbers | Contact Information | PII |
| Details / description of role | Employment Information | PII |
| Employer Identification Number | Employment Information | Sensitive Personal Data |
| 1-9 Forms | Employment Information | Sensitive Personal Data |
| Job status - full time / part time | Employment Information | PII |
| Office location | Employment Information | PII |
| Salary / wage | Employment Information | |
| Start date | Employment Information | |
| Tax Identification Number | Government Identifiers | Sensitive Personal Data |
| Health insurance details | Personal Health Information | Sensitive Personal Data |
| Health Plan Account Number | Personal Health Information | Sensitive Personal Data |
| Date of Birth | Personal Identification | PII |
| First Name | Personal Identification | Partial PII |
| Full Name | Personal Identification | PII |
| Last Name | Personal Identification | PII |
| Gender | Personal Identification | Partial PII |
| Marital Status | Personal Identification | Personal Data |
| Account Number | User Account Information | Sensitive Personal Data |

2) Database of Personal Data classification

FIG. 62 CONT.

3) Mapping Results

| Value | Object | Context | Category | Classification | Confidence | Score |
|---|---|---|---|---|---|---|
| Employee Information | Context | | | | | |
| John | First Name | Employee Information | Personal Identification | Partial PII | 70% | 2 |
| Doe | Last Name | Employee Information | Personal Identification | Partial PII | 70% | 2 |
| John Doe | Full Name | Employee Information | Personal Identification | PII | 80% | 6 |
| 123456789 | Social Security No | Employee Information | Personal Identification | Sensitive PII | 90% | 9 |
| 123456789 | Tax Identification Number | Employee Information | Personal Identification | Sensitive PII | 30% | 9 |
| 123456789 | Account Number | Employee Information | Personal Identification | Sensitive PII | 30% | 9 |
| 123 Main Street | Address | Employee Information | Location | Partial PII | 80% | 2 |
| Atlanta | City | Employee Information | Location | Partial PII | 80% | 2 |
| Fulton | County | Employee Information | Location | Partial PII | 80% | 2 |
| GA | State | Employee Information | Location | Partial PII | 80% | 2 |
| 30309 | Zip Code | Employee Information | Location | Partial PII | 80% | 2 |
| Single | Marital Status | Employee Information | Marital Status | Sensitive PII | 90% | 6 |
| 5555555555 | Primary Phone Number | Employee Information | Contact | PII | 60% | 5 |
| Jdoe@acme.com | Employer Email Address | Employee Information | Contact | Partial PII | 90% | 1 |
| Acme Corp | Employer Name | Employer | Entity Name | Partial PII | 90% | 1 |
| 123 East Parkway | Employee Street Address | Employer | Location | Non-PII | 90% | 0 |
| Atlanta | City | Employer | Location | Non-PII | 80% | 0 |
| Fulton | County | Employer | Location | Non-PII | 80% | 0 |
| GA | State | Employer | Location | Non-PII | 80% | 0 |
| 30309 | Zip Code | Employer | Location | Non-PII | 80% | 0 |
| Full Time | Employment Status | Employment | Employment Status | Sensitive PII | 90% | 7 |

4) Finalized Document Results
Document Score = 45
Document Category = Sensitive

FIG. 62 CONT.

DATA PROCESSING SYSTEMS FOR DATA TESTING TO CONFIRM DATA DELETION AND RELATED METHODS

CROSS REFERENCE TO RELATED APPLICATIONS

This application is a continuation-in-part of U.S. patent application Ser. No. 17/181,828, filed Feb. 22, 2021, which is a continuation of U.S. patent application Ser. No. 16/834,812, filed Mar. 30, 2020, now U.S. Pat. No. 10,929,559, issued Feb. 23, 2021, which is a continuation of U.S. patent application Ser. No. 16/563,741, filed Sep. 6, 2019, now U.S. Pat. No. 10,607,028, issued Mar. 31, 2020, which claims priority to U.S. Provisional Patent Application No. 62/728,435, filed Sep. 7, 2018, and is also a continuation-in-part of U.S. patent application Ser. No. 16/410,566, filed May 13, 2019, now U.S. Pat. No. 10,452,866, issued Oct. 22, 2019, which is a continuation-in-part of U.S. patent application Ser. No. 16/055,083, filed Aug. 4, 2018, now U.S. Pat. No. 10,289,870, issued May 14, 2019, which claims priority from U.S. Provisional Patent Application Ser. No. 62/547,530, filed Aug. 18, 2017, and is also a continuation-in-part of U.S. patent application Ser. No. 15/996,208, filed Jun. 1, 2018, now U.S. Pat. No. 10,181,051, issued Jan. 15, 2019, which claims priority from U.S. Provisional Patent Application Ser. No. 62/537,839 filed Jul. 27, 2017, and is also a continuation-in-part of U.S. patent application Ser. No. 15/853,674, filed Dec. 22, 2017, now U.S. Pat. No. 10,019,597, issued Jul. 10, 2018, which claims priority from U.S. Provisional Patent Application Ser. No. 62/541,613, filed Aug. 4, 2017, and is also a continuation-in-part of U.S. patent application Ser. No. 15/619,455, filed Jun. 10, 2017, now U.S. Pat. No. 9,851,966, issued Dec. 26, 2017, which is a continuation-in-part of U.S. patent application Ser. No. 15/254,901, filed Sep. 1, 2016, now U.S. Pat. No. 9,729,583, issued Aug. 8, 2017, which claims priority from: (1) U.S. Provisional Patent Application Ser. No. 62/360,123, filed Jul. 8, 2016; (2) U.S. Provisional Patent Application Ser. No. 62/353,802, filed Jun. 23, 2016; and (3) U.S. Provisional Patent Application Ser. No. 62/348,695, filed Jun. 10, 2016. The disclosures of all of the above patent applications are hereby incorporated herein by reference in their entirety.

BACKGROUND

Over the past years, privacy and security policies, and related operations have become increasingly important. Breaches in security, leading to the unauthorized access of personal data (which may include sensitive personal data) have become more frequent among companies and other organizations of all sizes. Such personal data may include, but is not limited to, personally identifiable information (PII), which may be information that directly (or indirectly) identifies an individual or entity. Examples of PII include names, addresses, dates of birth, social security numbers, and biometric identifiers such as a person's fingerprints or picture. Other personal data may include, for example, customers' Internet browsing habits, purchase history, and even their preferences (e.g., likes and dislikes, as provided or obtained through social media).

Many organizations that obtain, use, and transfer personal data, including sensitive personal data, have begun to address these privacy and security issues. To manage personal data, many organizations have attempted to implement operational policies and processes that comply with legal and industry requirements, as well as comply with certain rights related to a data subject's personal data that is collected, stored, or otherwise processed by an organization. These rights may include, for example, a right to obtain confirmation of whether a particular organization is processing their personal data, a right to obtain information about the purpose of the processing (e.g., one or more reasons for which the personal data was collected), and other such rights. Some regulations require organizations to comply with requests for such information (e.g., Data Subject Access Requests) within relatively short periods of time (e.g., 30 days).

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an entity. In particular, under various privacy and security policies, a data subject may be entitled to a right to erasure of any personal data associated with that data subject that has been at least temporarily stored by the entity (e.g., a right to be forgotten). In various embodiments, under the right to erasure, an entity (e.g., a data controller on behalf of another organization) may be obligated to erase personal data without undue delay under one or more of the following conditions: (1) the personal data is no longer necessary in relation to a purpose for which the data was originally collected or otherwise processed; (2) the data subject has withdrawn consent on which the processing of the personal data is based (e.g., and there is no other legal grounds for such processing); (3) the personal data has been unlawfully processed; (4) the data subject has objected to the processing and there is no overriding legitimate grounds for the processing of the data by the entity; and/or (5) for any other suitable reason or under any other suitable conditions.

Existing systems for complying with such requests can be inadequate for producing and providing the required information within the required timelines. In addition, existing systems for complying with such requests can be inadequate for producing and providing the required information while doing so in a secure manner that ensures the information is not improperly accessed. This is especially the case for large corporations, which may store data on several different platforms in differing locations. Accordingly, there is a need for improved systems and methods for complying with data subject access requests. In addition, there is a need for improved systems and methods for complying with data subject access requests that do so in a secure manner to ensure personal data is not improperly accessed.

SUMMARY

A computer-implemented data processing method for identifying one or more pieces of personal data that are not associated with the one or more privacy campaigns of a particular entity, in particular embodiments, comprises: (1) accessing, by one or more processors, via one or more computer networks, to one or more data assets of the particular entity; (2) scanning, by one or more processors, the one or more data assets to generate a catalog of one or more privacy campaigns and one or more pieces of personal information associated with one or more individuals; (3) storing, by one or more processors, the generated catalog in computer memory; (4) scanning, by one or more processors, one or more data assets based at least in part on the generated catalog to identify a first portion of the one or more pieces of personal data that are one or more pieces of personal data that are not associated with the one or more privacy campaigns; (5) generating, by one or more processors, an indication that the first portion of one or more pieces of personal data that are not associated with the one or more privacy campaigns of the particular entity is to be removed from the one or more data assets; (6) presenting, by one or more processors, the indication to one or more individuals associated with the particular entity; and (7) removing, by one or more processors, the first portion of the one or more pieces of personal data that are not associated with the one or more privacy campaigns of the particular entity from the one or more data assets.

A computer-implemented data processing method for removing one or more pieces of personal data that are not associated with the one or more privacy campaigns of a particular entity, in particular embodiments, comprises: (1) accessing, by one or more processors, via one or more computer networks, one or more data models that map an association between (i) one or more pieces of personal data associated with one or more individuals stored within one or more data assets of the particular entity and (ii) one or more privacy campaigns of the particular entity; (2) analyzing, by one or more processors, the one or more data models to identify a first portion of the one or more pieces of personal data that are one or more pieces of personal data that are not associated with the one or more privacy campaigns; and (3) automatically removing the first portion of the one or more pieces of personal data that are not associated with the one or more privacy campaigns of the particular entity from the one or more data assets.

Various embodiments are also described in the following listing of concepts:

1. A computer-implemented data processing method for identifying one or more pieces of personal data that are not associated with one or more privacy campaigns of a particular entity, the method comprising:

accessing, by one or more processors, via one or more computer networks, one or more data assets of the particular entity;

scanning, by one or more processors, the one or more data assets to generate a catalog of one or more privacy campaigns and one or more pieces of personal information associated with one or more individuals;

storing, by one or more processors, the generated catalog in computer memory;

scanning, by one or more processors, one or more data assets based at least in part on the generated catalog to identify a first portion of the one or more pieces of personal data that are one or more pieces of personal data that are not associated with the one or more privacy campaigns;

generating, by one or more processors, an indication that the first portion of one or more pieces of personal data that are not associated with the one or more privacy campaigns of the particular entity is to be removed from the one or more data assets;

presenting, by one or more processors, the indication to one or more individuals associated with the particular entity; and removing, by one or more processors, the first portion of the one or more pieces of personal data that are not associated with the one or more privacy campaigns of the particular entity from the one or more data assets.

2. The computer-implemented data processing method of Concept 1, wherein the first portion of the one or more pieces of personal data that are not associated with the one or more privacy campaigns of the particular entity are automatically removed from the one or more data assets.

3. The computer-implemented data processing method of Concept 1, further comprising:

determining that one or more privacy campaigns have been terminated within the one or more data assets of the particular entity;

scanning the one or more data assets based at least in part on the generated catalog to identify the one or more pieces of personal data that are associated with the terminated one or more privacy campaigns; and generating an indication that the one or more pieces of personal data that are associated with the terminated one or more privacy campaigns are included in the first portion of the one or more pieces of personal data.

4. The computer-implemented data processing method of Concept 3, further comprising:

determining that one or more privacy campaigns of the particular entity have not been utilized in a period of time; and terminating the one or more privacy campaigns of the particular entity that have not been utilized in the period of time.

5. The computer-implemented data processing method of Concept 4, wherein the period of time is ninety or more days.

6. The computer-implemented data processing method of Concept 1, wherein presenting the indication to the one or more individuals associated with the particular entity further comprises:

receiving, by one or more processors, a selection, by the one or more individuals associated with the particular entity, of a first set of the one or more pieces of personal data of the first portion of the one or more pieces of personal data to retain based on one or more bases to retain the first set of the one or more pieces of personal data;

prompting, by one or more processors, the one or more individuals to provide one or more bases to retain the first set of the one or more pieces of personal data of the first portion of the one or more pieces of personal data that are not associated with the one or more privacy campaigns;

receiving, by one or more processors, the provided one or more bases to retain the first set of the one or more pieces of personal data of the first portion of the one or more pieces of personal data from the one or more individuals associated with the particular entity;

retaining, by one or more processors, the first set of the one or more pieces of personal data of the first portion of the one or more pieces of personal data from the one or more individuals associated with the particular entity; and removing a second set of the one or more pieces of personal data of the first portion of the one or more pieces of personal data that are not associated with the one or more privacy campaigns from the one or more data assets, wherein the second set of the one or more pieces of personal data is different from the first set of the one or more pieces of personal data and the first portion of the one or more pieces of personal data comprise the first set of the one or more pieces of personal data and the second set of the one or more pieces of personal data.

7. The computer-implemented data processing method of Concept 6, further comprising:

in response to receiving the provided one or more bases to retain the first set of the one or more pieces of personal data from the one or more individuals associated with the particular entity, submitting the provided one or more bases to retain the first set of the one or more pieces of personal data to one or more second individuals associated with the particular entity for authorization.

8. The computer-implemented data processing method of Concept 6, wherein the second set of the one or more pieces of personal data does not include one or more pieces of personal data.

9. A computer-implemented data processing method for removing one or more pieces of personal data that are not associated with one or more privacy campaigns of a particular entity, the method comprising:

accessing, by one or more processors, via one or more computer networks, one or more data models that map an association between (i) one or more pieces of personal data associated with one or more individuals stored within one or more data assets of the particular entity and (ii) one or more privacy campaigns of the particular entity;

analyzing, by one or more processors, the one or more data models to identify a first portion of the one or more pieces of personal data that are one or more pieces of personal data that are not associated with the one or more privacy campaigns; and automatically removing the first portion of the one or more pieces of personal data that are not associated with the one or more privacy campaigns of the particular entity from the one or more data assets.

10. The computer-implemented data processing method of Concept 9, further comprising:

receiving, by one or more processors, an indication of a new privacy campaign initiated by the particular entity;

in response to receiving the indication of the new privacy campaign initiated by the particular entity, modifying the one or more data models to map an association between (i) one or more pieces of personal data associated with one or more individuals obtained in connection with the new privacy campaign and (ii) the new privacy campaign initiated by the particular entity.

11. The computer-implemented data processing method of Concept 9, further comprising:

generating an indication that the first portion of the one or more pieces of personal data that are not associated with the one or more privacy campaigns of the particular entity is to be removed from the one or more data assets of the particular entity; and presenting the indication to one or more individuals associated with the particular entity.

12. The computer-implemented data processing method of Concept 9, further comprising:

determining that one or more privacy campaigns have been terminated within the one or more data assets of the particular entity;

analyzing, by one or more processors, the one or more data models to identify one or more pieces of personal data that are one or more pieces of personal data that are associated with the terminated one or more privacy campaigns; and generating an indication that the one or more pieces of personal data that are associated with the terminated one or more privacy campaigns are included in the first portion of the one or more pieces of personal data.

13. The computer-implemented data processing method of Concept 12, further comprising:

determining that one or more privacy campaigns of the particular entity have not been utilized in a period of time; and terminating the one or more privacy campaigns of the particular entity have not been utilized in the period of time.

14. The computer-implemented data processing method of Concept 13, wherein the period of time is ninety or more days.

15. A computer-implemented data processing method for generating a privacy data report of a particular entity, the method comprising:

accessing, by one or more processors, via one or more computer networks, one or more data models that map an association between (i) one or more pieces of personal information of one or more individuals stored within one or more data assets of the particular entity and (ii) one or more privacy campaigns of the particular entity;

accessing, by one or more processors, a data collection policy of the particular entity that is based at least in part on one or more collection parameters defining how one or more pieces of personal data of one or more individuals is collected by the particular entity and one or more storage parameters associated with storing the one or more pieces of personal data of the one or more individuals, and one or more data retention metrics of the particular entity that are based at least in part on the collection and storage by the particular entity of the one or more pieces of personal data of one or more individuals;

analyzing, by or more processors, the one or more data models to identify one or more pieces of personal data that are not associated with the one or more privacy campaigns;

generating, by one or more processors, a privacy data report based at least in part on (i) analyzing the one or more data models to identify one or more pieces of personal data that are not associated with the one or more privacy campaigns, (ii) the data collection policy of the particular entity, and (iii) the one or more data retention metrics of the particular entity; and providing, by one or more processors, the privacy data report to one or more individuals associated with the particular entity.

16. The computer-implemented data processing method of Concept 15, wherein the privacy data report comprises a comparison of the data collection policy and the one or more data retention metrics of the particular entity to one or more industry standard data collection policies and one or more industry standard data retention metrics.

17. The computer-implemented data processing method of Concept 15, wherein generating the privacy data report further comprises:

calculating a data risk score for the particular entity based at least in part on (i) analyzing the one or more data models to identify one or more pieces of personal data that are not associated with the one or more privacy campaigns, (ii) the data collection policy of the particular entity, and (iii) the one or more data retention metrics of the particular entity.

18. The computer-implemented data processing method of Concept 17, further comprising:

comparing the data risk score for the particular entity to a threshold data risk score;

determining that the data risk score for the particular entity is less than the threshold data risk score;

in response to determining that the data risk score for the particular entity is less than the threshold risk score, generating a notification to indicate that the data risk score for the particular entity is less than the threshold risk score; and providing the notification to the one or more individuals associated with the particular entity.

19. The computer-implemented data processing method of Concept 17, further comprising:
comparing the data risk score for the particular entity to a threshold data risk score;
determining that the data risk score for the particular entity is greater than or equal to the threshold data risk score;
in response to determining that the data risk score for the particular entity is greater than the threshold risk score, generating a notification to indicate that the data risk score for the particular entity is greater than the threshold risk score; and
providing the notification to the one or more individuals associated with the particular entity.

20. The computer-implemented data processing method of Concept 15, wherein the one or more data retention metrics comprise at least one data retention metric selected from a group consisting of:
a storage location of the one or more pieces of personal data;
a period of time the one or more pieces of personal data are stored by the particular entity;
a number of the one or more privacy campaigns accessing the one or more pieces of personal data; and
an amount of the one or more pieces of personal data being collected by the particular entity.

A computer-implemented data processing method for generating a privacy data report of a particular entity, in particular embodiments, comprises: (1) accessing, by one or more processors, via one or more computer networks, one or more data models that map an association between (i) one or more pieces of personal information of one or more individuals stored within one or more data assets of the particular entity and (ii) one or more privacy campaigns of the particular entity; (2) accessing, by one or more processors, (i) a data collection policy of the particular entity that based at least in part on one or more collection parameters defining how one or more pieces of personal data of one or more individuals is collected by the particular entity and one or more storage parameters associated with storing the one or more pieces of personal data of the one or more individuals, and (ii) one or more data retention metrics of the particular entity that are based at least in part on the collection and storage by the particular entity of the one or more pieces of personal data of one or more individuals; (3) analyzing, by or more processors, the one or more data models to identify one or more pieces of personal data that are not associated with the one or more privacy campaigns; (4) generating, by one or more processors, a privacy data report based at least in part on (i) analyzing the one or more data models to identify one or more pieces of personal data that are not associated with the one or more privacy campaigns, (ii) the data collection policy of the particular entity, and (iii) the one or more data retention metrics of the particular entity; and (5) providing, by one or more processors, the privacy data report to one or more individuals associated with the particular entity.

A data management computer system for confirming a deletion of personal data associated with a data subject from one or more computer systems associated with an entity, in particular embodiments, comprises: (1) one or more computer processors; and (2) computer memory operatively coupled to the one or more processors, wherein the one or more computer processors are adapted for: (a) receiving an indication that the entity has completed an erasure of one or more pieces of personal data associated with the data subject under a right of erasure; (b) in response to receiving the indication that the entity (e.g., one or more computer systems associated with the entity) has completed the erasure, initiating a test interaction between a test data subject and the entity, the test interaction requiring a response from the entity to the test data subject; (c) in response to initiating the test interaction, determining whether one or more system associated with the entity have transmitted the response to the test data subject; and (d) in response to determining that the one or more systems associated with the entity have transmitted the response, (i) determining that the entity has not completed the erasure of the one or more pieces of personal data associated with the test data subject, and (ii) automatically taking one or more actions with regard to the personal data associated with the test data subject.

A data management computer system for confirming a deletion of personal data associated with a data subject from one or more computer systems associated with an entity, in particular embodiments, comprises: (1) one or more computer processors; and (2) computer memory operatively coupled to the one or more processors, wherein the one or more computer processors are adapted for: (a) receiving an indication that the entity has completed an erasure of one or more pieces of personal data associated with a test data subject under a right of erasure; (b) in response to receiving the indication that the entity has completed the erasure, initiating a test interaction between a test data subject and the entity, the test interaction requiring a response from the entity to the test data subject; (c) in response to initiating the test interaction, determining whether one or more system associated with the entity have initiated a test interaction response to the data subject based at least in part on the test interaction; and (d) in response to determining that the one or more systems associated with the entity have initiated the test interaction response, (i) determining that the entity has not completed the erasure of the one or more pieces of personal data associated with the data subject, and (ii) automatically taking one or more actions with regard to the personal data associated with the data subject.

A computer-implemented data processing method, in particular embodiments, comprises: (1) providing a communication to the entity, wherein the communication, (a) comprises a unique identifier associated with the data subject, (b) is performed without using a personal communication data platform, and (c) prompts the entity to provide a response by contacting the data subject via a personal communication data platform; (2) in response to providing the communication to the entity, determining whether the data subject has received a response via the personal communication data platform; (3) in response to determining that the data subject has received the response via the personal communication data platform, determining that the entity has not complied with the data subject's request for deletion of their personal data by the entity; (4) in response to determining that the entity has not complied with the data subject's request for deletion, generating an indication that the entity has not complied with the data subject's request for deletion of their personal data by the entity; and (5) digitally storing the indication that the entity has not complied with the data subject's request for deletion of their personal data in computer memory.

Various embodiments are also described in the following listing of concepts:

1. A data management computer system for confirming a deletion of personal data associated with a data subject from one or more computer systems associated with an entity, the system comprising:

one or more computer processors; and computer memory operatively coupled to the one or more processors, wherein the one or more computer processors are adapted for:

receiving an indication that the one or more computer systems have completed an erasure of one or more pieces of personal data associated with the data subject;

in response to receiving the indication that the one or more computer systems have completed the erasure, initiating a test interaction between the data subject and the entity, the test interaction requiring a response from the entity to the data subject;

in response to initiating the test interaction, determining whether one or more computer systems associated with the entity have initiated a test interaction response to the data subject based at least in part on the test interaction; and in response to determining that the one or more computer systems associated with the entity have initiated the test interaction response:

determining whether the one or more computer systems have completed the erasure of the one or more pieces of personal data associated with the data subject; and automatically taking one or more actions with regard to the personal data associated with the data subject.

2. The data management computer system of Concept 1, wherein the one or more actions comprise:

identifying the one or more pieces of personal data associated with the data subject that remain stored in the one or more computer systems of the entity;

flagging the one or more pieces of personal data associated with the data subject that remain stored in the one or more computer systems of the entity; and providing the flagged one or more pieces of personal data associated with the data subject that remain stored in the one or more computer systems of the entity to an individual associated with the entity.

3. The data management computer system of Concept 1, wherein:

initiating the test interaction between the data subject and the entity comprises substantially automatically completing a contact-request form hosted by the entity on behalf of the data subject.

4. The data management computer system of Concept 3, wherein:

substantially automatically completing the contact-request form comprises providing one or more pieces of identifying data associated with the data subject, the one or more pieces of identifying data comprising data other than contact data.

5. The data management computer system of Concept 4, wherein determining whether the one or more system associated with the entity have generated the test interaction response, further comprises:

determining whether the one or more computer systems of the entity have attempted to contact the data subject in response to submission of the contact-request form.

6. The data management computer system of Concept 1, wherein the method further comprises initiating a test interaction between the data subject and the entity in response to determining that a certain period of time has elapsed from a time that the data subject provided the request to delete the data subject's personal data.

7. The data management computer system of Concept 6, wherein the test interaction is automatically initiated by the computer system.

8. The data management computer system of Concept 1, wherein the one or more actions comprise:

generating a report indicating that one or more pieces of personal data associated with the data subject remain stored in the one or more computer systems of the entity; and providing the report to an individual associated with the entity.

9. A data management computer system for confirming deletion of personal data within one or more computer systems associated with an entity, the system comprising:

one or more computer processors; and computer memory operatively coupled to the one or more processors, wherein the one or more computer processors are adapted for:

receiving an indication that the one or more computer systems have completed an erasure of one or more pieces of personal data associated with a test data subject;

in response to receiving the indication that the one or more computer systems have completed the erasure, initiating a test interaction between a test data subject and the entity, the test interaction requiring a response from the entity to the test data subject;

in response to initiating the test interaction, determining whether the one or more computer systems associated with the entity have transmitted the response to the test data subject;

in response to determining that the one or more computer systems associated with the entity have transmitted the response:

determining whether the one or more computer systems have completed the erasure of the one or more pieces of personal data associated with the test data subject; and automatically taking one or more actions with regard to the personal data associated with the test data subject.

10. The data management computer system of Concept 9, wherein the one or more actions comprise:

identifying the one or more pieces of personal data associated with the test data subject that remain stored in the one or more computer systems of the entity;

flagging the one or more pieces of personal data associated with the test data subject that remain stored in the one or more computer systems of the entity; and providing the flagged one or more pieces of personal data associated with the test data subject that remain stored in the one or more computer systems of the entity to an individual associated with the entity.

11. The data management computer system of Concept 9, wherein:

initiating the test interaction between the test data subject and the entity comprises substantially automatically completing a contact-request form hosted by the entity on behalf of the test data subject.

12. The data management computer system of Concept 11, wherein:

substantially automatically completing the contact-request form comprises providing one or more pieces of identifying data associated with the test data subject, the one or more pieces of identifying data comprising data other than contact data.

13. The data management computer system of Concept 12, further comprising:
determining whether the one or more computer systems associated with the entity have generated the response and transmitted the response to the test data subject comprises determining whether the one or more computer systems have attempted to contact the test data subject in response to submission of the contact-request form.

14. The data management computer system of Concept 13, wherein the method further comprises initiating a test interaction between the data subject and the entity in response to determining that a certain period of time has elapsed from a time that the data subject provided the request to delete the data subject's personal data.

15. The data management computer system of Concept 14, wherein the test interaction is automatically initiated by the computer system.

16. The data management computer system of Concept 9, wherein the one or more actions comprise:
generating a report indicating that one or more pieces of personal data associated with the test data subject that remain stored in the one or more computer systems of the entity; and
providing the report to an individual associated with the entity.

17. A computer-implemented data processing method for monitoring compliance by a particular entity with a data subject's request to delete the data subject's personal data from one or more computer systems associated with a particular entity, the method comprising:
providing a communication to the entity, wherein the communication:
(a) comprises a unique identifier associated with the data subject;
(b) is performed without using a personal communication data platform, and
(c) prompts the entity to provide a response by contacting the data subject via a personal communication data platform;
in response to providing the communication to the entity, determining whether the data subject has received a response via the personal communication data platform;
in response to determining that the data subject has received the response via the personal communication data platform, determining whether the one or more computer systems have executed the data subject's request for deletion of the data subject's personal data;
in response to determining that the one or more computer systems have not complied with the data subject's request for deletion, generating an indication that the one or more computer systems have not complied with the data subject's request for deletion of the data subject's personal data; and
digitally storing in computer memory the indication that the one or more computer systems have not complied with the data subject's request for deletion of the data subject's personal data.

18. The computer-implemented data processing method of Concept 17, further comprising:
identifying one or more pieces of personal data associated with the data subject that are stored in the one or more computer systems of the entity;
flagging the one or more pieces of personal data associated with the data subject that are stored in the one or more computer systems of the entity; and
providing the flagged one or more pieces of personal data associated with the data subject that are stored in the one or more computer systems of the entity to an individual associated with the entity.

19. The computer-implemented data processing method of Concept 17, further comprising:
generating a report based at least in part on the indication that the entity has not complied with the data subject's request for deletion of their personal data in computer memory; and
providing the generated report to an individual associated with the entity.

20. The computer-implemented data processing method of Concept 19, wherein the individual associated with the entity is a privacy officer of the entity.

A computer-implemented method for updating risk remediation data for an entity, in particular embodiments, comprises: (1) accessing risk remediation data for an entity that identifies one or more actions to remediate a risk in response to identifying one or more data assets of the entity potentially affected by one or more risk triggers; (2) receiving an indication of an update to the one or more data assets; (3) identifying one or more updated risk triggers for an entity based at least in part on the update to the one or more data assets; (4) determining, by using one or more data models associated with the risk remediation data, one or more updated actions to remediate the one or more updated risk triggers; (5) analyzing the one or more updated risk triggers to determine a relevance of the risk posed to the entity by the one or more updated risk triggers; and (6) updating the risk remediation data to include the one or more updated actions to remediate the risk in response to identifying the one or more updated risk triggers.

A computer-implemented method for updating risk remediation data of an entity, in particular embodiments, comprises: (1) receiving an indication of an update to the first data asset of the entity receiving an indication of an update to the first data asset of the entity; (2) identifying one or more risk triggers for an entity based at least in part on the update to the first data asset of the entity; (3) identifying a second data asset of the entity potentially affected by the one or more risk triggers based at least in part on an association of the first data asset and the second data asset; (4) determining, by using one or more data models, one or more first updated actions to remediate the one or more updated risk triggers for the first data asset; (5) determining, by using one or more data models, one or more second updated actions to remediate the one or more updated risk triggers for the second data asset; and (6) generating risk remediation data of the entity to include the one or more first updated actions and the one or more second updated actions to remediate the one or more potential risk triggers.

A computer-implemented method for generating risk remediation data for an entity, in particular embodiments, comprises: (1) accessing aggregate risk remediation data for a plurality of identified risk triggers from one or more organizations; (2) analyzing the aggregate risk remediation data to determine a remediation outcome for each of the plurality of identified risk triggers and an associated entity response to the particular identified risk trigger of the plurality of identified risk triggers; (3) in response to analyzing the aggregate risk remediation data to determine a remediation outcome for each of the plurality of identified risk triggers and an associated entity response to the particular identified risk trigger of the plurality of identified risk triggers, generating one or more risk remediation data models; and (4) generating risk remediation data for the entity based at least in part on the one or more risk remediation data models and one or more data assets of the entity.

Various embodiments are also described in the following listing of concepts:

1. A computer-implemented data processing method for updating risk remediation data for an entity, the method comprising:
   accessing risk remediation data for an entity that identifies one or more actions to remediate a risk in response to identifying one or more data assets of the entity potentially affected by one or more risk triggers;
   receiving an indication of an update to the one or more data assets;
   identifying one or more updated risk triggers for an entity based at least in part on the update to the one or more data assets;
   determining, by using one or more data models associated with the risk remediation data, one or more updated actions to remediate the one or more updated risk triggers;
   analyzing the one or more updated risk triggers to determine a relevance of the risk posed to the entity by the one or more updated risk triggers; and
   updating the risk remediation data to include the one or more updated actions to remediate the risk in response to identifying the one or more updated risk triggers.

2. The computer-implemented data processing method of Concept 1, further comprising:
   determining, based at least in part on the one or more data assets and the relevance of the risk, whether to take one or more updated actions in response to the one or more updated risk triggers; and
   taking the one or more updated actions to remediate the risk in response to identifying the one or more updated risk triggers.

3. The computer-implemented data processing method of Concept 1, wherein updating the risk remediation data is performed automatically.

4. The computer-implemented data processing method of Concept 1, wherein the one or more updated risk triggers comprises the one or more data assets being physically located in one or more particular locations.

5. The computer-implemented data processing method of Concept 4, wherein the one or more particular locations comprise a single physical location.

6. The computer-implemented data processing method of Concept 1, wherein analyzing the one or more updated risk triggers to determine the relevance of the risk posed to the entity by the one or more updated risk triggers further comprises:
   calculating a risk level based at least in part on the one or more updated risk triggers;
   in response to calculating the risk level, comparing the risk level to a threshold risk level for the entity; and
   in response to determining that the risk level is greater than or equal to the threshold risk level, updating the risk remediation data to include the one or more updated actions to remediate the risk in response to identifying the one or more updated risk triggers.

7. The computer-implemented data processing method of Concept 6, wherein calculating the risk level based at least in part on the one or more updated risk triggers further comprises comparing the one or more updated risk triggers to (i) one or more previously identified risk triggers, and (ii) one or more previously implemented actions to the one or more previously identified risk triggers.

8. The computer-implemented data processing method of Concept 1, the method further comprising generating at least one data model of the one or more data models by:
   receiving aggregate risk remediation data for a plurality of identified risk triggers from one or more organizations;
   analyzing the aggregate risk remediation data to determine a remediation outcome for each of the plurality of identified risk triggers and an associated entity response to the particular identified risk trigger of the plurality of identified risk triggers; and
   in response to analyzing the aggregate risk remediation data to determine a remediation outcome for each of the plurality of identified risk triggers and an associated entity response to the particular identified risk trigger of the plurality of identified risk triggers, generating the at least one data model of the one or more data models.

9. The computer-implemented data processing method of Concept 8, wherein the risk remediation data implements the at least one data model of the one or more data models.

10. The computer-implemented data processing method of Concept 8, wherein the one or more organizations comprises the entity.

11. A computer-implemented data processing method for updating risk remediation data of an entity, the method comprising:
    receiving an indication of an update to the first data asset of the entity;
    identifying one or more risk triggers for an entity based at least in part on the update to the first data asset of the entity;
    identifying a second data asset of the entity potentially affected by the one or more risk triggers based at least in part on an association of the first data asset and the second data asset;
    determining, by using one or more data models, one or more first updated actions to remediate the one or more updated risk triggers for the first data asset;
    determining, by using one or more data models, one or more second updated actions to remediate the one or more updated risk triggers for the second data asset; and
    generating risk remediation data of the entity to include the one or more first updated actions and the one or more second updated actions to remediate the one or more potential risk triggers.

12. The computer-implemented data processing method of Concept 11, further comprising:
    determining a first data asset risk level based at least in part on the one or more updated risk triggers for the first data asset;
    determining to take the one or more first updated actions to remediate the one or more updated risk triggers for the first data asset based at least in part on the first data asset risk level; and
    in response, taking the first updated actions to remediate the one or more updated risk triggers for the first data asset.

13. The computer-implemented data processing method of Concept 12, further comprising:
    comparing the first data asset risk level to a threshold data asset risk level; and
    in response to determining that the first data asset risk level is greater than or equal to the threshold data asset risk level, taking the first updated actions to remediate the one or more updated risk triggers for the first data asset.

14. The computer-implemented data processing method of Concept 11, wherein the one or more first updated actions to remediate the one or more updated risk triggers for the first data asset is the one or more second updated actions to remediate the one or more updated risk triggers for the second data asset.

15. The computer-implemented data processing method of Concept 11, wherein the one or more first updated actions to remediate the one or more updated risk triggers for the first data asset is different from the one or more second updated actions to remediate the one or more updated risk triggers for the second data asset.

16. The computer-implemented data processing method of Concept 11, wherein generating the risk remediation data of the entity to include the one or more first updated actions and the one or more second updated actions to remediate the one or more potential risk triggers is performed automatically.

17. The computer-implemented data processing method of Concept 11, wherein the one or more risk triggers comprises one or more of the first data asset and the second data asset being physically located in a particular one or more locations.

18. The computer-implemented data processing method of Concept 17, wherein the one or more risk triggers comprises the first data asset being located in a first physical location and the second data asset being located in the first physical location.

19. A computer-implemented data processing method for generating risk remediation data for an entity, the method comprising:
   accessing aggregate risk remediation data for a plurality of identified risk triggers from one or more organizations;
   analyzing the aggregate risk remediation data to determine a remediation outcome for each of the plurality of identified risk triggers and an associated entity response to the particular identified risk trigger of the plurality of identified risk triggers;
   in response to analyzing the aggregate risk remediation data to determine a remediation outcome for each of the plurality of identified risk triggers and an associated entity response to the particular identified risk trigger of the plurality of identified risk triggers, generating one or more risk remediation data models; and
   generating risk remediation data for the entity based at least in part on the one or more risk remediation models and one or more data assets of the entity.

20. The computer-implemented data processing method of Concept 19, further comprising updating the generated risk remediation data automatically.

A computer-implemented method for managing a plurality of data assets of an organization with a third-party data repository, in particular embodiments, comprises: (1) identifying a form used to collect one or more pieces of personal data; (2) determining one or more data assets of a plurality of data assets of the organization where input data of the form is transmitted; (3) adding the one or more data assets to the third-party data repository with an electronic link to the form; (4) in response to a user submitting the form, creating a unique subject identifier associated with the user; (5) transmitting the unique subject identifier (i) to the third-party data repository and (ii) along with the form data provided by the user in the form, to the data asset; and (6) digitally storing the unique subject identifier (i) in the third-party data repository and (ii) along with the form data provided by the user in the form, in the data asset.

A computer-implemented method for or managing a plurality of data assets of an organization with a unique subject identifier database, in particular embodiments, comprises: (1) receiving an indication of completion of a form associated with the organization by a data subject; (2) determining, based at least in part on searching a unique subject identifier database, whether a unique subject identifier has been generated for the data subject; (3) in response to determining that a unique subject identifier has not been generated for the data subject, generating a unique subject identifier for the data subject; and (4) storing the unique subject identifier for the data subject in the unique subject identifier database, wherein the unique subject identifier database electronically links each respective unique subject identifier to each of: (i) the form associated with the organization submitted by the data subject of each respective unique subject identifier, and (ii) one or more data assets that utilize form data of the form received from the data subject.

A computer-implemented method for managing a plurality of data assets of an organization with a unique subject identifier database that, in particular embodiments, comprises: (1) receiving an indication of completion of a form associated with the organization by a data subject; (2) determining, based at least in part on searching a unique subject identifier database, whether a unique subject identifier has been generated for the data subject; (3) in response to determining that a unique subject identifier has been generated for the data subject, accessing the unique subject identifier database; (4) identifying the unique subject identifier of the data subject based at least in part on form data provided by the data subject in the completion of the form associated with the organization; and (5) updating the unique subject identifier database to include an electronic link between the unique subject identifier of the data subject and each of (i) the form submitted by the data subject of each respective unique subject identifier, and (ii) one or more data assets that utilize the form data of the form received from the data subject.

Various embodiments are also described in the following listing of concepts:

1. A computer-implemented data processing method for managing a plurality of data assets of an organization shared with a third-party data repository, the method comprising:
   identifying a form used to collect one or more pieces of personal data;
   determining one or more data assets of a plurality of data assets of the organization where input data of the form is transmitted;
   adding the one or more data assets to the third-party data repository with an electronic link to the form;
   in response to a user submitting the form, creating a unique subject identifier associated with the user;
   transmitting the unique subject identifier to the third-party data repository along with the form data provided by the user in the form, to the data asset; and
   digitally storing the unique subject identifier in the third-party data repository and along with the form data provided by the user in the form, in the data asset.

2. The computer-implemented data processing method of Concept 1, further comprising:
   receiving a data subject access request from the user;
   accessing the third-party data repository to identify the unique subject identifier of the user;
   determining which one or more data assets of the plurality of data assets of the organization include the unique subject identifier; and accessing personal data of the user stored in each of the one or more data assets of the plurality of data assets of the organization that include the unique subject identifier.

3. The computer-implemented data processing method of Concept 2, wherein the data subject access request comprises a type of data subject access request, and wherein the type of data subject access request is selected from a group consisting of:
   a subject's rights request, and
   a data subject deletion request.

4. The computer-implemented data processing method of Concept 3, wherein the type of data subject access request is a data subject deletion request and further comprising:
   in response to accessing the personal data of the user stored in each of the one or more data assets of the plurality of data assets of the organization that include the unique subject identifier, deleting the personal data of the user stored in each of the one or more data assets of the plurality of data assets of the organization that include the unique subject identifier.

5. The computer-implemented data processing method of Concept 3, wherein the type of data subject access request is a data subject deletion request and the method further comprises:
   in response to accessing the personal data of the user stored in each of the one or more data assets of the plurality of data assets, automatically determining that a first portion of personal data of the user stored in the one or more data assets has one or more legal bases for continued storage;
   in response to determining that the first portion of personal data of the user stored in the one or more data assets has one or more legal bases for continued storage, automatically maintaining storage of the first portion of personal data of the user stored in the one or more data assets;
   automatically facilitating deletion of a second portion of personal data of the user stored in the one or more data assets for which one or more legal bases for continued storage cannot be determined, wherein the first portion of the personal data of the user stored in the one or more data assets is different from the second portion of personal data of the user stored in the one or more data assets; and
   automatically marking as free one or more memory addresses associated with the second portion of personal data of the user stored in the one or more data assets associated with the user.

6. The computer-implemented data processing method of Concept 1, wherein identifying a form used to collect one or more pieces of personal data is performed by using one or more web site scanning tools.

7. The computer-implemented data processing method of Concept 1, wherein the third-party data repository comprises a link to each of the one or more data assets of the plurality of data assets of the organization that include the unique subject identifier of the user.

8. The computer-implemented data processing of Concept 1, wherein the third-party data repository stores the unique subject identifier in a database of a plurality of unique subject identifiers.

9. A computer-implemented data processing method for managing a plurality of data assets of an organization with a unique subject identifier database, the method comprising:
   receiving an indication of completion of a form associated with the organization by a data subject;
   determining, based at least in part on searching a unique subject identifier database, whether a unique subject identifier has been generated for the data subject;
   in response to determining that a unique subject identifier has not been generated for the data subject, generating a unique subject identifier for the data subject; and
   storing the unique subject identifier for the data subject in the unique subject identifier database, wherein the unique subject identifier database electronically links each respective unique subject identifier to each of: (i) the form associated with the organization submitted by the data subject of each respective unique subject identifier, and (ii) one or more data assets that utilize form data of the form received from the data subject.

10. The computer-implemented data processing method of Concept 9, further comprising:
    receiving a data subject access request from the data subject;
    accessing the unique subject identifier database to identify the unique subject identifier of the data subject;
    determining which one or more data assets of the plurality of data assets of the organization include the unique subject identifier of the data subject; and
    accessing personal data of the data subject stored in each of the one or more data assets of the plurality of data assets of the organization that include the unique subject identifier.

11. The computer-implemented data processing method of Concept 10, wherein the data subject access request comprises a type of data subject access request, and wherein the type of data subject access request is selected from a group consisting of:
    a subject's rights request, and
    a data subject deletion request.

12. The computer-implemented data processing method of Concept 11, wherein the type of data subject access request is a data subject deletion request and further comprising:
    in response to accessing the personal data of the data subject stored in each of the one or more data assets of the plurality of data assets of the organization that include the unique subject identifier, deleting the personal data of the data subject stored in each of the one or more data assets of the plurality of data assets of the organization that include the unique subject identifier.

13. The computer-implemented data processing method of Concept 9, further comprising:
    in response to determining that a unique subject identifier has been generated for the data subject, accessing the unique subject identifier database; and
    identifying the unique subject identifier of the data subject based at least in part on form data provided by the data subject in the completion of the form associated with the organization.

14. The computer-implemented data processing method of Concept 13, further comprising:
    updating the unique subject identifier database to include an electronic link between the unique subject identifier of the data subject and each of (i) the form submitted by the data subject of each respective unique subject identifier, and (ii) one or more data assets that utilize the form data of the form received from the data subject.

15. A computer-implemented data processing method for managing a plurality of data assets of an organization with a unique subject identifier database, the method comprising:

receiving an indication of completion of a form associated with the organization by a data subject;

determining, based at least in part on searching a unique subject identifier database, whether a unique subject identifier has been generated for the data subject;

in response to determining that a unique subject identifier has been generated for the data subject, accessing the unique subject identifier database;

identifying the unique subject identifier of the data subject based at least in part on form data provided by the data subject in the completion of the form associated with the organization; and updating the unique subject identifier database to include an electronic link between the unique subject identifier of the data subject and each of (i) the form submitted by the data subject of each respective unique subject identifier, and (ii) one or more data assets that utilize the form data of the form received from the data subject.

16. The computer-implemented data processing method of Concept 15, further comprising:

receiving a data subject access request from the data subject;

accessing the unique subject identifier database to identify the unique subject identifier of the data subject;

determining which one or more data assets of the plurality of data assets of the organization include the unique subject identifier of the data subject; and accessing personal data of the data subject stored in each of the one or more data assets of the plurality of data assets of the organization that include the unique subject identifier.

17. The computer-implemented data processing method of Concept 16, wherein the data subject access request comprises a type of data subject access request, and wherein the type of data subject access request is selected from a group consisting of:

a subject's rights request, and a data subject deletion request.

18. The computer-implemented data processing method of Concept 17, wherein the type of data subject access request is a data subject deletion request and further comprising:

in response to accessing the personal data of the data subject stored in each of the one or more data assets of the plurality of data assets of the organization that include the unique subject identifier, deleting the personal data of the data subject stored in each of the one or more data assets of the plurality of data assets of the organization that include the unique subject identifier.

19. The computer-implemented data processing method of Concept 17, wherein the type of data subject access request is a data subject deletion request and the method further comprises:

in response to accessing the personal data of the data subject stored in each of the one or more data assets of the plurality of data assets, automatically determining that a first portion of personal data of the data subject stored in the one or more data assets has one or more legal bases for continued storage;

in response to determining that the first portion of personal data of the data subject stored in the one or more data assets has one or more legal bases for continued storage, automatically maintaining storage of the first portion of personal data of the data subject stored in the one or more data assets;

automatically facilitating deletion of a second portion of personal data of the data subject stored in the one or more data assets for which one or more legal bases for continued storage cannot be determined, wherein the first portion of the personal data of the data subject stored in the one or more data assets is different from the second portion of personal data of the data subject stored in the one or more data assets; and automatically marking one or more memory addresses associated with the second portion of personal data of the data subject stored in the one or more data assets associated with the data subject as free.

20. The computer-implemented data processing of Concept 1, wherein the unique subject identifier database is a part of a third-party data repository.

A computer-implemented method for assessing a risk associated with one or more data transfers between one or more data assets (e.g., two or more data assets), in particular embodiments, comprises: (1) creating a data transfer record for a data transfer between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; and (6) digitally storing the risk score for the data transfer.

A computer-implemented method for assessing a risk associated with one or more data transfers between one or more data assets, in particular embodiments, comprises: (1) accessing a data transfer record for a data transfer between a first asset in a first location and a second asset in a second location; (2) accessing a set of data transfer rules that are associated with the data transfer record, wherein the set of data transfer rules comprise (a) one or more privacy law framework of the one or more of the first location and the second location, and (b) one or more entity framework of one or more of (i) an entity associated with the one or more first data asset and (ii) an entity associated with the one or more second data asset; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; and (6) digitally storing the risk score for the data transfer.

A computer-implemented method for assessing a risk associated with one or more data transfers between one or more data assets, in particular embodiments, comprises: (1) accessing a data transfer record for a data transfer between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; (6) digitally storing the risk score for the data transfer; (7) comparing the risk score for the data transfer to a threshold risk score; (8) determining that the risk score for the data transfer is a greater risk than the threshold risk score; and (9) in response to determining that the risk score for the data transfer is a greater risk than the threshold risk score, taking one or more action.

Various embodiments are also described in the following listing of concepts:

1. A computer-implemented data processing method for assessing a risk associated with one or more data transfers between one or more data assets, the method comprising:
creating a data transfer record for a data transfer between a first asset in a first location and a second asset in a second location;
accessing a set of data transfer rules that are associated with the data transfer record;
performing a data transfer assessment based at least in part on applying the set of data transfer rules on the data transfer record;
identifying one or more data transfer risks associated with the data transfer record, based at least in part on the data transfer assessment;
calculating a risk score for the data transfer based at least in part on the one or more data transfer risks associated with the data transfer record; and
digitally storing the risk score for the data transfer.

2. The computer-implemented data processing method of Concept 1, wherein the method further comprises:
comparing the risk score for the data transfer to a threshold risk score;
determining that the risk score for the data transfer is a greater risk than the threshold risk score; and
in response to determining that the risk score for the data transfer is a greater risk than the threshold risk score, taking one or more action.

3. The computer-implemented data processing method of Concept 2, wherein the one or more action is selected from a group consisting of:
providing the data transfer record to one or more individuals for review of the data transfer record; and
automatically terminating the data transfer.

4. The computer-implemented data processing method of Concept 2, wherein the one or more action comprises:
generating a secure link between one or more processors associated with the first asset in the first location and one or more processors associated with the second asset in the second location; and
providing the data transfer via the secure link between the one or more processors associated with the first asset in the first location and the one or more processors associated with the second asset in the second location.

5. The computer-implemented data processing method of Concept 1, wherein calculating a risk score for the data transfer based at least in part on the one or more data transfer risks associated with the data transfer record further comprises:
determining a weighting factor for each of the one or more data transfer risks;
determining a risk rating for each of the one or more data transfer risks; and
calculating the risk level for the data transfer based upon, for each respective one of the one or more data transfer risks, the risk rating for the respective data transfer risk and the weighting factor for the respective data transfer risk.

6. The computer-implemented data processing method of Concept 1, wherein the one or more data transfer risks are selected from a group consisting of:
a source location of the first location of the one or more first data asset of the data transfer;
a destination location of the second location of the one or more second data asset of the data transfer;
one or more type of data being transferred as part of the data transfer; a time of the data transfer; and
an amount of data being transferred as part of the data transfer.

7. The computer-implemented data processing method of Concept 1, wherein the set of data transfer rules are automatically updated.

8. The computer-implemented data processing method of Concept 1, wherein the set of data transfer rules comprise:
one or more privacy law framework of the one or more of the first location and the second location; and
one or more entity framework of one or more of (i) an entity associated with the one or more first data asset and (ii) an entity associated with the one or more second data asset.

9. A computer-implemented data processing method for assessing a risk associated with one or more data transfers between one or more data assets, the method comprising:
accessing a data transfer record for a data transfer between a first asset in a first location and a second asset in a second location;
accessing a set of data transfer rules that are associated with the data transfer record, wherein the set of data transfer rules comprise:
one or more privacy law framework of the one or more of the first location and the second location, and
one or more entity framework of one or more of (i) an entity associated with the one or more first data asset and (ii) an entity associated with the one or more second data asset;
performing a data transfer assessment based at least in part on applying the set of data transfer rules on the data transfer record;
identifying one or more data transfer risks associated with the data transfer record, based at least in part on the data transfer assessment;
calculating a risk score for the data transfer based at least in part on the one or more data transfer risks associated with the data transfer record; and
digitally storing the risk score for the data transfer.

10. The computer-implemented data processing method of Concept 9, wherein the method further comprises:
comparing the risk score for the data transfer to a threshold risk score;
determining that the risk score for the data transfer is a greater risk than the threshold risk score; and
in response to determining that the risk score for the data transfer is a greater risk than the threshold risk score, taking one or more action.

11. The computer-implemented data processing method of Concept 10, wherein the one or more action is selected from a group consisting of:
providing the data transfer record to one or more individuals for review of the data transfer record; and
automatically terminating the data transfer.

12. The computer-implemented data processing method of Concept 10, wherein the one or more action comprises:
generating a secure link between one or more processors associated with the first asset in the first location and one or more processors associated with the second asset in the second location; and providing the data transfer via the secure link between the one or more processors associated with the first asset in the first location and the one or more processors associated with the second asset in the second location.

13. The computer-implemented data processing method of Concept 9, wherein calculating a risk score for the data transfer based at least in part on the one or more data transfer risks associated with the data transfer record further comprises:

determining a weighting factor for each of the one or more data transfer risks;

determining a risk rating for each of the one or more data transfer risks; and calculating the risk level for the data transfer based upon, for each respective one of the one or more data transfer risks, the risk rating for the respective data transfer risk and the weighting factor for the respective data transfer risk.

14. The computer-implemented data processing method of Concept 9, wherein the one or more data transfer risks are selected from a group consisting of:

a source location of the first location of the one or more first data asset of the data transfer;

a destination location of the second location of the one or more second data asset of the data transfer;

one or more type of data being transferred as part of the data transfer;

a time of the data transfer; and an amount of data being transferred as part of the data transfer.

15. The computer-implemented data processing method of Concept 9, wherein the set of data transfer rules are automatically updated.

16. A computer-implemented data processing method for assessing a risk associated with one or more data transfers between one or more data assets, the method comprising:

accessing a data transfer record for a data transfer between a first asset in a first location and a second asset in a second location;

accessing a set of data transfer rules that are associated with the data transfer record;

performing a data transfer assessment based at least in part on applying the set of data transfer rules on the data transfer record;

identifying one or more data transfer risks associated with the data transfer record, based at least in part on the data transfer assessment;

calculating a risk score for the data transfer based at least in part on the one or more data transfer risks associated with the data transfer record;

digitally storing the risk score for the data transfer;

comparing the risk score for the data transfer to a threshold risk score;

determining that the risk score for the data transfer is a greater risk than the threshold risk score; and in response to determining that the risk score for the data transfer is a greater risk than the threshold risk score, taking one or more action.

17. The computer-implemented data processing method of Concept 16, wherein the one or more action is selected from a group consisting of:

providing the data transfer record to one or more individuals for review of the data transfer record; and automatically terminating the data transfer.

18. The computer-implemented data processing method of Concept 16, wherein the one or more data transfer risks are selected from a group consisting of:

a source location of the first location of the one or more first data asset of the data transfer;

a destination location of the second location of the one or more second data asset of the data transfer;

one or more type of data being transferred as part of the data transfer;

a time of the data transfer; and an amount of data being transferred as part of the data transfer.

19. The computer-implemented data processing method of Concept 16, wherein the one or more action comprises:

generating a secure link between one or more processors associated with the first asset in the first location and one or more processors associated with the second asset in the second location; and providing the data transfer via the secure link between the one or more processors associated with the first asset in the first location and the one or more processors associated with the second asset in the second location.

20. The computer-implemented data processing method of Concept 16, further comprising:

transferring the data between the first asset in the first location and the second asset in the second location.

A computer-implemented data processing method for automatically classifying personal information in an electronic document and generating a sensitivity score for the electronic document based on the classification, in particular embodiments, comprises: (1) receiving, by one or more processors, the electronic document for analysis; (2) using one or more natural language processing techniques, by one or more processors, to decompose data from the electronic document into (i) one or more structured objects and (ii) one or more values for each of the one or more structured objects; (3) classifying, by one or more processors, each of the one or more structured objects in the electronic document based on one or more attributes of the one or more structured objects; (4) categorizing, by one or more processors, each of the one or more structured objects based on a sensitivity of the one or more structured objects; (5) rating, by one or more processors, the accuracy of the categorization; and (6) generating, by one or more processors, a sensitivity score for the electronic document based at least in part on the categorized one or more structured objects and the associated one or more values.

A computer-implemented data processing method for automatically classifying personal information in an electronic document and generating a sensitivity score for the electronic document based on the classification, in particular embodiments, comprises: (1) receiving, by one or more processors, the electronic document for analysis; (2) sorting, using one or more natural language processing techniques, data from the electronic document into (i) one or more structured objects and (ii) one or more values for each of the one or more structured objects; (3) classifying, by one or more processors, each of the one or more structured objects in the electronic document based on one or more attributes of the one or more structured objects; (4) categorizing, by one or more processors, each of the one or more structured objects based on a sensitivity of the one or more structured objects; (5) generating, by one or more processors, a sensitivity score for the electronic document based at least in part on the categorized one or more structured objects and the associated one or more values; (6) parsing the classification of one or more structured objects; (7) identifying each of the one or more structured objects having an empty associated value; and (8) modifying the classification of one or more structured objects to remove the identified one or more structured objects from the classification.

A computer-implemented data processing method for automatically classifying personal information in an electronic document and generating a sensitivity score for the electronic document based on the classification, in particular embodiments, comprises: (1) receiving, by one or more processors, the electronic document for analysis; (2) using one or more natural language processing techniques, by one or more processors, to decompose data from the electronic document into (i) one or more structured objects and (ii) one or more values for each of the one or more structured objects; (3) classifying, by one or more processors, each of the one or more structured objects in the electronic document based on one or more attributes of the one or more structured objects; (4) categorizing, by one or more processors, each of the one or more structured objects based on a sensitivity of the one or more structured objects; and (5) generating, by one or more processors, a sensitivity score for the electronic document based at least in part on the categorized one or more structured objects and the associated one or more values.

Various embodiments are also described in the following listing of concepts:

1. A computer-implemented data processing method for automatically classifying personal information in an electronic document and generating a sensitivity score for the electronic document based on the classification, the method comprising:
    receiving, by one or more processors, the electronic document for analysis;
    using one or more natural language processing techniques, by one or more processors, to decompose data from the electronic document into:
        one or more structured objects; and
        one or more values for each of the one or more structured objects;
    classifying, by one or more processors, each of the one or more structured objects in the electronic document based on one or more attributes of the one or more structured objects;
    categorizing, by one or more processors, each of the one or more structured objects based on a sensitivity of the one or more structured objects;
    rating, by one or more processors, the accuracy of the categorization; and
    generating, by one or more processors, a sensitivity score for the electronic document based at least in part on the categorized one or more structured objects and the associated one or more values.

2. The computer-implemented data processing method of Concept 1, wherein generating the sensitivity score for the electronic document comprises:
    assigning a relative sensitivity rating to each of the one or more structured objects; and
    calculating the sensitivity score based on the one or more values and the relative sensitivity rating for each of the one or more structured objects.

3. The computer-implemented data processing method of Concept 1, further comprising:
    parsing the classification of one or more structured objects;
    identifying each of the one or more structured objects having an empty associated value; and
    modifying the classification of one or more structured objects to remove the identified one or more structured objects from the classification.

4. The computer-implemented data processing method of Concept 1, wherein rating the accuracy of the categorization comprises:
    receiving a second electronic document that is related to the electronic document;
    using one or more natural language processing techniques, by one or more processors, to decompose data from the second electronic document into;
        one or more second structured objects; and
        one or more second values for each of the one or more structured objects;
    classifying, by one or more processors, each of the one or more second structured objects in the second electronic document based on one or more second attributes of the one or more second structured objects;
    categorizing, by one or more processors, each of the one or more second structured objects based on a sensitivity of the one or more second structured objects; and
    comparing the categorization of the one or more structured objects with the categorization of the one or more second structured objects; and
    rating the accuracy based on the comparison.

5. The computer-implemented data processing method of Concept 1, wherein the one or more natural language process techniques is selected from a group comprising:
    one or more optical character recognition techniques; and
    one or more audio processing techniques.

6. The computer-implemented data processing method of Concept 1, wherein the one or more attributes of the one or more structured objects comprise a position within the electronic document of each of the one or more structured objects in the electronic document.

7. The computer-implemented data processing method of Concept 1, wherein the sensitivity of the one or more structured objects is automatically determined based at least in part on one or more government regulations directed toward the type of information associated with the particular one or more structured objects.

8. The computer-implemented data processing of Concept 1, wherein rating the accuracy of the categorization of each of the one or more structured objects further comprises:
    determining a character type for each of the one or more structured objects;
    determining a character type for each value associated with each of the one or more structured objects;
    comparing the character type for each value associated with each of the one or more structured objects and the character type for each of the one or more structed objects; and
    rating the accuracy of the categorization of each of the one or more structured objects based at least in part on comparing the character type for each value associated with each of the one or more structured objects and the character type for each of the one or more structed objects.

9. A computer-implemented data processing method for automatically classifying personal information in an electronic document and generating a sensitivity score for the electronic document based on the classification, the method comprising:
    receiving, by one or more processors, the electronic document for analysis;
    sorting, using one or more natural language processing techniques, data from the electronic document into;

one or more structured objects; and
one or more values for each of the one or more structured objects;
classifying, by one or more processors, each of the one or more structured objects in the electronic document based on one or more attributes of the one or more structured objects;
categorizing, by one or more processors, each of the one or more structured objects based on a sensitivity of the one or more structured objects;
generating, by one or more processors, a sensitivity score for the electronic document based at least in part on the categorized one or more structured objects and the associated one or more values;
parsing the classification of one or more structured objects;
identifying each of the one or more structured objects having an empty associated value; and
modifying the classification of one or more structured objects to remove the identified one or more structured objects from the classification.

10. The computer-implemented data processing method of Concept 9, wherein generating the sensitivity score for the electronic document comprises:
assigning a relative sensitivity rating to each of the one or more structured objects; and
calculating the sensitivity score based on the one or more values and the relative sensitivity rating for each of the one or more structured objects.

11. The computer-implemented data processing method of Concept 1, wherein rating the accuracy of the categorization comprises:
receiving a second electronic document that is related to the electronic document;
sorting, using one or more natural language processing techniques, the second electronic document into;
one or more second structured objects; and
one or more second values for each of the one or more structured objects;
classifying, by one or more processors, each of the one or more second structured objects in the second electronic document based on one or more second attributes of the one or more second structured objects;
categorizing, by one or more processors, each of the one or more second structured objects based on a sensitivity of the one or more second structured objects; and
generating, by one or more processors, a second sensitivity score for the second electronic document based at least in part on the categorized one or more second structured objects and the associated one or more second values;
parsing the classification of one or more second structured objects;
identifying each of the one or more second structured objects having an empty associated value; and
modifying the classification of one or more second structured objects to remove the identified one or more second structured objects from the classification.

12. The computer-implemented data processing method of Concept 9, wherein the one or more natural language process techniques is selected from a group comprising:
one or more optical character recognition techniques; and
one or more audio processing techniques.

13. The computer-implemented data processing method of Concept 9, wherein the one or more attributes of the one or more structured objects comprise a position within the electronic document of each of the one or more structured objects in the electronic document.

14. The computer-implemented data processing method of Concept 9, wherein the sensitivity of the one or more structured objects is automatically determined based at least in part on one or more government regulations directed toward the type of information associated with the particular one or more structured objects.

15. A computer-implemented data processing method for automatically classifying personal information in an electronic document and generating a sensitivity score for the electronic document based on the classification, the method comprising:
receiving, by one or more processors, the electronic document for analysis;
using one or more natural language processing techniques, by one or more processors, to decompose data from the electronic document into;
one or more structured objects; and
one or more values for each of the one or more structured objects;
classifying, by one or more processors, each of the one or more structured objects in the electronic document based on one or more attributes of the one or more structured objects;
categorizing, by one or more processors, each of the one or more structured objects based on a sensitivity of the one or more structured objects; and
generating, by one or more processors, a sensitivity score for the electronic document based at least in part on the categorized one or more structured objects and the associated one or more values.

16. The computer-implemented data processing method of Concept 15, wherein generating the sensitivity score for the electronic document comprises:
assigning a relative sensitivity rating to each of the one or more structured objects; and
calculating the sensitivity score based on the one or more values and the relative sensitivity rating for each of the one or more structured objects.

17. The computer-implemented data processing method of Concept 15, wherein rating the accuracy of the categorization comprises:
receiving a second electronic document that is related to the electronic document;
using one or more natural language processing techniques, by one or more processors, to decompose data from the second electronic document into;
one or more second structured objects; and
one or more second values for each of the one or more structured objects;
classifying, by one or more processors, each of the one or more second structured objects in the second electronic document based on one or more second attributes of the one or more second structured objects;
categorizing, by one or more processors, each of the one or more second structured objects based on a sensitivity of the one or more second structured objects; and
comparing the categorization of the one or more structured objects with the categorization of the one or more second structured objects; and
rating the accuracy based on the comparison.

18. The computer-implemented data processing method of Concept 15, wherein the one or more natural language process techniques is selected from a group comprising:
one or more optical character recognition techniques; and
one or more audio processing techniques.

19. The computer-implemented data processing method of Concept 15, wherein the one or more attributes of the one or more structured objects comprise a position within the electronic document of each of the one or more structured objects in the electronic document.

20. The computer-implemented data processing method of Concept 1, wherein the sensitivity of the one or more structured objects is automatically determined based at least in part on one or more government regulations directed toward the type of information associated with the particular one or more structured objects.

In one aspect of the disclosure, a method is provided that comprises: receiving, by computing hardware, a unique identifier of a data subject submitted through an interface associated with a computer system of an entity; responsive to a certain period of time elapsing after the unique identifier was submitted, initiating, by the computing hardware, a test interaction associated with the unique identifier and involving submitting a request for a response from the computer system; determining, by the computing hardware, the computer system has initiated the response to the request, wherein the response includes personal data of the data subject matched to the unique identifier; and responsive to determining that the computer system has initiated the response, performing, by the computing hardware, an action with regard to the computer system.

In particular embodiments, the unique identifier is provided to the data subject after submitting a deletion request to delete the personal data. In particular embodiments, the request comprises a contact-request form providing data associated with the unique identifier. In addition, in particular embodiments, the certain period of time comprises at least one of a time after which a deletion request to delete the personal data has been submitted to the entity or an expected data retention time for the personal data. Accordingly, in various embodiments, performing the action may comprise scanning the computer system to identify the personal data, performing the action may comprise flagging the personal data in the computer system and providing the flagged personal data to an individual associated with the entity, or performing the action may comprise generating a report indicating that the personal data remains in the computer system and providing the report to an individual associated with the entity.

In one aspect of the disclosure, a system is provided. Accordingly, the system comprises a non-transitory computer-readable medium storing instructions and a processing device communicatively coupled to the non-transitory computer-readable medium. the processing device is configured to execute the instructions and thereby perform operations comprising: receiving a unique identifier associated with a data subject submitted through an interface to a computer system of an entity; receiving an indication of completion of an erasure of personal data of the data subject matched to the unique identifier from the computer system; responsive to receiving the indication, initiating a test interaction associated with the unique identifier involving submitting a request for a response from the computer system; determining the computer system has initiated the response to the request, wherein the response includes the personal data; and responsive to determining that the computer system has initiated the response, performing an action with regard to the computer system. In particular embodiments, the operations further comprise submitting a deletion request to have the personal data deleted from the computer system. In addition, in particular embodiments, initiating the test interaction is performed after a certain period of time has elapsed after submission of the deletion request.

In one aspect of the disclosure, a non-transitory computer-readable medium is provided having program code that is stored thereon. Accordingly, the program code is executable by one or more processing devices for performing operations comprising: responsive to a certain period of time elapsing after a unique identifier associated with a data subject was submitted through an interface to a computer system of an entity, initiating a test interaction involving submitting a request for a response from the computer system; determining the computer system has initiated the response to the request, wherein the response includes personal data of the data subject matched to the unique identifier; and responsive to determining that the computer system has initiated the response, performing an action with regard to the computer system.

BRIEF DESCRIPTION OF THE DRAWINGS

Various embodiments of a data subject access request fulfillment system are described below. In the course of this description, reference will be made to the accompanying drawings, which are not necessarily drawn to scale, and wherein:

FIGS. 3-43 are computer screen shots that demonstrate the operation of various embodiments.

Figure 45:
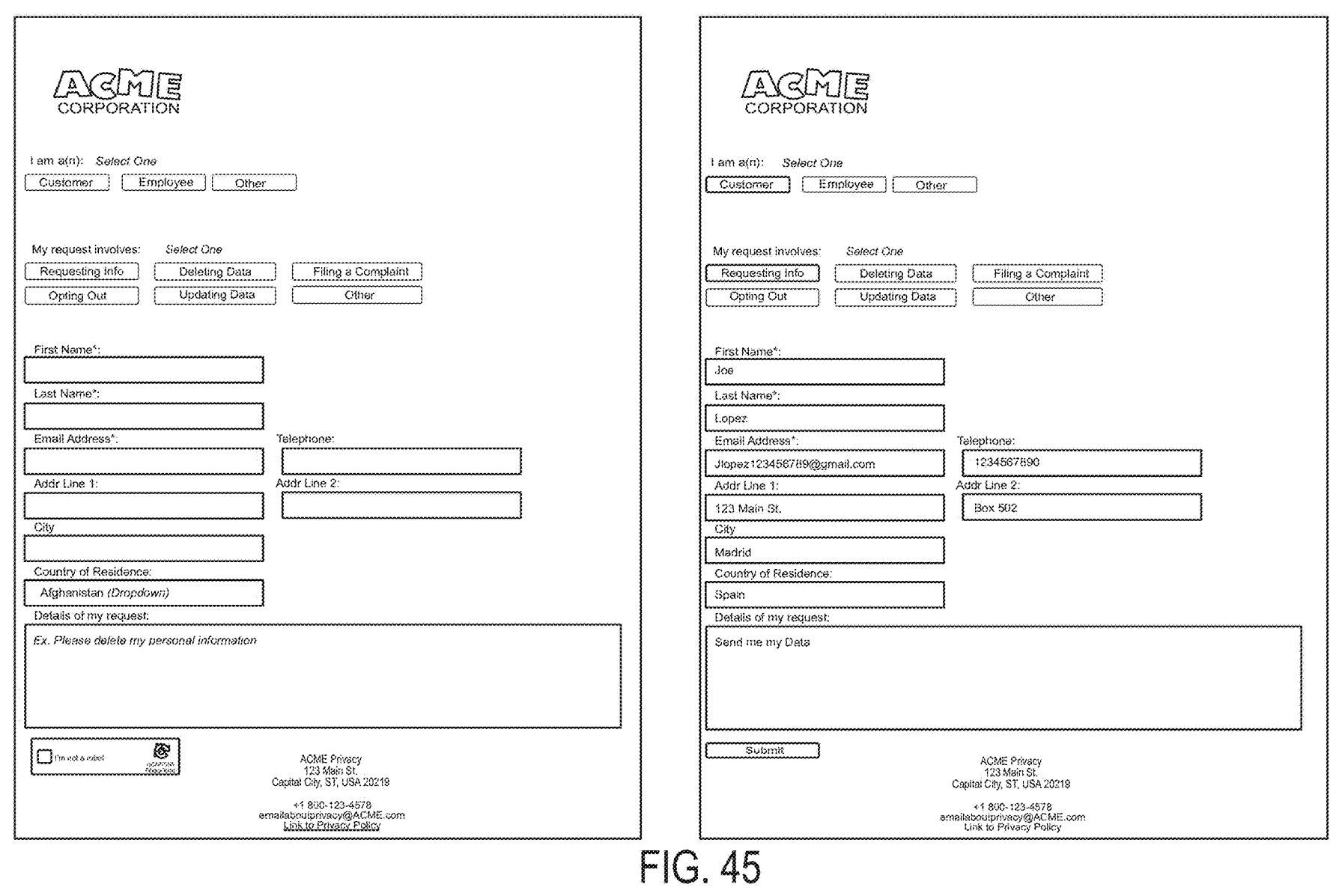

FIGS. 44-49 depict various exemplary screen displays and user interfaces that a user of various embodiments of the system may encounter (FIGS. 47 and 48 collectively show four different views of a Data Subject Request Queue).

FIG. 56 is a screenshot of a document from which the system described herein may be configured to automatically classify personal information.

FIG. 61 depicts a visual representation of the system mapping values into an object structure according to the classification and categorization created as shown in FIGS. 57-59.

FIG. 62 depicts a visual representation of the mapped results of an automatic classification of personal information in a document described herein.

DETAILED DESCRIPTION

Figure 1:
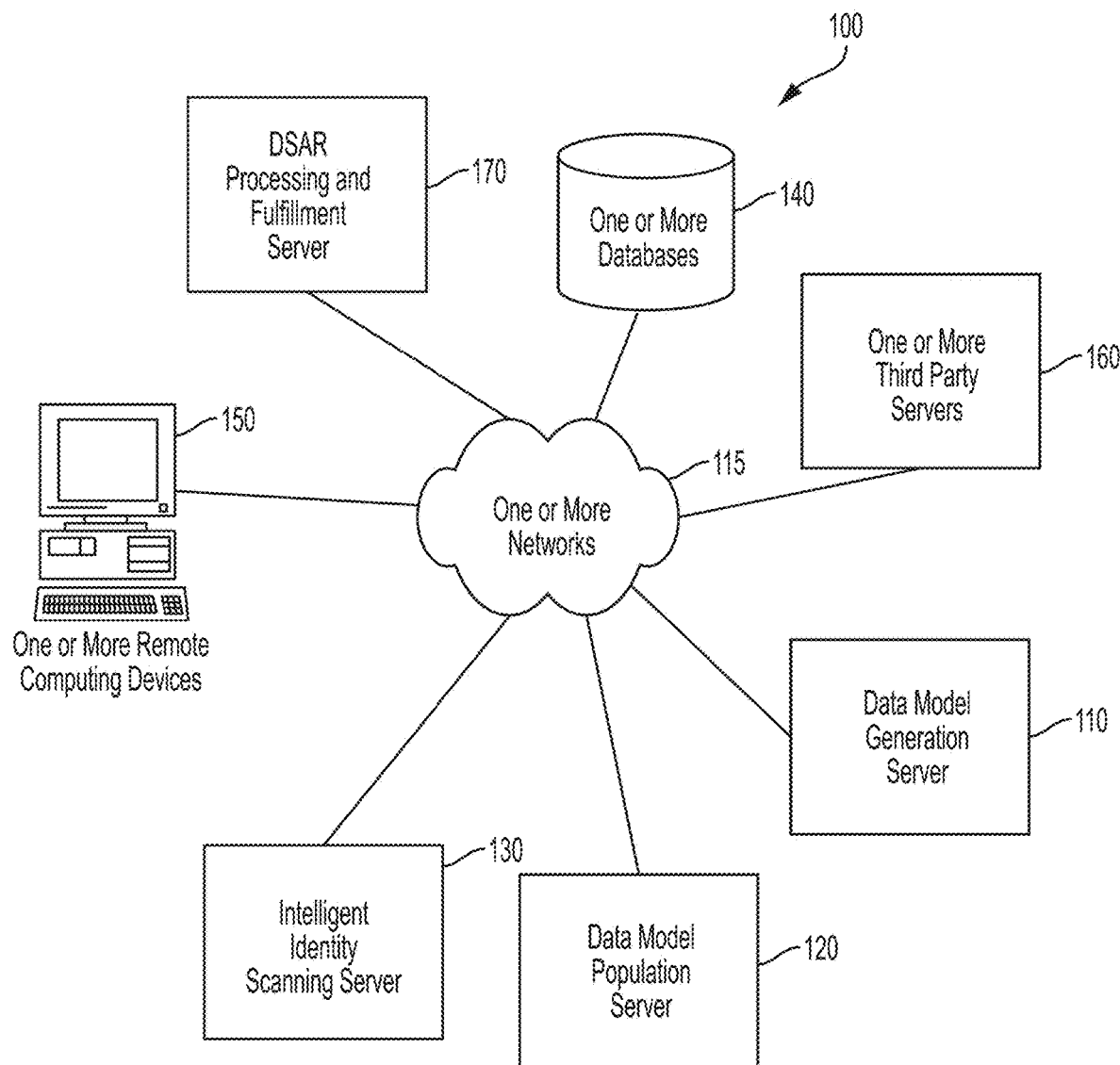
FIG. 1 depicts a data subject request processing and fulfillment system according to particular embodiments.

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Ticket management systems, according to various embodiments, are adapted to receive data subject access requests (DSAR's) from particular data subjects, and to facilitate the timely processing of valid DSAR's by an appropriate respondent. In particular embodiments, the ticket management system receives DSAR's via one or more webforms that each may, for example, respectively be accessed via an appropriate link/button on a respective web page. In other embodiments, the system may receive DSAR's through any other suitable mechanism, such as via a computer software application (e.g., a messaging application such as Slack, Twitter), via a chat bot, via generic API input from another system, or through entry by a representative who may receive the information, for example, via suitable paper forms or over the phone.

The ticket management system may include a webform creation tool that is adapted to allow a user to create customized webforms for receiving DSAR's from various different data subject types and for routing the requests to appropriate individuals for processing. The webform creation tool may, for example, allow the user to specify the language that the form will be displayed in, what particular information is to be requested from the data subject and/or provided by the data subject, who any DSAR's that are received via the webform will be routed to, etc. In particular embodiments, after the user completes their design of the webform, the webform creation tool generates code for the webform that may be cut and then pasted into a particular web page.

The system may be further adapted to facilitate processing of DSAR's that are received via the webforms, or any other suitable mechanism. For example, the ticket management system may be adapted to execute one or more of the following steps for each particular DSAR received via the webforms (or other suitable mechanism) described above: (1) before processing the DSAR, confirm that the DSAR was actually submitted by the particular data subject of the DSAR (or, for example, by an individual authorized to make the DSAR on the data subject's behalf, such as a parent, guardian, power-of-attorney holder, etc.)—any suitable method may be used to confirm the identity of the entity/individual submitting the DSAR—for example, if the system receives the DSAR via a third-party computer system, the system may validate authentication via API secret, or by requiring a copy of one or more particular legal documents (e.g., a particular contract between two particular entities)—the system may validate the identity of an individual by, for example, requiring the individual (e.g., data subject) to provide particular account credentials, by requiring the individual to provide particular out-of-wallet information, through biometric scanning of the individual (e.g., finger or retinal scan), or via any other suitable identity verification technique; (2) if the DSAR was not submitted by the particular data subject, deny the request; (3) if the DSAR was submitted by the particular data subject, advance the processing of the DSAR; (4) route the DSAR to the correct individual(s) or groups internally for handling; (5) facilitate the assignment of the DSAR to one or more other individuals for handling of one or more portions of the DSAR; (6) facilitate the suspension of processing of the data subject's data by the organization; and/or (7) change the policy according to which the data subject's personal data is retained and/or processed by the system. In particular embodiments, the system may perform any one or more of the above steps automatically. The system then generates a receipt for the DSAR request that the user can use as a transactional record of their submitted request.

In particular embodiments, the ticket management system may be adapted to generate a graphical user interface (e.g., a DSAR request-processing dashboard) that is adapted to allow a user (e.g., a privacy officer of an organization that is receiving the DSAR) to monitor the progress of any of the DSAR requests. The GUI interface may display, for each DSAR, for example, an indication of how much time is left (e.g., quantified in days and/or hours) before a legal and/or internal deadline to fulfill the request. The system may also display, for each DSAR, a respective user-selectable indicium that, when selected, may facilitate one or more of the following: (1) verification of the request; (2) assignment of the request to another individual; (3) requesting an extension to fulfill the request; (4) rejection of the request; or (5) suspension of the request.

As noted immediately above, and elsewhere in this application, in particular embodiments, any one or more of the above steps may be executed by the system automatically. As a particular example, the system may be adapted to automatically verify the identity of the DSAR requestor and then automatically fulfill the DSAR request by, for example, obtaining the requested information via a suitable data model and communicating the information to the requestor. As another particular example, the system may be configured to automatically route the DSAR to the correct individual for handling based at least in part on one or more pieces of information provided (e.g., in the webform).

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request; (2) the location from which the request is being made; (3) the country of residency of the data subject and, for example, that county's tolerance for enforcing DSAR violations; (4) current sensitivities to world events; (5) a status of the requestor (e.g., especially loyal customer); or (6) any other suitable metadata.

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, the organization or entity may not have or may no longer have a legal basis to continue to store the data. As such, organizations and entities may require improved systems and methods to identify such orphaned data, and take corrective action, if necessary (e.g., to ensure that the organization may not be in violation of one or more legal or industry regulations).

In various embodiments, an orphaned personal data identification system may be configured to generate a data model (e.g., one or more data models) that maps one or more relationships between and/or among a plurality of data assets utilized by a corporation or other entity (e.g., individual, organization, etc.) in the context, for example, of one or more business processes or processing activities. In particular embodiments, the system is configured to generate and populate a data model substantially on the fly (e.g., as the system receives new data associated with particular processing activities). In still other embodiments, the system is configured to generate and populate a data model based at least in part on existing information stored by the system (e.g., in one or more data assets), for example, using one or more suitable scanning techniques. In still other embodiments, the system is configured to access an existing data model that maps personal data stored by one or more organization systems to particular associated processing activities.

In various embodiments, the system may analyze the data model to identify personal data that has been collected and stored using one or more computer systems operated and/or utilized by a particular organization where the personal data is not currently being used as part of any privacy campaigns, processing activities, etc. undertaken by the particular organization. This data may be described as orphaned data. In some circumstances, the particular organization may be exposed to an increased risk that the data may be accessed by a third party (e.g., cybercrime) or that the particular organization may not be in compliance with one or more legal or industry requirements related to the collection, storage, and/or processing of this orphaned data.

Additionally, in some implementations, in response to the termination of a particular privacy campaign, processing activity, (e.g., manually or automatically), the system may be configured to analyze the data model to determine whether any of the personal data that has been collected and stored by the particular organization is now orphaned data (e.g., whether any personal data collected and stored as part of the now-terminated privacy campaign is being utilized by any other processing activity, has some other legal basis for its continued storage, etc.).

In additional implementations in response to determining that a particular privacy campaign, processing activity, etc. has not been utilized for a period of time (e.g., a day, month, year), the system may be configured to terminate the particular privacy campaign, processing activity, etc. or prompt one or more individuals associated with the particular organization to indicate whether the particular privacy campaign, processing activity, etc. should be terminated or otherwise discontinued.

For example, a particular processing activity may include transmission of a periodic advertising e-mail for a particular company (e.g., a hardware store). As part of the processing activity, the particular company may have collected and stored e-mail addresses for customers that elected to receive (e.g., consented to the receipt of) promotional e-mails. In response to determining that the particular company has not sent out any promotional e-mails for at least a particular amount of time (e.g., for at least a particular number of months), the system may be configured to: (1) automatically terminate the processing activity; (2) identify any of the personal data collected as part of the processing activity that is now orphaned data (e.g., the e-mail addresses); and (3) automatically delete the identified orphaned data. The processing activity may have ended for any suitable reason (e.g., because the promotion that drove the periodic e-mails has ended). As may be understood in light of this disclosure, because the particular organization no longer has a valid basis for continuing to store the e-mail addresses of the customers once the e-mail addresses are no longer being used to send promotional e-mails, the organization may wish to substantially automate the removal of personal data stored in its computer systems that may place the organization in violation of one or more personal data storage rules or regulations.

When the particular privacy campaign, processing activity, etc. is terminated or otherwise discontinued, the system may use the data model to determine if any of the associated personal data that has been collected and stored by the particular organization is now orphaned data.

In various embodiments, the system may be configured to identify orphaned data of a particular organization and automatically delete the data. In some implementations, in response to identifying the orphaned data, the system may present the data to one or more individuals associated with the particular organization (e.g., a privacy officer) and prompt the one or more individuals to indicate why the orphaned data is being stored by the particular organization. The system may then enable the individual to provide one or more valid reasons for the data's continued storage, or enable the one or more individuals to delete the particular orphaned data. In some embodiments, the system may automatically delete the orphaned data if, for example: (1) in response to determining that a reason provided by the individual is not a sufficient basis for the continued storage of the personal data; (2) the individual does not respond to the request to provide one or more valid reasons in a timely manner; (3) etc. In some embodiments, one or more other individuals may review the response provided indicating why the orphaned data is being stored, and in some embodiments, the one or more other individuals can delete the particular orphaned data.

In various embodiments, the system may be configured to review the data collection policy (e.g., how data is acquired, security of data storage, who can access the data, etc.) for the particular organization as well as one or more data retention metrics for the organization. For example, the one or more data retention metrics may include how much personal data is being collected, how long the data is held, how many privacy campaigns or other processes are using the personal data, etc. Additionally, the system may compare the particular organization's data collection policy and data retention metrics to the industry standards (e.g., in a particular field, based on a company size, etc.). In various embodiments, the system may be configured to generate a report that includes the comparison and provide the report to the particular organization (e.g., in electronic format).

In particular embodiments, the system may be configured advise the particular organization to delete data and identify particular data that should be deleted. In some embodiments, the system may automatically delete particular data (e.g., orphaned data). Further, the system may be configured to calculate and provide a risk score for particular data or the organization's data collection policy overall. In particular embodiments, the system may be configured to calculate the risk score based on the combinations of personal data elements in the data inventory of the organization (e.g., where an individual's phone number is stored in one location and their mailing address is stored in another location), and as such the risk may be increased because the additional pieces of personal information can make the stored data more sensitive.

In particular embodiments, any entity (e.g., organization, company, etc.) that collects, stores, processes, etc. personal data may require one or more of: (1) consent from a data subject from whom the personal data is collected and/or processed; and/or (2) a lawful basis for the collection and/or processing of the personal data. In various embodiments, the entity may be required to, for example, demonstrate that a data subject has freely given specific, informed, and unambiguous indication of the data subject's agreement to the processing of his or her personal data for one or more specific purposes (e.g., in the form of a statement or clear affirmative action). As such, in particular embodiments, an organization may be required to demonstrate a lawful basis for each piece of personal data that the organization has collected, processed, and/or stored. In particular, each piece of personal data that an organization or entity has a lawful basis to collect and process may be tied to a particular processing activity undertaken by the organization or entity.

A particular organization may undertake a plurality of different privacy campaigns, processing activities, etc. that involve the collection and storage of personal data. In some embodiments, each of the plurality of different processing activities may collect redundant data (e.g., may collect the same personal data for a particular individual more than once), and may store data and/or redundant data in one or more particular locations (e.g., on one or more different servers, in one or more different databases, etc.). In this way, because of the number of processing activities that an organization may undertake, and the amount of data collected as part of those processing activities over time, one or more data systems associated with an entity or organization may store or continue to store data that is not associated with any particular processing activity (e.g., any particular current processing activity). Under various legal and industry standards related to the collection and storage of personal data, such data may not have or may no longer have a legal basis for the organization or entity to continue to store the data. As such, organizations and entities may require improved systems and methods to maintain an inventory of data assets utilized to process and/or store personal data for which a data subject has provided consent for such storage and/or processing.

In various embodiments, the system is configured to provide a third-party data repository system to facilitate the receipt and centralized storage of personal data for each of a plurality of respective data subjects, as described herein. Additionally, the third-party data repository system is configured to interface with a centralized consent receipt management system.

In particular embodiments, the system may be configured to use one or more website scanning tools to, for example, identify a form (e.g., a webform) and locate a data asset where the input data is transmitted (e.g., Salesforce). Additionally, the system may be configured to add the data asset to the third-party data repository (e.g., and/or data map/data inventory) with a link to the form. In response to a user inputting form data (e.g., name, address, credit card information, etc.) of the form and submitting the form, the system may, based on the link to the form, create a unique subject identifier to submit to the third-party data repository and, along with the form data, to the data asset. Further, the system may use the unique subject identifier of a user to access and update each of the data assets of the particular organization. For example, in response to a user submitting a data subject access request to delete the user's personal data that the particular organization has stored, the system may use the unique subject identifier of the user to access and delete the user's personal data stored in all of the data assets (e.g., Salesforce, Eloqua, Marketo, etc.) utilized by the particular organization.

The system may, for example: (1) generate, for each of a plurality of data subjects, a respective unique subject identifier in response to submission, by each data subject, of a particular form; (2) maintain a database of each respective unique subject identifier; and (3) electronically link each respective unique subject identifier to each of: (A) a form initially submitted by the user; and (B) one or more data assets that utilize data received from the data subject via the form.

In various embodiments, the system may be configured to, for example: (1) identify a form used to collect one or more pieces of personal data, (2) determine a data asset of a plurality of data assets of the organization where input data of the form is transmitted, (3) add the data asset to the third-party data repository with an electronic link to the form, (4) in response to a user submitting the form, create a unique subject identifier to submit to the third-party data repository and, along with the form data provided by the user in the form, to the data asset, (5) submit the unique subject identifier and the form data provided by the user in the form to the third-party data repository and the data asset, and (6) digitally store the unique subject identifier and the form data provided by the user in the form in the third-party data repository and the data asset.

In some embodiments, the system may be further configured to, for example: (1) receive a data subject access request from the user (e.g., a data subject rights' request, a data subject deletion request, etc.), (2) access the third-party data repository to identify the unique subject identifier of the user, (3) determine which data assets of the plurality of data assets of the organization include the unique subject identifier, (4) access personal data of the user stored in each of the data assets of the plurality of data assets of the organization that include the unique subject identifier, and (5) take one or more actions based on the data subject access request (e.g., delete the accessed personal data in response to a data subject deletion request).

Various privacy and security policies (e.g., such as the European Union's General Data Protection Regulation, and other such policies) may provide data subjects (e.g., individuals, organizations, or other entities) with certain rights related to the data subject's personal data that is collected, stored, or otherwise processed by an entity. In particular, under various privacy and security policies, a data subject may be entitled to a right to erasure of any personal data associated with that data subject that has been at least temporarily stored by the entity (e.g., a right to be forgotten). In various embodiments, under the right to erasure, an entity (e.g., a data controller on behalf of another organization) may be obligated to erase personal data without undue delay under one or more of the following conditions: (1) the personal data is no longer necessary in relation to a purpose for which the data was originally collected or otherwise processed; (2) the data subject has withdrawn consent on which the processing of the personal data is based (e.g., and there is no other legal grounds for such processing); (3) the personal data has been unlawfully processed; (4) the data subject has objected to the processing and there is no overriding legitimate grounds for the processing of the data by the entity; and/or (5) for any other suitable reason or under any other suitable conditions.

In particular embodiments, a personal data deletion system may be configured to: (1) at least partially automatically identify and delete personal data that an entity is required to erase under one or more of the conditions discussed above; and (2) perform one or more data tests after the deletion to confirm that the system has, in fact, deleted any personal data associated with the data subject.

In particular embodiments, in response to a data subject submitting a request to delete their personal data from an entity's systems, the system may, for example: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., deleting a directory entry associated with the data); and/or (3) using any other suitable technique for deleting the personal data. In particular embodiments, as part of this process, the system may use any suitable data modelling technique to efficiently determine where all of the data subject's personal data is stored.

In various embodiments, the system may be configured to store (e.g., in memory) an indication that the data subject has requested to delete any of their personal data stored by the entity has been processed. Under various legal and industry policies/standards, the entity may have a certain period of time (e.g., a number of days) in order to comply with the one or more requirements related to the deletion or removal of personal data in response to receiving a request from the data subject or in response to identifying one or more of the conditions requiring deletion discussed above. In response to the receiving of an indication that the deletion request for the data subject's personal data has been processed or the certain period of time (described above) has passed, the system may be configured to perform a data test to confirm the deletion of the data subject's personal data.

In particular embodiments, when performing the data test, the system may be configured to provide an interaction request to the entity on behalf of the data subject. In particular embodiments, the interaction request may include, for example, a request for one or more pieces of data associated with the data subject (e.g., account information, etc.). In various embodiments, the interaction request is a request to contact the data subject (e.g., for any suitable reason). The system may, for example, be configured to substantially automatically complete a contact-request form (e.g., a webform made available by the entity) on behalf of the data subject. In various embodiments, when automatically completing the form on behalf of the data subject, the system may be configured to only provide identifying data, but not provide any contact data. In response to submitting the interaction request (e.g., submitting the webform), the system may be configured to determine whether the one or more computer systems have generated and/or transmitted a response to the data subject. The system may be configured to determine whether the one or more computer systems have generated and/or transmitted the response to the data subject by, for example, analyzing one or more computer systems associated with the entity to determine whether the one or more computer systems have generated a communication to the data subject (e.g., automatically) for transmission to an e-mail address or other contact method associated with the data subject, generated an action-item for an individual to contact the data subject at a particular contact number, etc.

In response to determining that the one or more computer systems has generated and/or transmitted the response to the data subject, the system may be configured to determine that the one or more computer systems has not complied with the data subject's request for deletion of their personal data from the one or more computer systems associated with the entity. In response, the system may generate an indication that the one or more computer systems has not complied with the data subject's request for deletion of their personal data from the one or more computer systems have, and store the indication in computer memory.

To perform the data test, for example, the system may be configured to: (1) access (e.g., manually or automatically) a form for the entity (e.g., a web-based "Contact Us" form); (2) input a unique identifier associated with the data subject (e.g., a full name or customer ID number) without providing contact information for the data subject (e.g., mailing address, phone number, email address, etc.); and (3) input a request, within the form, for the entity to contact the data subject to provide information associated with the data subject (e.g., the data subject's account balance with the entity). In response to submitting the form to the entity, the system may be configured to determine whether the data subject is contacted (e.g., via a phone call or email) by the one or more computer systems (e.g., automatically). In response to determining that the data subject has been contacted following submission of the form, the system may determine that the one or more computer systems have not fully deleted the data subject's personal data (e.g., because the one or more computer systems must still be storing contact information for the data subject in at least one location).

In particular embodiments, the system is configured to generate one or more test profiles for one or more test data subjects. For each of the one or more test data subjects, the system may be configured to generate and store test profile data such as, for example: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable test data. The system may then be configured to at least initially consent to processing or collection of personal data for the one or more test data subjects by the entity. The system may then request deletion, by the entity, of any personal data associated with a particular test data subject. In response to requesting the deletion of data for the particular test data subject, the system may then take one or more actions using the test profile data associated with the particular test data subjects in order to confirm that the one or more computer systems have, in fact, deleted the test data subject's personal data (e.g., any suitable action described herein). The system may, for example, be configured to: (1) initiate a contact request on behalf of the test data subject; (2) attempt to login to one or more user accounts that the system had created for the particular test data subject; and/or (3) take any other action, the effect of which could indicate a lack of complete deletion of the test data subject's personal data.

In response to determining that the one or more computer systems have not fully deleted a data subject's (or test data subject's) personal data, the system may then be configured, in particular embodiments, to: (1) flag the data subject's personal data for follow up by one or more privacy officers to investigate the lack of deletion; (2) perform one or more scans of one or more computing systems associated with the entity to identify any residual personal data that may be associated with the data subject; (3) generate a report indicating the lack of complete deletion; and/or (4) take any other suitable action to flag for follow-up the data subject, personal data, initial request to be forgotten, etc.

The system may, for example, be configured to test to ensure the data has been deleted by: (1) submitting a unique token of data through a form to a system (e.g., mark to); (2) in response to passage of an expected data retention time, test the system by calling into the system after the passage of the data retention time to search for the unique token. In response to finding the unique token, the system may be configured to determine that the data has not been properly deleted.

In various embodiments, a system may be configured to substantially automatically determine whether to take one or more actions in response to one or more identified risk triggers. For example, an identified risk trigger may be that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

In particular embodiments, the system may, for example, be configured to: (1) receive risk remediation data for a plurality of identified risk triggers from a plurality of different entities; (2) analyze the risk remediation data to determine a pattern in assigned risk levels and determined response to particular risk triggers; and (3) develop a model based on the risk remediation data for use in facilitating an automatic assessment of and/or response to future identified risk triggers.

In some embodiments, when a change or update is made to one or more processing activities and/or data assets (e.g., a database associated with a particular organization), the system may use data modeling techniques to update the risk remediation data for use in facilitating an automatic assessment of and/or response to future identified risk triggers. In various embodiments, when a privacy campaign, processing activity, etc. of the particular organization is modified (e.g., add, remove, or update particular information), then the system may use the risk remediation data for use in facilitating an automatic assessment of and/or response to future identified risk triggers.

In particular embodiments, the system may, for example, be configured to: (1) access risk remediation data for an entity that identifies one or more suitable actions to remediate a risk in response to identifying one or more data assets of the entity that may be affected by one or more potential risk triggers; (2) receive an indication of an update to the one or more data assets; (3) identify one or more potential updated risk triggers for an entity; (4) assess and analyze the one or more potential updated risk triggers to determine a relevance of a risk posed to the entity by the one or more potential updated risk triggers; (5) use one or more data modeling techniques to identify one or more data assets associated with the entity that may be affected by the risk; and (6) update the risk remediation data to include the one or more actions to remediate the risk in response to identifying the one or more potential updated risk triggers.

In any embodiment described herein, an automated classification system may be configured to substantially automatically classify one or more pieces of personal information in one or more documents (e.g., one or more text-based documents, one or more spreadsheets, one or more PDFs, one or more webpages, etc.). In particular embodiments, the system may be implemented in the context of any suitable privacy compliance system, which may, for example, be configured to calculate and assign a sensitivity score to a particular document based at least in part on one or more determined categories of personal information (e.g., personal data) identified in the one or more documents. As understood in the art, the storage of particular types of personal information may be governed by one or more government or industry regulations. As such, it may be desirable to implement one or more automated measures to automatically classify personal information from stored documents (e.g., to determine whether such documents may require particular security measures, storage techniques, handling, whether the documents should be destroyed, etc.).

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general-purpose computer, special-purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a data subject access request processing and fulfillment system 100 according to a particular embodiment. In various embodiments, the data subject access request processing and fulfillment system is part of a privacy compliance system (also referred to as a privacy management system), or other system, which may, for example, be associated with a particular organization and be configured to aid in compliance with one or more legal or industry regulations related to the collection and storage of personal data.

As may be understood from FIG. 1, the data subject access request processing and fulfillment system 100 includes one or more computer networks 115, a Data Model Generation Server 110, a Data Model Population Server 120, an Intelligent Identity Scanning Server 130 (which may automatically validate a DSAR requestor's identity), One or More Databases 140 or other data structures, one or more remote computing devices 150 (e.g., a desktop computer, laptop computer, tablet computer, smartphone, etc.), and One or More Third Party Servers 160. In particular embodiments, the one or more computer networks 115 facilitate communication between the Data Model Generation Server 110, Data Model Population Server 120, Intelligent Identity Scanning/Verification Server 130, One or More Databases 140, one or more remote computing devices 150 (e.g., a desktop computer, laptop computer, tablet computer, smartphone, etc.), One or More Third Party Servers 160, and DSAR Processing and Fulfillment Server 170. Although in the embodiment shown in FIG. 1, the Data Model Generation Server 110, Data Model Population Server 120, Intelligent Identity Scanning Server 130, One or More Databases 140, one or more remote computing devices 150 (e.g., a desktop computer, laptop computer, tablet computer, smartphone, etc.), and One or More Third Party Servers 160, and DSAR Processing and Fulfillment Server 170 are shown as separate servers, it should be understood that in other embodiments, the functionality of one or more of these servers and/or computing devices may, in different embodiments, be executed by a larger or smaller number of local servers, one or more cloud-based servers, or any other suitable configuration of computers.

The one or more computer networks 115 may include any of a variety of types of wired or wireless computer networks such as the Internet, a private intranet, a public switch telephone network (PSTN), or any other type of network. The communication link between the DSAR Processing and Fulfillment Server 170 and the One or More Remote Computing Devices 150 may be, for example, implemented via a Local Area Network (LAN) or via the Internet. In other embodiments, the One or More Databases 140 may be stored either fully or partially on any suitable server or combination of servers described herein.

Figure 2A:
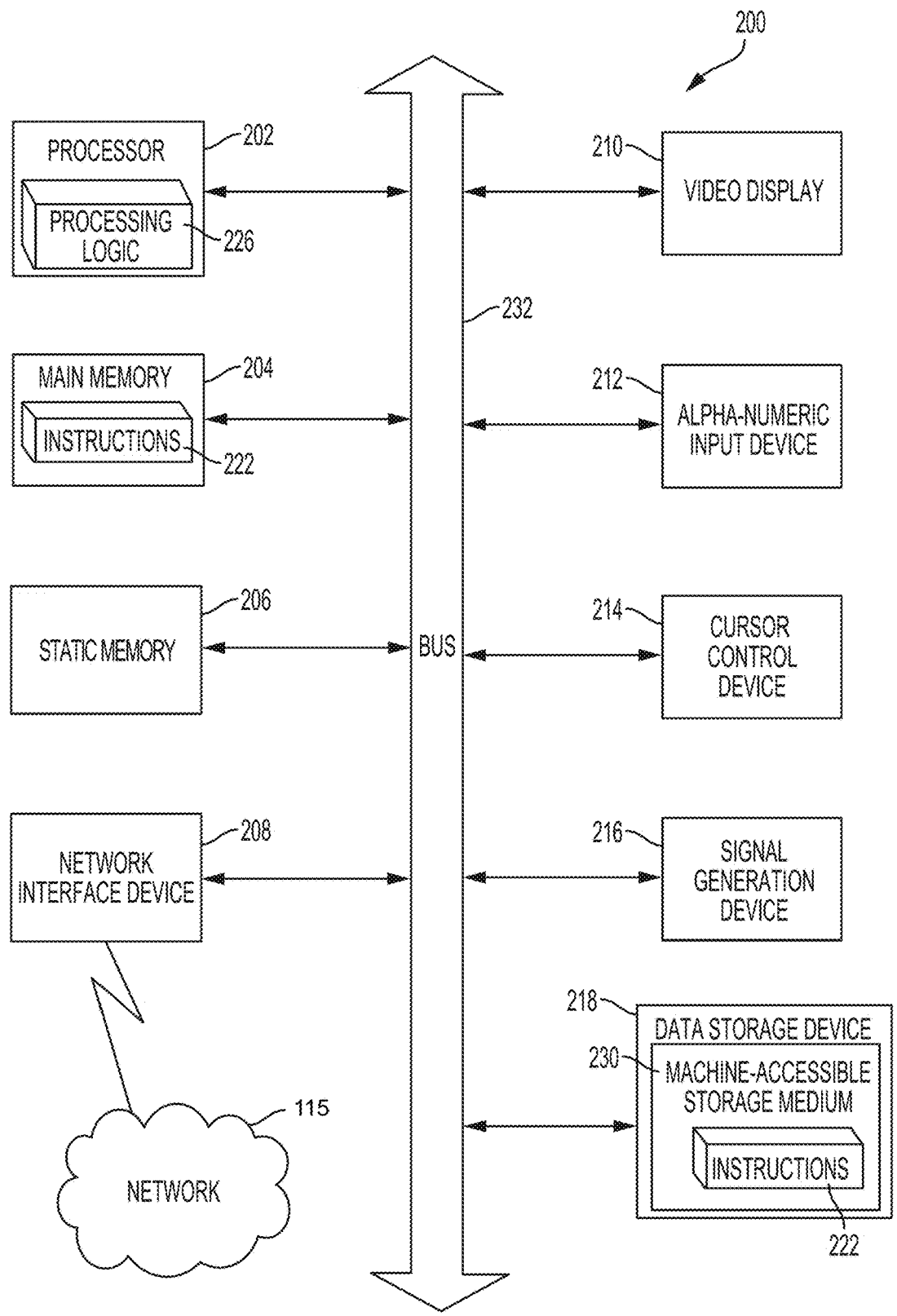
FIG. 2A is a schematic diagram of a computer (such as the data model generation server 110, or data model population server 120 of FIG. 1) that is suitable for use in various embodiments of the data subject request processing and fulfillment system shown in FIG. 1.

FIG. 2A illustrates a diagrammatic representation of a computer 200 that can be used within the data subject access request processing and fulfillment system 100, for example, as a client computer (e.g., one or more remote computing devices 150 shown in FIG. 1), or as a server computer (e.g., Data Model Generation Server 110 shown in FIG. 1). In particular embodiments, the computer 200 may be suitable for use as a computer within the context of the data subject access request processing and fulfillment system 100 that is configured for routing and/or processing DSAR requests and/or generating one or more data models used in automatically fulfilling those requests.

In particular embodiments, the computer 200 may be connected (e.g., networked) to other computers in a LAN, an intranet, an extranet, and/or the Internet. As noted above, the computer 200 may operate in the capacity of a server or a client computer in a client-server network environment, or as a peer computer in a peer-to-peer (or distributed) network environment. The Computer 200 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 200 includes a processing device 202, a main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 200 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software instructions 222) embodying any one or more of the methodologies or functions described herein. The software instructions 222 may also reside, completely or at least partially, within main memory 204 and/or within processing device 202 during execution thereof by computer 200—main memory 204 and processing device 202 also constituting computer-accessible storage media. The software instructions 222 may further be transmitted or received over a network 115 via network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The terms "computer-accessible storage medium", "computer-readable medium", and like terms should also be understood to include any medium that is capable of storing, encoding or carrying a set of instructions for execution by the computer and that cause the computer to perform any one or more of the methodologies of the present invention. These terms should accordingly be understood to include, but not be limited to, solid-state memories, optical and magnetic media, etc.

Systems for Managing Data Subject Access Requests

In various embodiments, the system may include a ticket management system and/or other systems for managing data subject access requests. In operation, the system may use one or more computer processors, which are operatively coupled to memory, to execute one or more software modules (which may be included in the Instructions 222 referenced above) such as: (1) a DSAR Request Routing Module 1000; and (4) a DSAR Prioritization Module. An overview of the functionality and operation of each of these modules is provided below.

Data Subject Access Request Routing Module 1000

Figure 2B:
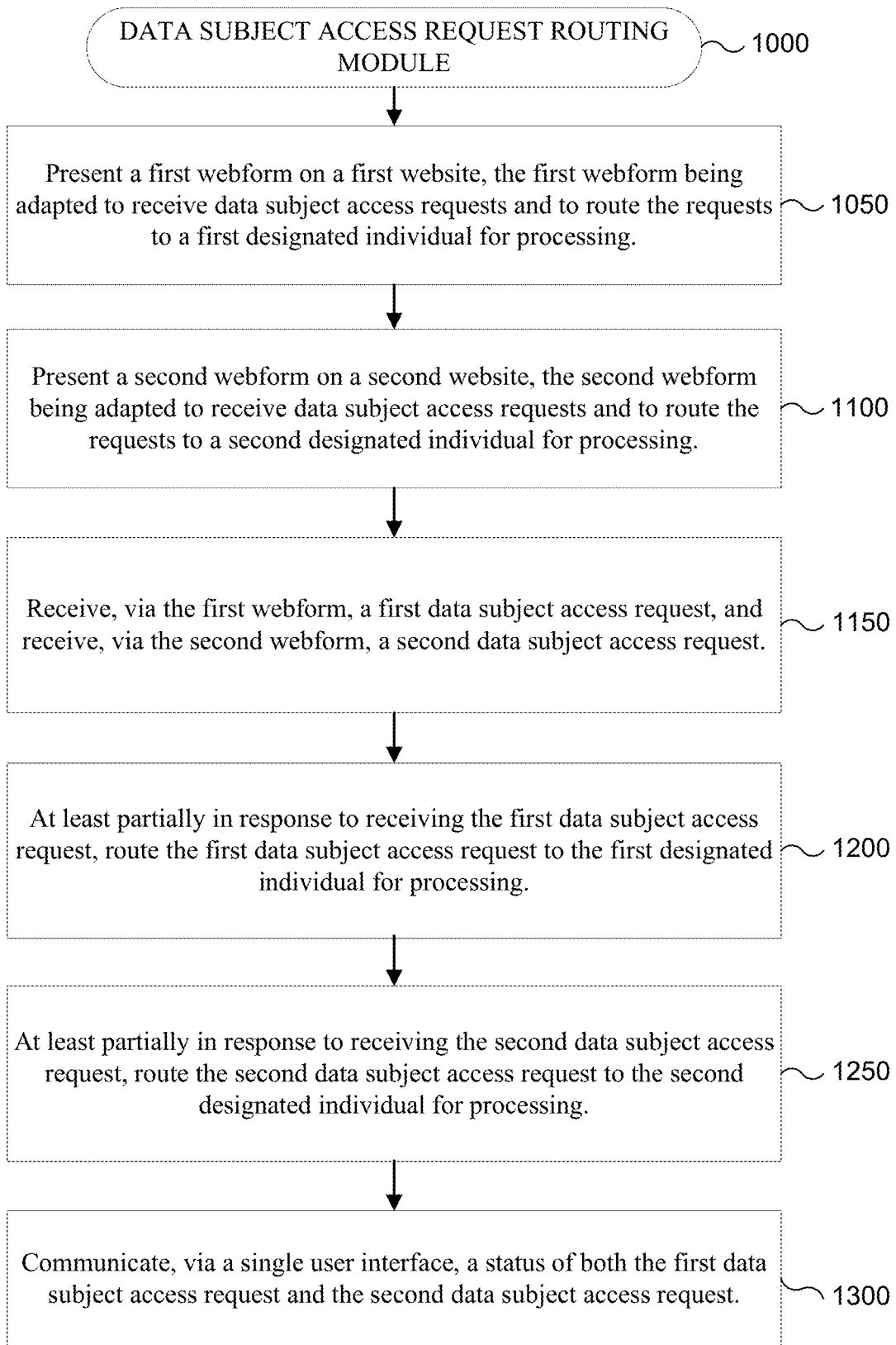
FIG. 2B is a flow chart depicting exemplary steps executed by a Data Subject Access Request Routing Module according to a particular embodiment

As shown in FIG. 2B, a Data Subject Access Request Routing Module 1000, according to particular embodiments, is adapted for executing the steps of: (1) at Step 1050, presenting, by at least one computer processor, a first webform on a first web site, the first webform being adapted to receive data subject access requests and to route the requests to a first designated individual (e.g., an individual who is associated with a first sub-organization of a particular organization—e.g., an employee of the first sub-organization) for processing (in various embodiments, "presenting a webform on a website" may comprise, for example: (A) providing a button, link, or other selectable indicium on the website that, when selected, causes the system to display the webform, or (B) displaying the webform directly on the website); (2) at Step 1100 presenting, by at least one computer processor, a second webform on a second website, the second webform being adapted to receive data subject access requests and to route the requests to a second designated individual (e.g., an individual who is associated with a second sub-organization of a particular organization—e.g., an employee of the second sub-organization) for processing; (3) at Step 1150, receiving, by at least one computer processor, via the first webform, a first data subject access request; (4) at Step 1200, at least partially in response to the receiving the first data subject access request, automatically routing the first data subject access request to the first designated individual for handling; (5) at Step 1250, at least partially in response to the receiving the second data subject access request, automatically routing the second data subject access request to the second designated individual for handling; and (6) at Step 1300, communicating, via a single user interface, a status of both the first data subject access request and the second data subject access request.

In particular embodiments: (1) the first website is a website of a first sub-organization of a particular parent organization; (2) the second website is a website of a second sub-organization of the particular parent organization; and (3) the computer-implemented method further comprises communicating, by at least one computer processor, via a single user interface, a status of each of said first data subject access request and said second data subject access request (e.g., to an employee of—e.g., privacy officer of—the parent organization). As discussed in more detail below, this single user interface may display an indication, for each respective one of the first and second data subject access requests, of a number of days remaining until a deadline for fulfilling the respective data subject access request.

In certain embodiments, the single user interface is adapted to facilitate the deletion or assignment of multiple data subject access requests to a particular individual for handling in response to a single command from a user (e.g., in response to a user first selecting multiple data subject access requests from the single user interface and then executing an assign command to assign each of the multiple requests to a particular individual for handling).

In particular embodiments, the system running the Data Subject Access Request Routing Module 1000, according to particular embodiments, may be adapted for, in response to receiving each data subject access request, generating an ID number (e.g., a transaction ID or suitable Authentication Token) for the first data subject access request, which may be used later, by the DSAR requestor, to access information related to the DSAR, such as personal information requested via the DSAR, the status of the DSAR request, etc. To facilitate this, the system may be adapted for receiving the ID number from an individual and, at least partially in response to receiving the ID number from the individual, providing the individual with information regarding status of the data subject access request and/or information previously requested via the data subject access request.

In particular embodiments, the system may be adapted to facilitate the processing of multiple different types of data subject access requests. For example, the system may be adapted to facilitate processing: (1) requests for all personal data that an organization is processing for the data subject (a copy of the personal data in a commonly used, machine-readable format); (2) requests for all such personal data to be deleted; (3) requests to update personal data that the organization is storing for the data subject; (4) requests to opt out of having the organization use the individual's personal information in one or more particular ways (e.g., per the organization's standard business practices), or otherwise change the way that the organization uses the individual's personal information; and/or (5) the filing of complaints.

In particular embodiments, the system may execute one or more steps (e.g., any suitable step or steps discussed herein) automatically. For example, the system may be adapted for: (1) receiving, from the first designated individual, a request to extend a deadline for satisfying the first data subject access request; (2) at least partially in response to receiving the extension request, automatically determining, by at least one processor, whether the requested extension complies with one or more applicable laws or internal policies; and (3) at least partially in response to determining that the requested extension complies with the one or more applicable laws or internal policies, automatically modifying the deadline, in memory, to extend the deadline according to the extension request. The system may be further adapted for, at least partially in response to determining that the requested extension does not comply with the one or more applicable laws or internal policies, automatically rejecting the extension request. In various embodiments, the system may also, or alternatively, be adapted for: (1) at least partially in response to determining that the requested extension does not comply with the one or more applicable laws or internal policies, automatically modifying the length of the requested extension to comply with the one or more applicable laws or internal policies; and (2) automatically modifying the deadline, in memory, to extend the deadline according to the extension request.

In various embodiments, the system may be adapted for: (1) automatically verifying an identity of a particular data subject access requestor placing the first data subject access request; (2) at least partially in response to verifying the identity of the particular data subject access requestor, automatically obtaining, from a particular data model, at least a portion of information requested in the first data subject access request; and (3) after obtaining the at least a portion of the requested information, displaying the obtained information to a user as part of a fulfillment of the first data subject access request. The information requested in the first data subject access request may, for example, comprise at least substantially all (e.g., most or all) of the information regarding the first data subject that is stored within the data model.

In various embodiments, the system is adapted for: (1) automatically verifying, by at least one computer processor, an identity of a particular data subject access requestor placing the first data subject access request; and (2) at least partially in response to verifying the identity of the particular data subject access requestor, automatically facilitating an update of personal data that an organization associated with the first webform is processing regarding the particular data subject access requestor.

Similarly, in particular embodiments, the system may be adapted for: (1) automatically verifying, by at least one computer processor, an identity of a particular data subject access requestor placing the first data subject access request; and (2) at least partially in response to verifying the identity of the particular data subject access requestor, automatically processing a request, made by the particular data subject access requestor, to opt out of having the organization use the particular data subject access requestor's personal information in one or more particular ways.

The system may, in various embodiments, be adapted for: (1) providing, by at least one computer processor, a webform creation tool that is adapted for receiving webform creation criteria from a particular user, the webform creation criteria comprising at least one criterion from a group consisting of: (A) a language that the form will be displayed in; (B) what information is to be requested from data subjects who use the webform to initiate a data subject access request; and (C) who any data subject access requests that are received via the webform will be routed to; and (2) executing the webform creation tool to create both the first webform and the second webform.

In light of the discussion above, although the Data Subject Access Request Routing Module 1000 is described as being adapted to, in various embodiments, route data subject access requests to particular individuals for handling, it should be understood that, in particular embodiments, this module may be adapted to process at least part of, or all of, particular data subject access requests automatically (e.g., without input from a human user). In such cases, the system may or may not route such automatically-processed requests to a designated individual for additional handling or monitoring. In particular embodiments, the system may automatically fulfill all or a portion of a particular DSAR request, automatically assign a transaction ID and/or authentication token to the automatically fulfilled transaction, and then display the completed DSAR transaction for display on a system dashboard associated with a particular responsible individual that would otherwise have been responsible for processing the DSAR request (e.g., an individual to whom the a webform receiving the DSAR would otherwise route DSAR requests). This may be helpful in allowing the human user to later track, and answer any questions about, the automatically-fulfilled DSAR request.

It should also be understood that, although the system is described, in various embodiments, as receiving DSAR requests via multiple webforms, each of which is located on a different website, the system may, in other embodiments, receive requests via only a single webform, or through any other suitable input mechanism other than a webform (e.g., through any suitable software application, request via SMS message, request via email, data transfer via a suitable API, etc.)

In various embodiments, the system may be adapted to access information needed to satisfy DSAR requests via one or more suitable data models. Such data models include those that are described in greater detail in U.S. patent application Ser. No. 15/996,208, filed Jun. 1, 2018, which, as noted above, is incorporated herein by reference. In various embodiments, the system is adapted to build and access such data models as described in this earlier-filed U.S. patent application.

As an example, in fulfilling a request to produce, modify, or delete, any of a data subject's personal information that is stored by a particular entity, the system may be adapted to access a suitable data model to identify any personal data of the data subject that is currently being stored in one or more computer systems associated with the particular entity. After using the data model to identify the data, the system may automatically process the data accordingly (e.g., by modifying or deleting it, and/or sharing it with the DSAR requestor).

DSAR Prioritization Module

A DSAR Prioritization Module, according to various embodiments, is adapted for (1) executing the steps of receiving a data subject access request; (2) at least partially in response to receiving the data subject access request, obtaining metadata regarding a data subject of the data subject access request; (3) using the metadata to determine whether a priority of the DSAR should be adjusted based on the obtained metadata; and (4) in response to determining that the priority of the DSAR should be adjusted based on the obtained metadata, adjusting the priority of the DSAR.

The operation of various embodiments of the various software modules above is described in greater detail below. It should be understood that the various steps described herein may be executed, by the system, in any suitable order and that various steps may be omitted, or other steps may be added in various embodiments.

Operation of Example Implementation

Figure 5:

FIGS. 3-43 are screen shots that demonstrate the operation of a particular embodiment. FIGS. 3-6 show a graphical user interface (GUI) of an example webform construction tool. FIG. 3 shows a user working to design a webform called "Web_form_1". As may be understood from the vertical menu shown on the left-hand side of the screen, the webform construction tool allows users to design a webform by: (1) specifying the details of the form (via the "Form Details" tab); (2) defining the fields that will be displayed on the webform (via the "Webform Fields" tab); (3) defining the styling of the webform (via the "Form Styling" tab); and (4) defining various settings associated with the webform (via the "Settings" tab). As shown in FIGS. 4-6, the user may also specify text to be displayed on the webform (e.g., via a "Form Text" tab).

Figure 4:
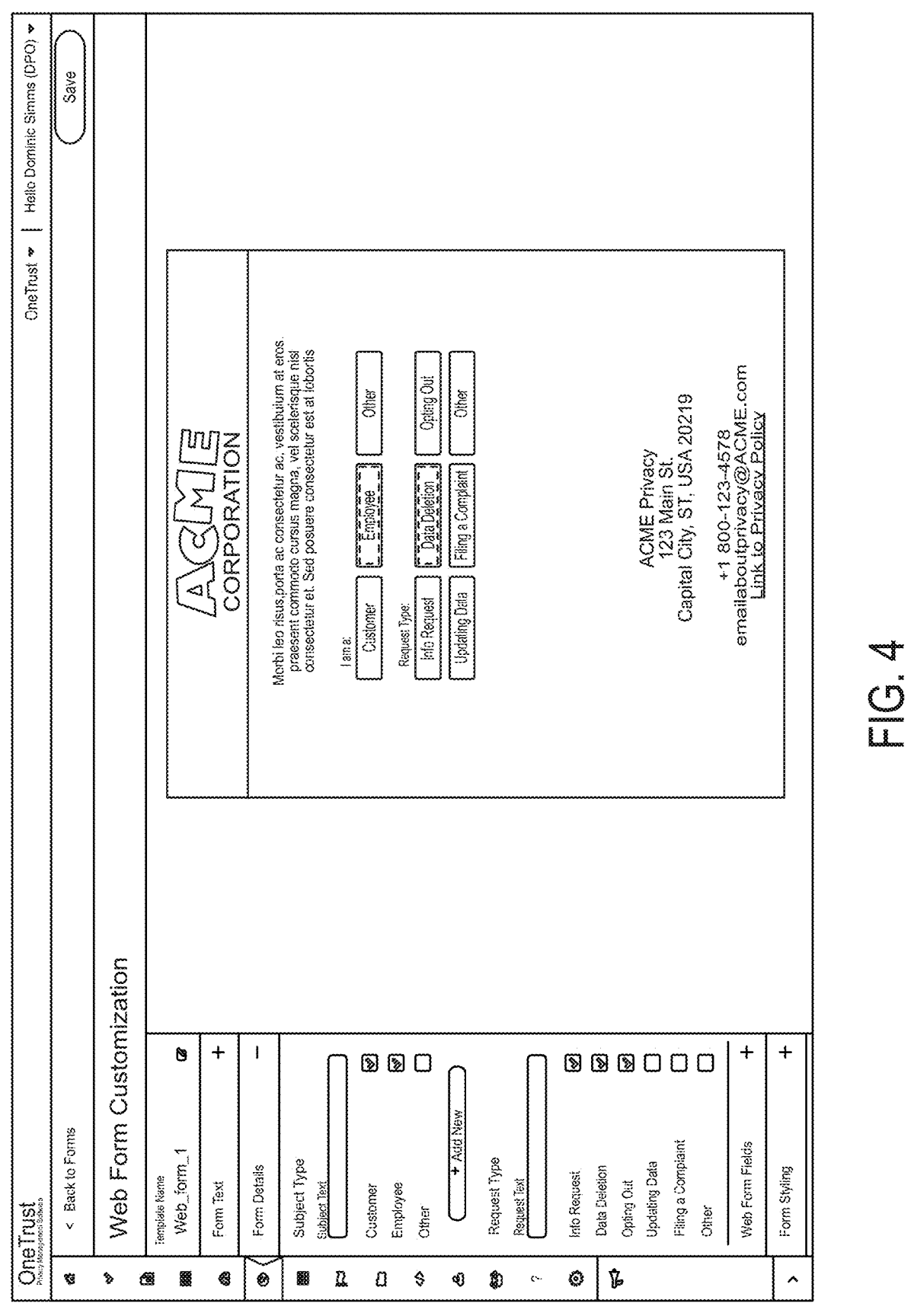

FIG. 4 shows that, by selecting the "Form Details" tab, the user may define which answers a requestor will be able to specify on the webform in response to prompts for information regarding what type of individual they are (customer, employee, etc.) and what type of request they are making via the webform. Example request types include: (1) a request for all personal data that an organization is processing for the data subject (a copy of the personal data in a commonly used, machine-readable format); (2) a request for all such personal data to be deleted; (3) a request to update personal data that the organization is storing for the data subject; (4) a request to opt out of having the organization use the individual's personal information in one or more particular ways (e.g., per the organization's standard business practices); (5) file a complaint; and/or (6) other.

FIG. 5 shows that, by selecting the "Settings" tab, the user may specify various system settings, such as whether Captcha will be used to verify that information is being entered by a human, rather than a computer.

Figure 6:
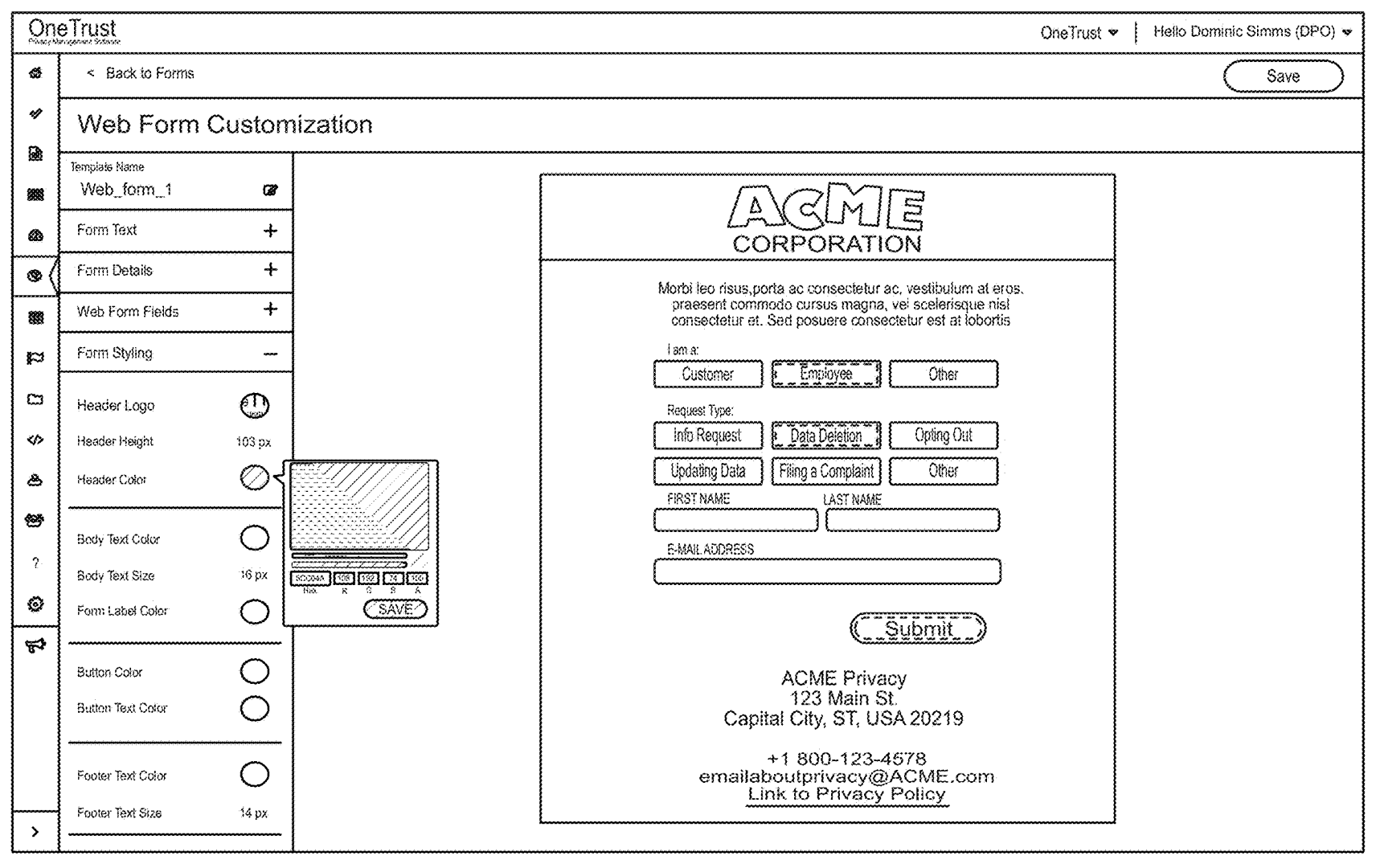

FIG. 6 shows that, by selecting the Form Styling tab, the user may specify the styling of the webform. The styling may include, for example: (1) a header logo; (2) header height; (3) header color; (4) body text color; (5) body text size; (6) form label color; (7) button color; (8) button text color; (9) footer text color; (10) footer text size; and/or any other suitable styling related to the webform.

In other embodiments, the system is configured to enable a user to specify, when configuring a new webform, what individual at a particular organization (e.g., company) will be responsible for responding to requests made via the webform. The system may, for example, enable the user to define a specific default sub-organization (e.g., within the organization) responsible for responding to DSAR's submitted via the new webform. As such, the system may be configured to automatically route a new DSAR made via the new webform to the appropriate sub-organization for processing and fulfillment. In various embodiments, the system is configured to route one or more various portions of the DSAR to one or more different sub-organizations within the organization for handling.

In particular embodiments, the system may include any suitable logic for determining how the webform routes data subject access requests. For example, the system may be adapted to determine which organization or individual to route a particular data subject access request to based, at least in part, on one or more factors selected from a group consisting of: (1) the data subject's current location; (2) the data subject's country of residence; (3) the type of request being made; (4) the type of systems that contain (e.g., store and/or process) the user's personal data (e.g., in ADP, Salesforce, etc.); or any other suitable factor.

In particular embodiments, the system is configured to enable a user generating webforms to assign multiple webforms to multiple different respective suborganizations within an organization. For example, an organization called ACME, Inc. may have a website for each of a plurality of different brands (e.g., sub-organizations) under which ACME sells products (e.g., UNICORN Brand T-shirts, GRIPP Brand Jeans, etc.). As may be understood in light of this disclosure, each website for each of the particular brands may include an associated webform for submitting DSAR's (either a webform directly on the web site, or one that is accessible via a link on the website). Each respective webform may be configured to route a DSAR made via its associated brand website to a particular sub-organization and/or individuals within ACME for handling DSAR's related to the brand.

As noted above, after the user uses the webform construction tool to design a particular webform for use on a particular web page, the webform construction tool generates code (e.g., HTML, code) that may be pasted into the particular web page to run the designed webform page. In particular embodiment, when pasted into the particular web page, the code generates a selectable button on the web page that, when selected, causes the system to display a suitable DSAR request webform.

Figure 7:
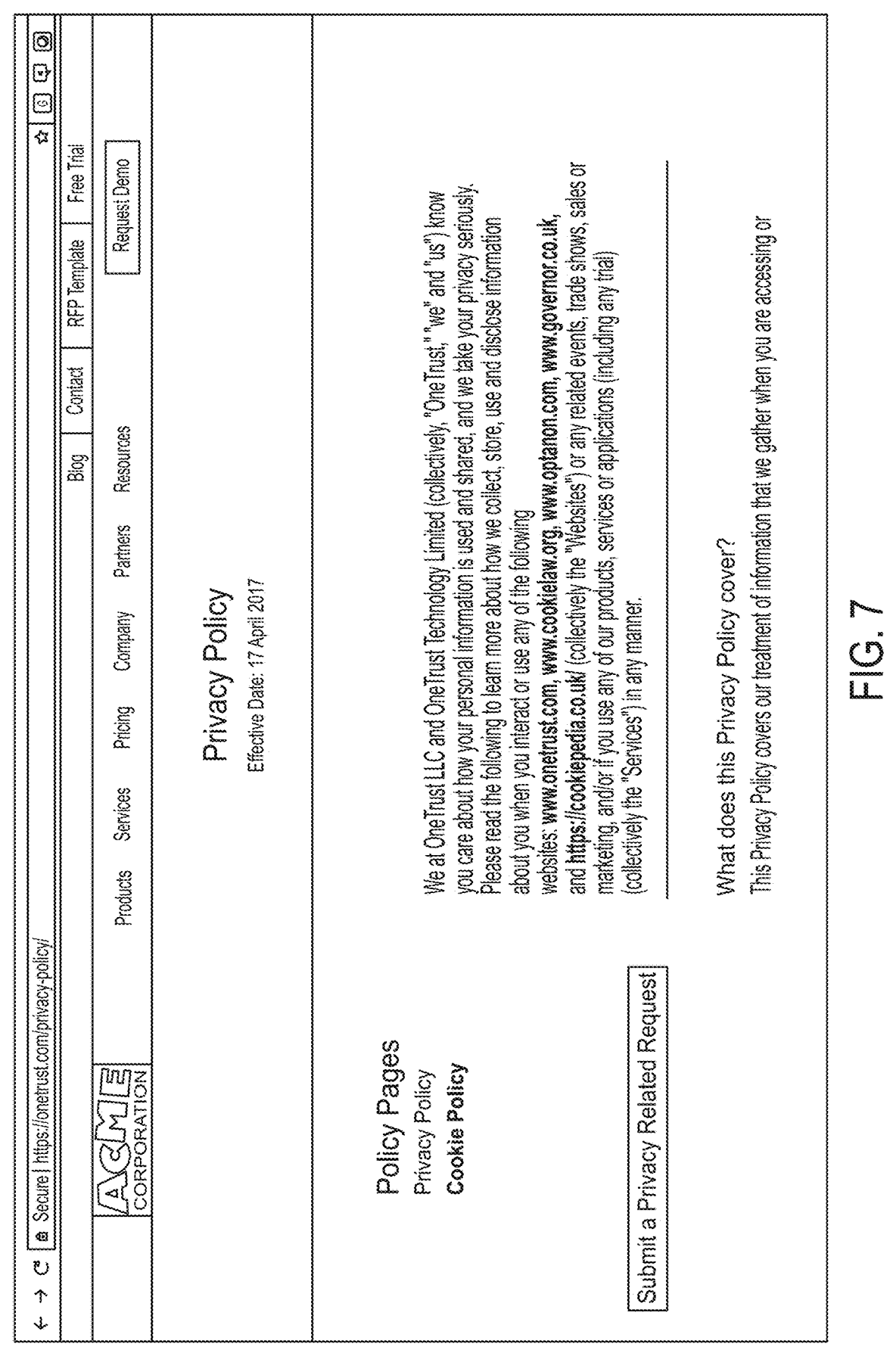

FIG. 7 shows the privacy webpage of a company (e.g., the ACME corporation). As shown in this figure, a requestor may submit a DSAR by selecting a "Submit a Privacy Related Request" button on the web page.

Figure 8:

FIG. 8 shows a webform that is displayed after a requestor selects the "Submit a Privacy Related Request" button on the privacy webpage of FIG. 7. As may be understood from this figure, the requestor may complete the webform by specifying which type of user they are, and what type of request they are making. The webform also asks the requestor to provide enough personal information to confirm their identity (e.g., and fulfill the request). As shown in this figure, the system may prompt a user submitting a DSAR to provide information for the user such as, for example: (1) what type of requestor the user is (e.g., employee, customer, etc.); (2) what the request involves (e.g., requesting info, opting out, deleting data, updating data, etc.); (3) first name; (4) last name; (5) email address; (6) telephone number; (7) home address; (8) one or more other pieces of identifying information; and/or (9) one or more details associated with the request. FIG. 9 shows an example populated version of the webform.

As shown in FIG. 10, after a requestor completes the webform and selects a "submit" indicia, the system displays a message to the requestor indicating that their DSAR has been successfully submitted. The system also displays a Request ID associated with the request. In response to the requestor successfully submitting the request, the system may also send an email (or other suitable communication) to the requestor confirming the request. An example of a suitable confirmation email is shown in FIG. 11.

In various embodiments, the system includes a dashboard that may be used by various individuals within an organization (e.g., one or more privacy officers of an organization) to manage multiple DSAR requests. As discussed above, the dashboard may display DSAR's submitted, respectively, to a single organization, any of multiple different sub-organizations (divisions, departments, subsidiaries etc.) of a particular organization, and/or any of multiple independent organizations. For example, the dashboard may display a listing of DSAR's that were submitted from a parent organization and from the parent organization's U.S. and European subsidiaries. This may be advantageous, for example, because it may allow an organization to manage all DSAR requests of all of its sub-organizations (and/or other related organizations) centrally.

FIGS. 12-23, 25-27, 29-34, and 41-43 depict various example user-interface screens of a DSAR request-management dashboard. As may be understood from FIG. 12, after an appropriate user (e.g., a privacy officer associated with a particular organization) logs into the system, the system may display a Data Subject Request Queue that may, for example, display a listing of all data subject access requests that the appropriate individual has been designated to process. As shown in FIG. 12, each data subject access request may be represented by a respective row of information that includes: (1) an ID number for the request; (2) the name of the data subject who has submitted the request; (3) the status of the request; (4) the number of days that are left to respond to the request (e.g., according to applicable laws and/or internal procedures); (5) an indication as to whether the deadline to respond to the request has been extended; (6) a creation date of the request; (7) an indication of the type of requestor that submitted the request (customer, employee, etc.); (8) the name of the individual who has been assigned to process the request (e.g., the respondent). This screen may also include selectable "Edit" and "Filter" buttons that respectively facilitate acting on and filtering the various requests displayed on the page.

As shown in FIG. 13, in response to a respondent selecting the edit button while a particular DSAR is highlighted, the system displays a dropdown menu allowing the respondent to select between taking the following actions: (1) verify the request; (2) assign the request to another individual; (3) request an extension; (4) reject the request; or (5) suspend the request.

Figure 14:
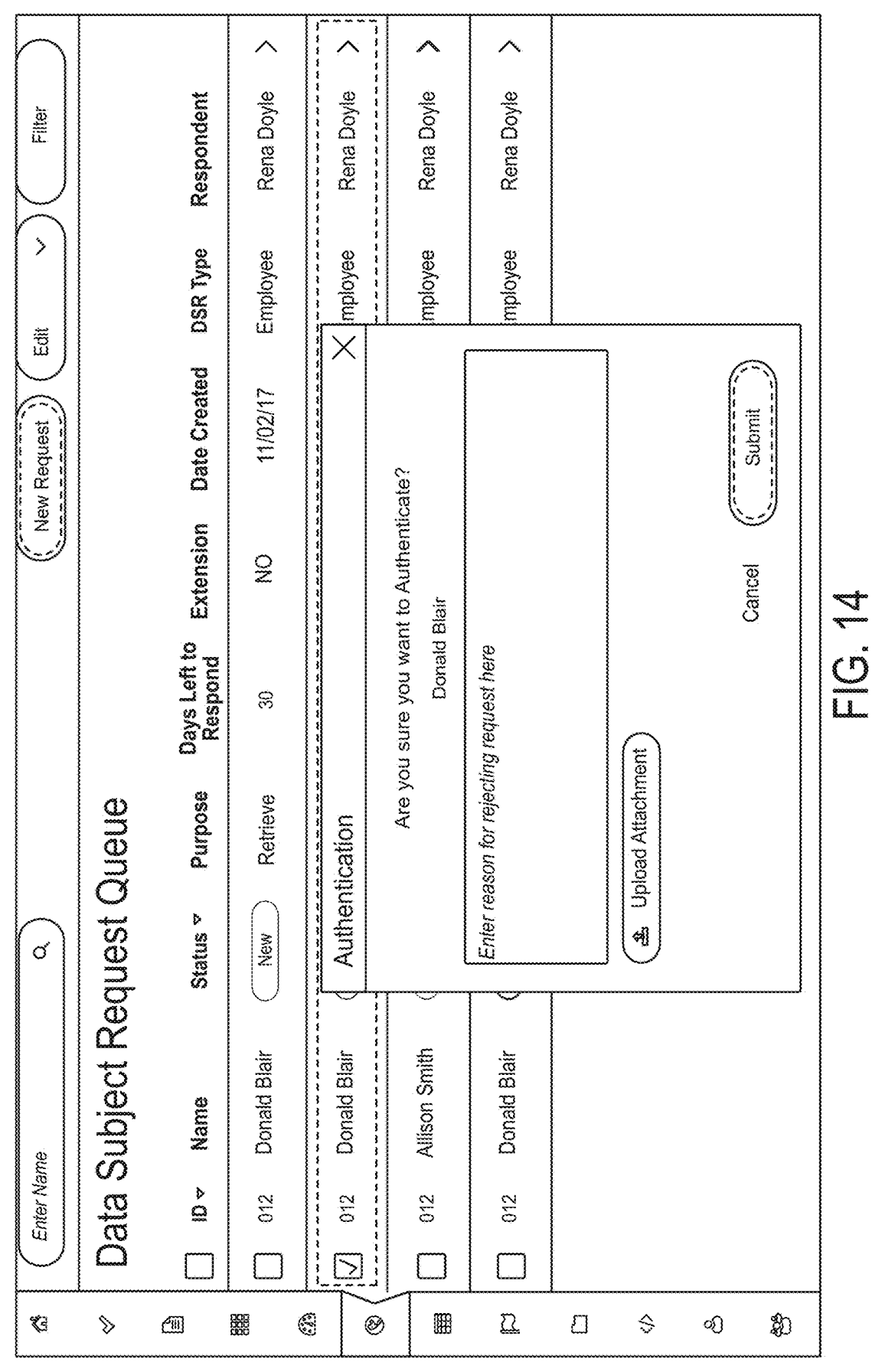

FIGS. 14 and 15 show a message that the system displays to the respondent in response to the respondent selecting the "verify" option. As shown in this figure, the system prompts the respondent to indicate whether they are sure that they wish to authenticate the request. The system also presents an input field where the respondent can enter text to be displayed to the requestor along with a request for the requestor to provide information verifying that they are the data subject associated with the request. After the respondent populates the input field, they may submit the request by selecting a "Submit" button.

In particular embodiments, the input field may enable the respondent to provide one or more supporting reasons for a decision, by the respondent, to authenticate the request. The respondent may also upload one or more supporting documents (such as an attachment). The supporting documents or information may include, for example, one or more documents utilized in confirming the requestor's identity, etc.

In response to the respondent selecting the Submit button, the system changes the status of the request to "In Progress" and also changes the color of the request's status from orange to blue (or from any other suitable color to any different suitable color)—see FIG. 16. The system also generates and sends a message (e.g., an electronic or paper message) to the requestor asking them to submit information verifying the request. The message may include the text that the respondent entered in the text box of FIG. 14.

Figure 18:
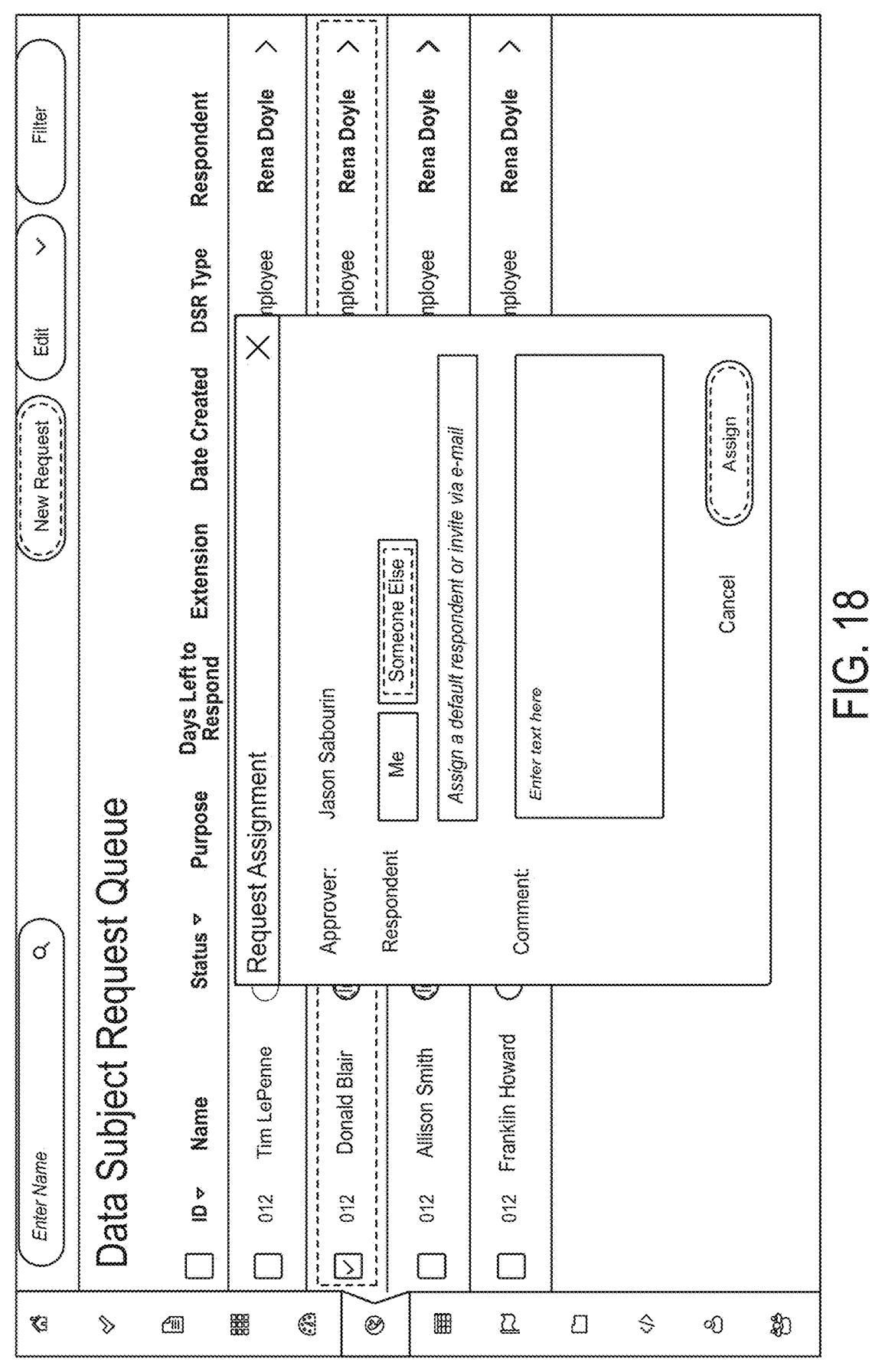
Figure 19:
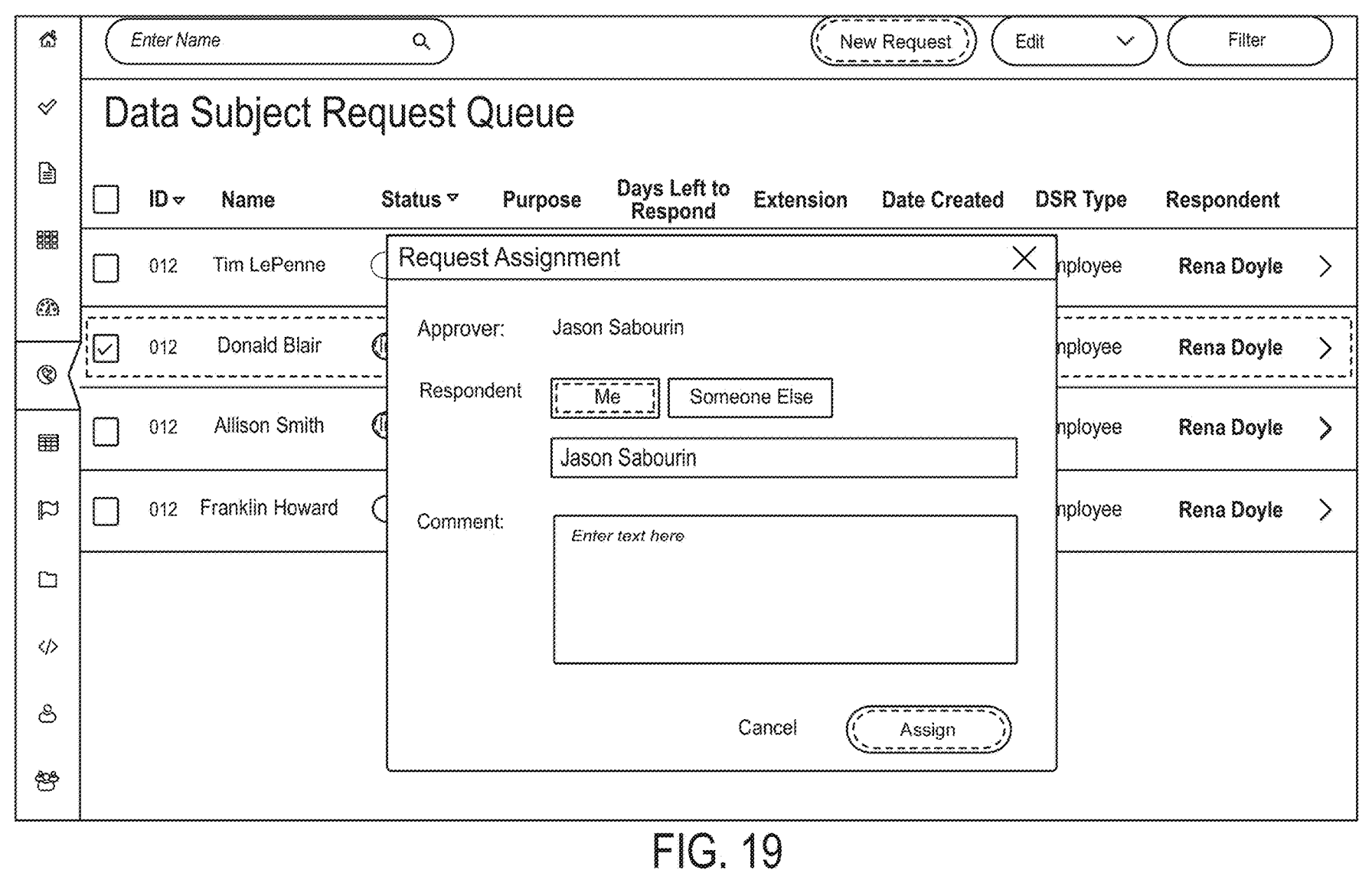

As shown in FIGS. 17-19, in response to a respondent selecting the "Edit" button and then selecting the "Assign" indicia from the displayed dropdown menu, the system displays a Request Assignment interface that allows a respondent to indicate who the request should be assigned to. For example, the respondent may indicate that they will be handling the request, or assign the request to another suitable individual, who may, for example, then be designated as the respondent for the request. If the respondent assigns the request to another individual for handling, the respondent may also provide an email address or other correspondence information for the individual. The Request Assignment interface includes a comment box for allowing a respondent to add a message to the individual that the assignment will be assigned to regarding the assignment. In response to the respondent selecting the "Assign" button, the system assigns the request to the designated individual for handling. If the request has been assigned to another, designated individual, the system automatically generates and sends a message (e.g., an electronic message such as an email or SMS message) to the designated individual informing them of the assignment.

Figure 21:
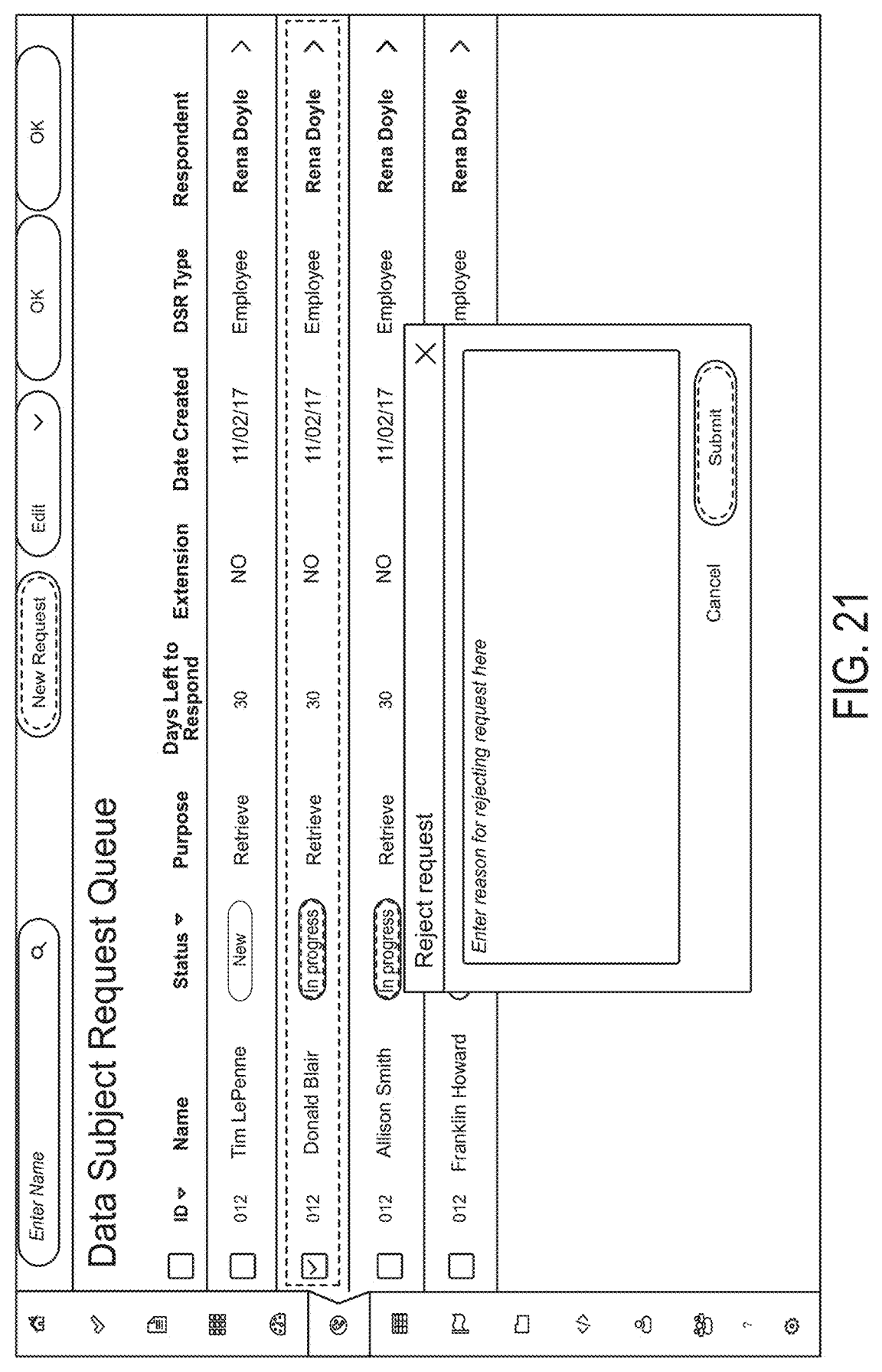

As shown in FIGS. 20-22, in response to a respondent selecting the "Edit" button and then selecting the "Reject" indicia from the displayed dropdown menu, the system displays a Reject Request interface. This interface includes a comment box for allowing a respondent to add a message to the requestor as to why the request was rejected. In response to the respondent selecting the "Submit" button, the system changes the status of the request to "Rejected" and changes the color of the request's status indicator to red (See FIG. 23). The system may also automatically generate a message (e.g., an electronic or paper message) to the requestor notifying them that their request has been rejected and displaying the text that the respondent entered into the Reject Request interface of FIG. 22. An example of such a message is shown in FIG. 24.

Figure 28:
Figure 37:
Figure 39:
Figure 41:
Figure 42:
Figure 43:
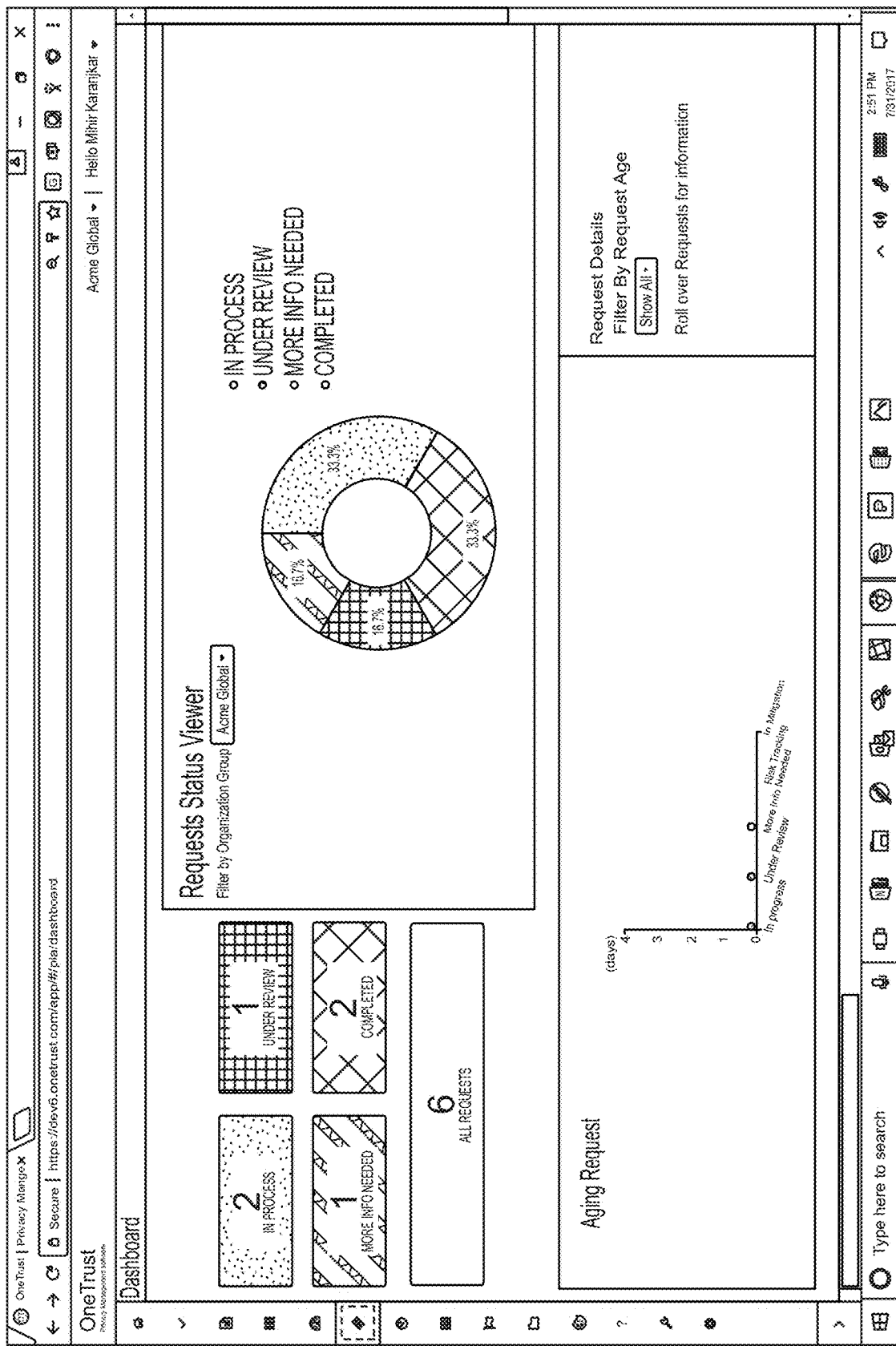
Figure 44:
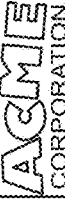

As shown in FIGS. 25-26, in response to a respondent selecting the "Edit" button and then selecting the "Request Extension" indicia from the displayed dropdown menu, the system displays a Request Extension interface. This includes a text box for allowing a user to indicate the number of days for which they would like to extend the current deadline for responding to the request. For example, the dialog box of FIG. 26 shows the respondent requesting that the current deadline be extended by 90 days. In response to the respondent entering a desired extension duration and selecting the "Submit" button, the system updates the deadline in the system's memory (e.g., in an appropriate data structure) to reflect the extension. For instance, in the example of FIG. 26, the system extends the deadline to be 90 days later than the current deadline. As shown in FIG. 27, the system also updates the "Days Left to Respond" field within the Data Subject Request Queue to reflect the extension (e.g., from 2 days from the current date to 92 days from the current date). As shown in FIG. 28, the system may also generate an appropriate message (e.g., an electronic, such as an email, or a paper message) to the requestor indicating that the request has been delayed. This message may provide a reason for the delay and/or an anticipated updated completion date for the request.

In particular embodiments, the system may include logic for automatically determining whether a requested extension complies with one or more applicable laws or internal policies and, in response, either automatically grant or reject the requested extension. For example, if the maximum allowable time for replying to a particular request is 90 days under the controlling laws and the respondent requests an extension that would result in the fulfillment of the request 91 or more days from the date that the request was submitted, the system may automatically reject the extension request. In various embodiments, the system may also communicate, to the respondent (e.g., via a suitable electronic message or text display on a system user interface) an explanation as to why the extension request was denied, and/or a maximum amount of time (e.g., a maximum number of days) that the deadline may be extended under the applicable laws or policies. In various embodiments, if the system determines that the requested extension is permissible under the applicable laws and/or policies, the system may automatically grant the extension.

In other embodiments, the system may be configured to automatically modify a length of the requested extension to conform with one or more applicable laws and/or policies. For example, if the request was for a 90-day extension, but only a 60 day extension is available under the applicable laws or regulations, the system may automatically grant a 60-day extension rather than a 90 day extension. The system may be adapted to also automatically generate and transmit a suitable message (e.g., a suitable electronic or paper communication) notifying them of the fact that the extension was granted for a shorter, specified period of time than requested.

Figure 30:
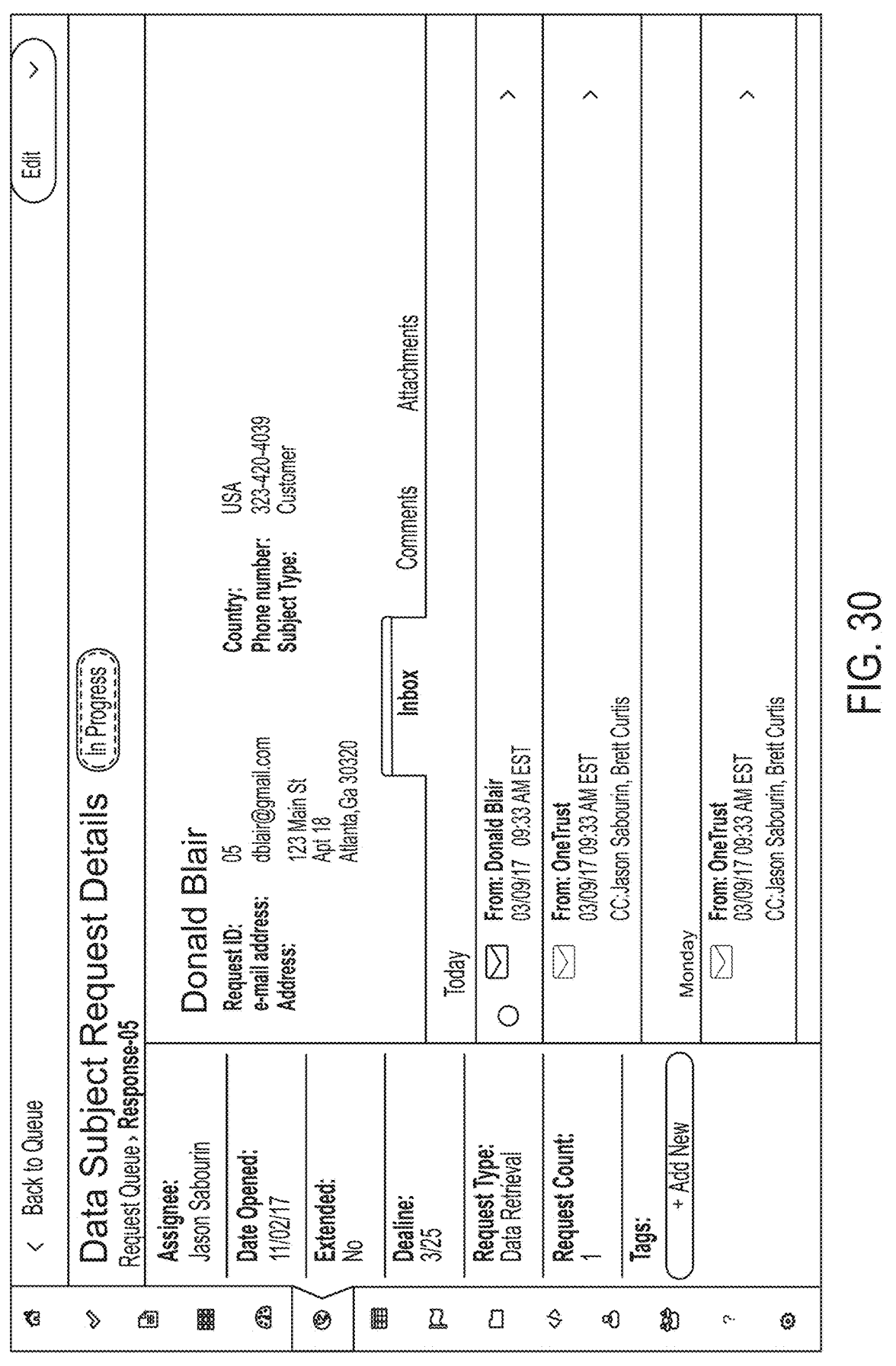

As shown in FIGS. 29-34, a respondent may obtain additional details regarding a particular request by selecting (e.g., clicking on) the request on the Data Subject Request Queue screen. For example, FIG. 30 shows a Data Subject Request Details screen that the system displays in response to a respondent selecting the "Donald Blair" request on the user interface screen of FIG. 35. As shown in FIG. 30, the Data Subject Request Details screen shows all correspondence between the organization and the requesting individual regarding the selected data subject access request. As may be understood from FIG. 31, when a respondent selects a particular correspondence (e.g., email), the system displays the correspondence to the respondent for review or other processing.

As shown in FIG. 32, in various embodiments, the system may provide a selectable "Reply" indicia that allows the respondent to reply to particular correspondence from an individual. As may be understood from this figure, in response to the respondent selecting the "Reply" indicia, the system may display a dropdown menu of various standard replies. For example, the dropdown menu may provide the option of generating a reply to the requestor indicating that the request has been rejected, is pending, has been extended, or that the request has been completed.

As shown in FIG. 33, in response to the respondent selecting "Reply as Completed", the system may generate a draft email to the requestor explaining that the request has been completed. The respondent may then edit this email and send the edited correspondence (e.g., via email) to the requestor by selecting a "Send as Complete" indicia. As shown in FIG. 34, the system may, in response, display an indicator adjacent the correspondence indicating that the correspondence included a reply indicating that the request was complete. This may be useful in allowing individuals to understand the contents of the correspondence without having to open it.

FIG. 35 shows an example email automatically generated by the system in response to the respondent selecting "Reply as Completed" on the screen shown in FIG. 32. As shown in FIG. 35, the correspondence may include a secure link that the requestor may select to access the data that was requested in the DSAR. In particular embodiments, the link is a link to a secure website, such as the website shown in FIG. 36, that provides access to the requested data (e.g., by allowing a user to download a .pdf file, or other suitable file, that includes the requested data). As shown in FIG. 36, the website may require multiple pieces of data to verify that the requestor is permitted to access the site. For example, in order to access the website, the requestor may be required to provide both the unique ID number of the request, and an authentication token, which the system may send to the user via email—See FIGS. 37 and 38.

FIGS. 39-43 are computer screen shots that depict additional user interfaces according to various embodiments.

Additional Concepts

Intelligent Prioritization of DSAR's

In various embodiments, the system may be adapted to prioritize the processing of DSAR's based on metadata about the data subject of the DSAR. For example, the system may be adapted for: (1) in response to receiving a DSAR, obtaining metadata regarding the data subject; (2) using the metadata to determine whether a priority of the DSAR should be adjusted based on the obtained metadata; and (3) in response to determining that the priority of the DSAR should be adjusted based on the obtained metadata, adjusting the priority of the DSAR.

Examples of metadata that may be used to determine whether to adjust the priority of a particular DSAR include: (1) the type of request, (2) the location from which the request is being made, (3) current sensitivities to world events, (4) a status of the requestor (e.g., especially loyal customer), or (5) any other suitable metadata.

In various embodiments, in response to the system determining that the priority of a particular DSAR should be elevated, the system may automatically adjust the deadline for responding to the DSAR. For example, the system may update the deadline in the system's memory and/or modify the "Days Left to Respond" field (See FIG. 13) to include a fewer number of days left to respond to the request. Alternatively, or in addition, the system may use other techniques to convey to a respondent that the request should be expedited (e.g., change the color of the request, send a message to the respondent that they should process the request before non-prioritized requests, etc.)

In various embodiments, in response to the system determining that the priority of a particular DSAR should be lowered, the system may automatically adjust the deadline for responding to the DSAR by adding to the number of days left to respond to the request.

Automatic Deletion of Data Subject Records Based on Detected Systems

In particular embodiments, in response a data subject submitting a request to delete their personal data from an organization's systems, the system may: (1) automatically determine where the data subject's personal data is stored; and (2) in response to determining the location of the data (which may be on multiple computing systems), automatically facilitate the deletion of the data subject's personal data from the various systems (e.g., by automatically assigning a plurality of tasks to delete data across multiple business systems to effectively delete the data subject's personal data from the systems). In particular embodiments, the step of facilitating the deletion may comprise, for example: (1) overwriting the data in memory; (2) marking the data for overwrite; (2) marking the data as free (e.g., and deleting a directory entry associated with the data); and/or (3) any other suitable technique for deleting the personal data. In particular embodiments, as part of this process, the system uses an appropriate data model (see discussion above) to efficiently determine where all of the data subject's personal data is stored.

Automatic Determination of Business Processes that Increase Chance of Deletion Requests In various embodiments, the system is adapted to store, in memory, a log of DSAR actions. The system may also store, in memory, additional information regarding the data subjects of each of the requests. The system may use this information, for example, to determine which business processes are most commonly associated with a data subject submitting a request to have their personal information deleted from the organization's systems. The organization may then use this information to revise the identified business processes in an effort to reduce the number of deletion requests issued by data subjects associated with the business processes.

As a particular example, the system may analyze stored information to determine that a high number (e.g., 15%) of all participants in a company's loyalty program submit requests to have their personal information deleted from the company's systems. In response to making this determination, the system may issue an electronic alert to an appropriate individual (e.g., a privacy officer of the company), informing them of the high rate of members of the company's loyalty program issuing personal data delete requests. This alert may prompt the individual to research the issue and try to resolve it.

Automated Data Subject Verification

In various embodiments, before a data subject request can be processed, the data subject's identity may need to be verified. In various embodiments, the system provides a mechanism to automatically detect the type of authentication required for a particular data subject based on the type of Data Subject Access Request being made and automatically issues a request to the data subject to verify their identity against that form of identification. For example, a subject rights request might only require two types of authentication, but a deletion request may require four types of data to verify authentication. The system may automatically detect which is type of authentication is required based on the DSAR and send an appropriate request to the data subject to verify their identity.

Stated more particularly, when processing a data subject access request, the system may be configured to verify an identity of the data subject prior to processing the request (e.g., or as part of the processing step). In various embodiments, confirming the identity of the data subject may, for example, limit a risk that a third-party or other entity may gain unlawful or unconsented to access to the requestor's personal data. The system may, for example, limit processing and fulfillment of requests relating to a particular data subject to requests that are originated by (e.g., received from) the particular data subject. When processing a data subject access request, the system may be configured to use various reasonable measures to verify the identity of the data subject who requests access (e.g., in particular in the context of online services and online identifiers). In particular embodiments, the system is configured to substantially automatically validate an identity of a data subject when processing the data subject access request.

For example, in particular embodiments, the system may be configured to substantially automatically (e.g., automatically) authenticate and/or validate an identity of a data subject using any suitable technique. These techniques may include, for example: (1) one or more credit-based and/or public- or private-information-based verification techniques; (2) one or more company verification techniques (e.g., in the case of a business-to-business data subject access request); (3) one or more techniques involving integration with a company's employee authentication system; (4) one or more techniques involving a company's (e.g., organization's) consumer portal authentication process; (5) etc. Various exemplary techniques for authenticating a data subject are discussed more fully below.

In particular embodiments, when authenticating a data subject (e.g., validating the data subject's identity), the system may be configured to execute particular identity confirmation steps, for example, by interfacing with one or more external systems (e.g., one or more third-party data aggregation systems). For example, the system, when validating a data subject's identity, may begin by verifying that a person with the data subject's name, address, social security number, or other identifying characteristic (e.g., which may have been provided by the data subject as part of the data subject access request) actually exists. In various embodiments, the system is configured to interface with (e.g., transmit a search request to) one or more credit reporting agencies (e.g., Experian, Equifax, TransUnion, etc.) to confirm that a person with one or more characteristics provided by the data subject exists. The system may, for example, interface with such credit reporting agencies via a suitable plugin (e.g., software plugin). Additionally, there might be a verification on behalf of a trusted third-party system (e.g., the controller).

In still other embodiments, the system may be configured to utilize one or more other third-party systems (e.g., such as LexisNexis, IDology, RSA, etc.), which may, for example, compile utility and phone bill data, property deeds, rental agreement data, and other public records for various individuals. The system may be configured to interface with one or more such third-party systems to confirm that a person with one or more characteristics provided by the data subject exists.

After the step of confirming the existence of a person with the one or more characteristics provided by the data subject, the system may be configured to confirm that the person making the data subject access request is, in fact, the data subject. The system may, for example, verify that the requestor is the data subject by prompting the requestor to answer one or more knowledge-based authentication questions (e.g., out-of-wallet questions). In particular embodiments, the system is configured to utilize one or more third-party services as a source of such questions (e.g., any of the suitable third-party sources discussed immediately above). The system may use third-party data from the one or more third-party sources to generate one or more questions. These one or more questions may include questions that a data subject should know an answer to without knowing the question ahead of time (e.g., one or more previous addresses, a parent or spouse name and/or maiden name, etc.).

FIG. 46 depicts an exemplary identity verification questionnaire. As may be understood from this figure, an identity verification questionnaire may include one or more questions whose responses include data that the system may derive from one or more credit agencies or other third-party data aggregation services (e.g., such as previous street addresses, close associates, previous cities lived in, etc.). In particular embodiments, the system is configured to provide these one or more questions to the data subject in response to receiving the data subject access request. In other embodiments, the system is configured to prompt the data subject to provide responses to the one or more questions at a later time (e.g., during processing of the request). In particular other embodiments, the system is configured to substantially automatically compare one or more pieces of information provided as part of the data subject access request to one or more pieces of data received from a third-party data aggregation service in order to substantially automatically verify the requestor's identity.

In still other embodiments, the system may be configured to prompt a requestor to provide one or more additional pieces of information in order to validate the requestor's identity. This information may include, for example: (1) at least a portion of the requestor's social security number (e.g., last four digits); (2) a name and/or place of birth of the requestor's father; (3) a name, maiden name, and/or place of birth of the requestor's mother; and/or (4) any other information which may be useful for confirming the requestor's identity (e.g., such as information available on the requestor's birth certificate). In other embodiments, the system may be configured to prompt the requestor to provide authorization for the company to check the requestor's social security or other private records (e.g., credit check authorization, etc.) to obtain information that the system may use to confirm the requestor's identity. In other embodiments, the system may prompt the user to provide one or more images (e.g., using a suitable mobile computing device) of an identifying document (e.g., a birth certificate, social security card, driver's license, etc.).

The system may, in response to a user providing one or more responses that matches information that the system receives from one or more third-party data aggregators or through any other suitable background, credit, or other search, substantially automatically authenticate the requestor as the data subject. The system may then continue processing the data subject's request, and ultimately fulfill their request.

In particular embodiments, such as embodiments in which the requestor includes a business (e.g., as in a business to business data subject access request), the system may be configured to authenticate the requesting business using one or more company verification techniques. These one or more company validation techniques may include, for example, validating a vendor contract (e.g., between the requesting business and the company receiving the data subject access request); receiving a matching token, code, or other unique identifier provided by the company receiving the data subject access request to the requesting business; receiving a matching file in possession of both the requesting business and the company receiving the data subject access request; receiving a signed contract, certificate (e.g., digital or physical), or other document memorializing an association between the requesting business and the company receiving the data subject access request; and/or any other suitable method of validating that a particular request is actually made on behalf of the requesting business (e.g., by requesting the requesting business to provide one or more pieces of information, one or more files, one or more documents, etc. that may only be accessible to the requesting business).

In other embodiments, the system may be configured to authenticate a request via integration with a company's employee or customer (e.g., consumer) authentication process. For example, in response to receiving a data subject access request that indicates that the data subject is an employee of the company receiving the data subject access request, the system may be configured to prompt the employee to login to the company's employee authentication system (e.g., Okta, Azure, AD, etc.) In this way, the system may be configured to authenticate the requestor based at least in part on the requestor successfully logging into the authentication system using the data subject's credentials. Similarly, in response to receiving a data subject access request that indicates that the data subject is a customer of the company receiving the data subject access request, the system may be configured to prompt the customer to login to an account associated with the company (e.g., via a consumer portal authentication process). In a particular example, this may include, for example, an Apple ID (for data subject access requests received by Apple). In this way, the system may be configured to authenticate the requestor based at least in part on the requestor successfully logging into the authentication system using the data subject's credentials. In some embodiments, the system may be configured to require the requestor to login using two-factor authentication or other suitable existing employee or consumer authentication process.

Data Subject Blacklist

In various embodiments, a particular organization may not be required to respond to a data subject access request that originates (e.g., is received from) a malicious requestor. A malicious requestor may include, for example: (1) a requestor (e.g., an individual) that submits excessive or redundant data subject access requests; (2) a group of requestors such as researchers, professors, students, NGOs, etc. that submit a plurality of requests for reasons other than those reasons provided by policy, law, etc.; (3) a competitor of the company receiving the data subject access request that is submitting such requests to tie up the company's resources unnecessarily; (4) a terrorist or other organization that may spam requests to disrupt the company's operation and response to valid requests; and/or (5) any other request that may fall outside the scope of valid requests made for reasons proscribed by public policy, company policy, or law. In particular embodiments, the system is configured to maintain a blacklist of such malicious requestors.

In particular embodiments, the system is configured to track a source of each data subject access request and analyze each source to identify sources from which: (1) the company receives a large volume of requests; (2) the company receives a large number of repeat requests; (3) etc. These sources may include, for example: (1) one or more particular IP addresses; (2) one or more particular domains; (3) one or more particular countries; (4) one or more particular institutions; (5) one or more particular geographic regions; (6) etc. In various embodiments, in response to analyzing the sources of the requests, the system may identify one or more sources that may be malicious (e.g., are submitting excessive requests).

In various embodiments, the system is configured to maintain a database of the identified one or more sources (e.g., in computer memory). In particular embodiments, the database may store a listing of identities, data sources, etc. that have been blacklisted (e.g., by the system). In particular embodiments, the system is configured to, in response to receiving a new data subject access request, cross reference the request with the blacklist to determine if the requestor is on the blacklist or is making the request from a blacklisted source. The system may then, in response to determining that the requestor or source is blacklisted, substantially automatically reject the request. In particular embodiments, the blacklist cross-referencing step may be part of the requestor authentication (e.g., verification) discussed above. In various embodiments, the system may be configured to analyze request data on a company by company basis to generate a blacklist. In other embodiments, the system may analyze global data (e.g., all data collected for a plurality of companies that utilize the data subject access request fulfillment system) to generate the blacklist.

In particular embodiments, the system may be configured to fulfill data subject access requests for the purpose of providing a data subject with information regarding what data the company collects and for what purpose, for example, so the data subject can ensure that the company is collecting data for lawful reasons. As such, the system may be configured to identify requestors and other sources of data requests that are made for other reasons (e.g., one or more reasons that would not obligate the company to respond to the request). These reasons may include, for example, malicious or other reasons such as: (1) research by an academic institution by one or more students or professors; (2) anticompetitive requests by one or more competitors; (3) requests by disgruntled former employees for nefarious reasons; (4) etc.

In particular embodiments, the system may, for example, maintain a database (e.g., in computer memory) of former employees. In other embodiments, the system may, for example: (1) identify a plurality of IP addresses associated with a particular entity (e.g., academic organization, competitor, etc.); and (2) substantially automatically reject a data subject access request that originates from the plurality of IP addresses. In such embodiments, the system may be configured to automatically add such identified IP addresses and/or domains to the blacklist.

In still other embodiments, the system is configured to maintain a listing of blacklisted names of particular individuals. These may include, for example, one or more individuals identified (e.g., by an organization or other entity) as submitting malicious data subject access requests).

Figure 47:
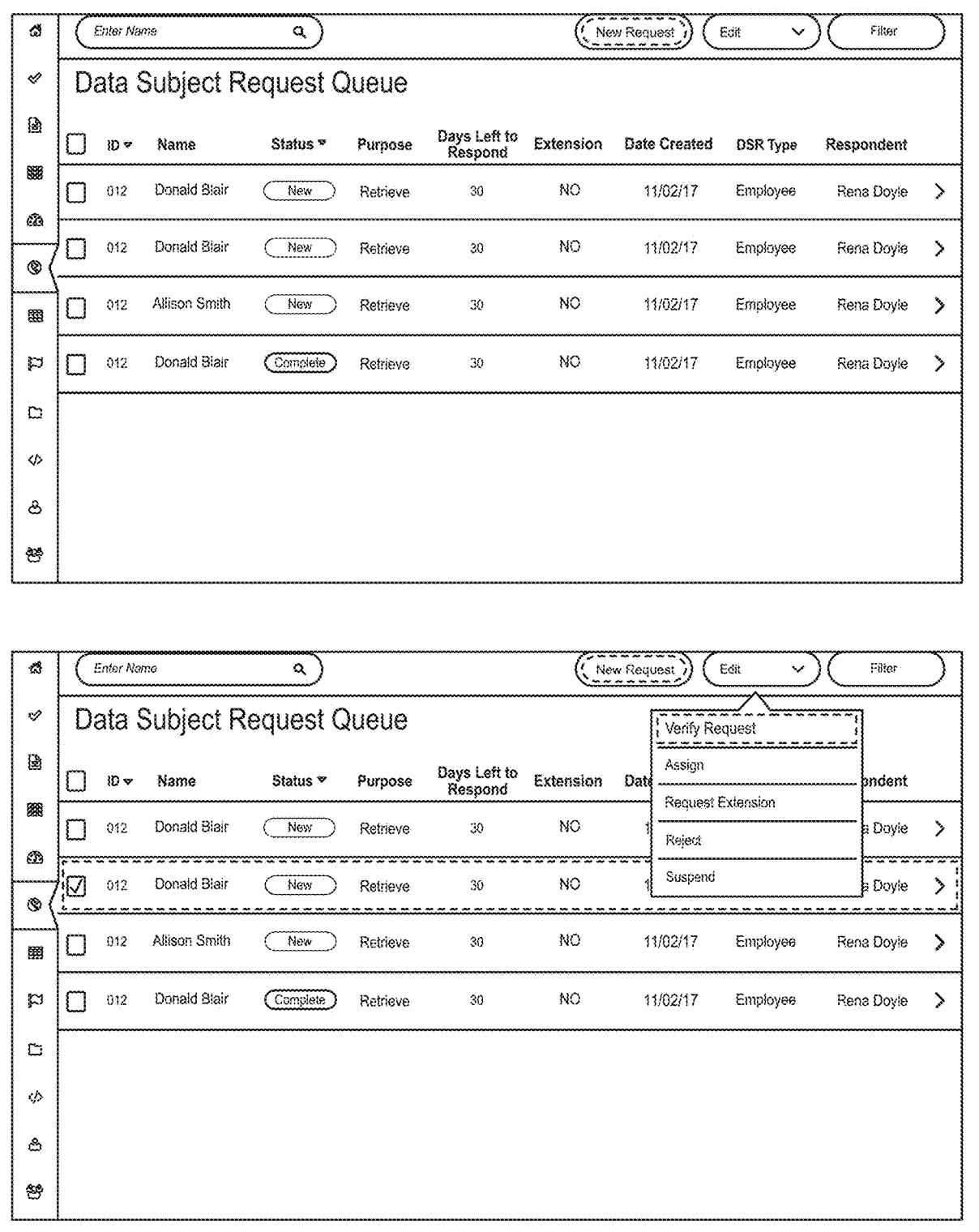
Figure 48:
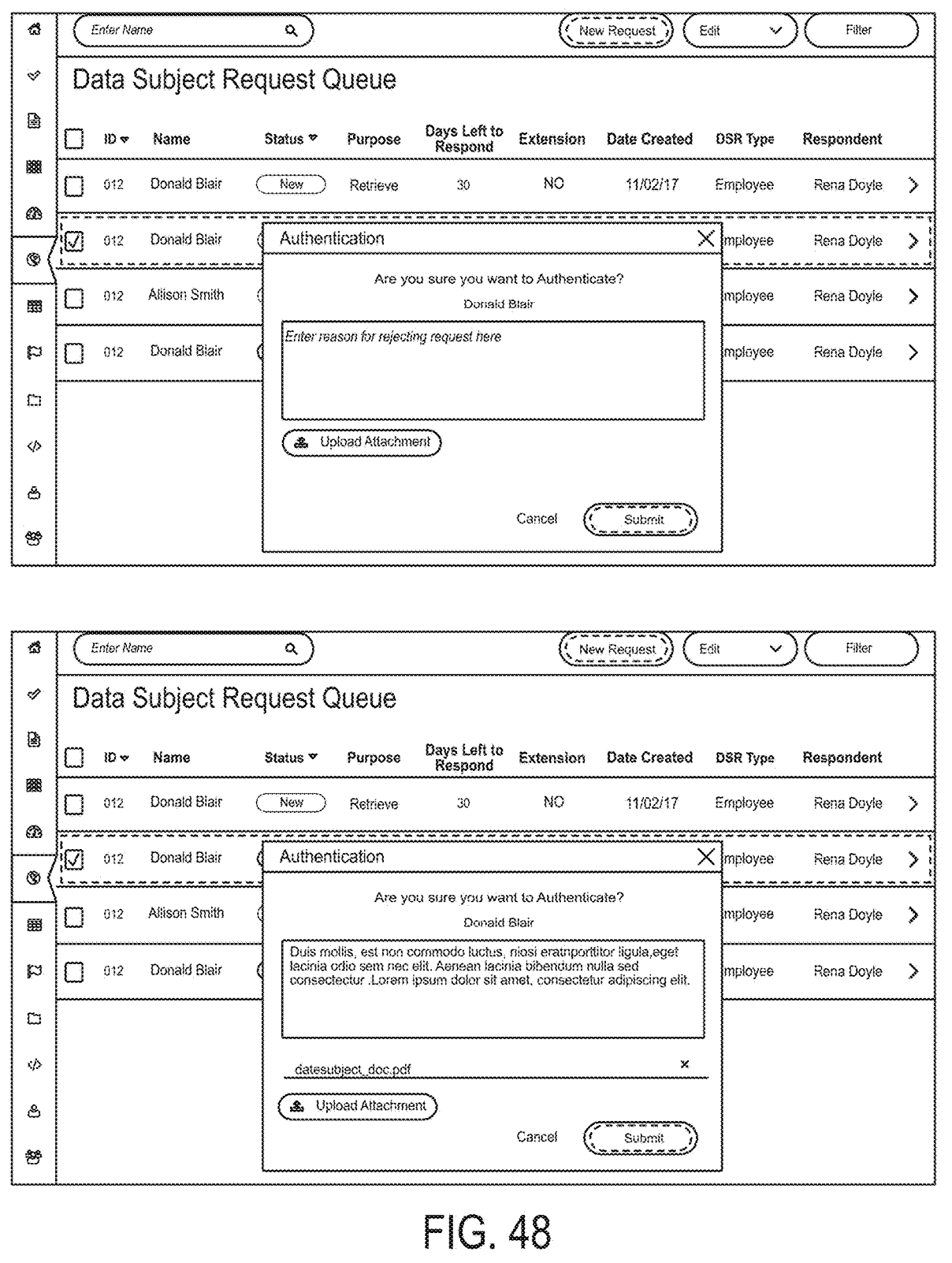

FIG. 47 depicts a queue of pending data subject access requests. As shown in this figure, the first three listed data subject access requests are new and require verification before processing and fulfillment can begin. As shown in this figure, a user (e.g., such as a privacy officer or other privacy controller) may select a particular request, and select an indicia for verifying the request. The user may also optionally select to reject the request. FIG. 48 depicts an authentication window that enables the user to authenticate a particular request. In various embodiments, the user may provide an explanation of why the user is authenticating the request (e.g., because the requestor successfully completed on or more out-of-wallet questions or for any other suitable reason). The user may further submit one or more attachments to support the verification. In this way, the system may be configured to document that the authentication process was performed for each request (e.g., in case there was an issue with improperly fulfilling a request, the company could show that they are following procedures to prevent such improper processing). In other embodiments, the system may enable the user to provide similar support when rejecting a request (e.g., because the requestor was blacklisted, made excessive requests, etc.).

Data Subject Access Request Fulfillment Cost Determination

In various embodiments, as may be understood in light of this disclosure, fulfilling a data subject access request may be particularly costly. In some embodiments, a company may store data regarding a particular data subject in multiple different locations for a plurality of different reasons as part of a plurality of different processing and other business activities. For example, a particular data subject may be both a customer and an employee of a particular company or organization. Accordingly, in some embodiments, fulfilling a data subject access request for a particular data subject may involve a plurality of different information technology (IT) professionals in a plurality of different departments of a particular company or organization. As such, it may be useful to determine a cost of a particular data subject access request (e.g., particularly because, in some cases, a data subject is entitled to a response to their data subject access request as a matter of right at no charge).

In particular embodiments, in response to receiving a data subject access request, the system may be configured to: (1) assign the request to at least one privacy team member; (2) identify one or more IT teams required to fulfill the request (e.g., one or more IT teams associated with one or more business units that may store personal data related to the request); (3) delegate one or more subtasks of the request to each of the one or more IT teams; (4) receive one or more time logs from each individual involved in the processing and fulfillment of the data subject access request; (5) calculate an effective rate of each individual's time (e.g., based at least in part on the individual's salary, bonus, benefits, chair cost, etc.); (6) calculate an effective cost of fulfilling the data subject access request based at least in part on the one or more time logs and effective rate of each of the individual's time; and (7) apply an adjustment to the calculated effective cost that accounts for one or more external factors (e.g., overhead, etc.) in order to calculate a cost of fulfilling the data subject access request.

In particular embodiments, the system is configured to substantially automatically track an amount of time spent by each individual involved in the processing and fulfillment of the data subject access request. The system may, for example, automatically track an amount of time between each individual opening and closing a ticket assigned to them as part of their role in processing or fulfilling the data subject access request. In other embodiments, the system may determine the time spent based on an amount of time provided by each respective individual (e.g., the individual may track their own time and submit it to the system).

In various embodiments, the system is configured to measure a cost of each particular data subject access request received, and analyze one or more trends in costs of, for example: (1) data subject access requests over time; (2) related data subject access requests; (3) etc. For example, the system may be configured to track and analyze cost and time-to-process trends for one or more social groups, one or more political groups, one or more class action groups, etc. In particular, the system may be configured to identify a particular group from which the system receives particularly costly data subject access request (e.g., former and/or current employees, members of a particular social group, members of a particular political group, etc.).

In particular embodiments, the system may be configured to utilize data subject access request cost data when processing, assigning, and/or fulfilling future data subject access requests (e.g., from a particular identified group, individual, etc.). For example, the system may be configured to prioritize requests that are expected to be less costly and time-consuming (e.g., based on past cost data) over requests identified as being likely more expensive. Alternatively, the system may prioritize more costly and time-consuming requests over less costly ones in the interest of ensuring that the system is able to respond to each request in a reasonable amount of time (e.g., within a time required by law, such as a thirty day period, or any other suitable time period).

Customer Satisfaction Integration with Data Subject Access Requests

In various embodiments, the system may be configured to collect customer satisfaction data, for example: (1) as part of a data subject access request submission form; (2) when providing one or more results of a data subject access request to the data subject; or (3) at any other suitable time. In various embodiments, the customer satisfaction data may be collected in the form of a suitable survey, free-form response questionnaire, or other suitable satisfaction data collection format (e.g., thumbs up vs. thumbs down, etc.).

Figure 49:
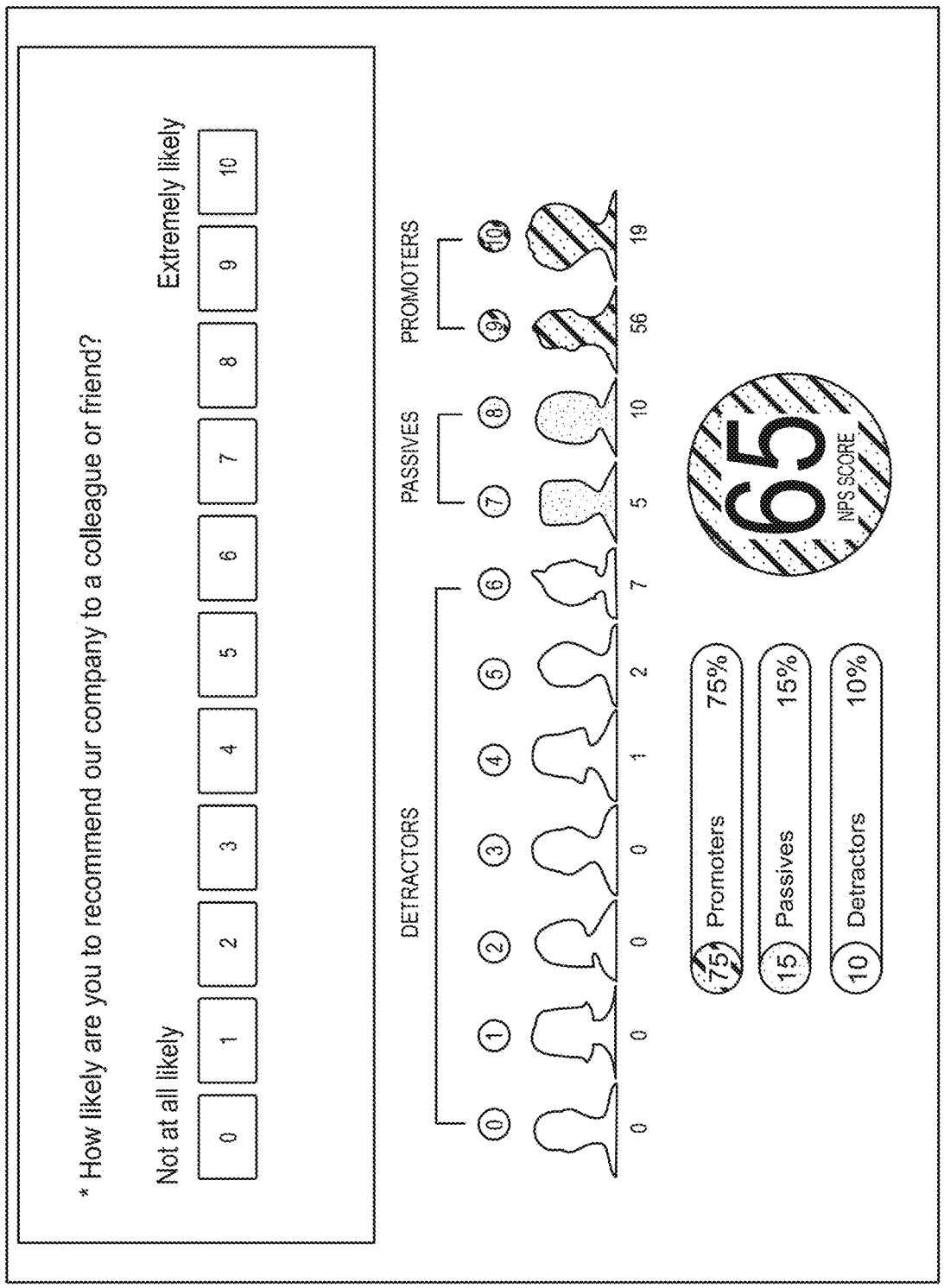

FIG. 49 depicts an exemplary customer satisfaction survey that may be included as part of a data subject access request form, provided along with the results of a data subject access request, provided in one or more messages confirming receipt of a data subject access request, etc. As shown in the figure, the customer satisfaction survey may relate to how likely a customer (e.g., a data subject) is to recommend the company (e.g., to which the data subject has submitted the request) to a friend (e.g., or colleague). In the example shown in FIG. 49, the satisfaction survey may relate to a Net Promoter score (NPS), which may indicate a loyalty of a company's customer relationships. Generally speaking, the Net Promoter Score may measure a loyalty that exists between a provider and a consumer. In various embodiments, the provider may include a company, employer, or any other entity. In particular embodiments, the consumer may include a customer, employee, or other respondent to an NPS survey.

In particular embodiments, the question depicted in FIG. 49 is the primary question utilized in calculating a Net Promoter Score (e.g., "how likely is it that you would recommend our company/product/service to a friend or colleague?"). In particular embodiments, the question is presented with responses ranging from 0 (not at all likely) to 10 (extremely likely). In particular embodiments, the question may include any other suitable scale. As may be understood from FIG. 49, the system may be configured to assign particular categories to particular ratings on the 10 point scale. The system may be configured to track and store responses provided by consumers and calculate an overall NPS score for the provider. The system may be further configured to generate a visual representation of the NPS score, including a total number of responses received for each particular score and category as shown in FIG. 49.

In various embodiments, the system may be configured to measure data related to any other suitable customer satisfaction method (e.g., in addition to NPS). By integrating a customer satisfaction survey with the data subject access request process, the system may increase a number of consumers that provide one or more responses to the customer satisfaction survey. In particular embodiments, the system is configured to require the requestor to respond to the customer satisfaction survey prior to submitting the data subject access request.

Identifying and Deleting Orphaned Data

In particular embodiments, an Orphaned Data Action System is configured to analyze one or more data systems (e.g., data assets), identify one or more pieces of personal data that are one or more pieces of personal data that are not associated with one or more privacy campaigns of the particular organization, and notify one or more individuals of the particular organization of the one or more pieces of personal data that are one or more pieces of personal data that are not associated with one or more privacy campaigns of the particular organization. In various embodiments, one or more processes described herein with respect to the orphaned data action system may be performed by any suitable server, computer, and/or combination of servers and computers.

Figure 50:
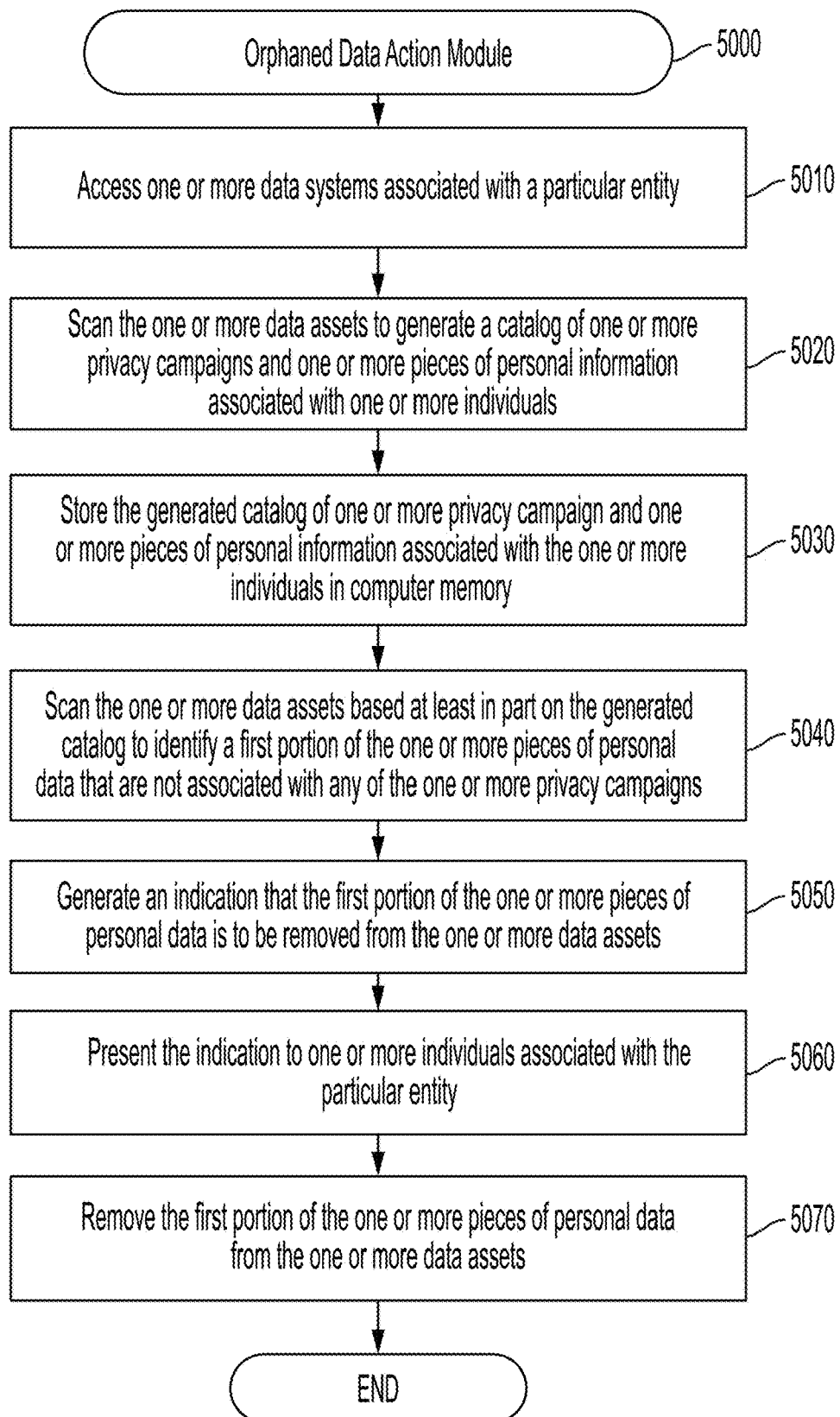
FIG. 50 is a flowchart showing an example of processes performed by an Orphaned Data Action Module 5000 according to various embodiments.

Various processes performed by the Orphaned Data Action System may be implemented by an Orphaned Data Action Module 5000. Referring to FIG. 50, in particular embodiments, the system, when executing the Orphaned Data Action Module 5000, is configured to: (1) access one or more data assets of a particular organization; (2) scan the one or more data assets to generate a catalog of one or more privacy campaigns and one or more pieces of personal information associated with one or more individuals; (3) store the generated catalog in computer memory; (4) scan one or more data assets based at least in part on the generated catalog to identify a first portion of the one or more pieces of personal data that are one or more pieces of personal data that are not associated with the one or more privacy campaigns; (5) generate an indication that the first portion of one or more pieces of personal data that are not associated with the one or more privacy campaigns of the particular organization is to be removed from the one or more data assets; (6) present the indication to one or more individuals associated with the particular organization; and (7) remove the first portion of the one or more pieces of personal data that are not associated with the one or more privacy campaigns of the particular organization from the one or more data assets.

When executing the Orphaned Data Action Module 5000, the system begins, at Step 5010, by accessing one or more data systems associated with the particular entity. The particular entity may include, for example, a particular organization, company, sub-organization, etc. In particular embodiments, the one or more data assets (e.g., data systems) may include, for example, any entity that collects, processes, contains, and/or transfers data (e.g., a software application, "internet of things" computerized device, database, website, data-center, server, etc.). For example, a data asset may include any software or device utilized by a particular entity for data collection, processing, transfer, storage, etc.

In particular embodiments, the system is configured to identify and access the one or more data assets using one or more data modeling techniques. As discussed more fully above, a data model may store the following information: (1) the entity that owns and/or uses a particular data asset; (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify and access the one or more data assets associated with the particular entity.

Continuing to Step 5020, the system is configured to scan the one or more data assets to generate a catalog of one or more privacy campaigns and one or more pieces of personal information associated with one or more individuals. The catalog may include a table of the one or more privacy campaigns within the data assets of the particular entity and, for each privacy campaign, the one or more pieces of personal data stored within the data assets of the particular entity that are associated with the particular privacy campaign. In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some implementations, the system may access, via one or more computer networks, one or more data models that map an association between one or more pieces of personal data stored within one or more data assets of the particular entity and one or more privacy campaigns of the particular entity. As further described herein, the data models may access the data assets of the particular entity and use one or more suitable data mapping techniques to link, or otherwise associate, the one or more pieces of personal data stored within one or more data assets of the particular entity and one or more privacy campaigns of the particular entity. In some implementations, the one or more data models may link, or otherwise associate, a particular individual and each piece of personal data of that particular individual that is stored on one or more data assets of the particular entity.

In some embodiments, the system is configured to generate and populate a data model based at least in part on existing information stored by the system (e.g., in one or more data assets), for example, using one or more suitable scanning techniques. In still other embodiments, the system is configured to access an existing data model that maps personal data stored by one or more organization systems to particular associated processing activities. In some implementations, the system is configured to generate and populate a data model substantially on the fly (e.g., as the system receives new data associated with particular processing activities). For example, a particular processing activity (e.g., privacy campaign) may include transmission of a periodic advertising e-mail for a particular company (e.g., a hardware store). A data model may locate the collected and stored email addresses for customers that elected to receive (e.g., consented to receipt of) the promotional email within the data assets of the particular entity, and then map each of the stored email addresses to the particular processing activity (i.e., the transmission of a periodic advertising e-mail) within the data assets of the particular entity.

Next, at Step 5030, the system is configured to store the generated catalog of one or more privacy campaigns and one or more pieces of personal information associated with one or more individuals. In some implementations, the system may receive an indication that a new processing activity (e.g., privacy campaign) has been launched by the particular entity. In response to receiving the indication, the system may modify the one or more data models to map an association between (i) one or more pieces of personal data associated with one or more individuals obtained in connection with the new privacy campaign and (ii) the new privacy campaign initiated by the particular entity. As the system receives one or more pieces of personal data associated with one or more individuals (e.g., an email address signing up to receive information from the particular entity), then the data model associated with the particular processing activity may associate the received personal data with the privacy campaign. In some implementations, one or more data assets may already include the particular personal data (e.g., email address) because the particular individual, for example, previously provided their email address in relation to a different privacy campaign of the particular entity. In response, the system may access the particular personal data and associate that particular personal data with the new privacy campaign.

At Step 5040, the system is configured to scan one or more data assets based at least in part on the generated catalog to identify a first portion of the one or more pieces of personal data that are one or more pieces of personal data that are not associated with the one or more privacy campaigns. In various embodiments, the system may use the generated catalogue to scan the data assets of the particular entity to identify personal data that has been collected and stored using one or more computer systems operated and/or utilized by a particular organization where the personal data is not currently being used as part of any privacy campaigns, processing activities, etc. undertaken by the particular organization. The one or more pieces of personal data that are not associated with the one or more privacy campaigns may be a portion of the personal data that is stored by the particular entity. In some implementations, the system may analyze the data models to identify the one or more pieces of personal data that are not associated with the one or more privacy campaigns.

When the particular privacy campaign, processing activity, etc. is terminated or otherwise discontinued, the system may determine if any of the associated personal data that has been collected and stored by the particular organization is now orphaned data. In some implementations, in response to the termination of a particular privacy campaign and/or processing activity, (e.g., manually or automatically), the system may be configured to scan one or more data assets based at least in part on the generated catalog or analyze the data models to determine whether any of the personal data that has been collected and stored by the particular organization is now orphaned data (e.g., whether any personal data collected and stored as part of the now-terminated privacy campaign is being utilized by any other processing activity, has some other legal basis for its continued storage, etc.). In some implementations, the system may generate an indication that one or more pieces of personal data that are associated with the terminated one or more privacy campaigns are included in the portion of the one or more pieces of personal data (e.g., orphaned data).

In additional implementations, the system may determine that a particular privacy campaign, processing activity, etc. has not been utilized for a period of time (e.g., a day, a month, a year). In response, the system may be configured to terminate the particular processing activity, processing activity, etc. In some implementations, in response to the system determining that a particular processing activity has not been utilized for a period of time, the system may prompt one or more individuals associated with the particular entity to indicate whether the particular privacy campaign should be terminated or otherwise discontinued.

For example, a particular processing activity may include transmission of a periodic advertising e-mail for a particular company (e.g., a hardware store). As part of the processing activity, the particular company may have collected and stored e-mail addresses for customers that elected to receive (e.g., consented to the receipt of) the promotional e-mails. In response to determining that the particular company has not sent out any promotional e-mails for at least a particular amount of time (e.g., for at least a particular number of months), the system may be configured to: (1) automatically terminate the processing activity; (2) identify any of the personal data collected as part of the processing activity that is now orphaned data (e.g., the e-mail addresses); and (3) automatically delete the identified orphaned data. The processing activity may have ended for any suitable reason (e.g., because the promotion that drove the periodic e-mails has ended). As may be understood in light of this disclosure, because the particular organization no longer has a valid basis for continuing to store the e-mail addresses of the customers once the e-mail addresses are no longer being used to send promotional e-mails, the organization may wish to substantially automate the removal of personal data stored in its computer systems that may place the organization in violation of one or more personal data storage rules or regulations.

Continuing to Step 5050, the system is configured to generate an indication that the portion of one or more pieces of personal data that are not associated with the one or more privacy campaigns of the particular entity is to be removed from the one or more data assets. At Step 5060, the system is configured to present the indication to one or more individuals associated with the particular entity. The indication may be an electronic notification to be provided to an individual (e.g., privacy officer) associated with the particular entity. The electronic notification may be, for example, (1) a notification within a software application (e.g., a data management system for the one or more data assets of the particular entity), (2) an email notification, (3) etc.

In some implementations, the indication may enable the individual (e.g., privacy officer of the particular entity) to select a set of the one or more pieces of personal data of the portion of the one or more pieces of personal data to retain based on one or more bases to retain the set of the one or more pieces of personal data.

In particular embodiments, the system may prompt the one or more individuals to provide one or more bases to retain the first set of the one or more pieces of personal data of the first portion of the one or more pieces of personal data that are not associated with the one or more privacy campaigns. In some implementations, in response to receiving the provided one or more valid bases to retain the first set of the one or more pieces of personal data from the one or more individuals associated with the particular entity, submitting the provided one or more valid bases to retain the first set of the one or more pieces of personal data to one or more second individuals associated with the particular entity for authorization. In response, the system may retain the first set of the one or more pieces of personal data of the first portion of the one or more pieces of personal data from the one or more individuals associated with the particular entity. Further, the system may remove a second set of the one or more pieces of personal data of the first portion of the one or more pieces of personal data that are not associated with the one or more privacy campaigns from the one or more data assets. In particular embodiments, the second set of the one or more pieces of personal data may be different from the first set of the one or more pieces of personal data.

Continuing to Step 5070, the system is configured to remove, by one or more processors, the first portion of the one or more pieces of personal data that are not associated with the one or more privacy campaigns of the particular entity from the one or more data assets.

Data Testing to Confirm Deletion under a Right to Erasure

As previously noted, various privacy and security policies may provide data subjects (e.g., individuals, organizations, or other entities) with certain rights related to the data subject's personal data that is collected, stored, or otherwise processed by an entity. In particular, under various privacy and security policies, a data subject may be entitled to a right to erasure of any personal data associated with that data subject that has been at least temporarily stored by the entity (e.g., a right to be forgotten). In various embodiments, under the right to erasure, an entity (e.g., a data controller on behalf of another organization) may be obligated to erase personal data without undue delay under one or more of the following conditions: (1) the personal data is no longer necessary in relation to a purpose for which the data was originally collected or otherwise processed; (2) the data subject has withdrawn consent on which the processing of the personal data is based (e.g., and there is no other legal grounds for such processing); (3) the personal data has been unlawfully processed; (4) the data subject has objected to the processing and there is no overriding legitimate grounds for the processing of the data by the entity; and/or (5) for any other suitable reason or under any other suitable conditions. Therefore, an entity receiving a request from a data subject under the right to erasure is required to erase any personal data the entity has stored for the data subject, as well as ensure such erasure has been carried out.

In addition, certain entities may put data collection policies and/or data retention policies in place that define data retention metrics such as how long personal data is to be held by the entities. Therefore, in many instances, entities will put processes in place to erase personal data in adherence with the data retention metrics defined within the entities' data collection and/or retention policies. Accordingly, these data retention metrics may be based on one or more legal and/or industry standards. In addition, these data retention metrics may be defined and implemented as to attempt to minimize the entities' risk of experiencing a data privacy incident, such as a breach of personal data by unauthorized third parties, due to their use (e.g., processing, collecting, transferring, storing, and/or the like) of the personal data.

However, a technical challenge often encountered by many entities in managing and/or implementing the erasure of personal data is that these entities will oftentimes use personal data within many different processes and/or systems. In addition, many of these entities will store personal data over various storage devices located over various areas and/or within various systems. Therefore, putting effective and reliable processes in place to carry out the erasure of personal data, as needed, can be a significant technical challenge.

Accordingly, various embodiments of present disclosure overcome many of the technical challenges associated with implementing effective and reliable data retention and/or removal processes for performing erasure of personal data by providing a computational framework for identifying and deleting personal data, as well as enabling an entity to determine whether such processes are functioning properly in removing personal data as required. In particular, various embodiments of the disclosure provide a Personal Data Deletion System configured to: (1) at least partially automatically identify and delete personal data that an entity is required to erase under one or more of the conditions discussed above; and (2) perform one or more data tests after the deletion to confirm that the system has, in fact, deleted any personal data associated with the data subject. In addition, various embodiments of the disclosure provide a Personal Data Deletion System configured to perform one or more data tests to ensure processes implemented to carry out data collection and/or retention policies (metrics) are functioning properly in removing personal data as required.

Further, various embodiments of the disclosure provided herein enable more effective, efficient, reliable, and accurate implementations of data retention and/or removal processes. By doing so, various embodiments help ensure that entities carry out requests received under a right to erasure and/or data collection and/or retention policies properly by ensuring the removal of personal data of data subjects from the entities' systems, processes, storage devices, and/or the like. Thus, various embodiments of the present disclosure make major technical contributions to improving the computational efficiency and reliability of various data retention and/or removal systems and procedures used in managing and/or removing personal data as required. This in turn translates to more computationally efficient software systems. Further detail is now provided for different aspects of various embodiments of the Personal Data Deletion System.

Figure 51:
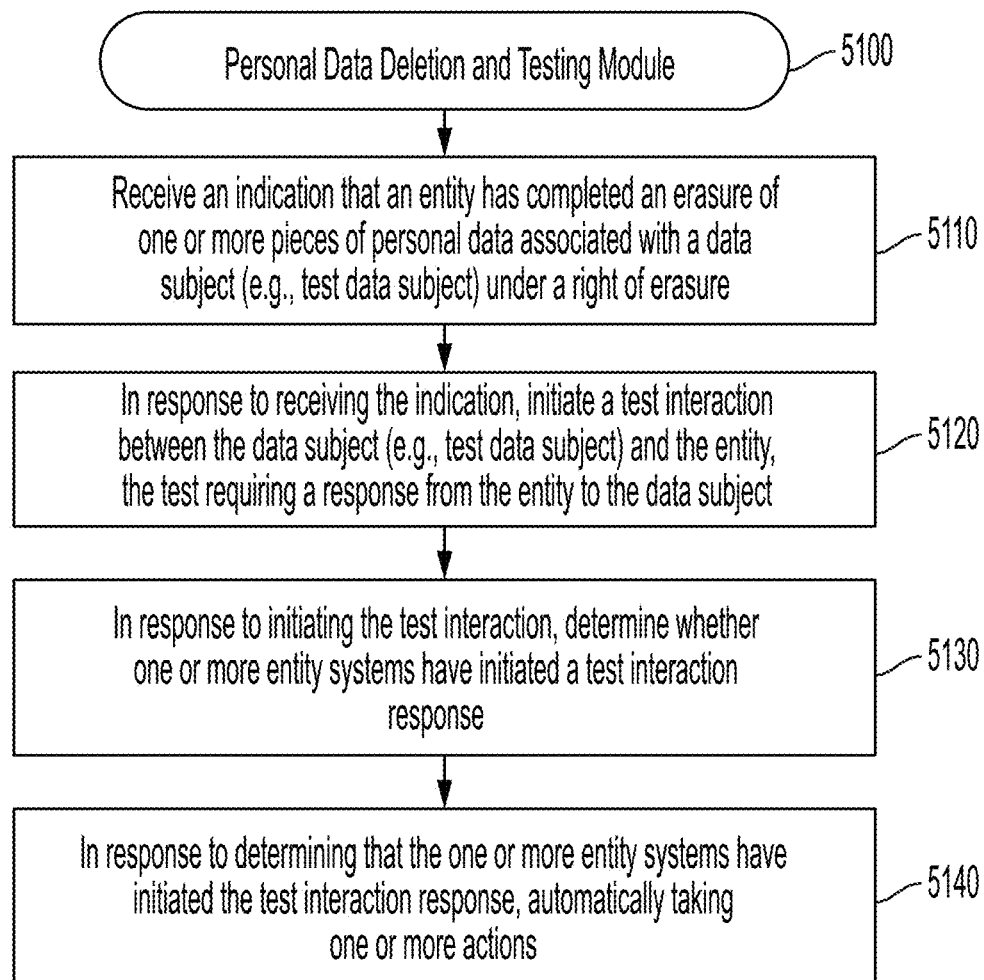
FIG. 51 is a flowchart showing an example of processes performed by a Personal Data Deletion and Testing Module 5100 according to various embodiments.

Accordingly, various processes performed by the Personal Data Deletion System may be implemented by a Personal Data Deletion and Testing Module 5100. Referring to FIG. 51, in particular embodiments, the system, when executing the Personal Data Deletion and Testing Module 5100, is configured to: (1) receive an indication that the entity has completed an erasure of one or more pieces of personal data associated with the data subject under a right of erasure; (2) initiate a test interaction between the data subject and the entity, the test interaction requiring a response from the entity to the data subject; (3) determine whether one or more system associated with the entity have initiated a test interaction response to the data subject based at least in part on the test interaction; (4) in response to determining that the one or more systems associated with the entity have initiated the test interaction response, (a) determine that the entity has not completed the erasure of the one or more pieces of personal data associated with the data subject and (b) automatically take one or more actions with regard to the personal data associated with the data subject.

When executing the Personal Data Deletion and Testing Module 5100, the system begins, at Step 5110, by receiving an indication that the entity has completed an erasure of one or more pieces of personal data associated with the data subject under a right to erasure. The particular entity may include, for example, a particular organization, company, sub-organization, etc. In particular embodiments, the one or more computer systems may be configured to store (e.g., in memory) an indication that the data subject's request to delete any of their personal data stored by the one or more computer systems has been processed. Under various legal and industry policies/standards, the organization may have a certain period of time (e.g., a number of days) in order to comply with the one or more requirements related to the deletion or removal of personal data in response to receiving a request from the data subject or in response to identifying one or more of the conditions requiring deletion discussed above. In response to the receiving an indication that the deletion request for the data subject's personal data has been processed or the certain period of time (described above) has passed, the system may be configured to perform a data test to confirm the deletion of the data subject's personal data.

Continuing to Step 5120, in response to receiving the indication that the entity has completed the erasure, the system is configured to initiate a test interaction between the data subject and the entity, the test interaction requiring a response from the entity to the data subject. In particular embodiments, when performing the data test, the system may be configured to provide an interaction request to the entity on behalf of the data subject. In particular embodiments, the interaction request may include, for example, a request for one or more pieces of data associated with the data subject (e.g., account information, etc.). In various embodiments, the interaction request is a request to contact the data subject (e.g., for any suitable reason). The system may, for example, be configured to substantially automatically complete a contact-request form (e.g., a webform made available by the entity) on behalf of the data subject. In various embodiments, when automatically completing the form on behalf of the data subject, the system may be configured to only provide identifying data, but not to provide any contact data. In response to submitting the interaction request (e.g., submitting the webform), the system may be configured to determine whether the one or more computer systems have generated and/or transmitted a response to the data subject. The system may be configured to determine whether the one or more computer systems have generated and/or transmitted the response to the data subject by, for example, analyzing one or more computer systems associated with the entity to determine whether the one or more computer systems have generated a communication to the data subject (e.g., automatically) for transmission to an e-mail address or other contact method associated with the data subject, generated an action-item for an individual to contact the data subject at a particular contact number, etc.

To perform the data test, for example, the system may be configured to: (1) access (e.g., manually or automatically) a form for the entity (e.g., a web-based "Contact Us" form); (2) input a unique identifier associated with the data subject (e.g., a full name or customer ID number) without providing contact information for the data subject (e.g., mailing address, phone number, email address, etc.); and (3) input a request, within the form, for the entity to contact the data subject to provide information associated with the data subject (e.g., the data subject's account balance with the entity). In response to submitting the form to the entity, the system may be configured to determine whether the data subject is contacted (e.g., via a phone call or email) by the one or more computer systems (e.g., automatically). In some implementations, completing the contact-request form may include providing one or more pieces of identifying data associated with the data subject, the one or more pieces of identifying data comprising data other than contact data. In response to determining that the data subject has been contacted following submission of the form, the system may determine that the one or more computer systems have not fully deleted the data subject's personal data (e.g., because the one or more computer systems must still be storing contact information for the data subject in at least one location).

In particular embodiments, the system is configured to generate one or more test profiles for one or more test data subjects. For each of the one or more test data subjects, the system may be configured to generate and store test profile data such as, for example: (1) name; (2) address; (3) telephone number; (4) e-mail address; (5) social security number; (6) information associated with one or more credit accounts (e.g., credit card numbers); (7) banking information; (8) location data; (9) internet search history; (10) non-credit account data; and/or (11) any other suitable test data. The system may then be configured to at least initially consent to processing or collection of personal data for the one or more test data subjects by the entity. The system may then request deletion of data of any personal data associated with a particular test data subject. In response to requesting the deletion of data for the particular test data subject, the system may then take one or more actions using the test profile data associated with the particular test data subjects in order to confirm that the one or more computer systems have, in fact, deleted the test data subject's personal data (e.g., any suitable action described herein). The system may, for example, be configured to: (1) initiate a contact request on behalf of the test data subject; (2) attempt to login to one or more user accounts that the system had created for the particular test data subject; and/or (3) take any other action, the effect of which could indicate a lack of complete deletion of the test data subject's personal data.

Next, at Step 5130, in response to initiating the test interaction, the system is configured to determine whether one or more systems associated with the entity have initiated a test interaction response to the data subject based at least in part on the test interaction. In response to determining that the entity has generated a response to the test interaction, the system may be configured to determine that the entity has not complied with the data subject's request (e.g., deletion of their personal data from the one or more computer systems). For example, if the test interaction requests for the entity to locate and provide any personal data the system has stored related to the data subject, then by the system providing a response that includes one or more pieces of personal data related to the data subject, the system may determine that the one or more computer systems have not complied with the request. As described above, the request may be an erasure of one or more pieces of personal data associated with the data subject under a right to erasure. In some implementations, the test interaction response may be any response that includes any one of the one or more pieces of personal data the system indicated was erased under the right to erasure. In some implementations, the test interaction response may not include response that indicates that the one or more pieces of personal data the system indicated was erased under the right to erasure was not found or accessed by the system.

At Step 5140, in response to determining that the one or more systems associated with the entity have initiated the test interaction response, the system is configured to (a) determine that the one or more computer systems have not completed the erasure of the one or more pieces of personal data associated with the data subject, and (b) automatically take one or more actions with regard to the personal data associated with the data subject. In response to determining that the one or more computer systems have not fully deleted a data subject's (e.g., or test data subject's) personal data, the system may then be configured, in particular embodiments, to: (1) flag the data subject's personal data for follow up by one or more privacy officers to investigate the lack of deletion; (2) perform one or more scans of one or more computing systems associated with the entity to identify any residual personal data that may be associated with the data subject; (3) generate a report indicating the lack of complete deletion; and/or (4) take any other suitable action to flag the data subject, personal data, initial request to be forgotten, etc. for follow up.

In various embodiments, the one or more actions may include: (1) identifying the one or more pieces of personal data associated with the data subject that remain stored in the one or more computer systems of the entity; (2) flagging the one or more pieces of personal data associated with the data subject that remain stored in the one or more computer systems of the entity; and (3) providing the flagged one or more pieces of personal data associated with the data subject that remain stored in the one or more computer systems of the entity to an individual associated with the entity.

In various embodiments, the system may monitor compliance by a particular entity with a data subject's request to delete the data subject's personal data from the one or more computer systems associated with a particular entity. In addition, the system may monitor compliance by a particular entity with a data collection and/or retention policy defining data retention metrics for the entity. For example, the policy may define a data retention metric on how long personal data of a data subject should be held by the entity. The system may, for example, be configured to test to ensure the data has been deleted by: (1) submitting a unique token of data (e.g., via through a webform) to a system (e.g., mark to); and (2) in response to receiving an indication that erasure of the unique token of data has been completed and/or to a passage of a certain period of time, test the system by calling into the system to search for the unique token. For example, the certain period of time may be a time after which a request to delete the unique token of data has been received or an expected data retention time for the unique token of data. In response to finding the unique token, the system may be configured to determine that the data has not been properly deleted.

The system may provide a communication to the entity that includes a unique identifier associated with the data subject, that is provided without using a personal communication data platform, and prompts the entity to provide a response by contacting the data subject via a personal communication data platform. In response to providing the communication to the entity, the system may determine whether the data subject has received a response via the personal communication data platform. The system may, in response to determining that the data subject has received the response via the personal communication data platform, determine that the one or more computer systems have not complied with the data subject's request for deletion of their personal data. In response, the system may generate an indication that the one or more computer systems have not complied with the data subject's request for deletion of their personal data by the entity, and digitally store the indication that the one or more computer systems have not complied with the data subject's request for deletion of their personal data in computer memory.

Automatic Preparation for Remediation

In particular embodiments, a Risk Remediation System is configured to substantially automatically determine whether to take one or more actions in response to one or more identified risk triggers. For example, an identified risk trigger may be that a data asset for an organization is hosted in only one particular location thereby increasing the scope of risk if the location were infiltrated (e.g., via cybercrime). In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger.

Figure 52:
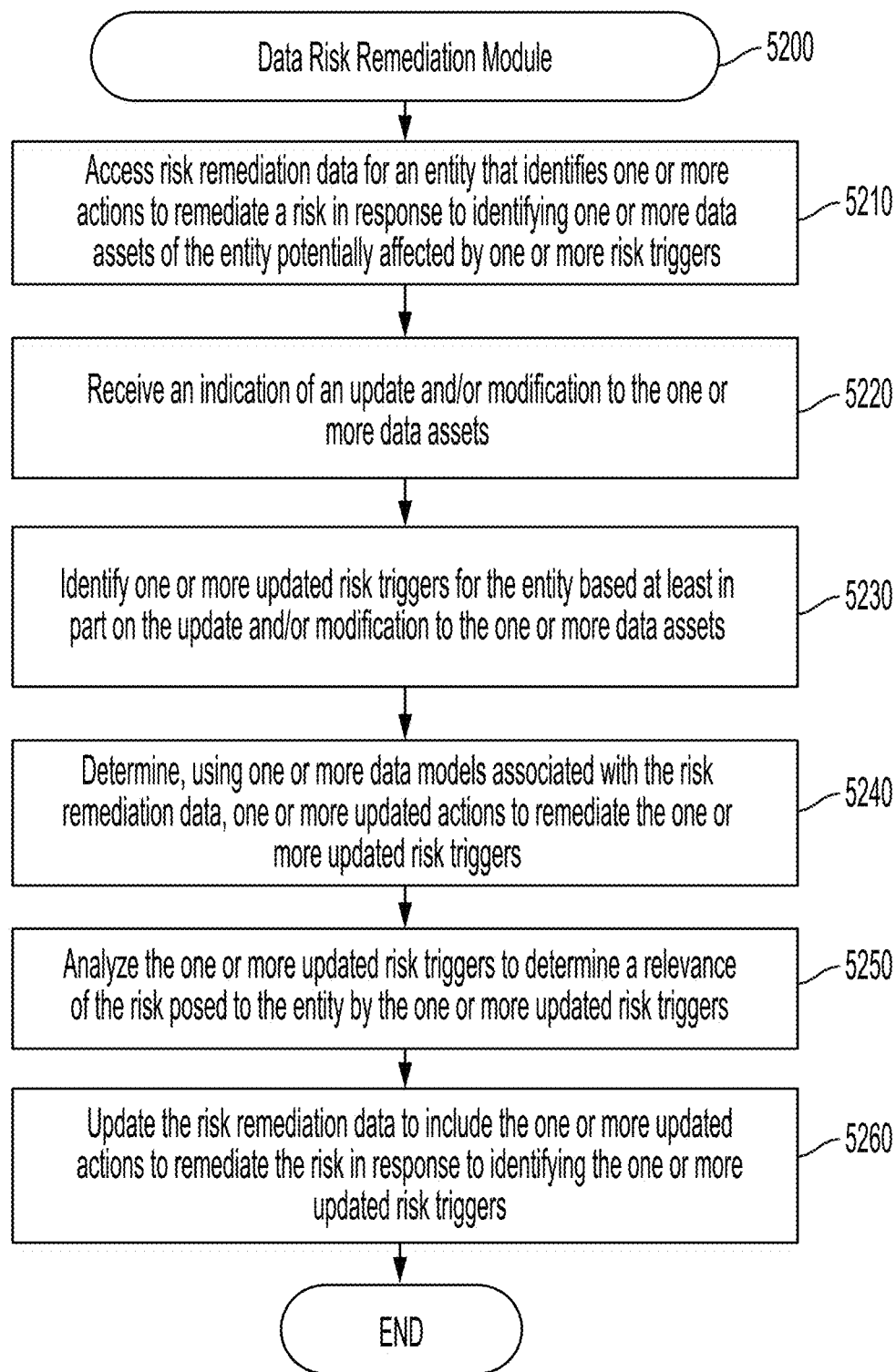
FIG. 52 is a flowchart showing an example of processes performed by a Data Risk Remediation Module 5200 according to various embodiments.

Various processes performed by the Risk Remediation System may be implemented by a Data Risk Remediation Module 5200. Referring to FIG. 52, in particular embodiments, the system, when executing the Data Risk Remediation Module 5200, is configured to access risk remediation data for an entity that identifies one or more actions to remediate a risk in response to identifying one or more data assets of the entity potentially affected by one or more risk triggers, receive an indication of an update to the one or more data assets, identify one or more updated risk triggers for an entity based at least in part on the update to the one or more data assets, determine, by using one or more data models associated with the risk remediation data, one or more updated actions to remediate the one or more updated risk triggers, analyze the one or more updated risk triggers to determine a relevance of the risk posed to the entity by the one or more updated risk triggers, and update the risk remediation data to include the one or more updated actions to remediate the risk in response to identifying the one or more updated risk triggers.

When executing the Data Risk Remediation Module 5200, the system begins, at Step 5210, by accessing risk remediation data for an entity that identifies one or more actions to remediate a risk in response to identifying one or more data assets of the entity potentially affected by one or more risk triggers. The particular entity may include, for example, a particular organization, company, sub-organization, etc. The one or more data assets may include personal data for clients or customers. In embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some implementations, the system may include risk remediation data associated with one or more data assets. The risk remediation data may be default or pre-configured risk remediation data that identifies one or more actions to remediate a risk in response to identifying one or more data assets of the entity potentially affected by one or more risk triggers. In some implementations, the system may have previously updated and/or continuously update the risk remediation data. The risk remediation data may be updated and/or based on aggregate risk remediation data for a plurality of identified risk triggers from one or more organizations, which may include the entity.

The system may analyze the aggregate risk remediation data to determine a remediation outcome for each of the plurality of identified risk triggers and an associated entity response to the particular identified risk trigger of the plurality of identified risk triggers. The remediation outcome is an indication of how well the entity response addressed the identified risk trigger. For example, the remediation outcome can be a numerical (e.g., 1 to 10), an indication of the risk trigger after the entity response was performed (e.g., "high," "medium," or "low"). In response to analyzing the aggregate risk remediation data to determine a remediation outcome for each of the plurality of identified risk triggers and an associated entity response to the particular identified risk trigger of the plurality of identified risk triggers, generating the data model of the one or more data models.

One or more data models for the system may be generated to indicate a recommended entity response based on each identified risk trigger. The one or more risk remediation models base be generated in response to analyzing the aggregate risk remediation data to determine a remediation outcome for each of the plurality of identified risk triggers and an associated entity response to the particular identified risk trigger of the plurality of identified risk triggers. Additionally, the risk remediation data for the entity may include the one or more risk remediation data models with an associated one or more data assets of the entity.

Continuing to Step 5220, the system is configured to receive an indication of an update to the one or more data assets. In particular embodiments, the system may indicate that a modification has been performed to the one or more data assets. In various embodiments, when a privacy campaign, processing activity, etc. of the particular organization is modified (e.g., add, remove, or update particular information), then the system may the risk remediation data for use in facilitating an automatic assessment of and/or response to future identified risk triggers. The modification may be an addition (e.g., additional data stored to the one or more data assets), a deletion (e.g., removing data stored to the one or more data assets), or a change (e.g., editing particular data or rearranging a configuration of the data associated with the one or more data assets. At Step 5230, the system is configured to identify one or more updated risk triggers for an entity based at least in part on the update to the one or more data assets. The updated risk triggers may be anything that exposes the one or more data assets of the entity to, for example, a data breach or a loss of data, among others. For example, an identified risk trigger may be that a data asset for an organization is hosted in only one particular location thereby increasing the scope of risk if the location were infiltrated (e.g., via cybercrime).

At Step 5240, the system is configured to determine, by using one or more data models associated with the risk remediation data, one or more updated actions to remediate the one or more updated risk triggers. As previously described above, the one or more data models for the system may be generated to indicate a recommended entity response based on each identified risk trigger. The one or more risk remediation models base be generated in response to analyzing the aggregate risk remediation data to determine a remediation outcome for each of the plurality of identified risk triggers and an associated entity response to the particular identified risk trigger of the plurality of identified risk triggers.

At Step 5250, the system is configured to analyze the one or more updated risk triggers to determine a relevance of the risk posed to the entity by the one or more updated risk triggers. In particular embodiments, the system is configured to substantially automatically perform one or more steps related to the analysis of and response to the one or more potential risk triggers discussed above. For example, the system may substantially automatically determine a relevance of a risk posed by (e.g., a risk level) the one or more potential risk triggers based at least in part on one or more previously-determined responses to similar risk triggers. This may include, for example, one or more previously determined responses for the particular entity that has identified the current risk trigger, one or more similarly situated entities, or any other suitable entity or potential trigger. In some embodiments, the system is configured to determine, based at least in part on the one or more data assets and the relevance of the risk, whether to take one or more updated actions in response to the one or more updated risk triggers, and take the one or more updated actions to remediate the risk in response to identifying the one or more updated risk triggers.

Additionally, in some implementations, the system may calculate a risk level based at least in part on the one or more updated risk triggers. The risk level may be compared to a threshold risk level for the entity. The threshold risk level may be pre-determined, or the entity may be able to adjust the threshold risk level (e.g., based on the type of data stored in the particular data asset, a number of data assets involved, etc.). In response to determining that the risk level is greater than or equal to the threshold risk level (i.e., a risk level that is defined as riskier than the threshold risk level or as risky as the threshold risk level), updating the risk remediation data to include the one or more updated actions to remediate the risk in response to identifying the one or more updated risk triggers. The risk level may be, for example, a numerical value (e.g., 1 to 10) or a described value (e.g., "low," "medium," or "high"), among others. In some implementations, calculating the risk level may be based at least in part on the one or more updated risk triggers further comprises comparing the one or more updated risk triggers to (i) one or more previously identified risk triggers, and (ii) one or more previously implemented actions to the one or more previously identified risk triggers.

At Step 5260, the system continues by updating the risk remediation data to include the one or more updated actions to remediate the risk in response to identifying the one or more updated risk triggers. In various embodiments, the system may automatically (e.g., substantially automatically) update the risk remediation data.

In various embodiments, the system may identify one or more risk triggers for an entity based at least in part on the update to the first data asset of the entity, and in turn, identify a second data asset of the entity potentially affected by the one or more risk triggers based at least in part on an association of a first data asset and the second data asset. The system may then determine, by using one or more data models, one or more first updated actions to remediate the one or more updated risk triggers for the first data asset, and determine, by using one or more data models, one or more second updated actions to remediate the one or more updated risk triggers for the second data asset. In some implementations, the one or more first updated actions to remediate the one or more updated risk triggers for the first data asset may be the same as or different from one or more second updated actions to remediate the one or more updated risk triggers for the second data asset. Further, the system may generate (or update) risk remediation data of the entity to include the one or more first updated actions and the one or more second updated actions to remediate the one or more potential risk triggers.

Central Consent Repository Maintenance and Data Inventory Linking

In particular embodiments, a Central Consent System is configured to provide a third-party data repository system to facilitate the receipt and centralized storage of personal data for each of a plurality of respective data subjects, as described herein. Additionally, the Central Consent System is configured to interface with a centralized consent receipt management system.

Figure 53:
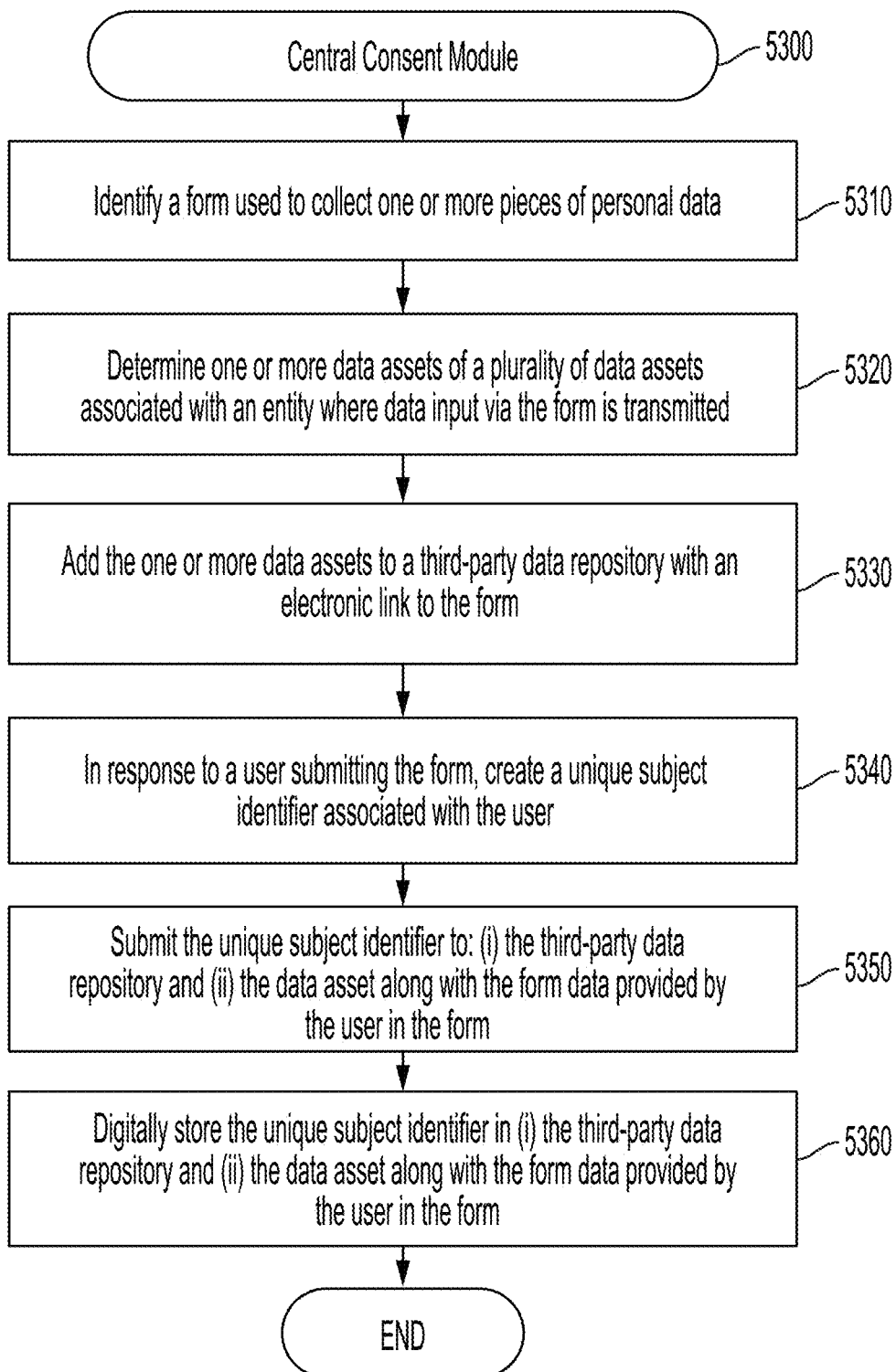
FIG. 53 is a flowchart showing an example of processes performed by a Central Consent Module 5300 according to various embodiments.

Various processes performed by the Central Consent System may be implemented by a Central Consent Module 5300. Referring to FIG. 53, in particular embodiments, the system, when executing the Central Consent Module 5300, is configured to: identify a form used to collect one or more pieces of personal data, determine a data asset of a plurality of data assets of the organization where input data of the form is transmitted, add the data asset to the third-party data repository with an electronic link to the form in response to a user submitting the form, create a unique subject identifier associated with the user, transmit the unique subject identifier (i) to the third-party data repository and (ii) along with the form data provided by the user in the form, to the data asset, and digitally store the unique subject identifier (i) in the third-party data repository and (ii) along with the form data provided by the user in the form, in the data asset.

When executing the Central Consent Module 5300, the system begins, at Step 5310, by identifying a form used to collect one or more pieces of personal data. The particular entity may include, for example, a particular organization, company, sub-organization, etc. In particular embodiments, the one or more data assets (e.g., data systems) may include, for example, any processor or database that collects, processes, contains, and/or transfers data (e.g., such as a software application, "internet of things" computerized device, database, website, data-center, server, etc.). The one or more forms may ask for personal data, and the one or more data assets may store personal data for clients or customers. In embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In particular embodiments, the system is configured to identify a form via one or more method that may include one or more website scanning tools (e.g., web crawling). The system may also receive an indication that a user is completing a form (e.g., a webform via a website) associated with the particular organization (e.g., a form to complete for a particular privacy campaign).

The form may include, for example, one or more fields that include the user's e-mail address, billing address, shipping address, and payment information for the purposes of collected payment data to complete a checkout process on an e-commerce website. The system may, for example, be configured to track data on behalf of an entity that collects and/or processes personal data related to: (1) who consented to the processing or collection of personal data (e.g., the data subject themselves or a person legally entitled to consent on their behalf such as a parent, guardian, etc.); (2) when the consent was given (e.g., a date and time); (3) what information was provided to the consenter at the time of consent (e.g., a privacy policy, what personal data would be collected following the provision of the consent, for what purpose that personal data would be collected, etc.); (4) how consent was received (e.g., one or more copies of a data capture form, webform, etc. via which consent was provided by the consenter); (5) when consent was withdrawn (e.g., a date and time of consent withdrawal if the consenter withdraws consent); and/or (6) any other suitable data related to receipt or withdrawal of consent.

Continuing to Step 5320, the system is configured to determine one or more data assets of a plurality of data assets of the organization where input data of the form is transmitted. In particular embodiments, the system may determine one or more data assets of the organization that receive the form data provided by the user in the form (e.g., webform). In particular embodiments, the system is configured to identify the one or more data assets using one or more data modeling techniques. As discussed more fully above, a data model may store the following information: (1) the entity that owns and/or uses a particular data asset (e.g., such as a primary data asset, an example of which is shown in the center of the data model in FIG. 4); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) to identify the one or more data assets associated with the particular entity that receive and/or store particular form data.

At Step 5330, the system is configured to add the one or more data assets to the third-party data repository with an electronic link to the form. In particular embodiments, a third-party data repository system may electronically link the form to the one or more data assets that processor or store the form data of the form. Next, at Step 5340, in response to a user submitting the form, the system is configured to create a unique subject identifier associated with the user. The system is configured to generate, for each data subject that completes the form (e.g., a webform), a unique identifier. The system may, for example: (1) receive an indication that the form has been completed with the form including a piece of personal data; (2) identify a data subject associated with the piece of personal data; (3) determine whether the central repository system is currently storing data associated with the data subject; and (4) in response to determining that one or more data assets of the plurality of data assets is not currently storing data associated with the data subject (e.g., because the data subject is a new data subject), generate the unique identifier.

In particular embodiments, the unique identifier may include any unique identifier such as, for example: (1) any of the one or more pieces of personal data collected, stored, and/or processed by the system (e.g., name, first name, last name, full name, address, phone number, e-mail address, etc.); (2) a unique string or hash comprising any suitable number of numerals, letters, or combination thereof; and/or (3) any other identifier that is sufficiently unique to distinguish between a first and second data subject for the purpose of subsequent data retrieval. In particular embodiments, the system is configured to assign a permanent identifier to each particular data subject. In other embodiments, the system is configured to assign one or more temporary unique identifiers to the same data subject.

In particular embodiments, the system is configured to: (1) receive an indication of completion of a form associated with the organization by a data subject; (2) determine, based at least in part on searching a unique subject identifier database (e.g., a third-party data repository), whether a unique subject identifier has been generated for the data subject; (3) in response to determining that a unique subject identifier has been generated for the data subject, accessing the unique subject identifier database; (4) identify the unique subject identifier of the data subject based at least in part on form data provided by the data subject in the completion of the form associated with the organization; and (5) update the unique subject identifier database to include an electronic link between the unique subject identifier of the data subject with each of (i) the form (e.g., including the form data) submitted by the data subject of each respective unique subject identifier, and (ii) one or more data assets that utilize the form data of the form received from the data subject. In this way, as an entity collects additional data for a particular unique data subject (e.g., having a unique subject identifier, hash, etc.), the third party data repository system is configured to maintain a centralized database of data collected, stored, and or processed for each unique data subject (e.g., indexed by unique subject identifier). The system may then, in response to receiving a data subject access request from a particular data subject, fulfill the request substantially automatically (e.g., by providing a copy of the personal data, deleting the personal data, indicating to the entity what personal data needs to be deleted from their system and where it is located, etc.). The system may, for example, automatically fulfill the request by: (1) identifying the unique subject identifier associated with the unique data subject making the request; and (2) retrieving any information associated with the unique data subject based on the unique subject identifier.

Continuing to Step 5350, the system is configured to transmit the unique subject identifier (i) to the third-party data repository and (ii) along with the form data provided by the user in the form, to the data asset. At Step 5360, the system is configured to digitally store the unique subject identifier (i) in the third-party data repository and (ii) along with the form data provided by the user in the form, in the data asset. As may understood in light of this disclosure, the system may then be configured to facilitate the receipt and centralized storage of personal data for each of a plurality of respective data subjects and the associated one or more data assets that process or store the form data provided by the data subject.

In particular embodiments, the system may be further configured for receiving a data subject access request from the user, accessing the third-party data repository to identify the unique subject identifier of the user, determining which one or more data assets of the plurality of data assets of the organization include the unique subject identifier, and accessing personal data (e.g., form data) of the user stored in each of the one or more data assets of the plurality of data assets of the organization that include the unique subject identifier. In particular embodiments, the data subject access request may be a subject's rights request where the data subject may be inquiring for the organization to provide all data that the particular organization has obtained on the data subject or a data subject deletion request where the data subject is requesting for the particular organization to delete all data that the particular organization has obtained on the data subject.

In particular embodiments, when the data subject access request is a data subject deletion request, in response to accessing the personal data of the user stored in each of the one or more data assets of the plurality of data assets of the organization that include the unique subject identifier, the system deletes the personal data of the user stored in each of the one or more data assets of the plurality of data assets of the organization that include the unique subject identifier. In some embodiments, when the data subject access request is a data subject deletion request, the system may be configured to: (1) in response to accessing the personal data of the user stored in each of the one or more data assets of the plurality of data assets, automatically determine that a first portion of personal data of the user stored in the one or more data assets has one or more legal bases for continued storage; (2) in response to determining that the first portion of personal data of the user stored in the one or more data assets has one or more legal bases for continued storage, automatically maintain storage of the first portion of personal data of the user stored in the one or more data assets; (3) in response to determining that the first portion of personal data of the user stored in the one or more data assets has one or more legal bases for continued storage, automatically maintaining storage of the first portion of personal data of the user stored in the one or more data assets; and (4) automatically facilitating deletion of a second portion of personal data of the user stored in the one or more data assets for which one or more legal bases for continued storage cannot be determined, wherein the first portion of the personal data of the user stored in the one or more data assets is different from the second portion of personal data of the user stored in the one or more data assets.

Data Transfer Risk Identification and Analysis

In particular embodiments, a Data Transfer Risk Identification System is configured to analyze one or more data systems (e.g., data assets), identify data transfers between/among those systems, apply data transfer rules to each data transfer record, perform a data transfer assessment on each data transfer record based on the data transfer rules to be applied to each data transfer record, and calculate a risk score for the data transfer based at least in part on the one or more data transfer risks associated with the data transfer record.

Figure 54:
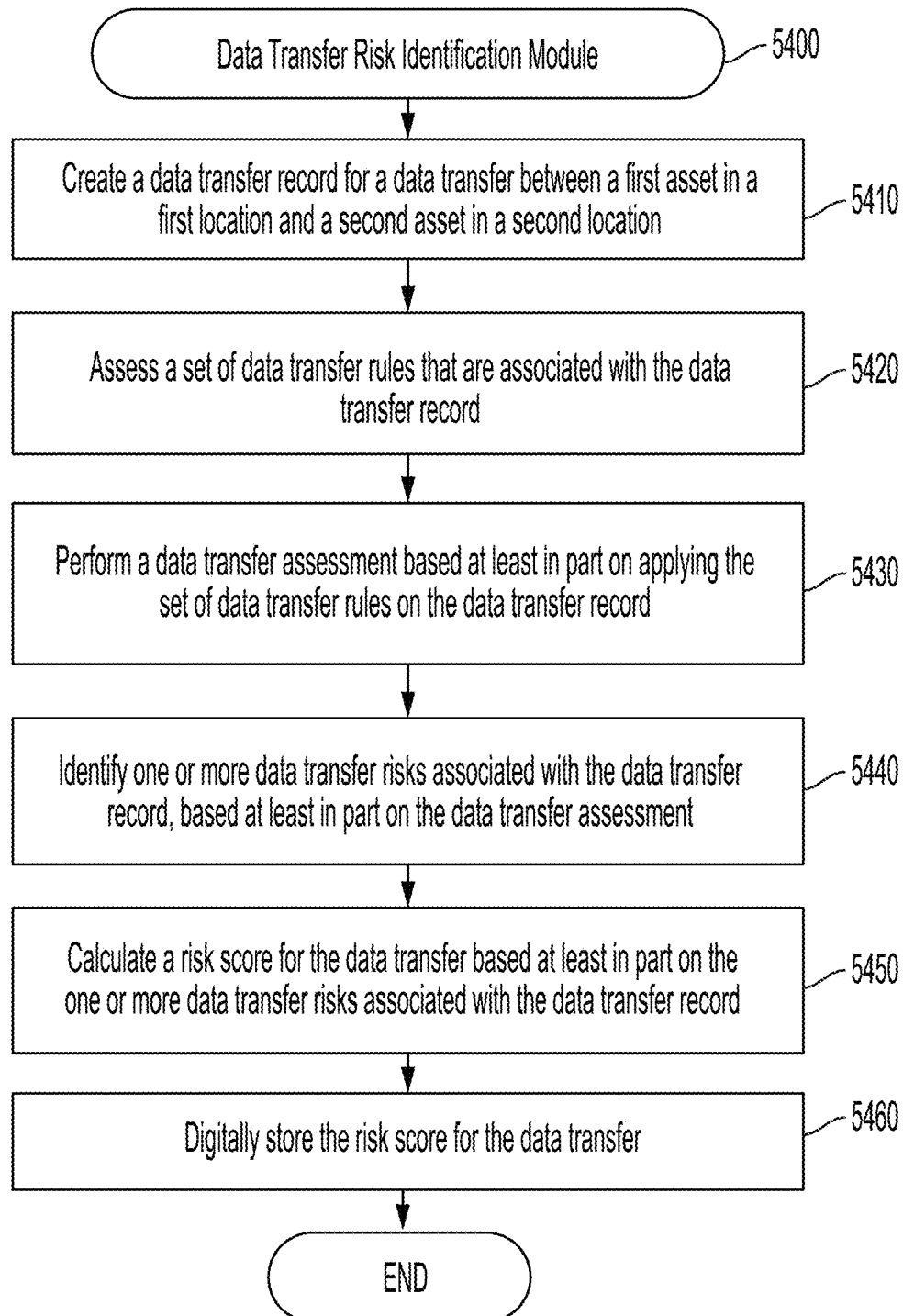
FIG. 54 is a flowchart showing an example of processes performed by a Data Transfer Risk Identification Module 5400 according to various embodiments.

Various processes performed by the Data Transfer Risk Identification System may be implemented by Data Transfer Risk Identification Module 5400. Referring to FIG. 54, in particular embodiments, the system, when executing the Data Transfer Risk Identification Module 5400, is configured for: (1) creating a data transfer record for a data transfer between a first asset in a first location and a second asset in a second location; (2) accessing a set of data transfer rules that are associated with the data transfer record; (3) performing a data transfer assessment based at least in part on applying the set of data transfer rules on the data transfer record; (4) identifying one or more data transfer risks associated with the data transfer record, based at least in part on the data transfer assessment; (5) calculating a risk score for the data transfer based at least in part on the one or more data transfer risks associated with the data transfer record; and (6) digitally storing the risk score for the data transfer.

When executing the Data Transfer Risk Identification Module 5400, the system begins, at Step 5410, by creating a data transfer record for a data transfer between a first asset in a first location and a second asset in a second location. The data transfer record may be created for each transfer of data between a first asset in a first location and a second asset in a second location where the transfer record may also include information regarding the type of data being transferred, a time of the data transfer, an amount of data being transferred, etc. In some embodiments, the system may access a data transfer record that may have already been created by the system.

In various embodiments, the system may be configured to determine in which of the one or more defined plurality of physical locations each particular data system is physically located. In particular embodiments, the system is configured to determine the physical location based at least in part on one or more data attributes of a particular data asset (e.g., data system) using one or more data modeling techniques (e.g., using one or more suitable data modeling techniques described herein). In some embodiments, the system may be configured to determine the physical location of each data asset based at least in part on an existing data model that includes the data asset. In still other embodiments, the system may be configured to determine the physical location based at least in part on an IP address and/or domain of the data asset (e.g., in the case of a computer server or other computing device) or any other identifying feature of a particular data asset.

In particular embodiments, the system is configured to identify one or more data elements stored by the one or more data systems that are subject to transfer (e.g., transfer to the one or more data systems such as from a source asset, transfer from the one or more data systems to a destination asset, etc.). In particular embodiments, the system is configured to identify a particular data element that is subject to such transfer (e.g., such as a particular piece of personal data or other data). In some embodiments, the system may be configured to identify any suitable data element that is subject to transfer and includes personal data.

In any embodiment described herein, personal data may include, for example: (1) the name of a particular data subject (which may be a particular individual); (2) the data subject's address; (3) the data subject's telephone number; (4) the data subject's e-mail address; (5) the data subject's social security number; (6) information associated with one or more of the data subject's credit accounts (e.g., credit card numbers); (7) banking information for the data subject; (8) location data for the data subject (e.g., their present or past location); (9) internet search history for the data subject; and/or (10) any other suitable personal information, such as other personal information discussed herein.

In some embodiments, with regard to the location of the one or more data assets, the system may define a geographic location of the one or more data assets. For example, define each of the plurality of physical locations based at least in part on one or more geographic boundaries. These one or more geographic boundaries may include, for example: (1) one or more countries; (2) one or more continents; (3) one or more jurisdictions (e.g., such as one or more legal jurisdictions); (4) one or more territories; (5) one or more counties; (6) one or more cities; (7) one or more treaty members (e.g., such as members of a trade, defense, or other treaty); and/or (8) any other suitable geographically distinct physical locations.

Continuing to Step 5420, the system is configured for accessing a set of data transfer rules that are associated with the data transfer record. The system may apply data transfer rules to each data transfer record. The data transfer rules may be configurable to support different privacy frameworks (e.g., a particular data subject type is being transferred from a first asset in the European Union to a second asset outside of the European Union) and organizational frameworks (e.g., to support the different locations and types of data assets within an organization). The applied data transfer rules may be automatically configured by the system (e.g., when an update is applied to privacy rules in a country or region) or manually adjusted by the particular organization (e.g., by a privacy officer of the organization). The data transfer rules to be applied may vary based on the data being transferred.

As may be understood from this disclosure, the transfer of personal data may trigger one or more regulations that govern such transfer. In particular embodiments, personal data may include any data which relate to a living individual who can be identified: (1) from the data; or (2) from the data in combination with other information, which is in the possession of, or is likely to come into the possession of a particular entity. In particular embodiments, a particular entity may collect, store, process, and/or transfer personal data for one or more customers, one or more employees, etc.

In various embodiments, the system is configured to use one or more data models of the one or more data assets (e.g., data systems) to analyze one or more data elements associated with those assets to determine whether the one or more data elements include one or more data elements that include personal data and are subject to transfer. In particular embodiments, the transfer may include, for example: (1) an internal transfer (e.g., a transfer from a first data asset associated with the entity to a second data asset associated with the entity); (2) an external transfer (e.g., a transfer from a data asset associated with the entity to a second data asset associated with a second entity); and/or (3) a collective transfer (e.g., a transfer to a data asset associated with the entity from an external data asset associated with a second entity).

The particular entity may include, for example, a particular organization, company, sub-organization, etc. In particular embodiments, the one or more data assets (e.g., data systems) may include, for example, any entity that collects, processes, contains, and/or transfers data (e.g., such as a software application, "internet of things" computerized device, database, web site, data-center, server, etc.). For example, a first data asset may include any software or device utilized by a particular entity for such data collection, processing, transfer, storage, etc. In various embodiments, the first data asset may be at least partially stored on and/or physically located in a particular location. For example, a server may be located in a particular country, jurisdiction, etc. A piece of software may be stored on one or more servers in a particular location, etc.

In particular embodiments, the system is configured to identify the one or more data systems using one or more data modeling techniques. As discussed more fully above, a data model may store the following information: (1) the entity that owns and/or uses a particular data asset (e.g., such as a primary data asset, an example of which is shown in the center of the data model in FIG. 4); (2) one or more departments within the organization that are responsible for the data asset; (3) one or more software applications that collect data (e.g., personal data) for storage in and/or use by the data asset; (4) one or more particular data subjects (or categories of data subjects) that information is collected from for use by the data asset; (5) one or more particular types of data that are collected by each of the particular applications for storage in and/or use by the data asset; (6) one or more individuals (e.g., particular individuals or types of individuals) that are permitted to access and/or use the data stored in, or used by, the data asset; (7) which particular types of data each of those individuals are allowed to access and use; and (8) one or more data assets (destination assets) that the data is transferred to for other use, and which particular data is transferred to each of those data assets.

As may be understood in light of this disclosure, the system may utilize a data model (e.g., or one or more data models) of data assets associated with a particular entity to identify the one or more data systems associated with the particular entity.

Next, at Step 5430, the system is configured for performing a data transfer assessment based at least in part on applying the set of data transfer rules on the data transfer record. The data transfer assessment performed by the system may identify risks associated with the data transfer record. At Step 5440, the system is configured for identifying one or more data transfer risks associated with the data transfer record, based at least in part on the data transfer assessment. The one or more data transfer risks may include, for example, a source location of the first location of the one or more first data asset of the data transfer, a destination location of the second location of the one or more second data asset of the data transfer, one or more type of data being transferred as part of the data transfer (e.g., personal data or sensitive data), a time of the data transfer (e.g., date, day of the week, time, month, etc.), an amount of data being transferred as part of the data transfer.

Continuing to Step 5450, the system is configured for calculating a risk score for the data transfer based at least in part on the one or more data transfer risks associated with the data transfer record. The risk score may be calculated in a multitude of ways, and may include one or more data transfer risks such as a source location of the data transfer, a destination location of the data transfer, the type of data being transferred, a time of the data transfer, an amount of data being transferred, etc. Additionally, the system may apply weighting factors (e.g., manually or automatically determined) to the risk factors. Further, in some implementations, the system may include a threshold risk score where a data transfer may be terminated if the data transfer risk score indicates a higher risk than the threshold risk score (e.g., the data transfer risk score being higher than the threshold risk score).

In some embodiments, the system may compare the risk score for the data transfer to a threshold risk score, determine that the risk score for the data transfer is a greater risk than the threshold risk score, and in response to determining that the risk score for the data transfer is a greater risk than the threshold risk score, taking one or more action. The one or more action may include, for example, provide the data transfer record to one or more individuals (e.g., a privacy officer) for review of the data transfer record where the one or more individuals may make a decision to approve the data transfer or terminate the data transfer. In some implementations, the system may automatically terminate the data transfer.

In some implementations, the system may generate a secure link between one or more processors associated with the first asset in the first location and one or more processors associated with the second asset in the second location, and the system may further provide the data transfer via the secure link between the one or more processors associated with the first asset in the first location and the one or more processors associated with the second asset in the second location.

In various embodiments, the system may determine a weighting factor for each of the one or more data transfer risks, determine a risk rating for each of the one or more data transfer risks, and calculate the risk level for the data transfer based upon, for each respective one of the one or more data transfer risks, the risk rating for the respective data transfer risk and the weighting factor for the respective data transfer risk.

At Step 5460, the system continues by digitally storing the risk score for the data transfer. In various embodiments, the system may continue by transferring the data between the first asset in the first location and the second asset in the second location. In some embodiments, the system may be configured to substantially automatically flag a particular transfer of data as problematic (e.g., because the transfer does not comply with an applicable regulation). For example, a particular regulation may require data transfers from a first asset to a second asset to be encrypted.

Automated Classification of Personal Information from Documents

In any embodiment described herein, an automated classification system may be configured to substantially automatically classify one or more pieces of personal information in one or more documents (e.g., one or more text-based documents, one or more spreadsheets, one or more PDFs, one or more webpages, etc.). In particular embodiments, the system may be implemented in the context of any suitable privacy compliance system, which may, for example, be configured to calculate and assign a sensitivity score to a particular document based at least in part on one or more determined categories of personal information (e.g., personal data) identified in the one or more documents. As understood in the art, the storage of particular types of personal information may be governed by one or more government or industry regulations. As such, it may be desirable to implement one or more automated measures to automatically classify personal information from stored documents (e.g., to determine whether such documents may require particular security measures, storage techniques, handling, whether the documents should be destroyed, etc.).

Figure 55:
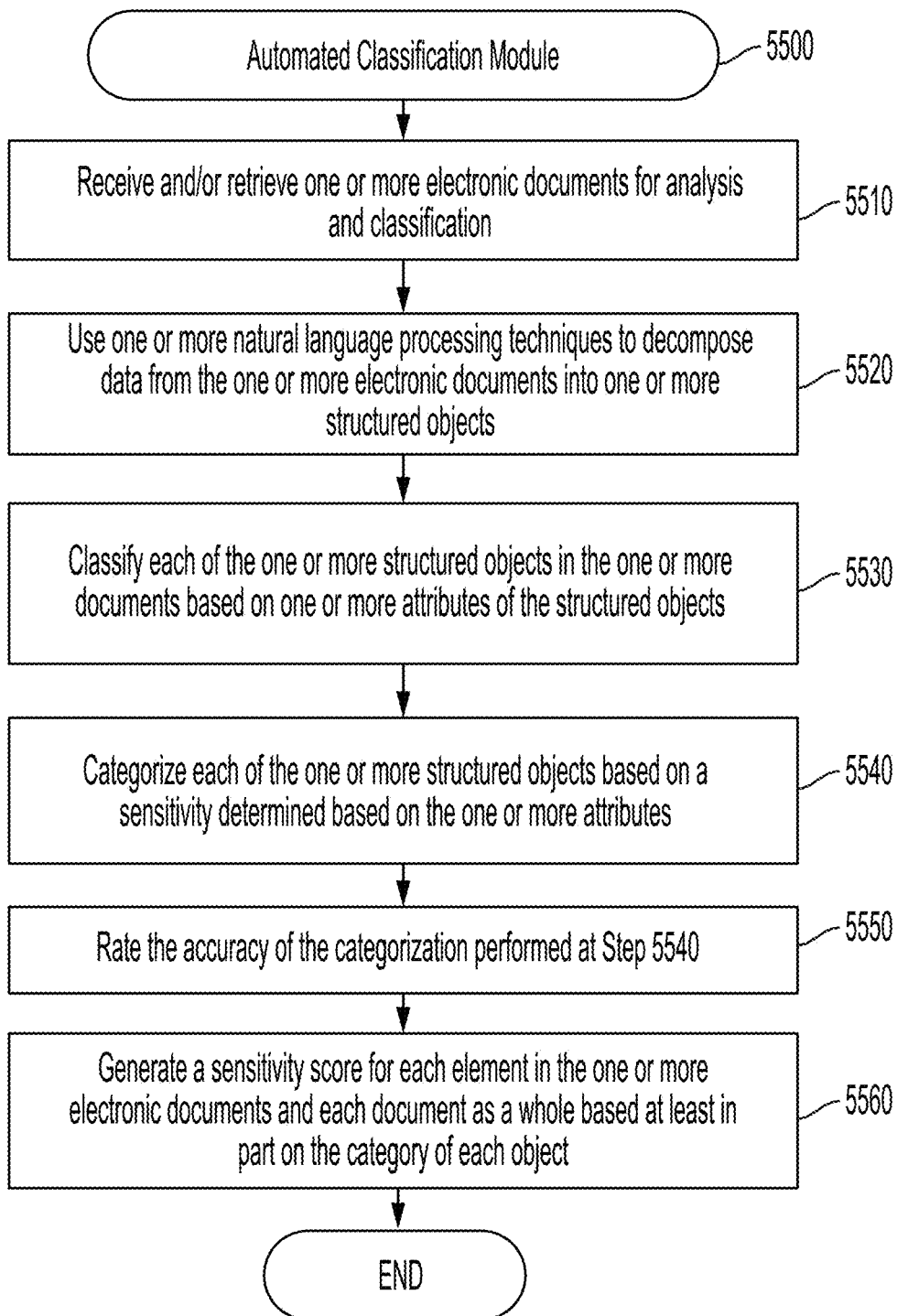
FIG. 55 is a is a flowchart showing an example of a process performed by an Automated Classification Module 5500 according to particular embodiments.

FIG. 55 is a flowchart of process steps that the system may perform in the automatic classification of personal information in an electronic document. When executing the Automated Classification Module 5500, the system begins, at Step 5510, by receiving and/or retrieving one or more electronic documents for analysis and classification. The system may, for example, receive a particular document from a user for analysis. In other embodiments, the system may be configured to automatically scan electronic documents stored on a system (e.g., on one or more servers, in one or more databases, or in any other suitable location) to classify any personal information that may be stored therein. In various embodiments, the one or more electronic documents may include, for example: (1) one or more PDFs; (2) one or more spreadsheets; (3) one or more text-based documents; (4) one or more audio files; (5) one or more video files; (6) one or more webpages; and/or (7) any other suitable type of document.

FIG. 56 depicts an exemplary electronic document that the system may receive and/or retrieve for analysis. As may be understood from FIG. 56 (e.g., a PDF or other text-based document), the electronic document contains employee information such as: (1) first name; (2) last name; (3) social security number; (3) address; (4) marital status; (5) phone number; (6) employer information; (7) etc.

Continuing to Step 5520, the system is configured to use one or more natural language processing techniques to determine data from the one or more electronic documents into one or more structured objects. The system may, for example, use one or more optical character recognition (OCR) techniques to identify particular text in the electronic documents. In some embodiments, the system may be configured to use one or more audio processing techniques to identify one or more words in an audio recording, etc.

The system, in particular embodiments, may be configured to: (1) parse the document to identify context for particular identified text (e.g., identify context based at least in part on proximity to other identified text, etc.); (2) parse out labels from the document; and (3) parse out values for the various labels. The system may, for example, identify particular categories of information contained in document. As may be understood from FIG. 3, the system may be configured to identify particular labels such as, for example: (1) first name; (2) last name; (3) city; and (4) so on. The system may be further configured to identify values associated with each label such as: (1) DOE for last name; (2) JOHN for first name; (3) etc. The system may be configured to determine these values based on, for example: (1) a proximity of the values to the labels; (2) a position of the values relative to the labels; (3) one or more natural language processing techniques (e.g., the system may be configured to identify John as a name, and then associate John with the identified label for name, etc.). The system may then be further configured to electronically associate the identified values with their respective labels (e.g., in computer memory).

Figure 57:
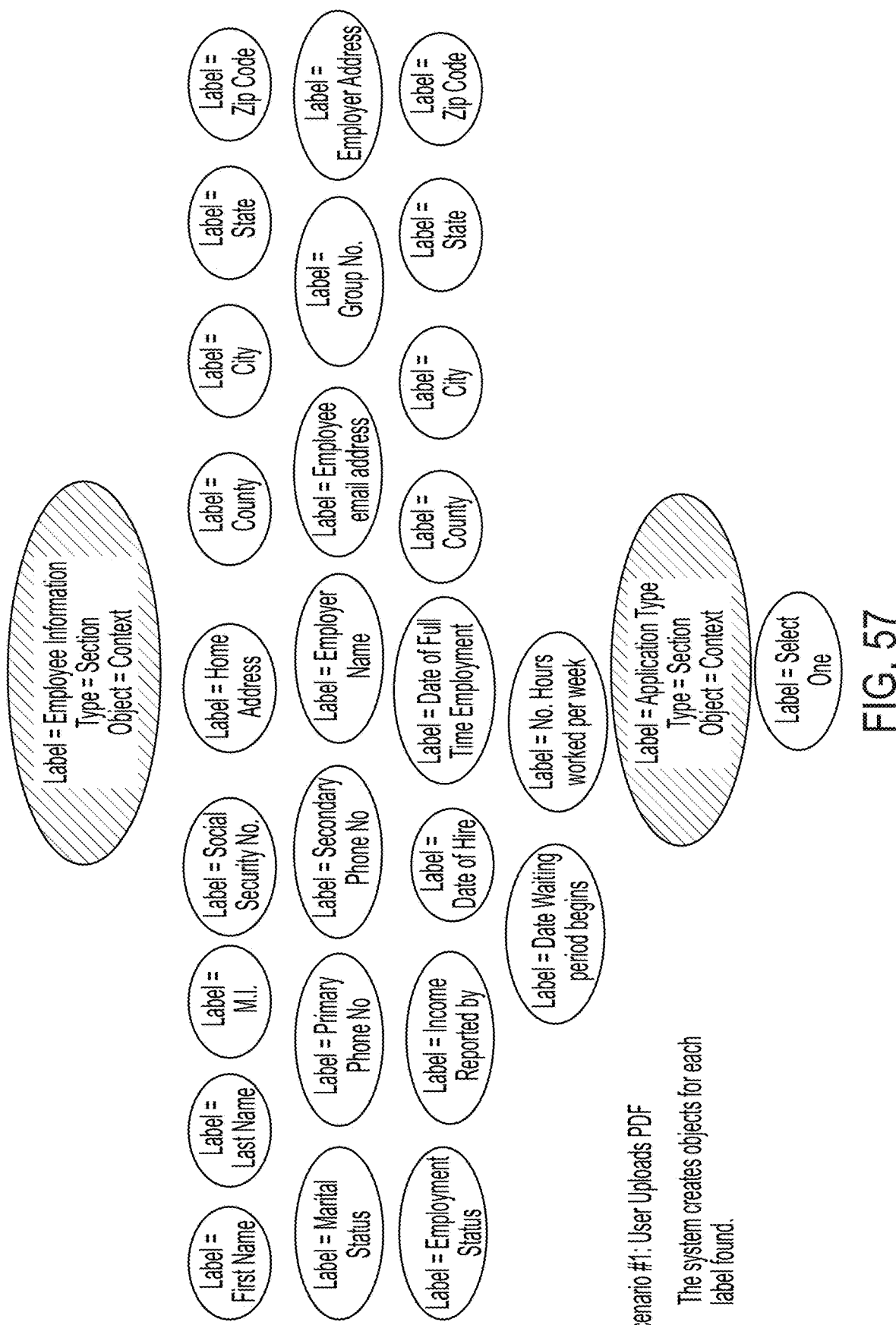
FIG. 57 depicts a visual representation of a plurality of objects that the system may create for each particular label identified in a document.

In any embodiment described herein, the system may then generate a classification of one or more structured objects identified using the natural language processing techniques described above. For example, the system may be configured to generate a catalog of labels identified in the electronic document. FIG. 57 depicts an illustration of one or more object that the system has generated based on the document shown in FIG. 56 as a result of the scanning described above.

Figure 58:
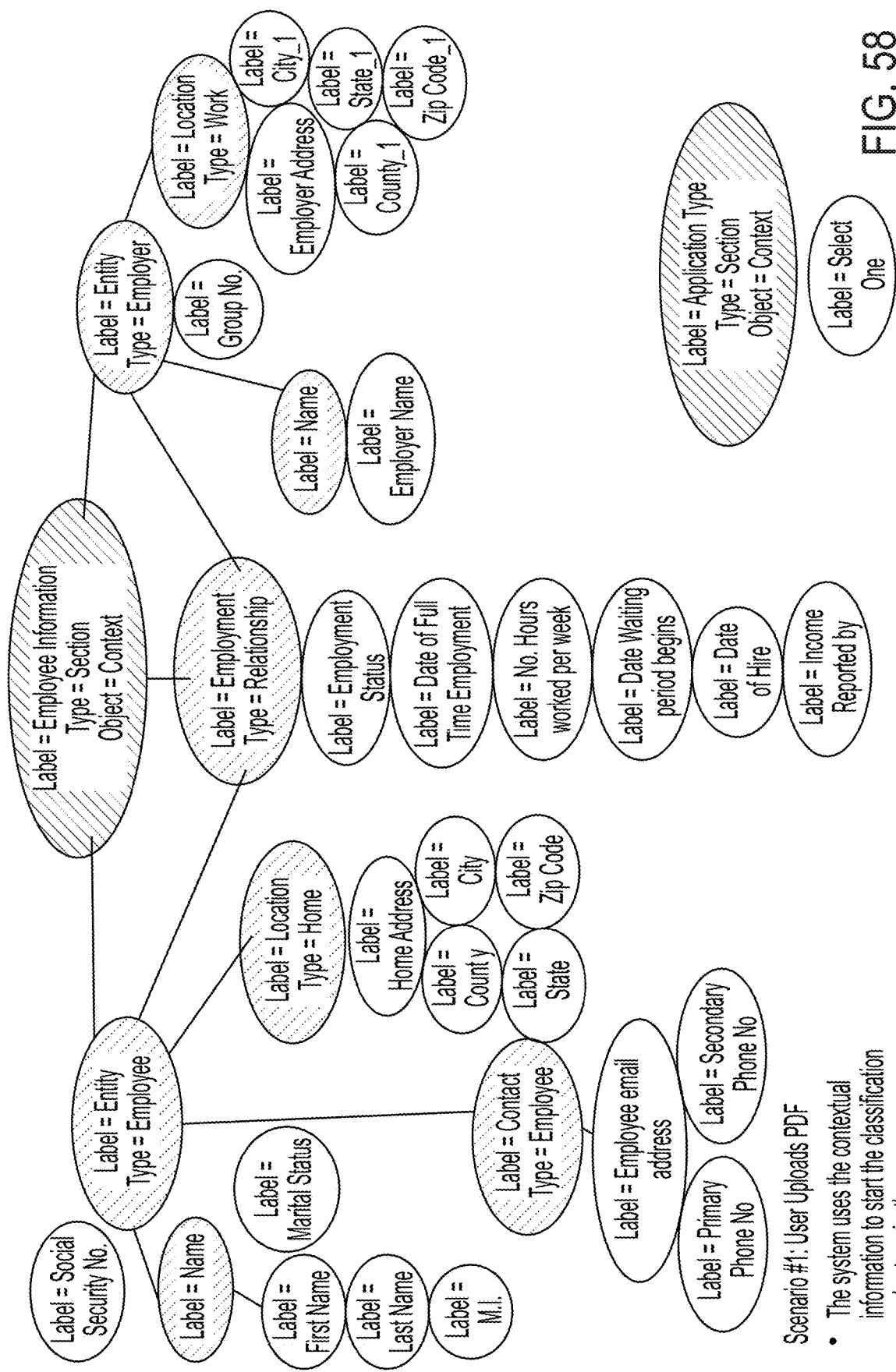
FIGS. 58-60 depict a visual representation of the system creating a classification and categorization of objects using contextual information from the document.

Continuing to Step 5530, the system is configured to classify each of the one or more structured objects based on one or more attributes of the structured objects. For example, the system may be configured to use contextual information, sentiment, and/or syntax to classify each of the structured objects. FIG. 58 depicts an exemplary classification of the structured objects cataloged from FIG. 57. As may be understood from this Figure, the system may be configured to group objects based in part on a type of information. For example, the various objects related to an individual's name (e.g., first name, last name, etc.) may be grouped into a single classification. The system may, for example, be configured to automatically classify the one or more objects based on: (1) the object's proximity in the particular document; (2) one or more headings identified in the document; and/or (3) any other suitable factor. For example, in various embodiments, the system is configured to use one or more machine learning and/or natural language techniques to identify a relation between objects.

Figure 59:
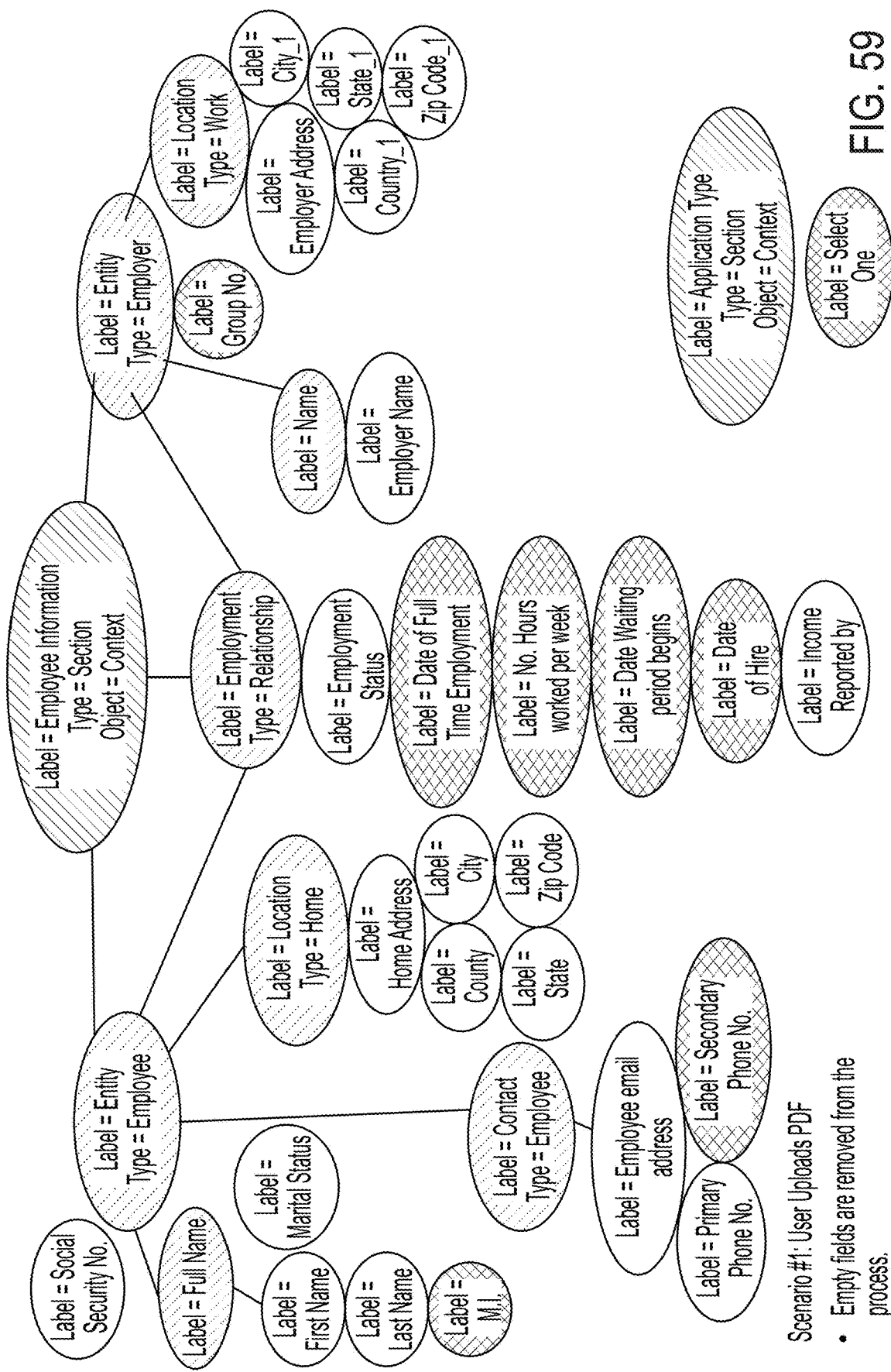
Figure 60:
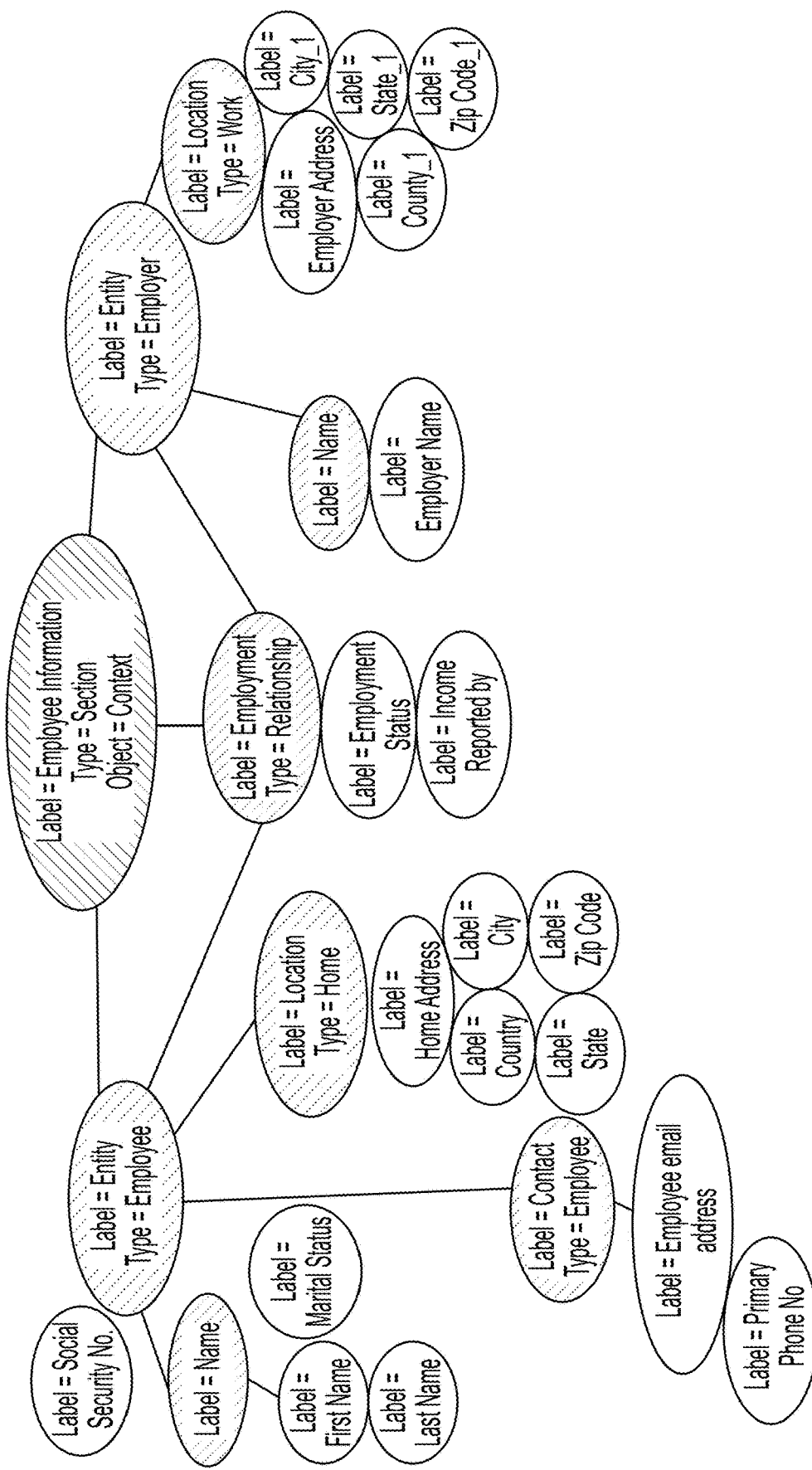

The system may then be configured to identify one or more objects without associated values and remove those objects from the classification. FIGS. 59-60 depict a visual representation of objects without associated values from the PDF shown in FIG. 56 being blacked out and removed from the classification. The system may, for example, be configured to generate an initial classification based on the document, and then modify the classification based on one or more identified values in the specific document.

Continuing to Step 5540, the system is configured to categorize each of the one or more structured objects based at least in part on a sensitivity of information determined based on the one or more attributes of the objects. The system may be configured to determine the categorization based on sensitivity based on, for example: (1) one or more predefined sensitivities for particular categories of information; (2) one or more user-defined sensitivities; (3) one or more sensitivities determined automatically based on one or more prevailing industry or government regulations directed toward the type of information associated with the objects; (4) etc.

FIG. 62 depicts an exemplary mapping of values and structured objects based on a sensitivity of the structured objects. As may be understood from this figure, the system is configured to cross-reference the categorization of structured objects with a database of personal data classification, which may, for example, identify a sensitivity of particular categories of structured objects (e.g., personally identifiable information, sensitive personal data, partial PII, personal data, not personal data, etc.). The system may then be configured to map the results as shown in FIG. 62.

Next, at Step 5550, the system is configured to rate the accuracy of the categorization performed at Step 5540. The system may, for example, be configured to rate the categorization by comparing the categorization determined for a similar electronic document (e.g., a second electronic document that includes the same form filled out by another individual than John Doe). In other embodiments, the system may be configured to rate the accuracy of the categorization based on one or more attributes (e.g., one or more values) of the structured objects. The system may, for example, analyze the value for a particular object to determine an accuracy of the categorization of the object. For example, an object for first name may be categorized as "employee information," and the system may be configured to analyze a value associated with the object to determine whether the categorization is accurate (e.g., analyze the value to determine whether the value is, in fact, a name). The system may, for example, determine that the accuracy of the categorization is relatively low in response to determining that a value for the "first name" object contains a number string or a word that is not traditionally a name (e.g., such as 'attorney' or another job title, a phone number, etc.). The system may determine a character type (e.g., set of numbers, letters, a combination of numbers and letters, etc.) for each object and a character type for each value of the object to determine the accuracy of the categorization. The character type for each object and each value of the object may be compared to determine the accuracy of the categorization by the system.

Continuing to Step 5560, the system is configured to generate a sensitivity score for each element in the one or more electronic documents and each document as a whole based at least in part on the category and sensitivity of each object. The system may, for example, assign a relative sensitivity to the document based on each relative sensitivity score assigned to each object identified in the document. The system may, in various embodiments, calculate a sensitivity score for each object based at least in part on a confidence in the accuracy of the categorization of the object and the sensitivity assigned to the particular categorization.

Conclusion

Although embodiments above are described in reference to various privacy compliance monitoring systems, it should be understood that various aspects of the system described above may be applicable to other privacy-related systems, or to other types of systems, in general.

While this specification contains many specific embodiment details, these should not be construed as limitations on the scope of any invention or of what may be Concepted, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially Concepted as such, one or more features from a Concepted combination may in some cases be excised from the combination, and the Concepted combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended Concepts. Although specific terms are employed herein, they are used in a generic and descriptive sense only and not for the purposes of limitation.

Although embodiments above are described in reference to various data subject access fulfillment systems, it should be understood that various aspects of the system described above may be applicable to other privacy-related systems, or to other types of systems, in general.

While this specification contains many specific embodiment details, these should not be construed as limitations on the scope of any invention or of what may be Concepted, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially Concepted as such, one or more features from a Concepted combination may in some cases be excised from the combination, and the Concepted combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. In addition, it should be understood that terms such as "in some embodiments", "in various embodiments", and "in certain embodiments" are intended to indicate that the stated features may be implemented in any suitable embodiment described herein.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended Concepts. Although specific terms are employed herein, they are used in a generic and descriptive sense only and not for the purposes of limitation.

We claim:

1. A method comprising:
   receiving, by computing hardware, a unique identifier of a data subject submitted through an interface associated with a computer system of an entity;
   responsive to a certain period of time elapsing after the unique identifier was submitted, initiating, by the computing hardware, a test interaction associated with the unique identifier and involving submitting a request for a response from the computer system;
   determining, by the computing hardware, the computer system has initiated the response to the request, wherein the response includes personal data of the data subject matched to the unique identifier; and
   responsive to determining that the computer system has initiated the response, performing, by the computing hardware, an action with regard to the computer system, wherein:
   the certain period of time comprises at least one of a time after which a deletion request to delete the personal data has been submitted to the entity or an expected data retention time for the personal data; and
   performing the action comprises:
   generating a report indicating that the personal data remains in the computer system; and
   providing the report to an individual associated with the entity.

2. The method of claim 1, wherein the unique identifier was provided to the data subject after submitting the deletion request to delete the personal data.

3. The method of claim 1, wherein performing the action comprises scanning the computer system to identify the personal data.

4. The method of claim 1, wherein performing the action comprises:
   flagging the personal data in the computer system; and
   providing the flagged personal data to an individual associated with the entity.

5. The method of claim 1, wherein the request comprises a contact-request form providing data associated with the unique identifier.

6. A system comprising:
   a non-transitory computer-readable medium storing instructions; and
   a processing device communicatively coupled to the non-transitory computer-readable medium,
   wherein, the processing device is configured to execute the instructions and thereby perform operations comprising:
   receiving a unique identifier associated with a data subject submitted through an interface to a computer system of an entity;
   receiving an indication of completion of an erasure of personal data of the data subject matched to the unique identifier from the computer system;
   responsive to receiving the indication, initiating a test interaction associated with the unique identifier after a certain period of time has elapsed after submission of a deletion request to delete the personal data, the test interaction involving submitting a request for a response from the computer system;
   determining the computer system has initiated the response to the request, wherein the response includes the personal data; and
   responsive to determining that the computer system has initiated the response, performing an action with regard to the computer system, wherein:
   the certain period of time comprises at least one of a time after which the deletion request to delete the personal data has been submitted to the entity or an expected data retention time for the personal data
   performing the action comprises:
   generating a report indicating that the personal data remains in the computer system; and
   providing the report to an individual associated with the entity.

7. The system of claim 6, wherein the unique identifier was provided to the data subject after submitting the deletion request to delete the personal data.

8. The system of claim 6, wherein the operations further comprise submitting the deletion request to have the personal data deleted from the computer system.

9. The system of claim 6, wherein performing the action comprises:
- flagging the personal data in the computer system; and
- providing the flagged personal data to an individual associated with the entity.

10. The system of claim 6, wherein performing the action comprises:
- generating a report indicating that the personal data remains in the computer system; and
- providing the report to an individual associated with the entity.

11. A non-transitory computer-readable medium having program code that is stored thereon, the program code executable by one or more processing devices for performing operations comprising:
- responsive to a certain period of time elapsing after a unique identifier associated with a data subject was submitted through an interface to a computer system of an entity, initiating a test interaction involving submitting a request for a response from the computer system;
- determining the computer system has initiated the response to the request, wherein the response includes personal data of the data subject matched to the unique identifier; and
- responsive to determining that the computer system has initiated the response, performing an action with regard to the computer system, wherein:
  - the certain period of time comprises at least one of a time after which a deletion request to delete the personal data has been submitted to the entity or an expected data retention time for the personal data; and
  - performing the action comprises:
    - generating a report indicating that the personal data remains in the computer system; and
    - providing the report to an individual associated with the entity.

12. The non-transitory computer-readable medium of claim 11, wherein the unique identifier was provided to the data subject after submitting the deletion request to delete the personal data.

13. The non-transitory computer-readable medium of claim 11, wherein the interface comprises a webform in which the unique identifier is provided.

14. The non-transitory computer-readable medium of claim 11, wherein performing the action comprises:
- flagging the personal data in the computer system; and
- providing the flagged personal data to an individual associated with the entity.

\* \* \* \* \*